United States Patent [19]
Shimada et al.

[11] Patent Number: 6,020,867
[45] Date of Patent: *Feb. 1, 2000

[54] DISPLAY APPARATUS

[75] Inventors: Tetsuya Shimada, Zama; Katsumi Kurematsu, Hiratsuka; Hiroshi Takabayashi, Atsugi; Shigeki Yabu, Yokohama; Makoto Uehara, Zama; Toshiaki Itazawa, Yamato; Yasushi Maeda; Masanori Takahashi, both of Chigasaki; Yoshihiro Onitsuka, Hiratsuka; Kumiharu Takai, Yokohama; Osamu Yuki, Atsugi, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/620,227

[22] Filed: Mar. 22, 1996

[51] Int. Cl.⁷ ....................................... G09G 3/36
[52] U.S. Cl. ............................... 345/87; 345/905
[58] Field of Search ............................ 345/87, 905, 102; 361/681; 349/58, 61; 248/919, 921–923

[56] References Cited

U.S. PATENT DOCUMENTS

| | | | |
|---|---|---|---|
| 4,561,726 | 12/1985 | Goodby et al. | 350/341 |
| 4,589,996 | 5/1986 | Inoue et al. | 252/299.65 |
| 4,592,858 | 6/1986 | Higuchi et al. | 252/299.66 |
| 5,255,109 | 10/1993 | Klein | 359/43 |
| 5,504,605 | 4/1996 | Sakuma et al. | 359/83 |
| 5,583,529 | 12/1996 | Satou | 345/87 |

FOREIGN PATENT DOCUMENTS

| | | |
|---|---|---|
| 4172319 | 6/1992 | Japan . |
| 6230344 | 8/1994 | Japan . |
| 7049497 | 2/1995 | Japan . |

OTHER PUBLICATIONS

Database WPI, Week 9647, Derwent Publication Ltd., London, GB, AN 96–473382, English Abstract (Sep. 1996).
R.B.Meyer, et al., "Ferroelectric Liquid Crystals", Journal de Physique Lettres, Supplement au Journal de Physique, Tome 36, No. 3, pp. L51–L78 (Mar. 1975).
K. Butsuri, Solid State Physics, vol. 16, No. 3, pp. 141–151 (1981).
N. Clark, et al., "Submicrosecond Bistable Electro–Optic Switching in Liquid Crystals", Applied Physica Letters, vol. 36, No. 11, pp. 899–901 (Jun. 1980).

*Primary Examiner*—Jeffery Brier
*Attorney, Agent, or Firm*—Fitzpatrick, Cella, Harper & Scinto

[57] ABSTRACT

A display apparatus includes a display unit for displaying images, a backlight unit disposed behind the display unit for illuminating the display unit, an inverter unit for electrically controlling the backlight unit, a controller unit for controlling the inverter unit and the display unit, and a power supply unit having an exothermic heat distribution for supplying electricity to the inverter unit and the controller unit. The inverter unit and controller unit are disposed behind the backlight unit and the power supply unit is disposed on a side of the display unit, backlight unit, inverter unit and controller unit. The display unit, backlight unit, inverter unit, controller unit and power supply unit are disposed in a common housing. The inverter unit and the controller unit are arranged behind the backlight unit. An insulating member is further disposed between the power supply unit and the display unit at a position corresponding to a region of relatively large exothermic heat of the power supply unit, and the insulating member is disposed at a diagonal position with respect to the inverter unit. The display apparatus may be supported by a support structure including vertically tilting and laterally turning mechanisms.

67 Claims, 152 Drawing Sheets

$L_c = 24.39^{+5.05}_{0}$ $L_s = 16.75^{+1.69}_{0}$

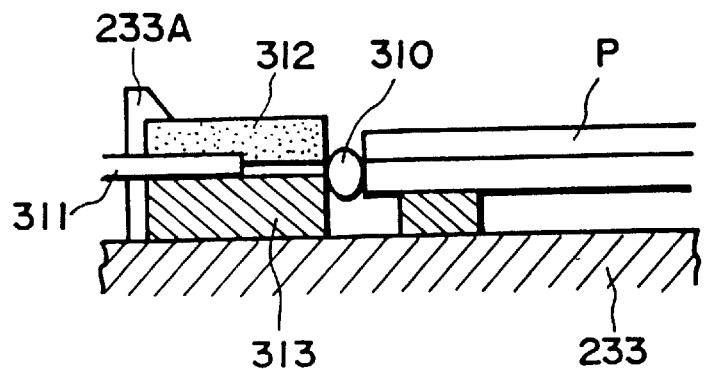
F I G. 140
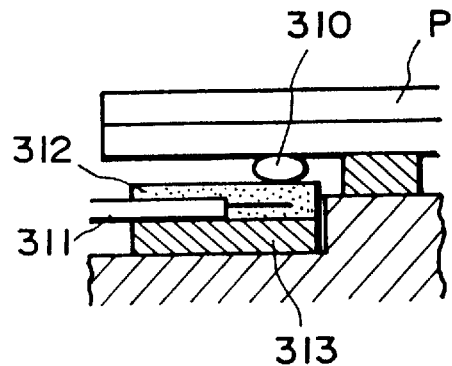
F I G. 141
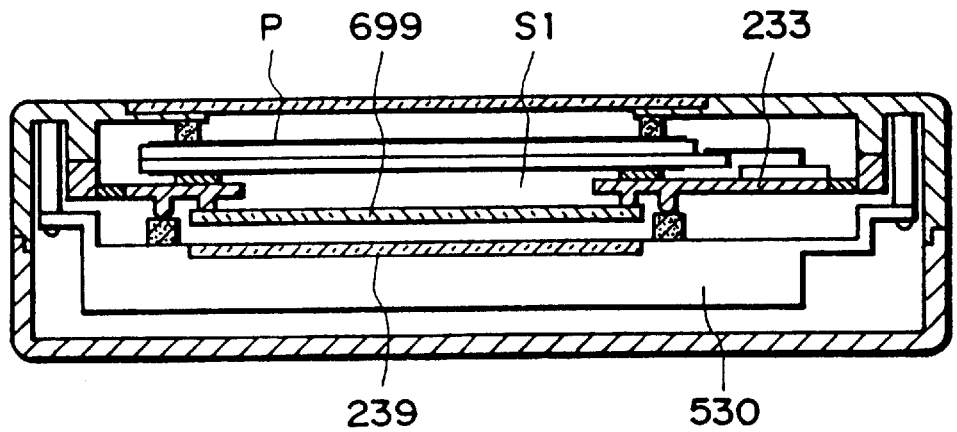
F I G. 142

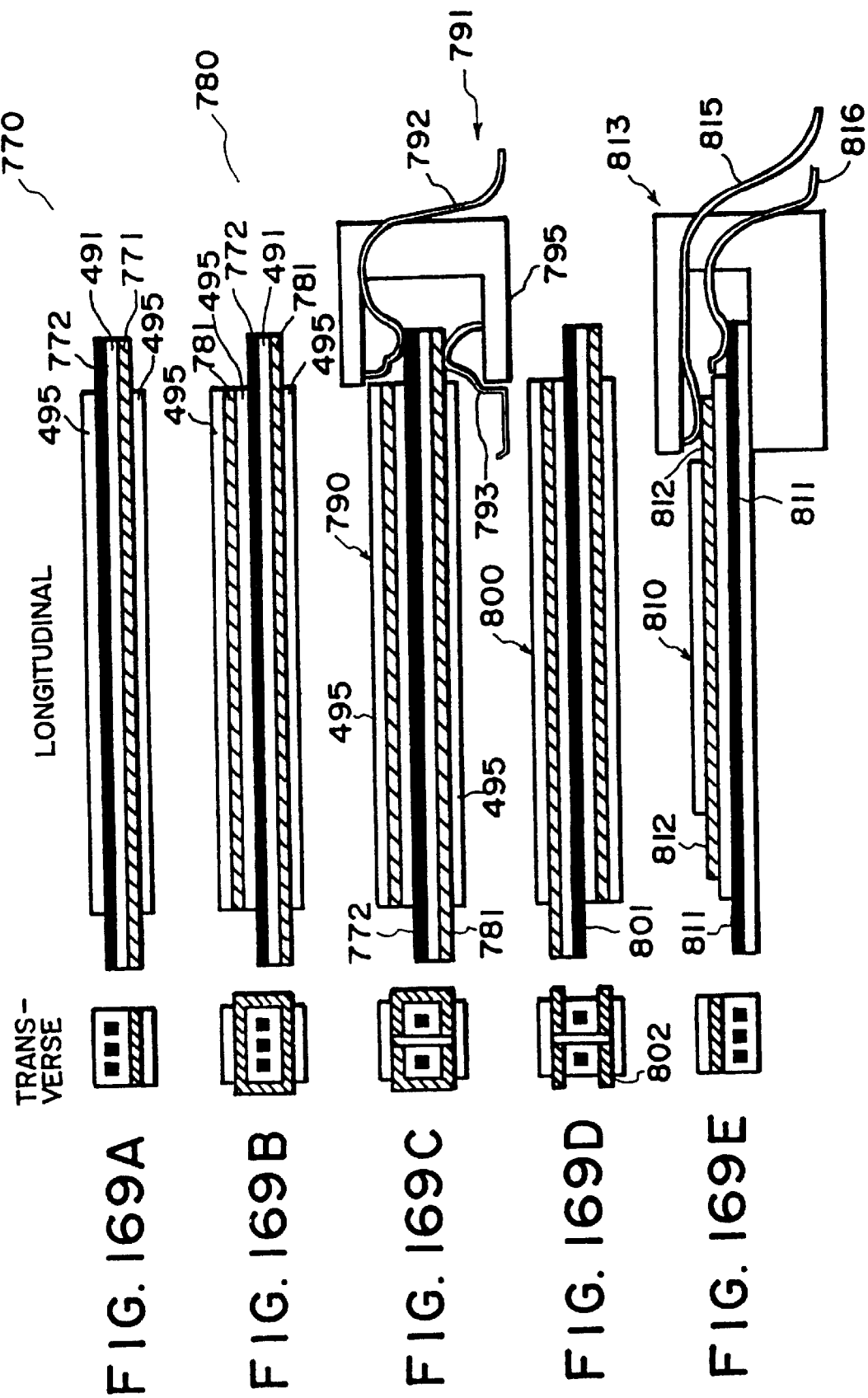

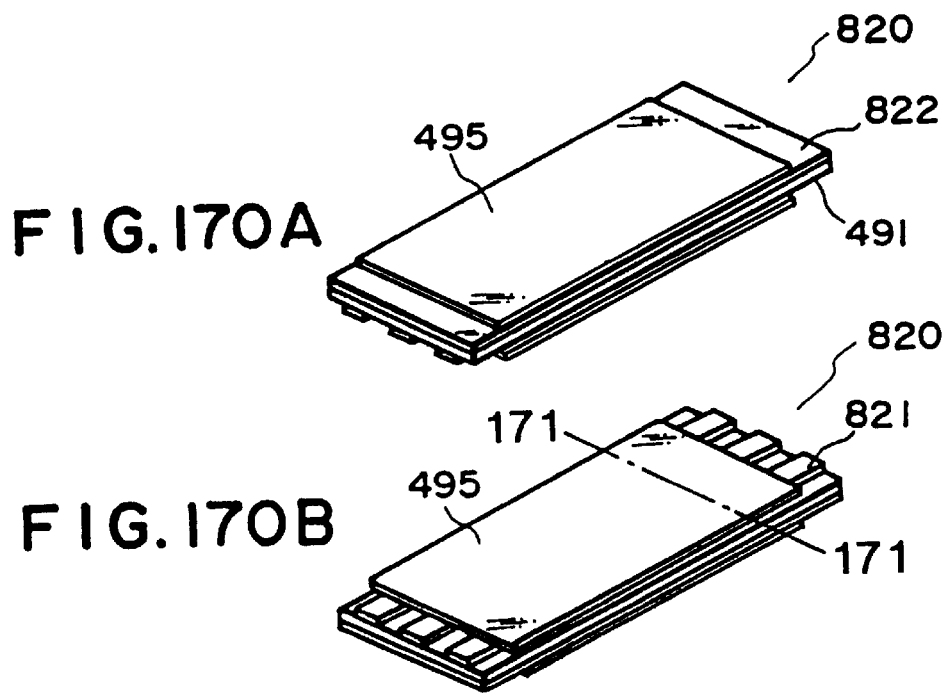
FIG. 170A
FIG. 170B
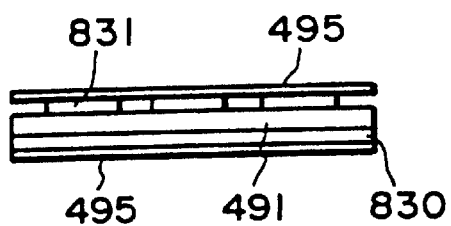
FIG. 171
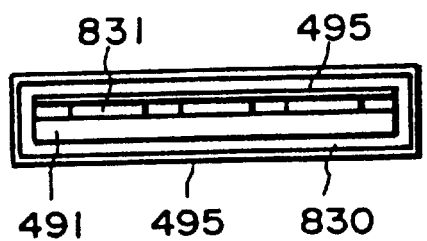
FIG. 172

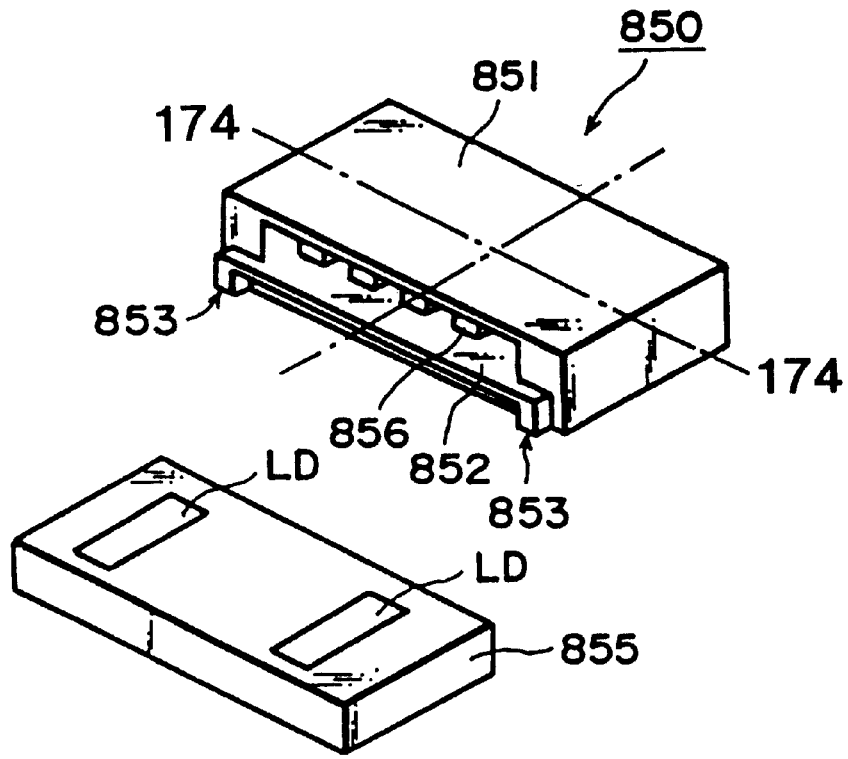
F I G. 173
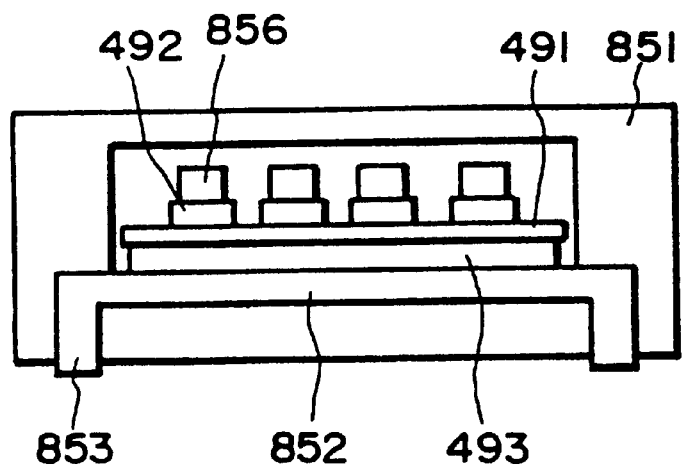
F I G. 174

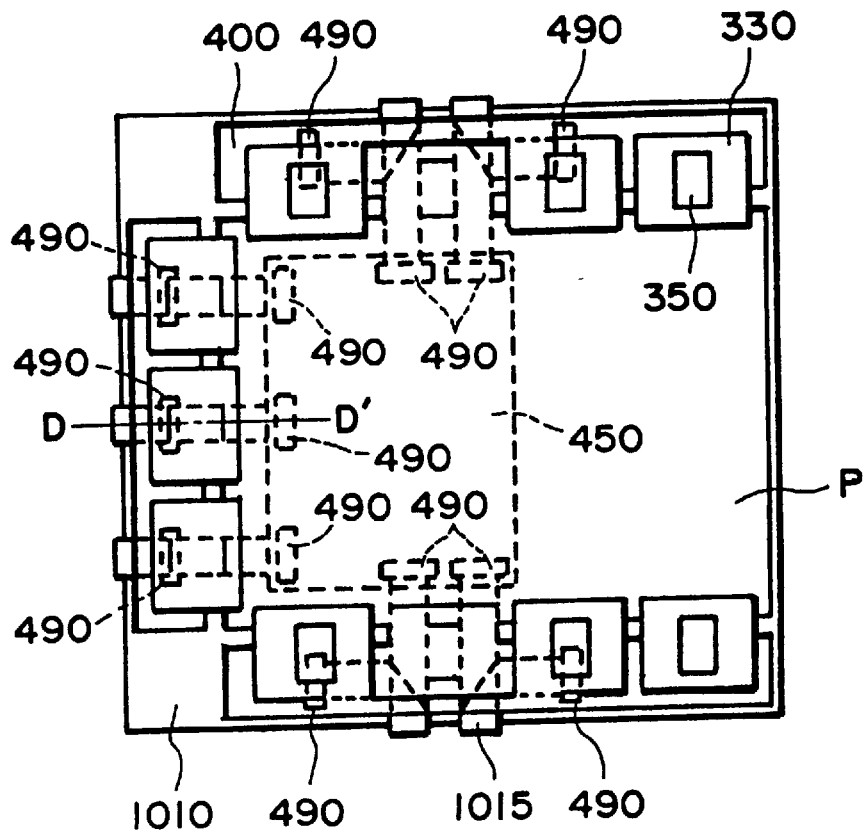
F I G. 187
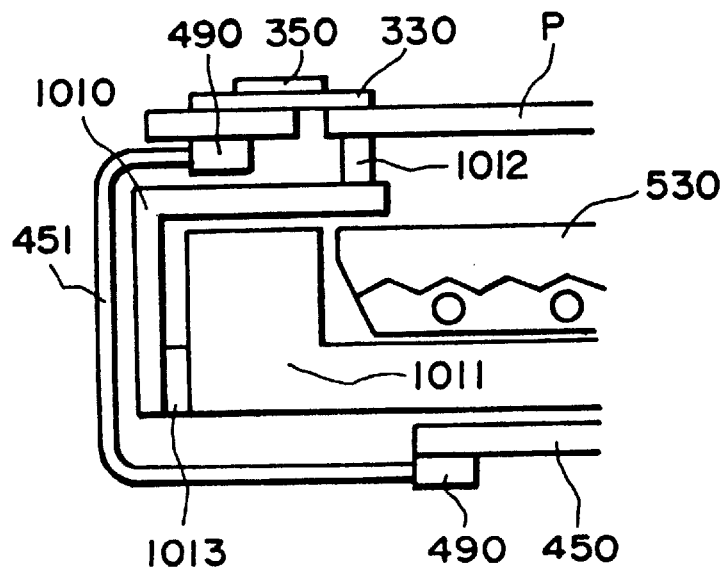
F I G. 188

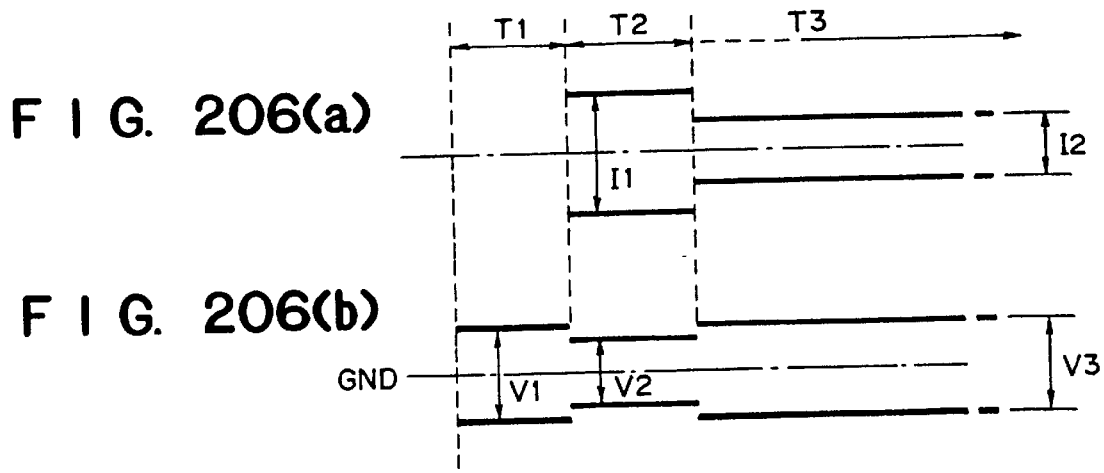
F I G. 206(a)
F I G. 206(b)
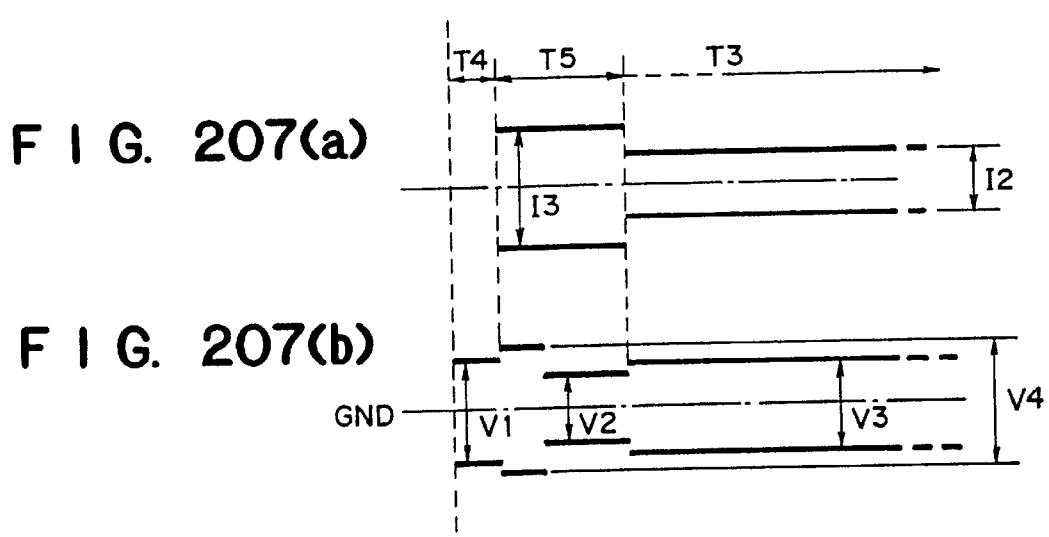
F I G. 207(a)
F I G. 207(b)
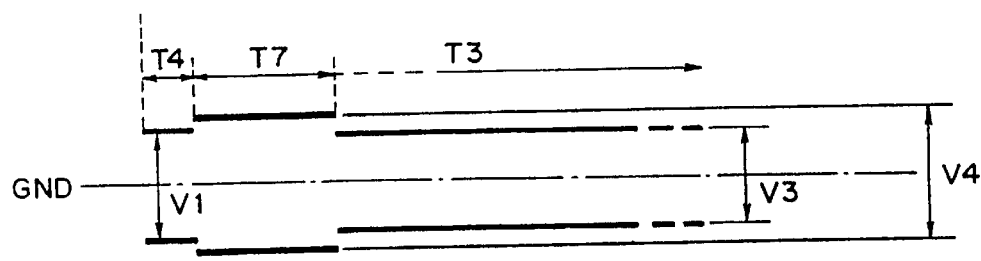
F I G. 208

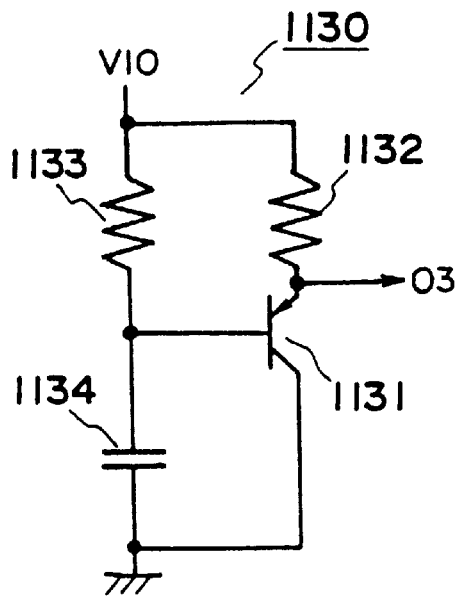
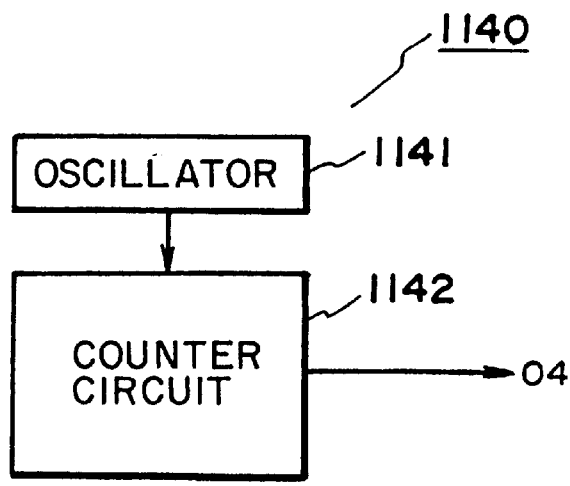
FIG. 209  FIG. 210
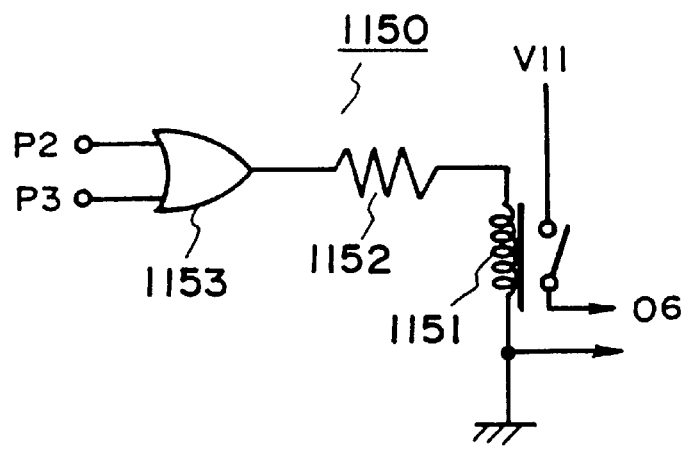
FIG. 211

F I G. 235(a) 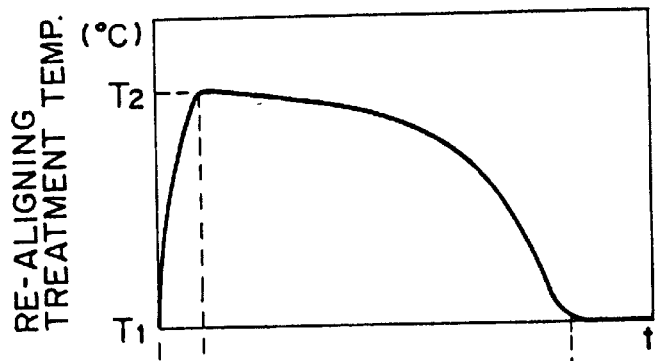
F I G. 235(b) 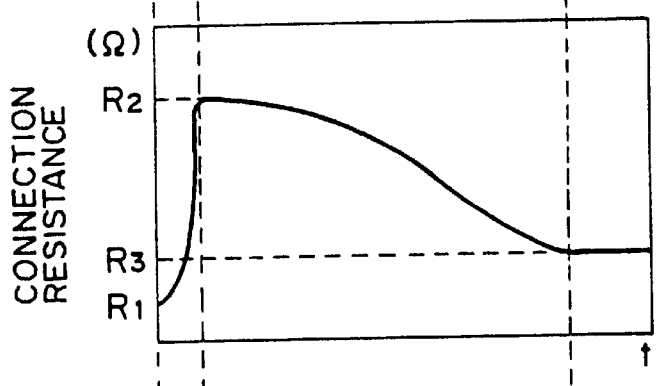
F I G. 235(c) 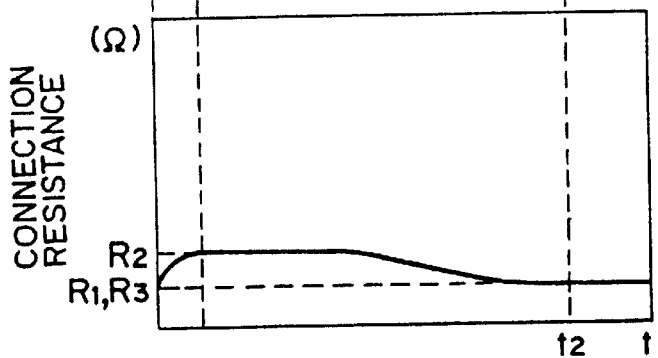

DISPLAY APPARATUS

FIELD OF THE INVENTION AND RELATED ART

The present invention relates generally to a display apparatus for displaying various data or information and more particularly to a display apparatus including a power supply unit as a heat-generating source together with a display unit in a common housing.

Display apparatus including a CRT display, an electroluminescence device, etc., have hitherto been used in OA (office automation) equipments such as personal computers. In recent years, the use of various liquid crystal display apparatus having advantages of low power consumption, a small thickness and light weight has been proposed, e.g., in Japanese Laid-Open Patent Application (JP-A) 6-230344. Hereinbelow, a liquid crystal display apparatus as an example of display apparatus will be described with reference to FIGS. 238–241.

A liquid crystal display apparatus 1500, for example, includes a liquid crystal panel 1501 as shown in FIG. 238. As shown in further detail in FIG. 239, the liquid crystal panel 1501 includes, e.g., 1.1 mm-thick two glass substrates 1502 and 1503 having thereon plural stripe-shaped transparent electrodes 1505 and 1506, respectively, covered with insulating films 1507 and 1509, respectively, of $SiO_2$ for short circuit prevention. The insulating films 1507 and 1509 are further coated with polyimide alignment films 1510 and 1511, respectively, which have been subjected to a rubbing treatment to be imparted with an alignment control power. Between the substrates 1502 and 1503, a multiplicity of spacer beads are dispersed, and a sealing adhesive 1513 is disposed at the periphery, so that a prescribed gap is held between the substrates by the spacers, and the substrates 1502 and 1503 are bonded to each other with the sealing adhesive. Further, a liquid crystal 1515 is disposed at the gap between the substrates 1502 and 1503.

The liquid crystal panel 1501 having the above structure is fixed to a fixing plate 1521 by means of an elastic silicone adhesive 1520, and a transparent face plate 1522 is affixed to the fixing state. To the liquid crystal panel 1501 are connected a liquid crystal drive element 1523 and a driver board 1525 (FIG. 240), of which the driver board 1525 is affixed to the fixing plate 1521.

On the back side of the liquid crystal panel 1501, a backlight unit 1530 is disposed as shown in FIG. 238. The backlight unit 1530 includes a linear light source 1531, a diffusion plate 1532 and a reflection plate 1533, so that light issued from the linear light source 1531 is reflected and diffused by the reflection plate 1533 and the diffusion plate 1532 to be emitted for illuminating the liquid crystal panel 1501.

As the liquid crystal 1515, a ferroelectric liquid crystal having a high-speed responsiveness and bistability and capable of a large area display has been used in place of a conventional nematic liquid crystal, but the properties of the ferroelectric liquid crystal are remarkably temperature-dependent, so that the threshold of liquid crystal molecular switching remarkably changes on a temperature change and the response speed becomes slower, i.e., one-scanning line writing frequency is lowered, at a low temperature (as shown in FIG. 241). Further, the ferroelectric liquid crystal has a relatively narrow temperature range where a chiral smectic phase showing ferroelectricity is stably present and is liable to cause a phase transition to a crystal phase at a temperature near zero °C. Once it is crystallized, the liquid crystal cannot restore its normal molecular alignment state (characterized by a uniform layer structure in chiral smectic phase formed in the panel production step) even if it is returned to its chiral smectic phase temperature but results in a state not suitable for display.

Accordingly, in a liquid crystal display apparatus using such a ferroelectric liquid crystal, it is necessary to retain the liquid crystal panel 1501 at a prescribed temperature in order to retain a fast response speed and an image quality. For this purpose, a heater panel 1526 has been inserted between the liquid crystal panel 1501 and the backlight unit 1530 as shown in FIG. 238 so as to heat or warm the liquid crystal panel 1501 by the heater panel 1526. Further, a heater control circuit 1535, etc., has also been added.

However, the use of such a heater panel 1526 in a conventional liquid crystal display apparatus has incurred an increased power consumption.

The use of such a heater panel 1526 and a heater control circuit 1535 necessitates an increase in number of parts or components and are further accompanied with difficulties, such as increased production steps, complicated maintenance, an increase in weight of the liquid crystal apparatus, difficulty in transportation or movement, and an increase in production cost.

SUMMARY OF THE INVENTION

An object of the present invention is to provide a display apparatus capable of preventing an increase in power consumption, preventing a complication of production step and maintenance and suppressing an increase in production cost.

Another object of the present invention is to provide a display apparatus having desirable performances as described above, providing a uniform temperature distribution over a display unit and providing excellent display qualities.

A further object of the present invention is to provide a display apparatus of a small thickness having good observability in addition to performances as described above.

According to the present invention, there is provided a display apparatus, comprising:

a display unit for displaying images, a backlight unit for illuminating the display unit, an inverter unit for electrically controlling the backlight unit, a controller unit for controlling the inverter unit and the display unit, a power supply unit having an exothermic heat distribution for supplying electricity to the inverter unit and the controller unit;

said display unit being disposed on a front side of the backlight unit, said inverter unit and said controller unit being disposed on a back side of the backlight unit, said power supply unit being disposed on a side of the display unit, backlight unit, inverter unit and controller unit, said display unit, said backlight unit, said inverter unit, said controller unit and said power supply unit being disposed in a common housing;

wherein said inverter unit and said controller unit are arranged behind the backlight unit, an insulating member is disposed between the power supply unit and the display unit at a position corresponding to a region of relatively large exothermic heat of the power supply unit so that the insulating member is disposed at a diagonal position with respect to the inverter unit.

According to the present invention, there is further provided a display apparatus including the above-mentioned display apparatus as an apparatus main body and a support structure for supporting the apparatus main body.

When the above-mentioned display apparatus according to the present invention is started, electricity is supplied from the power supply unit to the inverter unit and the controller unit, whereby the display unit is electrically controlled by the controller unit to display images thereon. On the other hand, the backlight unit is turned on via the controller unit and the inverter unit to illuminate the display unit. By the illumination, the images on the display unit become easily recognizable.

Further, as the power supply unit is disposed on a side of and integrally with the display unit in a common housing, heat evolved from the power supply unit is effectively conducted to the display unit.

Further, the display apparatus can be supported by the support structure so as to change its angle of inclination vertically and laterally whereby the observability thereof can be optimized.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 140 and 141 are respectively a sectional view showing an another thermistor attachment structure.

FIG. 142 is a sectional view showing another diffusion plate disposition.

FIGS. 169A–169E each show a transverse section and a longitudinal section of a flat cable.

FIGS. 170A and 170B are a perspective view as viewed from the GND side and a perspective view as viewed from the signal line side, respectively, of another flat cable.

FIG. 171 is a sectional view of the flat cable taken along a 171—171 line in FIG. 170B.

FIG. 172 is a sectional view of another flat cable.

FIG. 173 is an exploded view of another connector.

FIG. 174 is a sectional view taken along a 174—174 line in FIG. 173.

FIGS. 175–178 are respectively a sectional view showing another connector.

FIGS. 179A and 179B are sectional views of another flat cable.

FIG. 180 is a sectional view showing another connector.

FIGS. 181–184 are respectively a perspective view of another connector.

FIG. 185 is a perspective view of another flat cable.

FIG. 186 is a sectional view showing another flat cable.

FIG. 187 is a schematic plan view showing a disposition of flat cables and connectors on a display panel.

FIG. 188 is a sectional view taken along a line D-D' in FIG. 187.

FIG. 189 is a partial perspective view showing a manner of connector attachment.

Figure 190A:
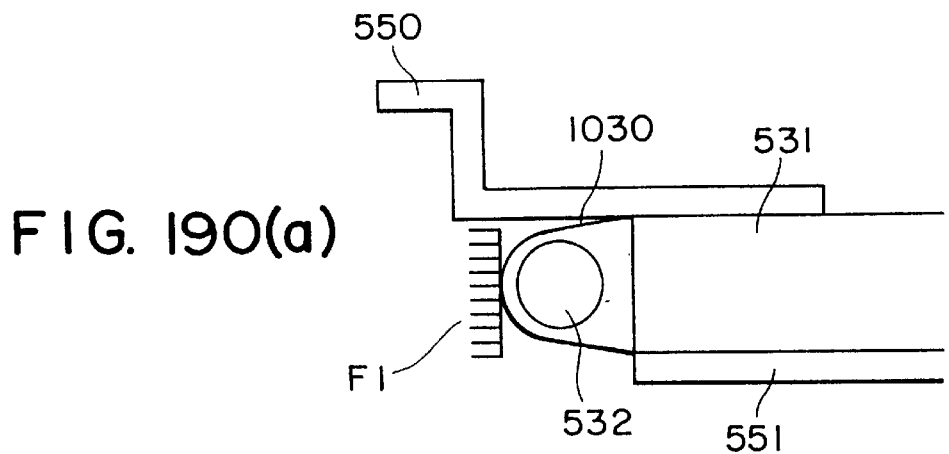
Figure 190B:
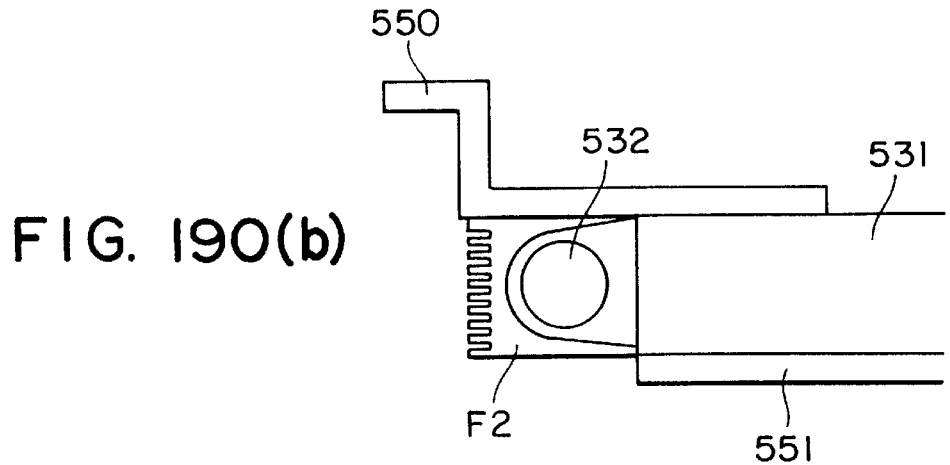

FIGS. 190(a) and 190(b) are sectional views showing another backlight unit.

Figure 191:
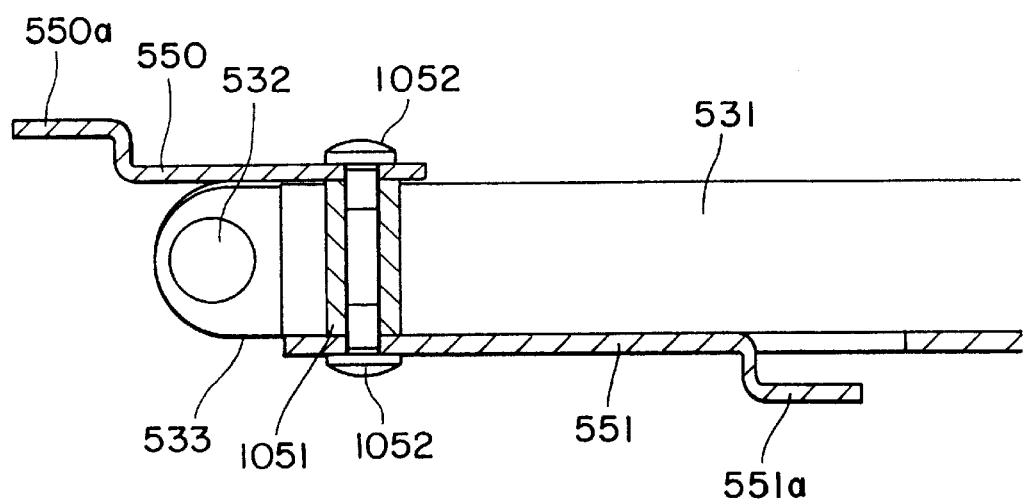
Figure 193:
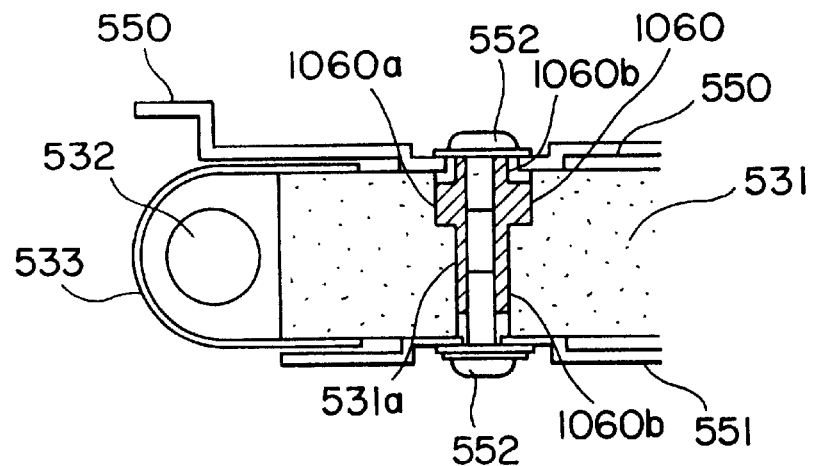

FIGS. 191 and 193 are respectively a sectional view showing another backlight unit.

Figure 192:
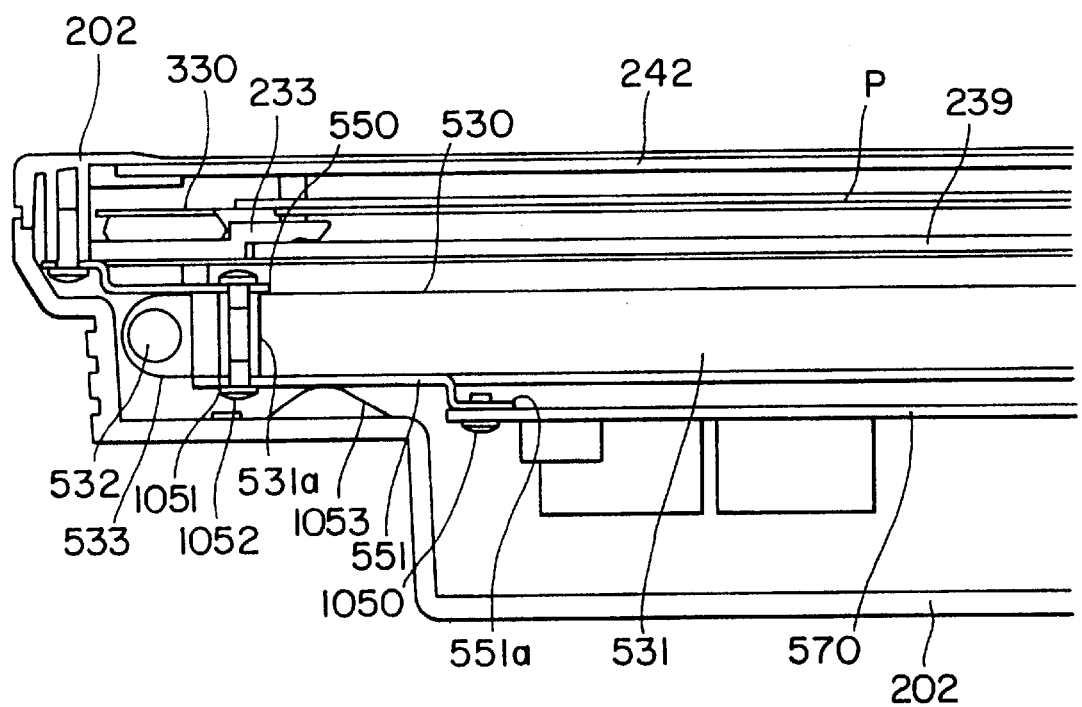

FIG. 192 is a sectional view showing a manner of grounding.

Figure 194:
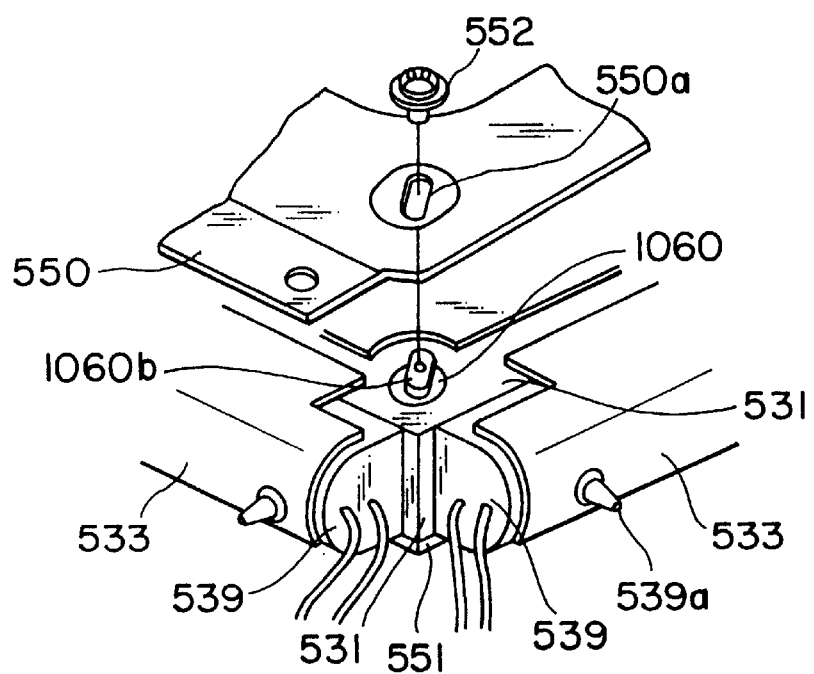

FIG. 194 is an exploded view regarding another backlight unit.

Figure 195:
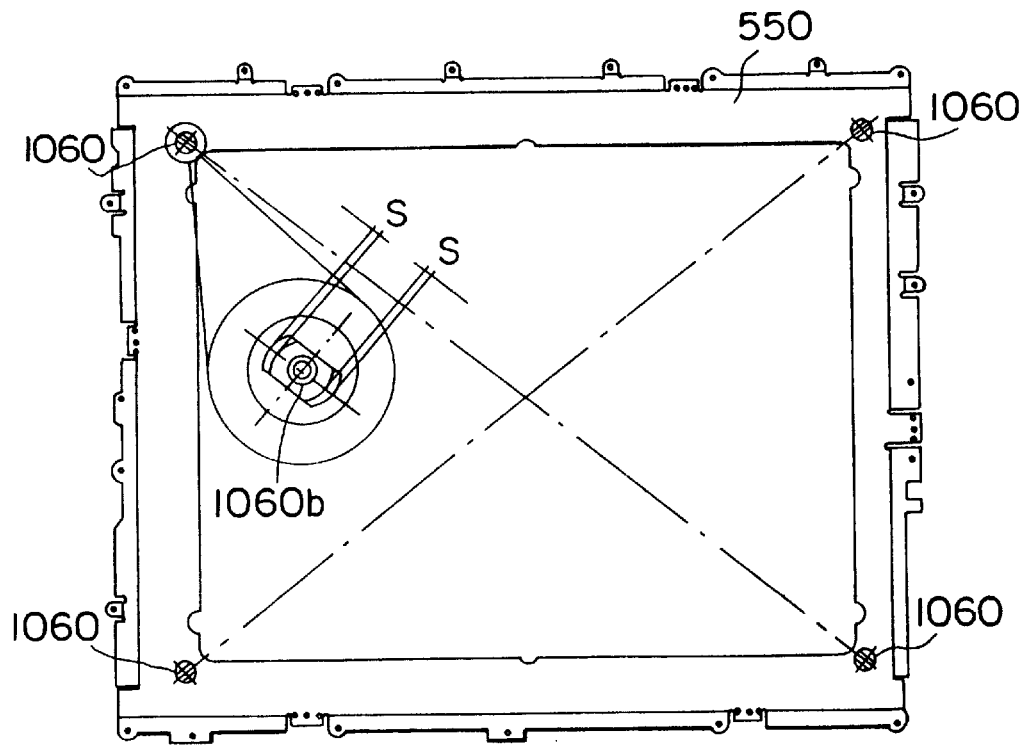
Figure 196:
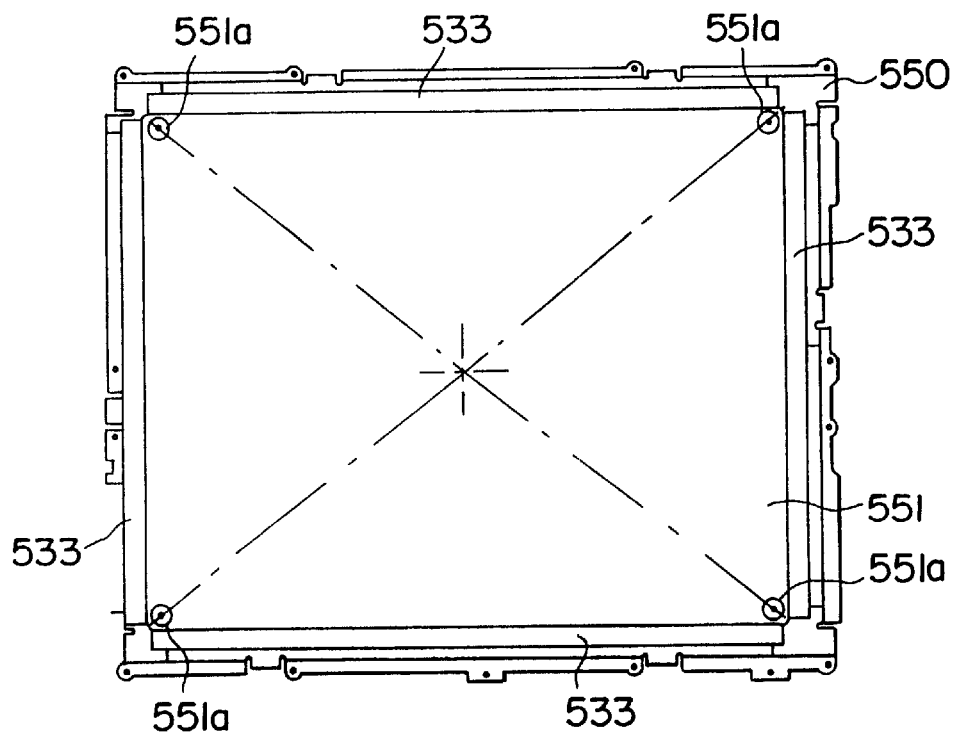

FIGS. 195 and 196 are plan views showing another backlight unit.

Figure 197:
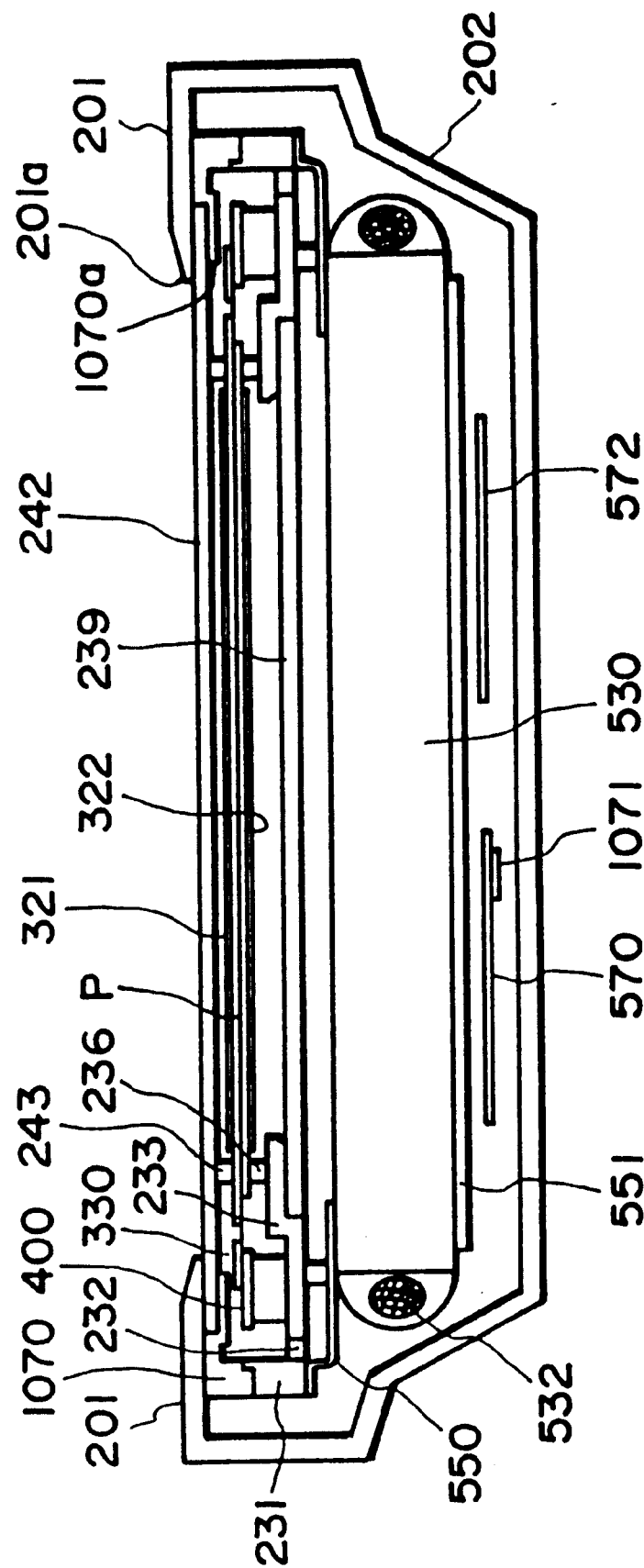

FIG. 197 is a sectional view showing a positional relationship between a backlight unit and an inverter unit.

Figure 198:
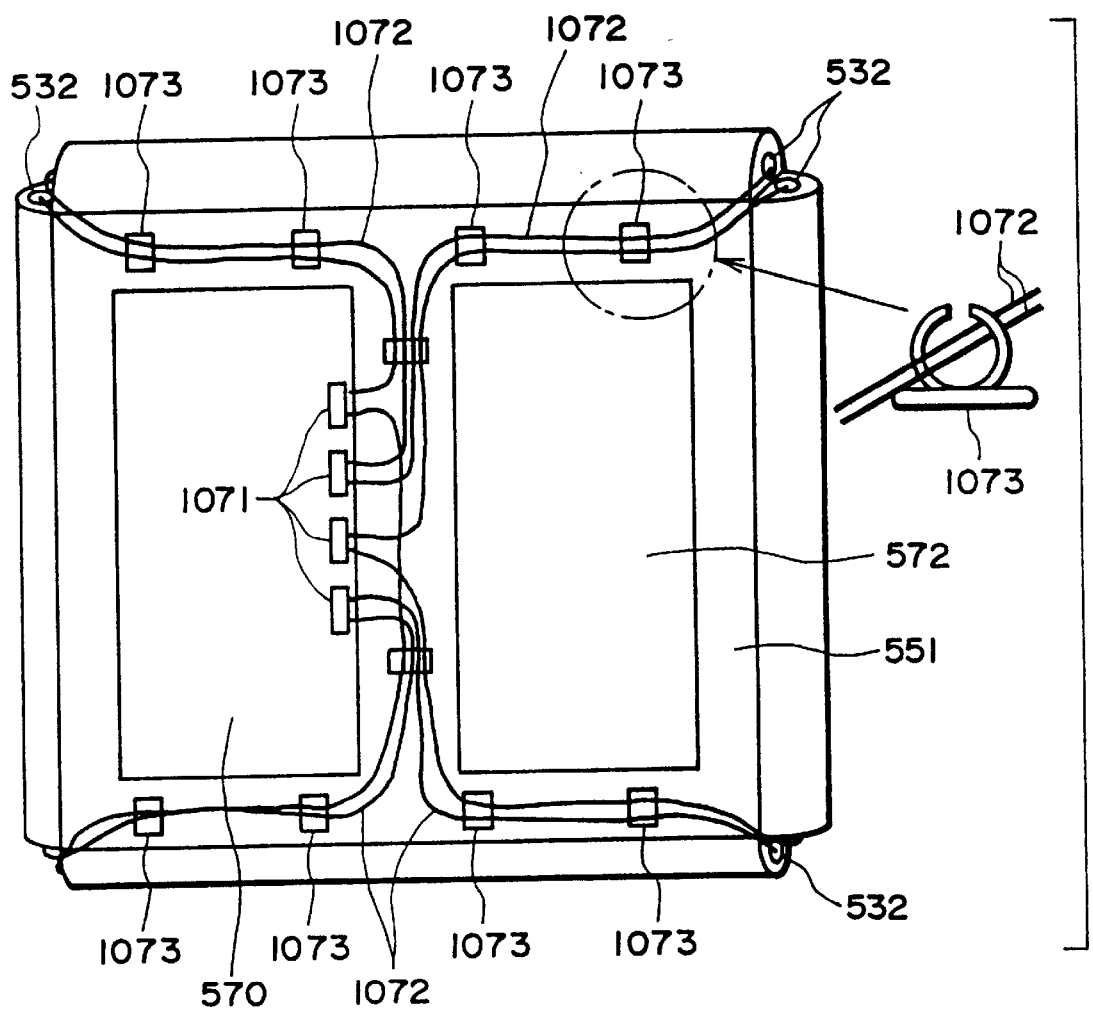

FIG. 198 is a plan view showing a wiring state between a backlight unit and an inverter unit.

Figure 199:
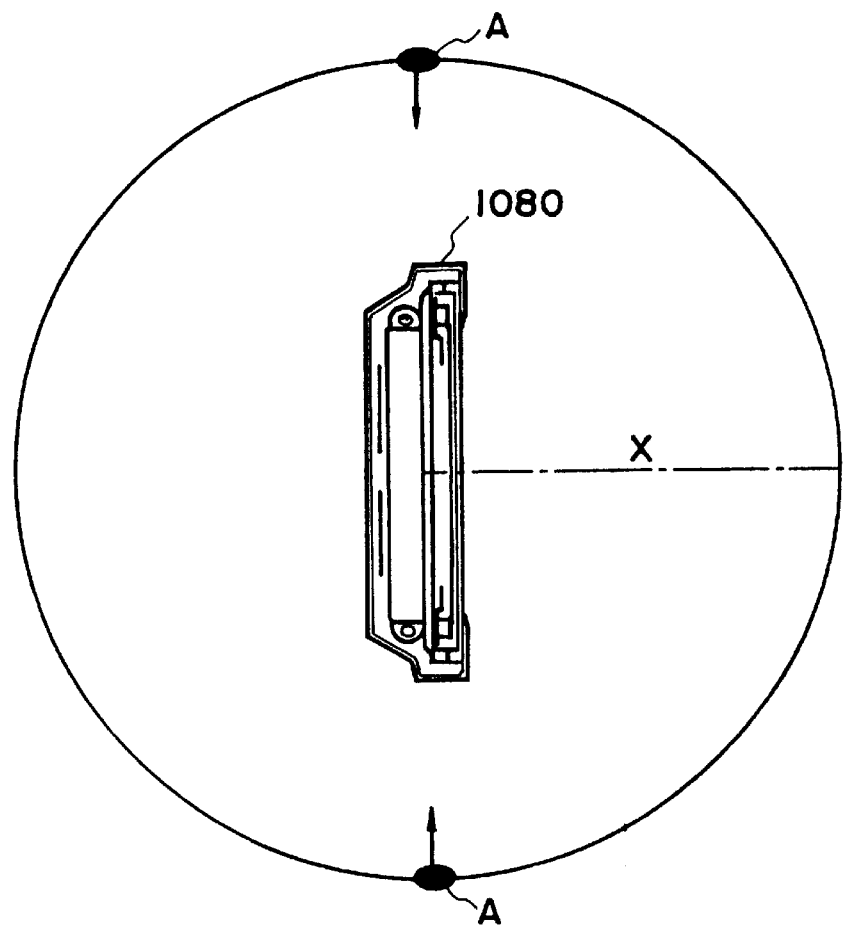
Figure 200:
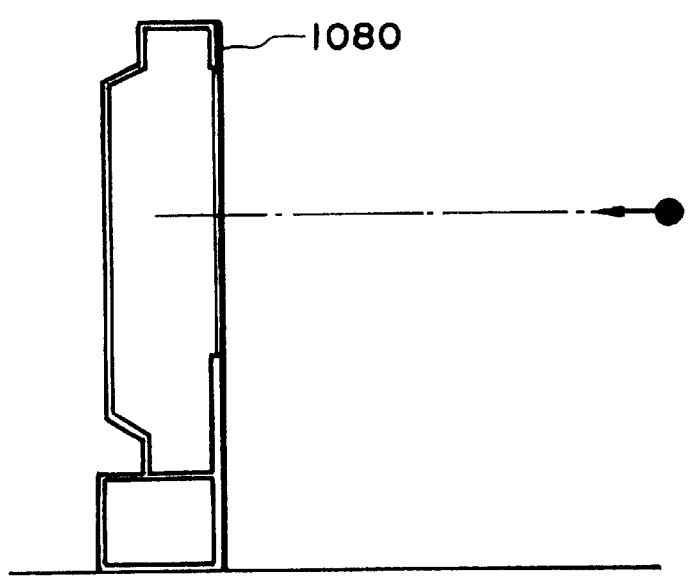

FIGS. 199 and 200 are sectional views for illustrating an effect of an embodiment.

Figure 201:
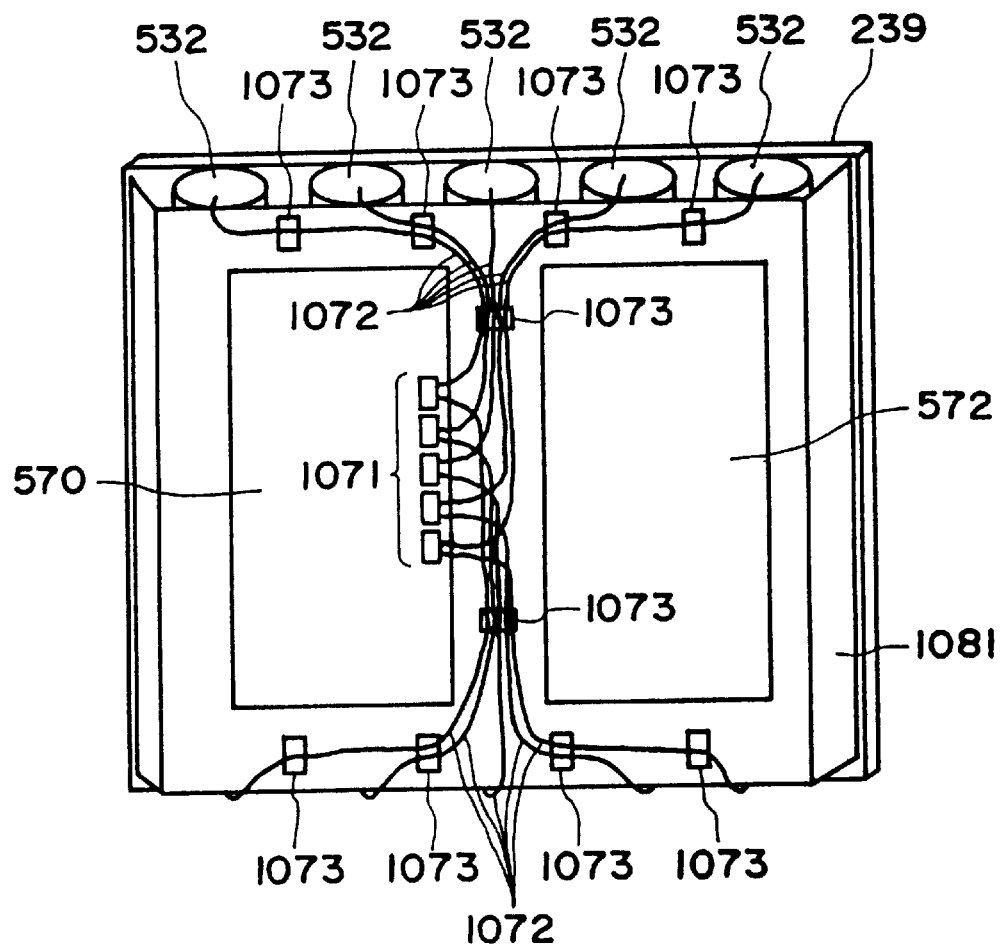

FIG. 201 is a perspective view showing another wiring state between a backlight unit and an inverter unit.

Figure 202:
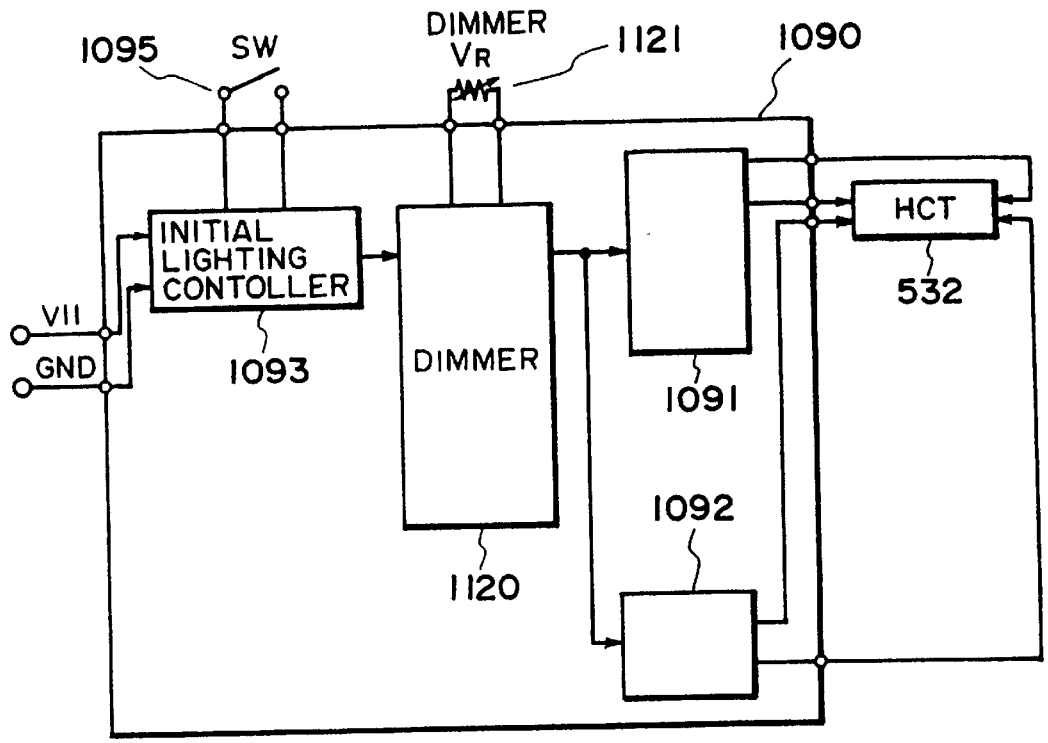

FIG. 202 is a block diagram of another lighting control device.

Figure 203:
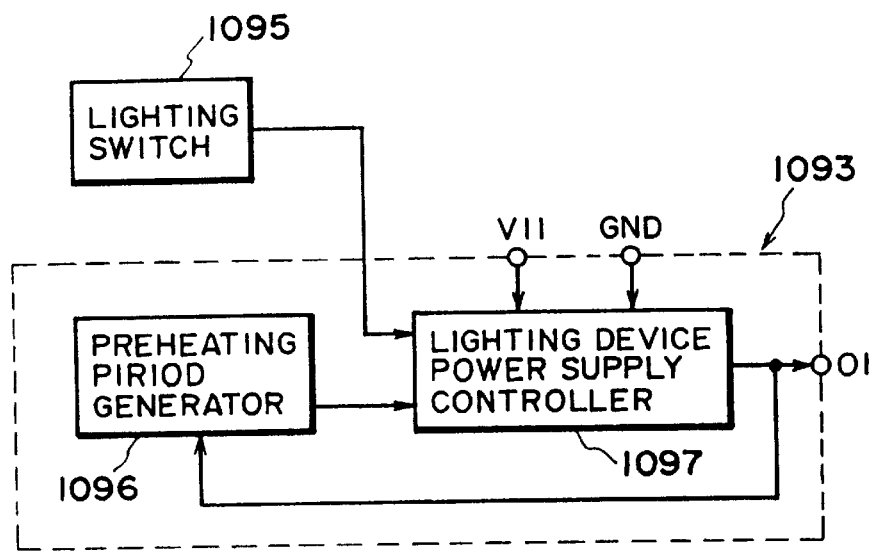

FIGS. 203 an 204 are block diagrams showing an entire structure and a detailed structure, respectively, of an initial lighting control unit.

Figure 205:
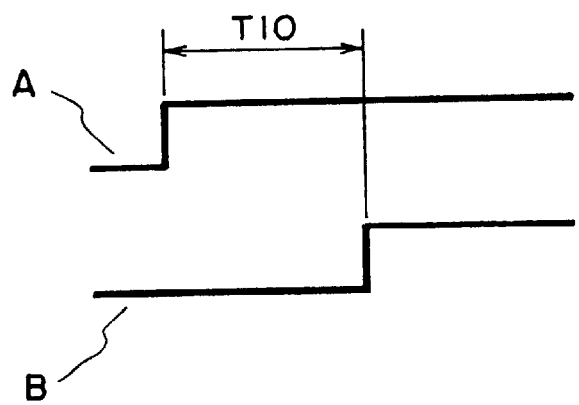

FIG. 205 is a waveform diagram showing voltage changes at V10 terminal and O2 terminal in an initial light control unit.

FIG. 206 is a waveform diagram showing (a) a lighting current change with time flowing through a linear light source in an ordinary case (ON-state of a lighting switch is continued without turning-off), and (b) a corresponding lighting voltage (effective value) change with time applied between both ends of the linear light source.

FIG. 207 is a waveform diagram for illustrating a problem in a conventional system including (a) a lighting current change with time in a second lighting in case where a lighting switch is turned off once in a first preheating period and then turned on, and (b) a corresponding lighting voltage change with time.

FIG. 208 is a waveform diagram showing a problem in a known system.

FIG. 209 is a circuit diagram of another preheating period generating unit.

FIG. 210 is a block diagram of another preheating period generating unit.

FIG. 211 is a circuit diagram of another lighting device power supply control unit.

Figure 212:
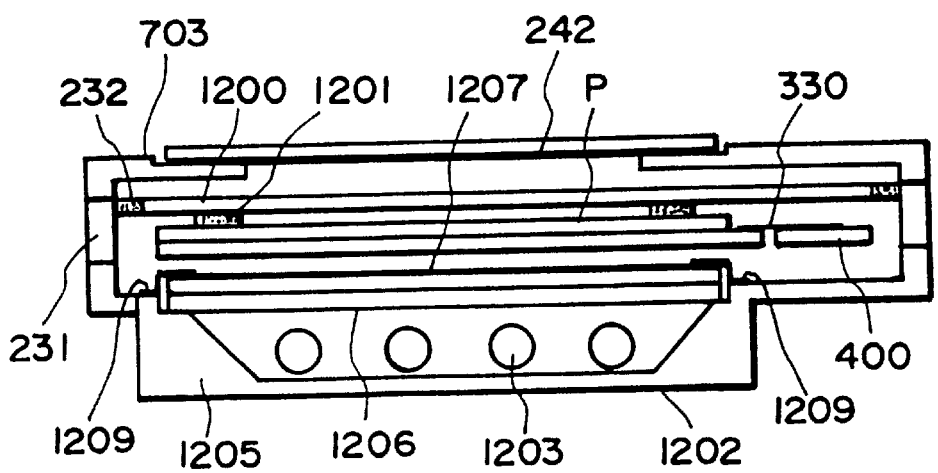

FIG. 212 is a sectional view of a display unit including another diffusion plate.

Figure 213:
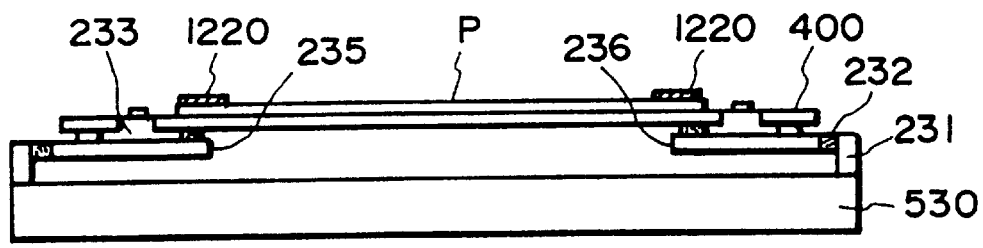

FIG. 213 is a sectional view of a display unit equipped with a damper plate.

Figure 214:
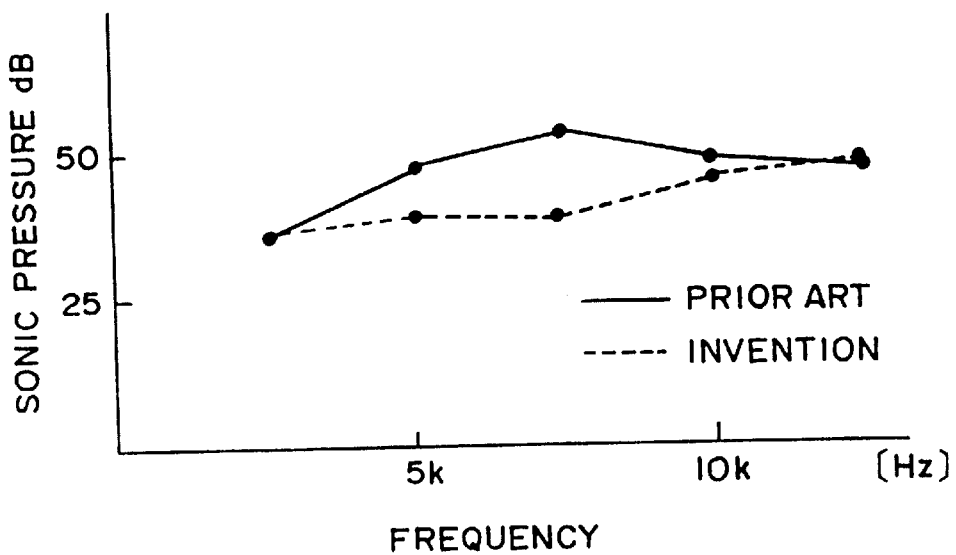

FIG. 214 is a graph showing an effect of a damper plate.

FIGS. 215–218 are respectively a sectional view showing another damper plate provided to a driver unit.

Figure 219:
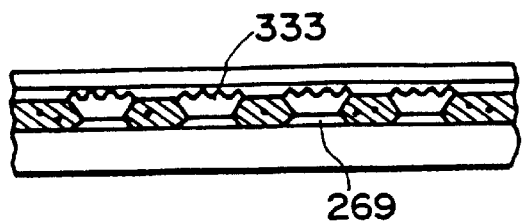

FIG. 219 is a sectional view for illustrating a problem accompanying the use of an anisotropic conductive film.

Figure 220:
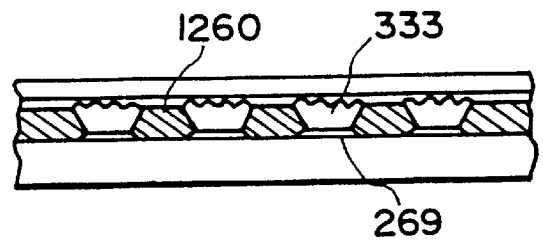

FIG. 220 is a sectional view for showing a state of bonding a liquid crystal device TAB.

Figure 221:
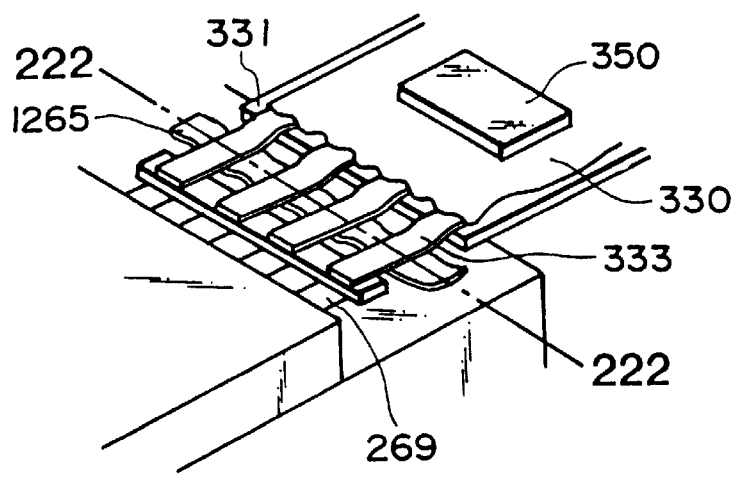

FIG. 221 is a perspective view for illustrating another embodiment of bonding a liquid crystal drive TAB.

Figure 222:
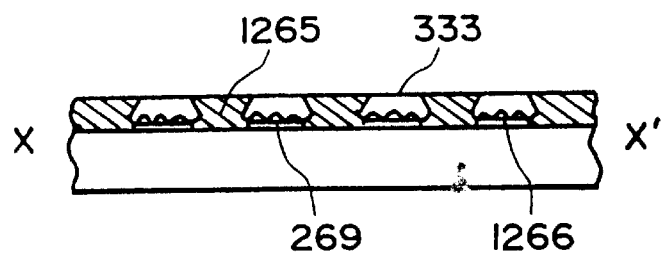

FIG. 222 is a sectional view taken along a line 222—222 in FIG. 221.

FIGS. 223–226 are respectively a schematic sectional view for illustrating another embodiment of bonding a liquid crystal drive TAB.

Figure 227:
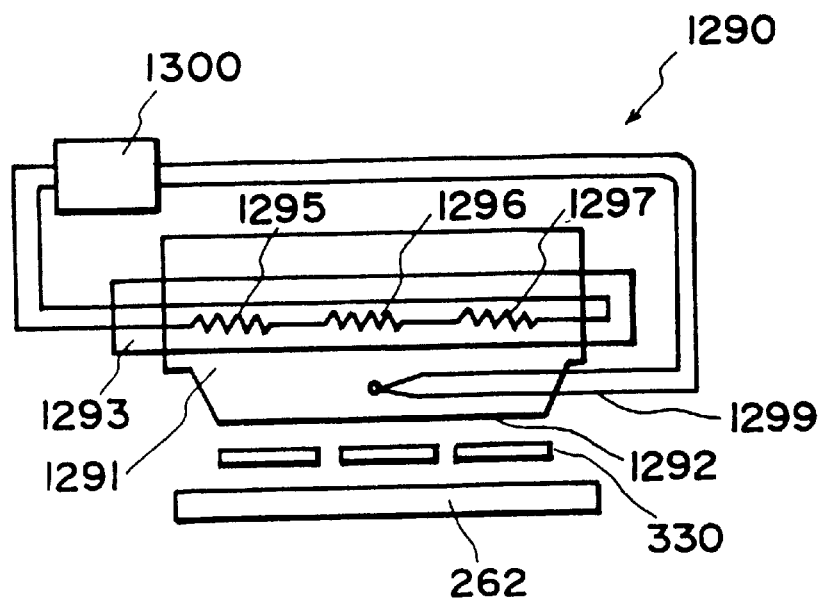

FIG. 227 is a schematic sectional view of a known heat-bonding system for illustrating a problem accompanying the system.

Figure 228:
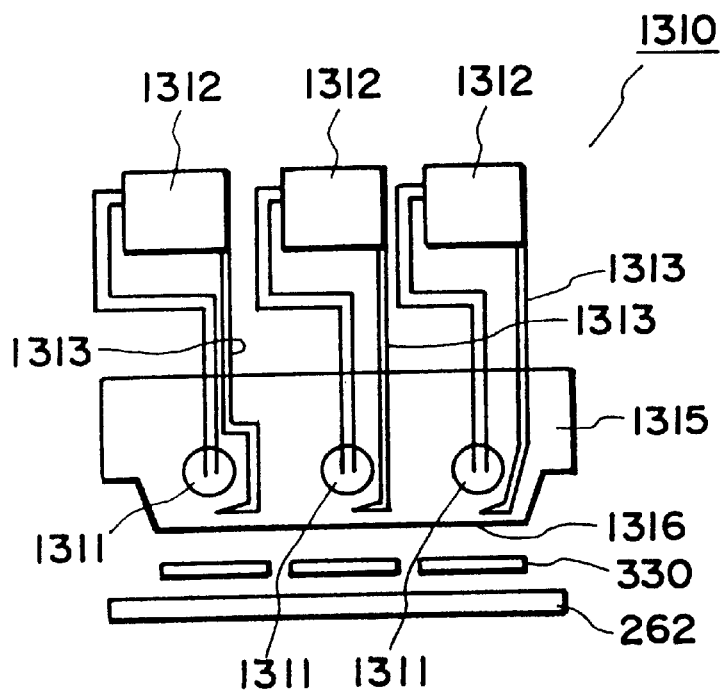
Figure 229:
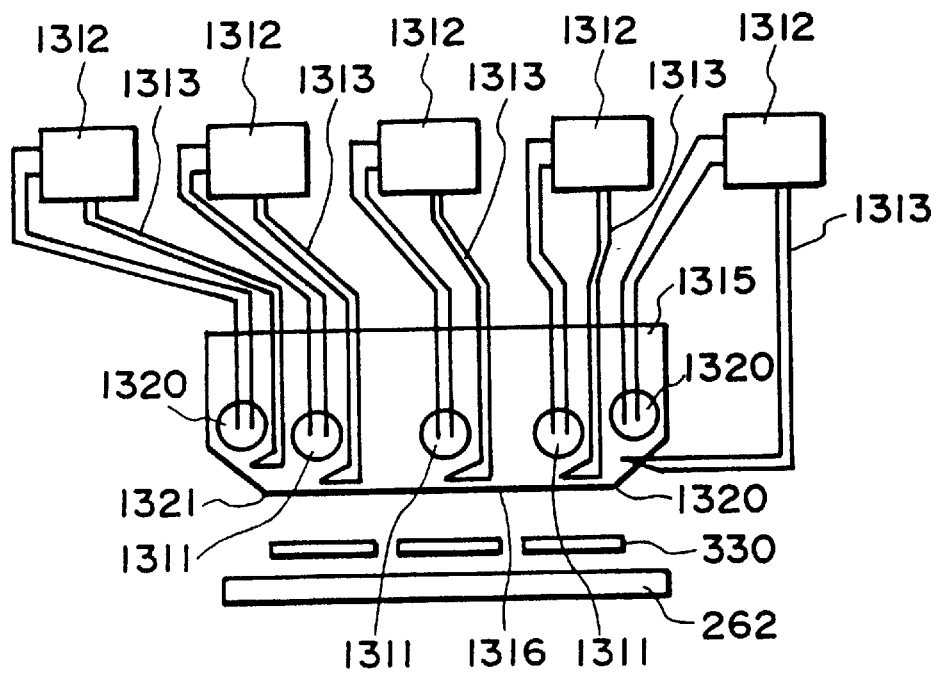
Figure 230:
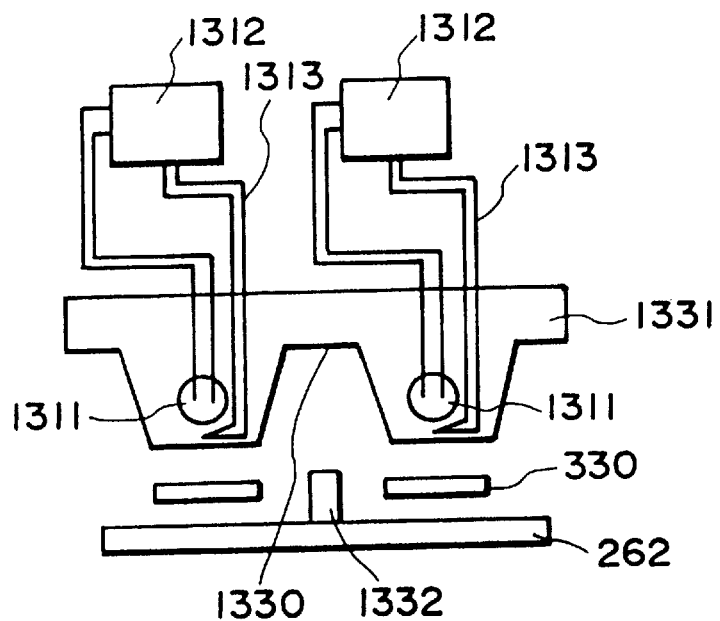

FIGS. 228–230 are respectively a schematic sectional view of another embodiment of heat-bonding system.

Figure 231:
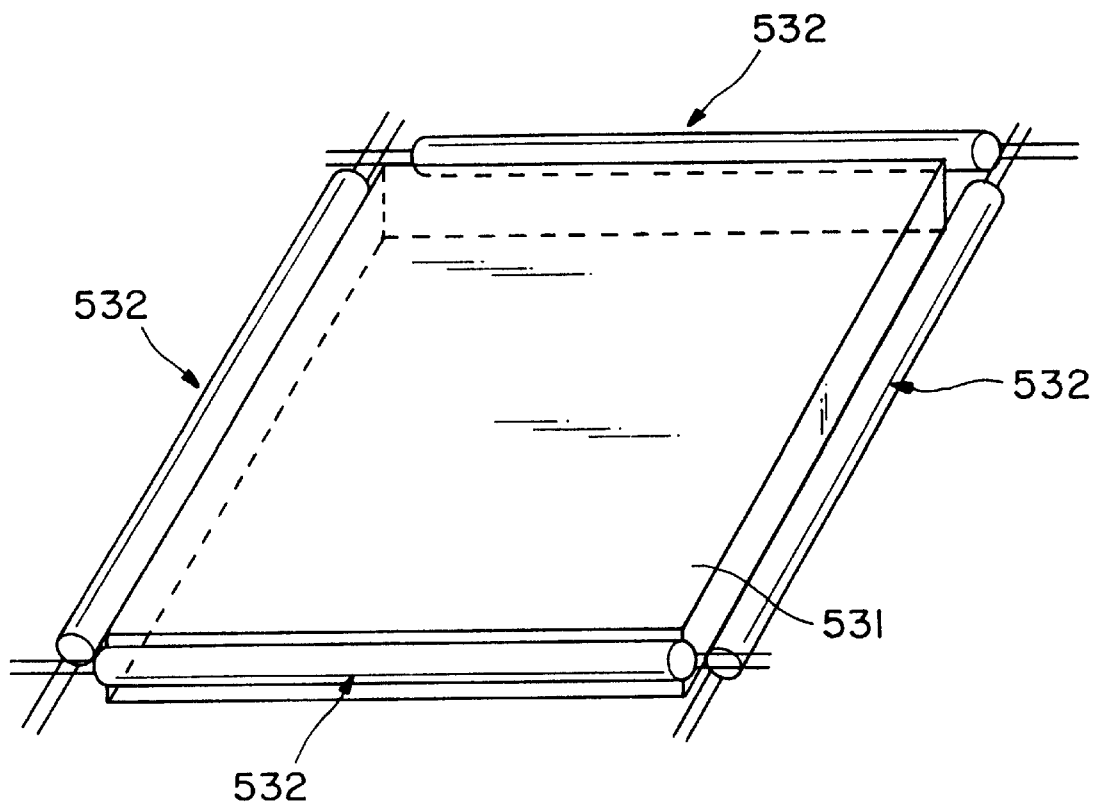

FIG. 231 is a sectional view of another backlight unit.

Figure 232:
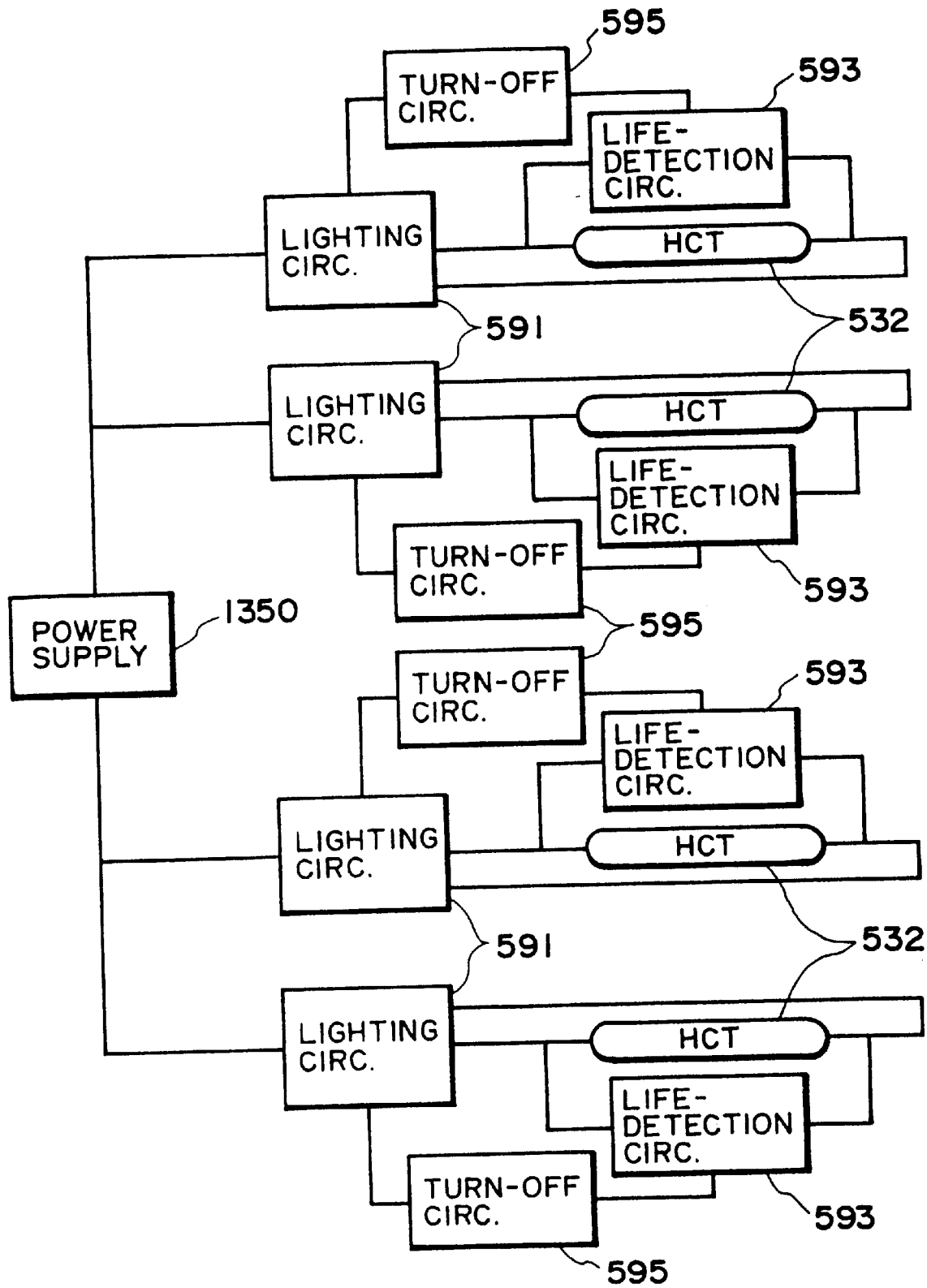

FIG. 232 is a block diagram showing another embodiment of inverter unit.

Figure 233:
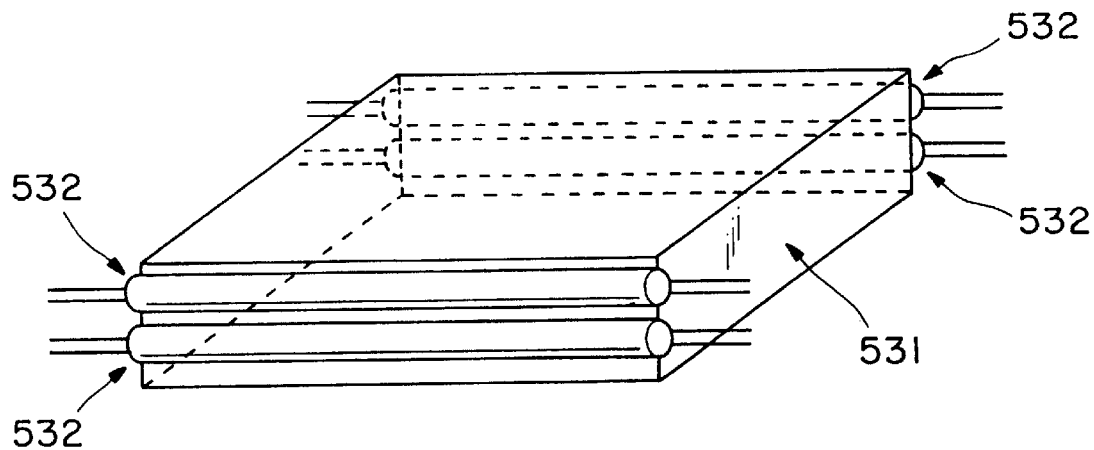
Figure 234:
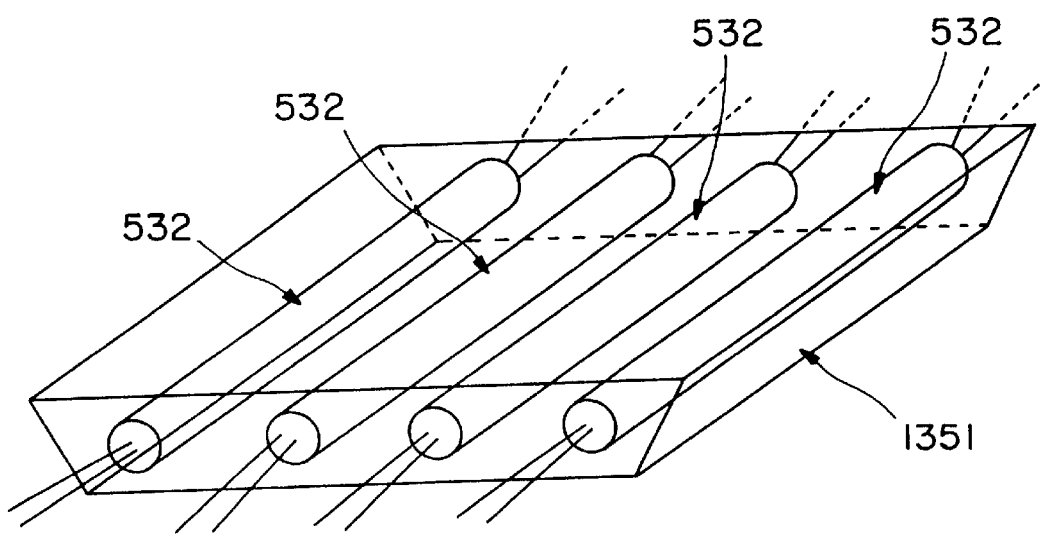

FIGS. 233 and 234 are respectively a perspective showing another layout of linear light sources.

FIG. 235 is a graphical correlation showing (a) a re-aligning treatment temperature change, (b) a change in connection resistance (prior art) and (c) a change in connection resistance (invention).

Figure 236:
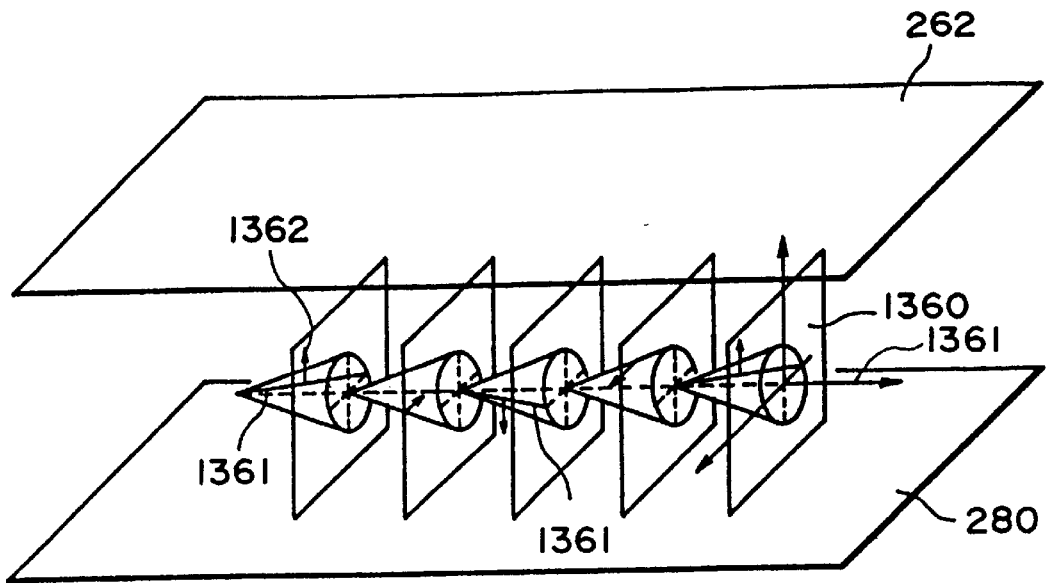

FIG. 236 is a schematic view of a ferroelectric liquid crystal device retaining a helical structure.

Figure 237:
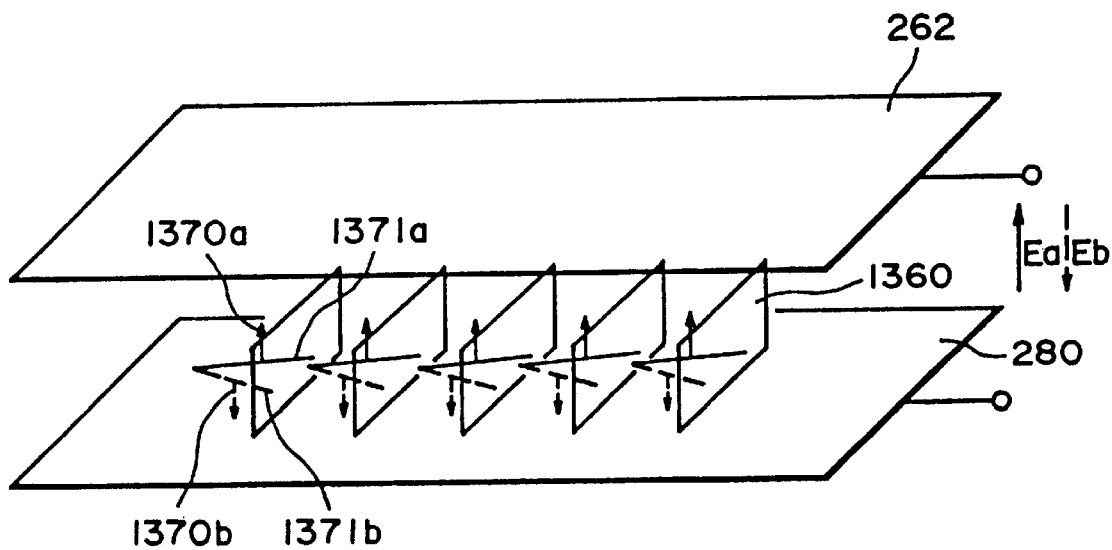

FIG. 237 is a schematic sectional view of a ferroelectric liquid crystal device with no helical structure.

Figure 238:
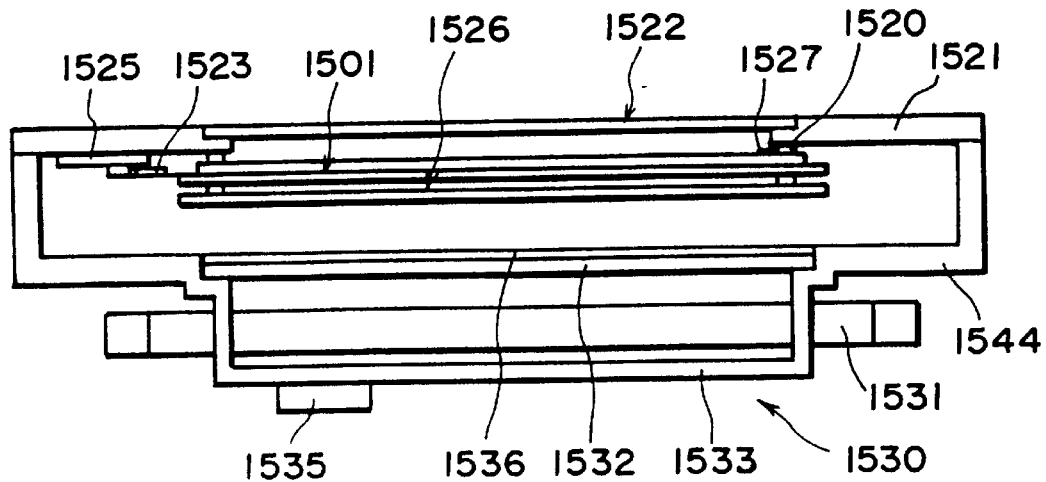

FIG. 238 is a schematic sectional view of a conventional liquid crystal display apparatus.

Figure 239:
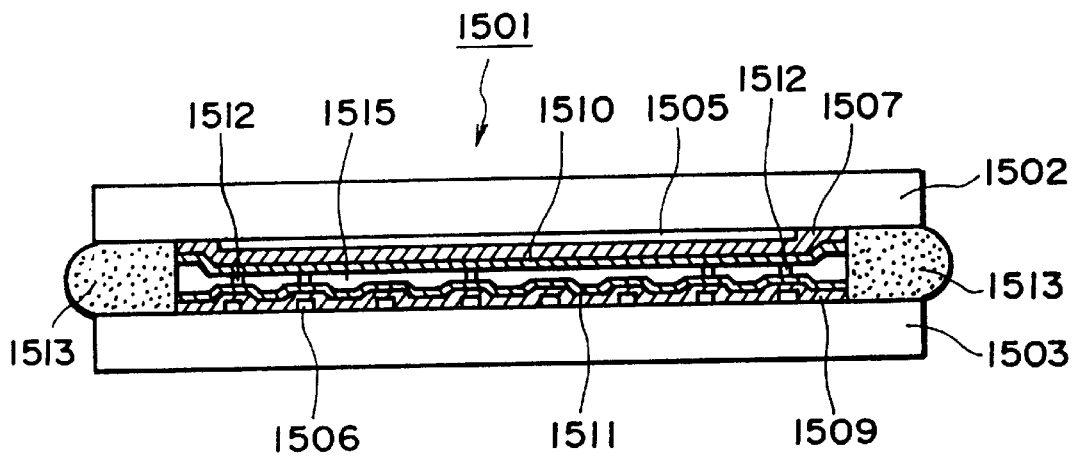

FIG. 239 is a sectional view showing an internal structure of a liquid crystal panel.

Figure 240:
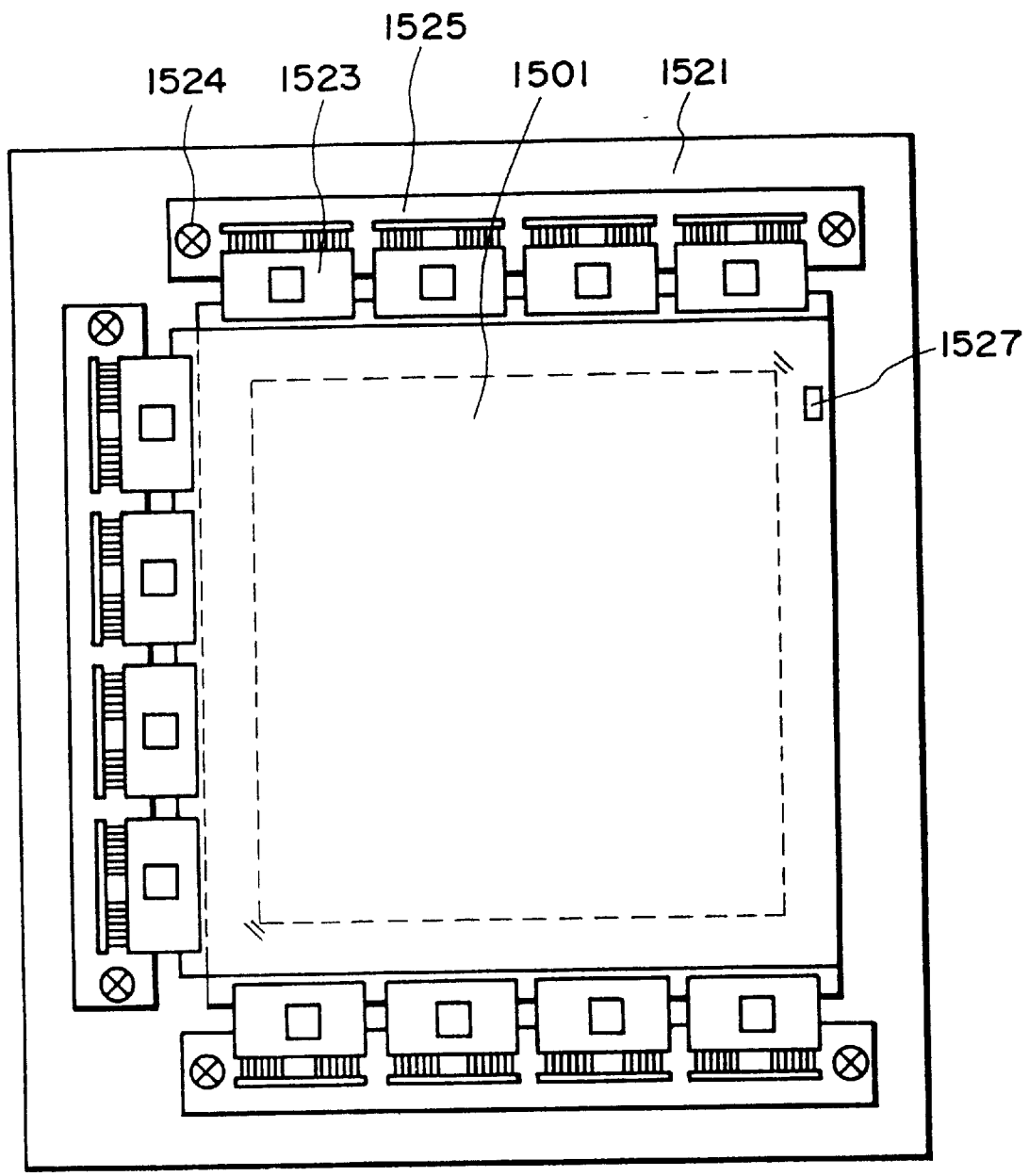

FIG. 240 is a plan view showing an ordinary liquid crystal display apparatus.

Figure 241:
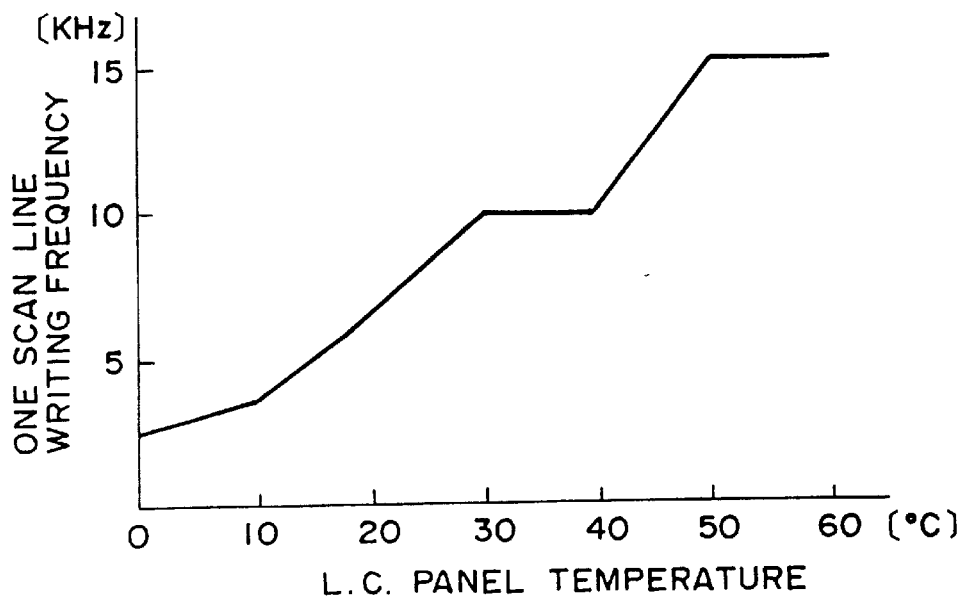

FIG. 241 is a graph showing a temperature-dependence of one-scanning line writing frequency.

Figure 242:
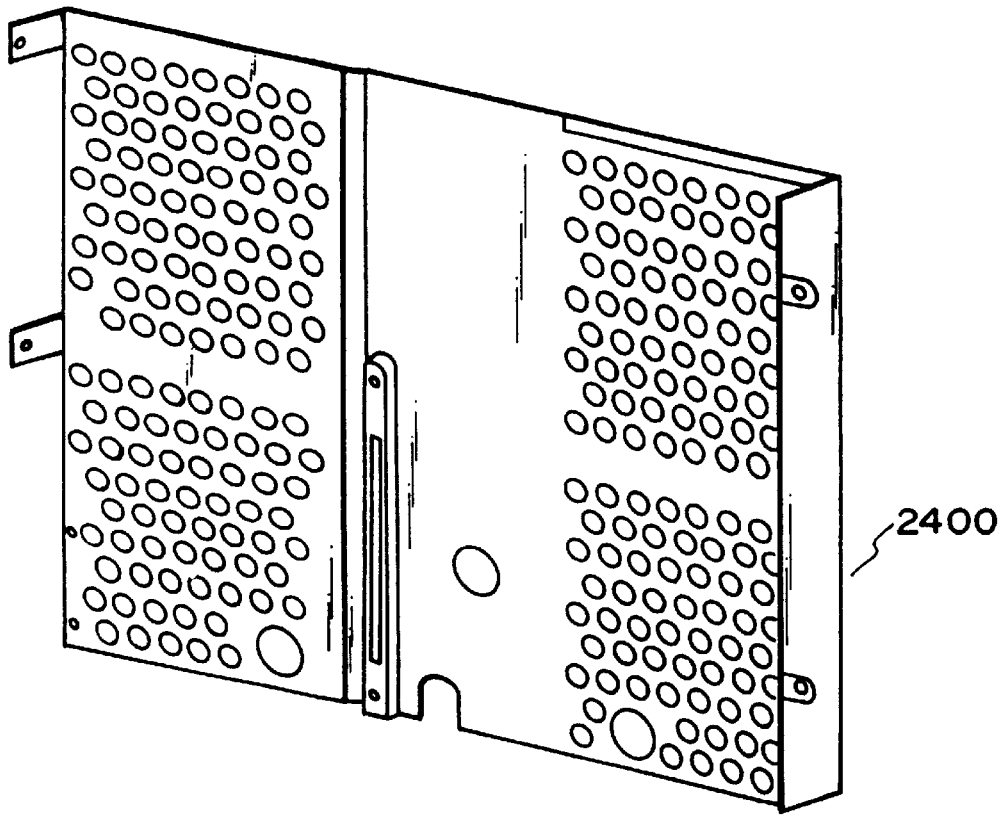

FIG. 242 is a view showing a structure of an electromagnetic shielding plate disposed on an inner surface of a rear cover (housing).

Incidentally, some reference numerals representing major components or members showing in the accompanying drawings are remarked hereinbelow.

1 . . . (liquid crystal) driving apparatus
201 . . . front cover (housing)
201a . . . opening
202 . . . rear cover (housing)
215 . . . interface cable connection
230 . . . display unit
223 . . . switching power supply unit
231 . . . panel frame
232 . . . panel elastic holding member (silicone resin)
233 . . . panel-fixing plate
236 . . . elastic member (silicone resin)
239 . . . diffusion plate
241 . . . sponge member (elastic member)
242 . . . face plate (transparent member)
243 . . . elastic member
262 . . . upper substrate (transparent substrate)
269 . . . scanning electrode
280 . . . lower substrate (transparent substrate)
281 . . . data electrode
293 . . . ferroelectric liquid crystal
301 . . . substrate side eye alignment mark (second alignment mark, fourth alignment mark)
303 . . . substrate auto alignment mark (second alignment mark, fourth alignment mark)
320 . . . anisotropic conductive film
321, 322 . . . polarizer
330 . . . liquid crystal drive TAB (print film)
330A . . . scanning side TAB (scanning-side print film)
330B . . . data side TAB (data-side print film)
331 . . . base film
332 . . . input terminal (input electrode)
333 . . . output terminal (output electrode)
350A . . . scanning-side drive IC
350B . . . data-side drive IC
370 . . . TAB-side eye alignment mark (first alignment mark, third alignment mark)
371 . . . TAB-side auto alignment mark (first alignment mark, third alignment mark)
400 . . . driver board
400L . . . common driver board (scanning-side driver board)
400U, 400D . . . upper and lower driving boards (data-side driving board)
401a . . . connecting electrode
411 . . . solder
430 . . . holding plate
451–456 . . . flat cable
490 . . . connector (first connector, second connector)
530 . . . backlight unit
531 . . . light-guide plate (light-guide means)
532 . . . linear light source
533 . . . reflection means
533a . . . fastening hole
535 . . . diffusive reflection pattern (luminance distribution-adjusting means)
536 . . . rear reflection plate (diffusive reflection means)
537 . . . prism sheet
539 . . . grommet
539 . . . fastening projection
550 . . . backlight upper plate
551 . . . backlight lower plate
570 . . . inverter unit
572 . . . controller unit
P . . . liquid crystal panel (liquid crystal device)

DESCRIPTION OF THE PREFERRED EMBODIMENTS

Figure 92:
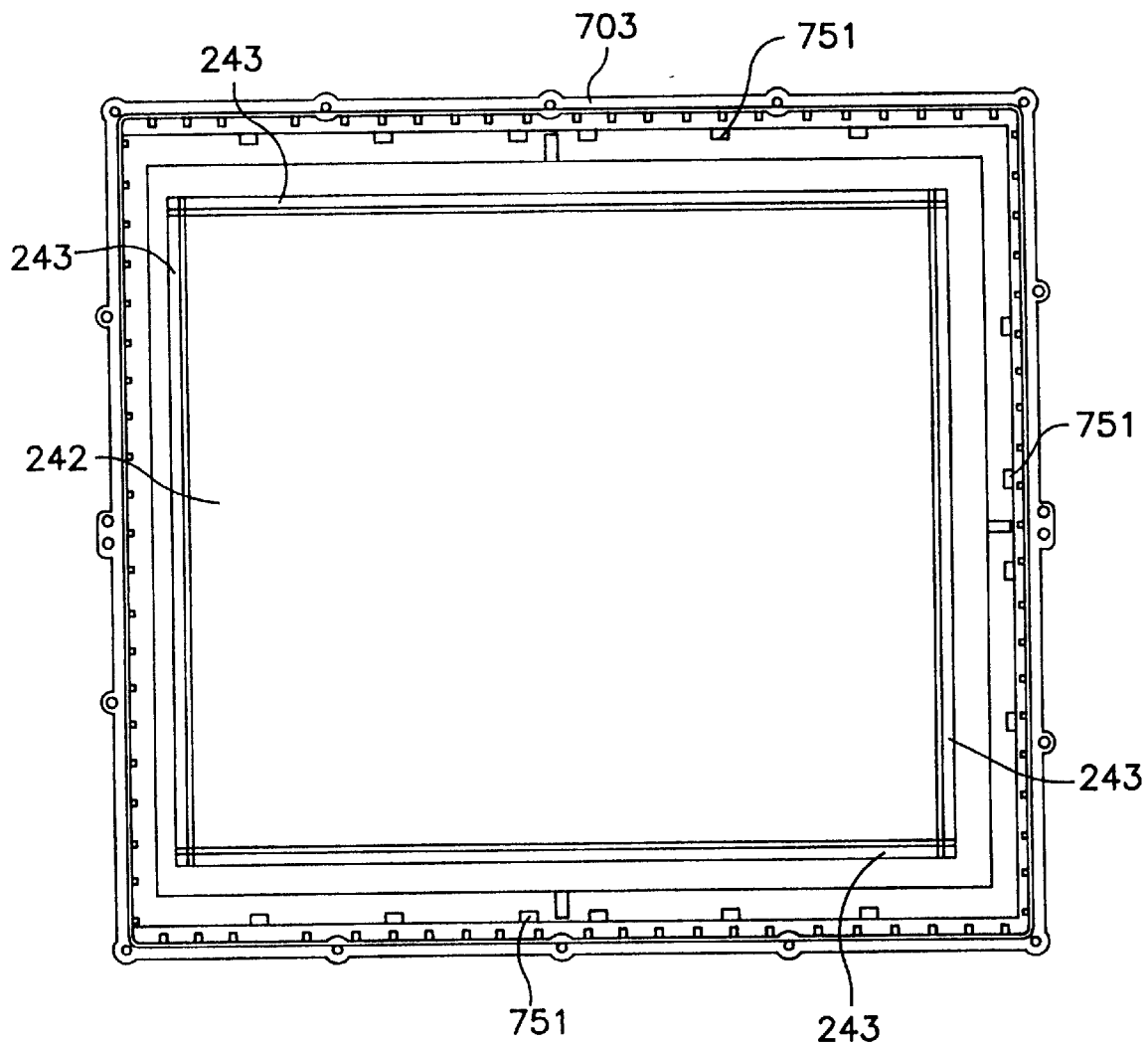
FIG. 92 is a plan view showing a rear structure of a face plate.

First, an entire structure of an embodiment of liquid crystal display apparatus according to the present invention will now be described with reference to FIGS. 1–92.

Figure 1:
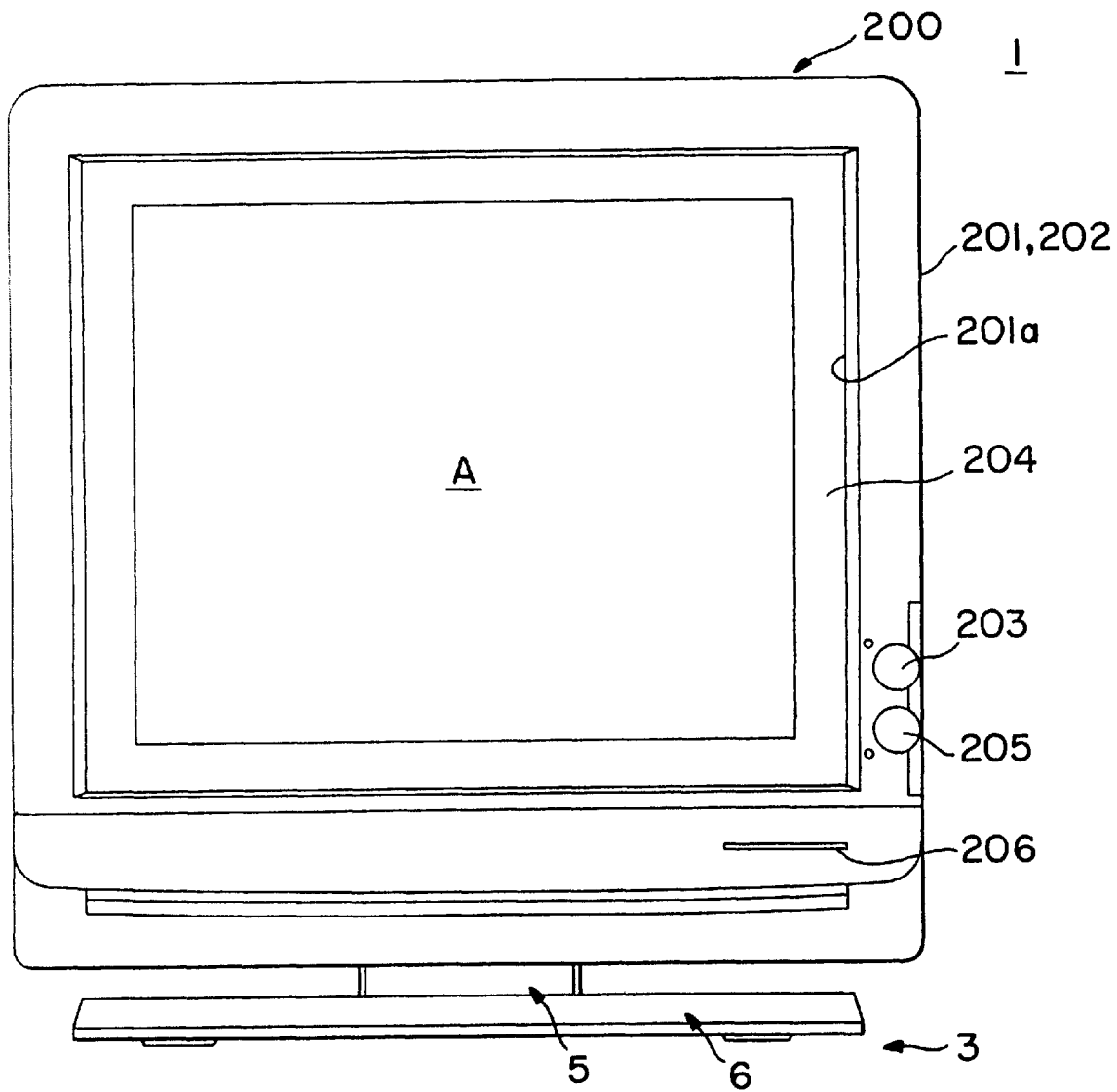
FIG. 1 is a front view showing an entire structure of a display apparatus according to the present invention.

As shown in FIG. 1, a liquid crystal display apparatus 1 according to this embodiment includes a display apparatus body 200 for displaying various data or information, and a support structure 3 supporting the display apparatus body 200.

The display apparatus 200 has an outer appearance as shown in FIGS. 2 to 7.

Figure 2:
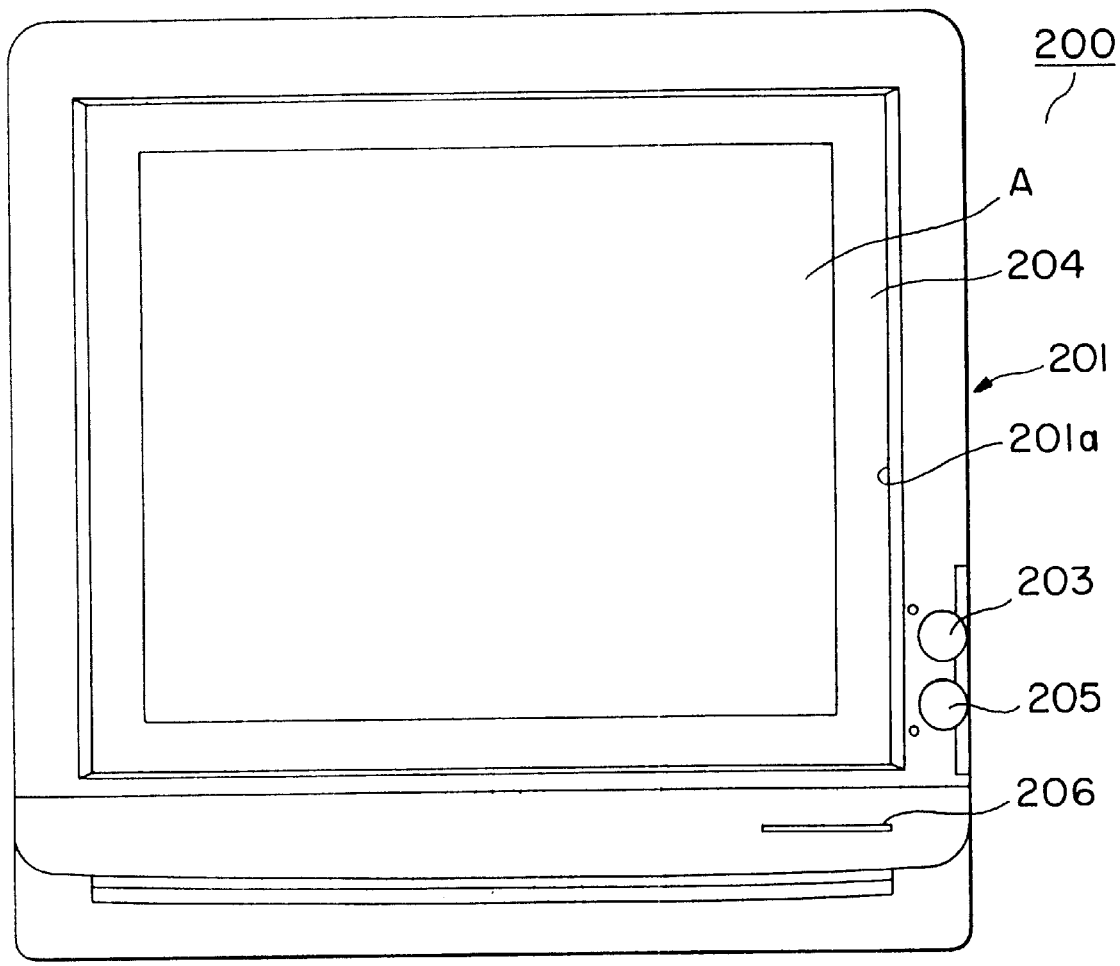
FIGS. 2–7 are a front view, a rear view, a right side view, a left side view, a top plan view, and a bottom plan view, respectively, showing an outer appearance of a display apparatus body of the display apparatus of FIG. 1.

More specifically, the display apparatus body 200 has a front cover 201 and a rear cover 202, and the front cover 201 is provided with an opening 201a (FIG. 2). Inside the opening 201a, a liquid crystal panel P is disposed (as will be described in further detail later), so as to be observable with eyes from outside. The opening 201a is closed with a face plate (transparent member) 242 comprising a transparent and rigid glass plate (described later in detail) so as to protect the liquid crystal panel P. Further, a parting frame 204 is disposed behind the face plate 242 so as to define a display area A as a region surrounded thereby. The front cover 201 and the rear cover 202 may for example be composed of ABS (acrylonitrile-butadiene-styrene) resin, and the inner surfaces thereof may be plated with Ni so as to reduce a noise radiated outwardly.

It is also possible to effect such a radiation noise prevention by disposing a radiation noise prevention plate 2400 of a steel material, such as tin-plated steel, in a prescribed shape, e.g., as shown in FIG. 242 at a prescribed region within a housing. More specifically, such a radiation noise prevention plate 2400 may be disposed by fixing its side portions at peripheral sides of a backlight upper late 550 as a supporting member of a backlight unit 530 so as to cover the backlight unit 530, inverter unit 570 and 572 from the backside of a display apparatus body. The disposition, material and shape of such a radiation noise prevention plate may be optimally designed as desired depending on factors, such as the type and position of a noise-generating source, without particular restriction.

Figure 3:
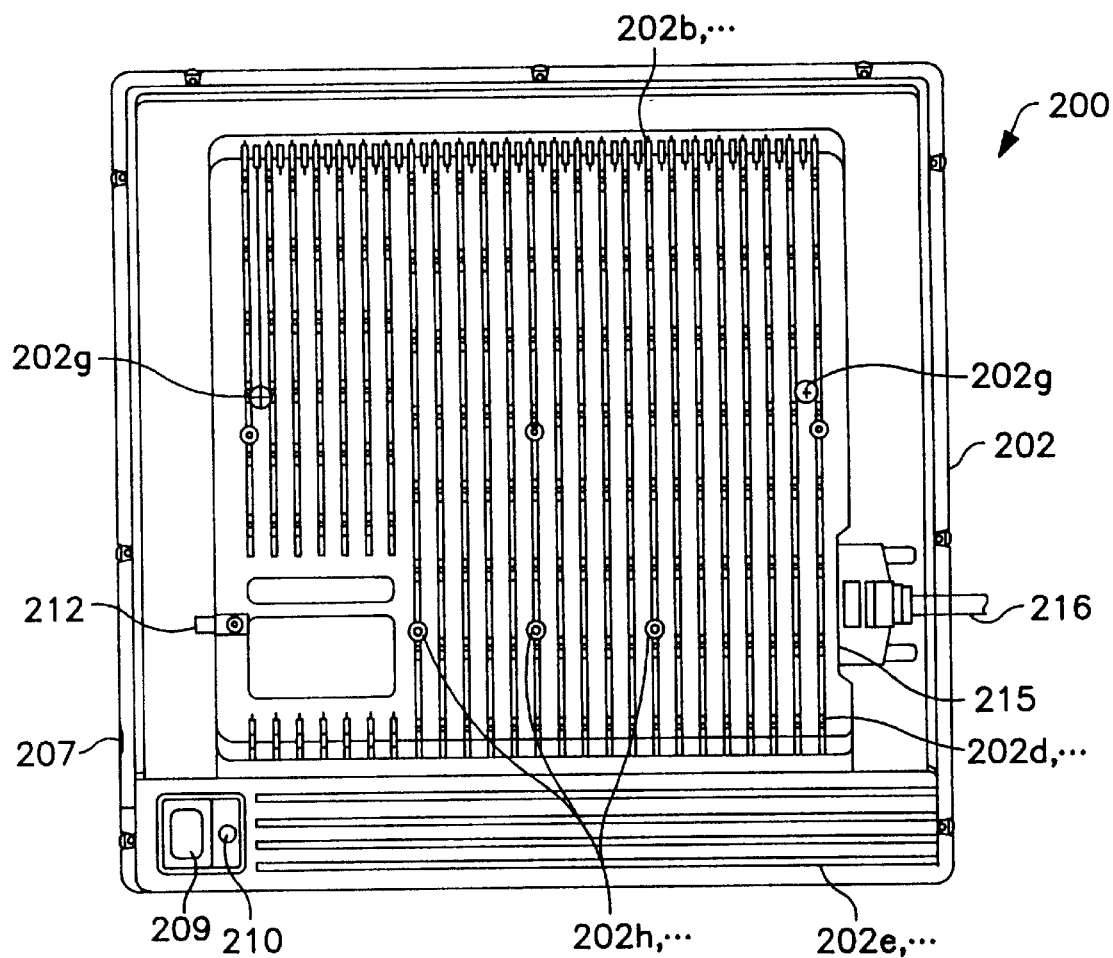
Figure 4:
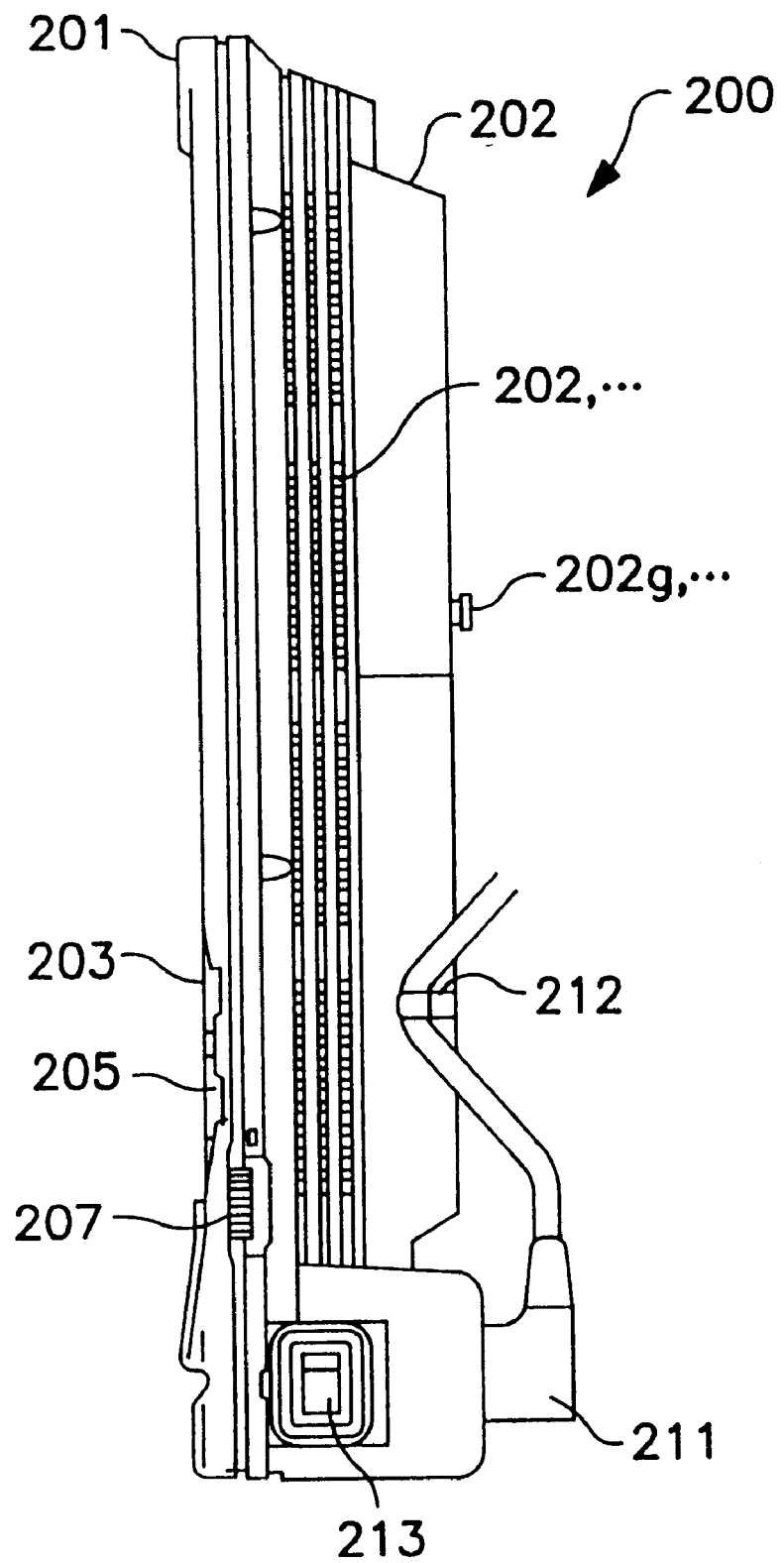

On a front side region of the front cover 201, a luminance control dial 203 and an image quality control dial 205 are disposed (described later in detail). Below the dials 203 and 205, an LED 206 is disposed so as to be lighted when a main switch 203 (FIG. 4) is turned on and flickered when a power management function is in operation for power economization, thus indicating an operation state of the display apparatus body 200. On a side of the display apparatus body 200, a color adjusting key 207 is disposed, around which are further formed an AC power supply connection 209 and a ground connection 210 (FIG. 3). To the AC power supply cable connection 209, an AC power supply cable 211 is connected and disposed in hanging on a hook 212 projected from the rear cover 202 (FIG. 4). To the ground connection 210, a grounding wire (not shown) is connected so as to ground the display apparatus body 200. In proximity to the AC power supply cable connection 209, a main power switch 213 is disposed.

Figure 5:
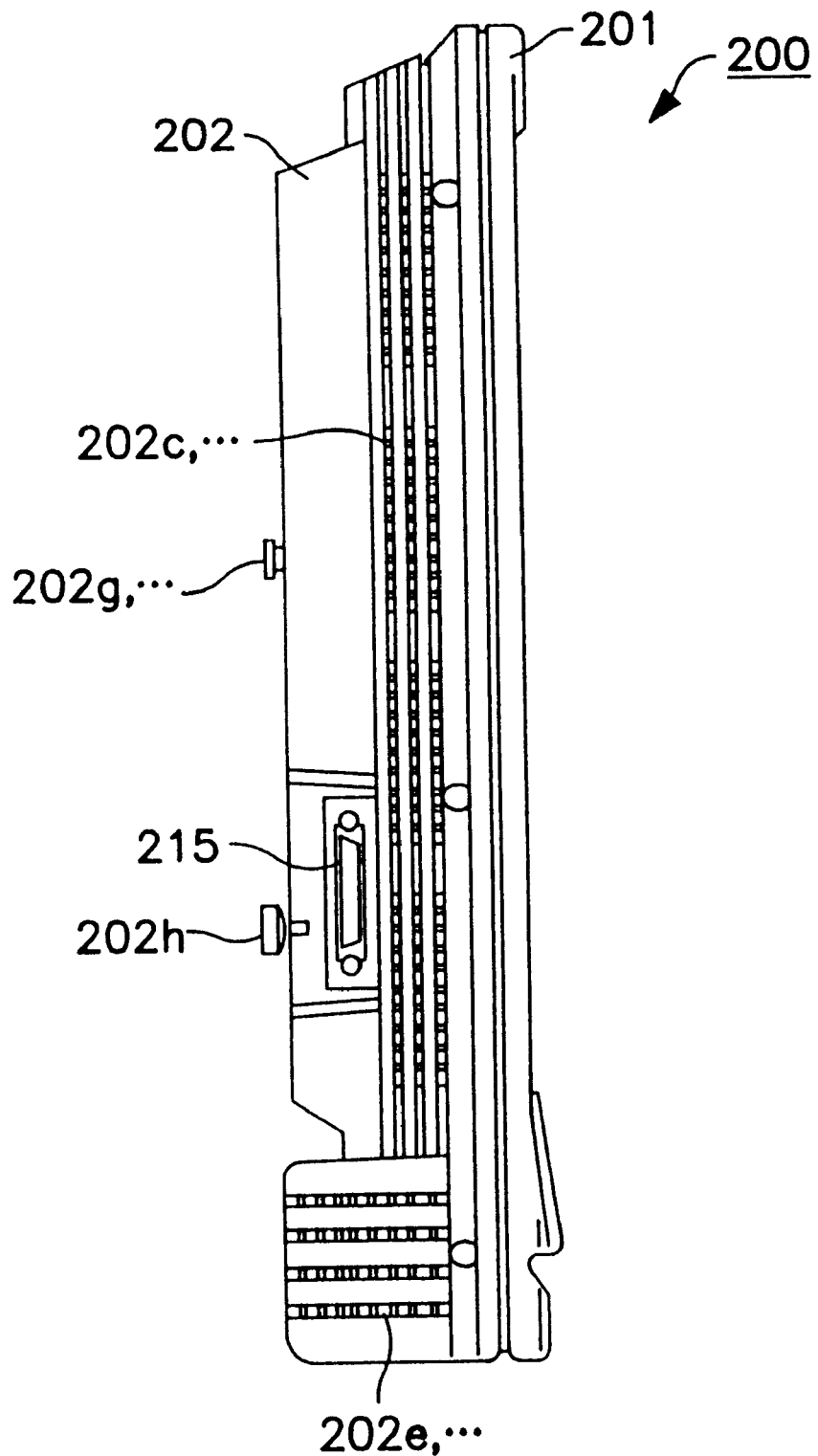
Figure 6:
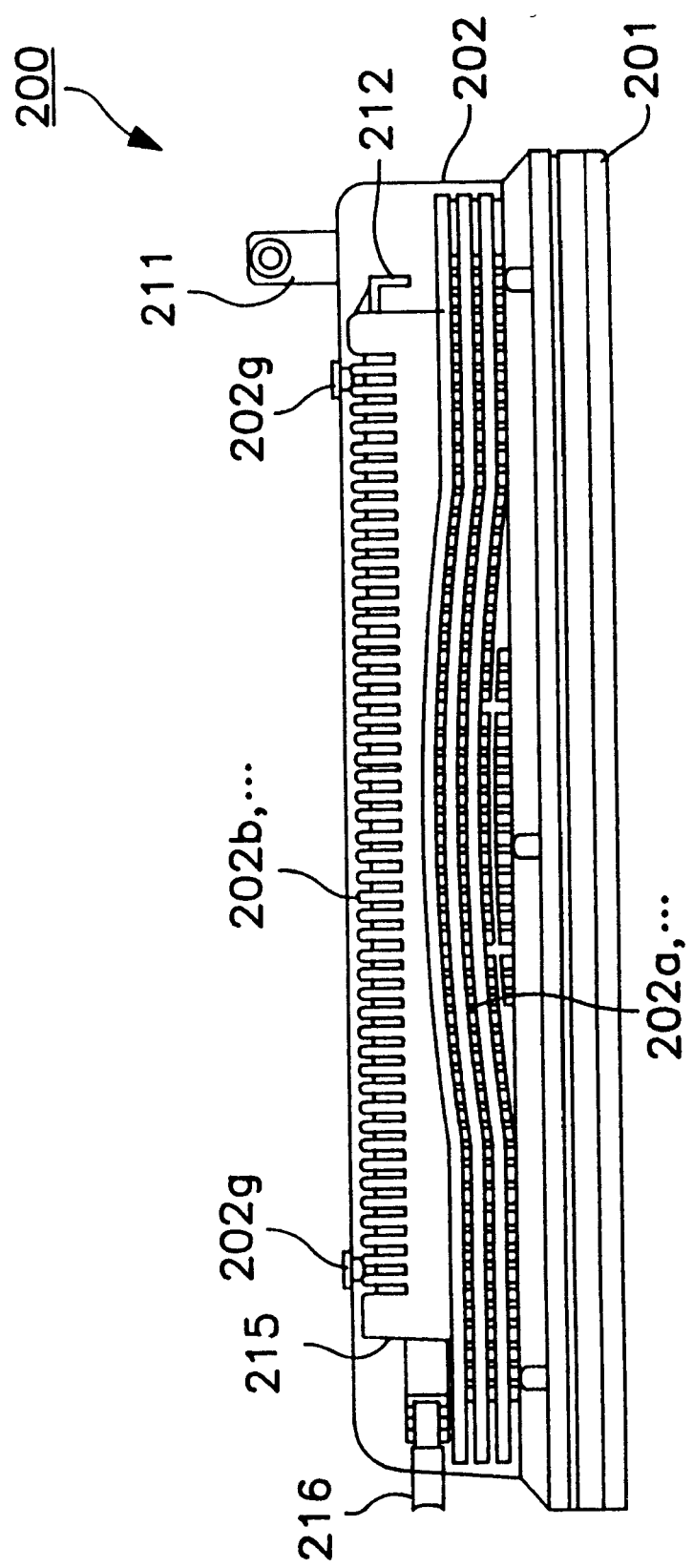
Figure 7:
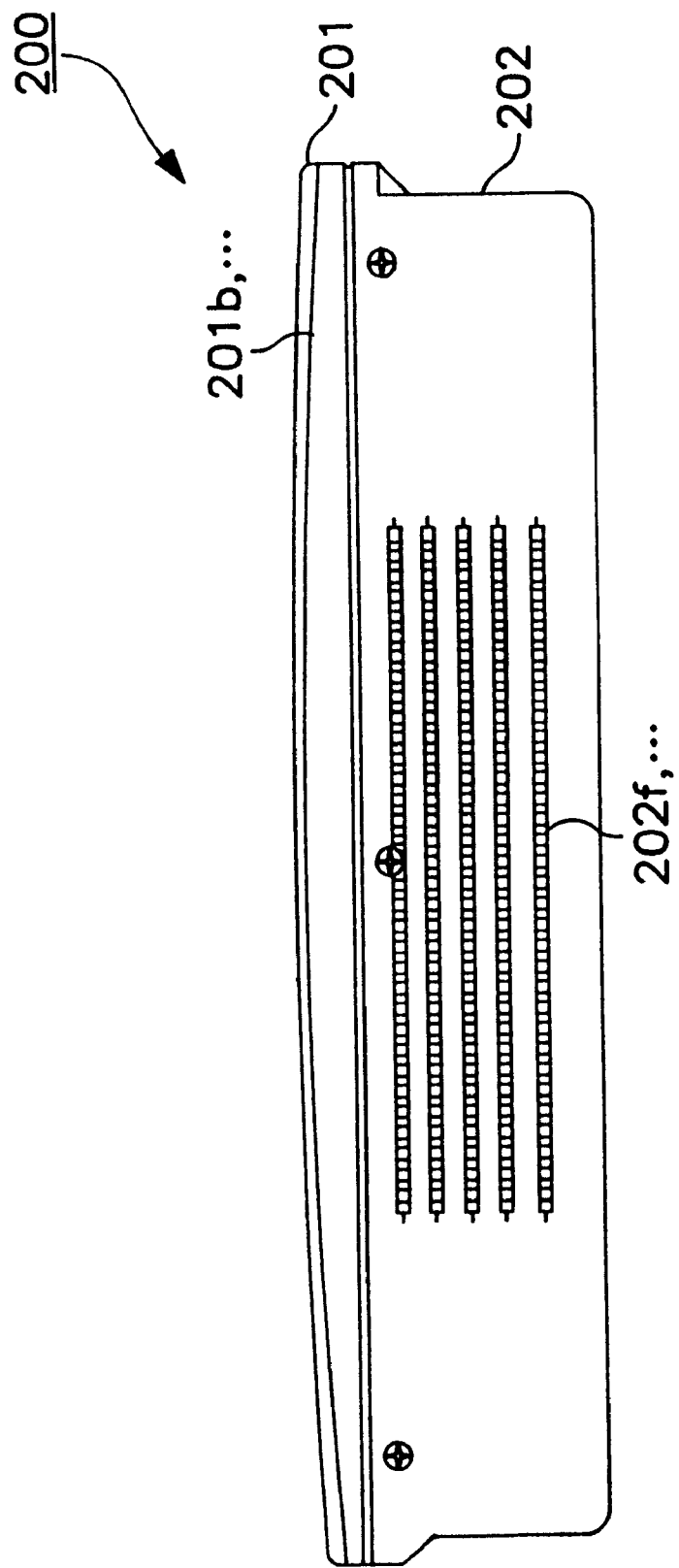

The rear cover 202 is provided with a multiplicity of radiating perforations so as to discharge the inner heat. More specifically, an upper surface portion of the rear cover is swollen to provide a convexity, where a multiplicity of radiating perforations 202a are formed, below which are further formed other radiating perforations 202b. Further, in sides of the rear cover 202, radiating perforations 202c are formed as shown in FIGS. 4 and 5. Further in lower part of the rear cover 202, radiating perforations 202d and 202e are formed, and radiating perforations 202f are formed in the bottom surface of the rear cover 202 as shown in FIG. 7. On the inner surface of the rear cover 202 having the radiating perforations, a fine-mesh net member (not shown) is applied so as to prevent intrusion of fine dirt to the inner space within the housing through the perforations.

At middle parts on the back surface of the rear cover 202, two pins 202g are projectively disposed with a prescribed spacing therebetween and, at lower parts, screws 202h are disposed, so that the display apparatus body 200 is affixed to the support structure 3 by means of the pins 202g and screws 202h (as described later in detail).

Further, at a position roughly symmetrical with the hook 212, an interface cable connection 215 is formed (FIG. 3). To the connection 215, an interface cable 216 is connected so as to connect the display apparatus body 200 and a host computer (not shown).

Next, the internal structure of the display apparatus body will be described with reference to FIGS. 8 through 92.

Figure 8:
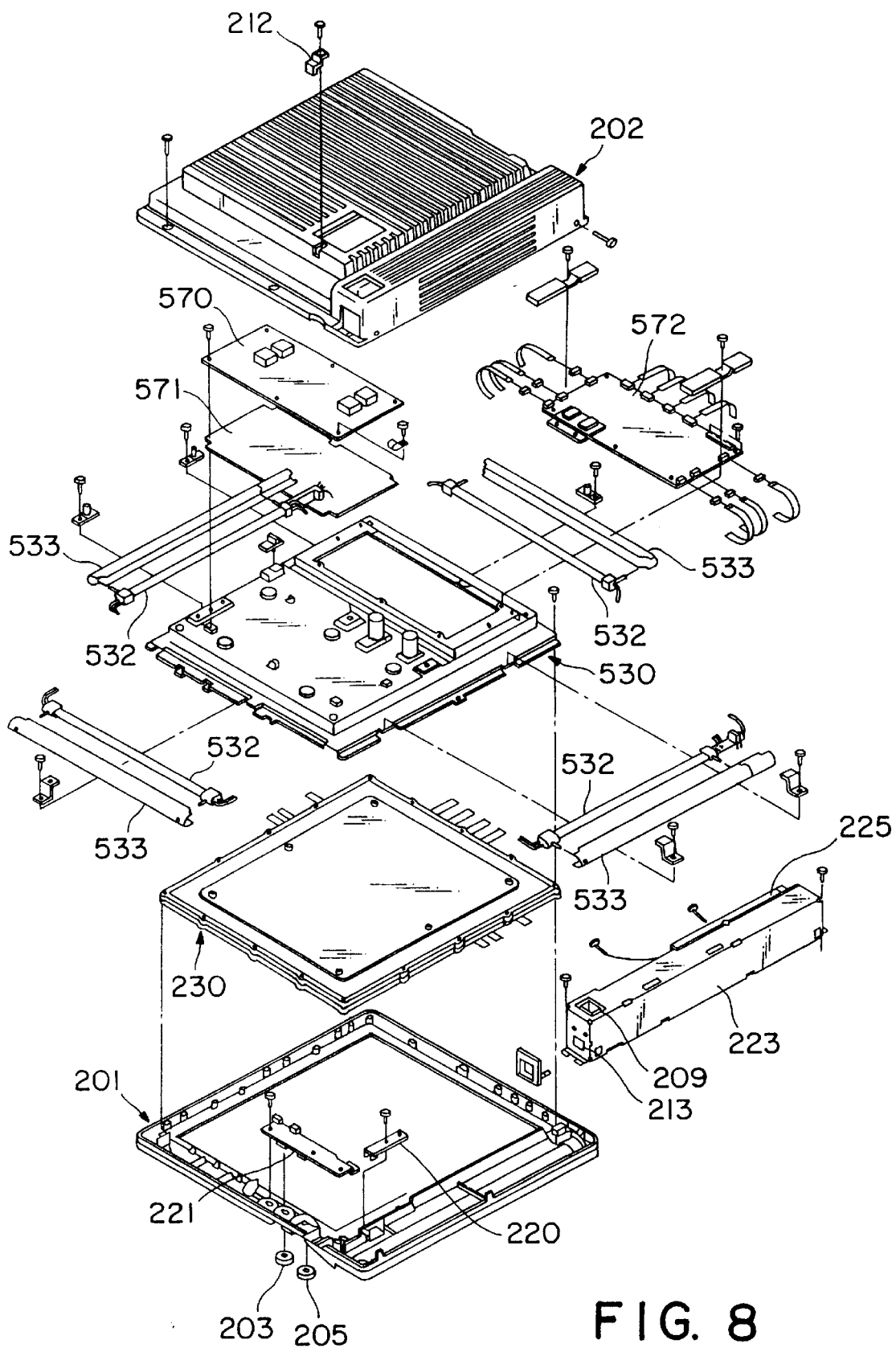
FIG. 8 is an exploded perspective view showing an inner structure of the display apparatus body.

At a lower part behind the rear cover 201, an indicator unit 220 is disposed at a position corresponding to LED 26 so as to effect a lighting control of LED 26 as shown in FIG. 8. In proximity thereto, a trimmer unit 221 including the luminance control dial 203, image quality control dial 205 and color adjusting key 207 is disposed, so that the display picture becomes darker or brighter when the luminance dial 203 is turned clockwise or counterclockwise for adjusting the luminance or brightness of the display picture. Image disorders, such as darkish or whitish picture or after-image, can be alleviated by turning the image quality dial 205 clockwise or counterclockwise, so as to prevent image disorder and retain image uniformity. Further, the color adjusting key or dial may be turned counter-clockwise to better display a halftone or turned clockwise to provide a clearer display, whereby the image color can be adjusted at 8 levels.

<Switching power supply unit 223>

Figure 9:
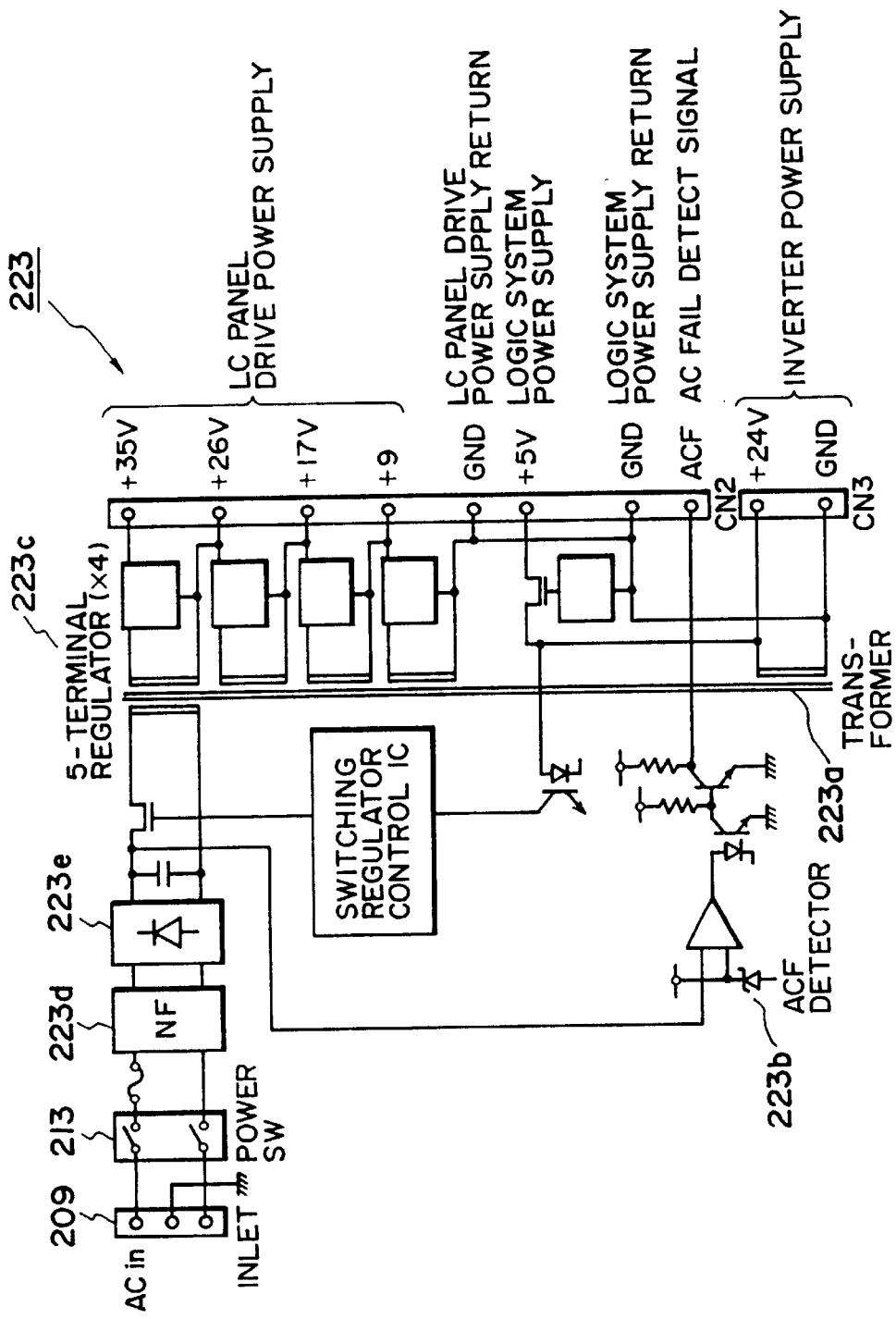
FIG. 9 is a block diagram showing an internal organization of a switching power supply unit.

At a lower part of the display apparatus body 200, a switching power supply unit 223 is disposed as shown in FIG. 8. The switching power supply unit 223 has a primary side on its left side as viewed from the back of the apparatus, which is connected via the main switch 213, the AC power supply connection 209 and the AC power supply cable (212 in FIG. 9) as better shown in FIG. 9 to the AC power supply. The switching power supply unit 223 has a secondary side on its right side as viewed from the back, so as to supply electricity therefrom to a controller unit 572 and an inverter unit 570 described hereinafter. Between the primary and secondary sides, a transformer 223a is disposed.

<Insulating plate 225>

The switching power supply unit 223 includes a DC power supply converter on its left side as viewed from the front of the apparatus, so that it evolves more heat at its left side than its right side. As a result, if no measure is taken, an upper left region of the display area as viewed from the front of the apparatus is caused to have the highest temperature, and a lower right region has the lowest temperature to result in an ununiform temperature distribution and accordingly an ununiform display quality. This problem is most pronounced at the time of display of an all white picture or an all black picture and also in a liquid crystal panel using a ferroelectric liquid crystal having a severe temperature-dependence of performances.

Figures 10A, 10B:
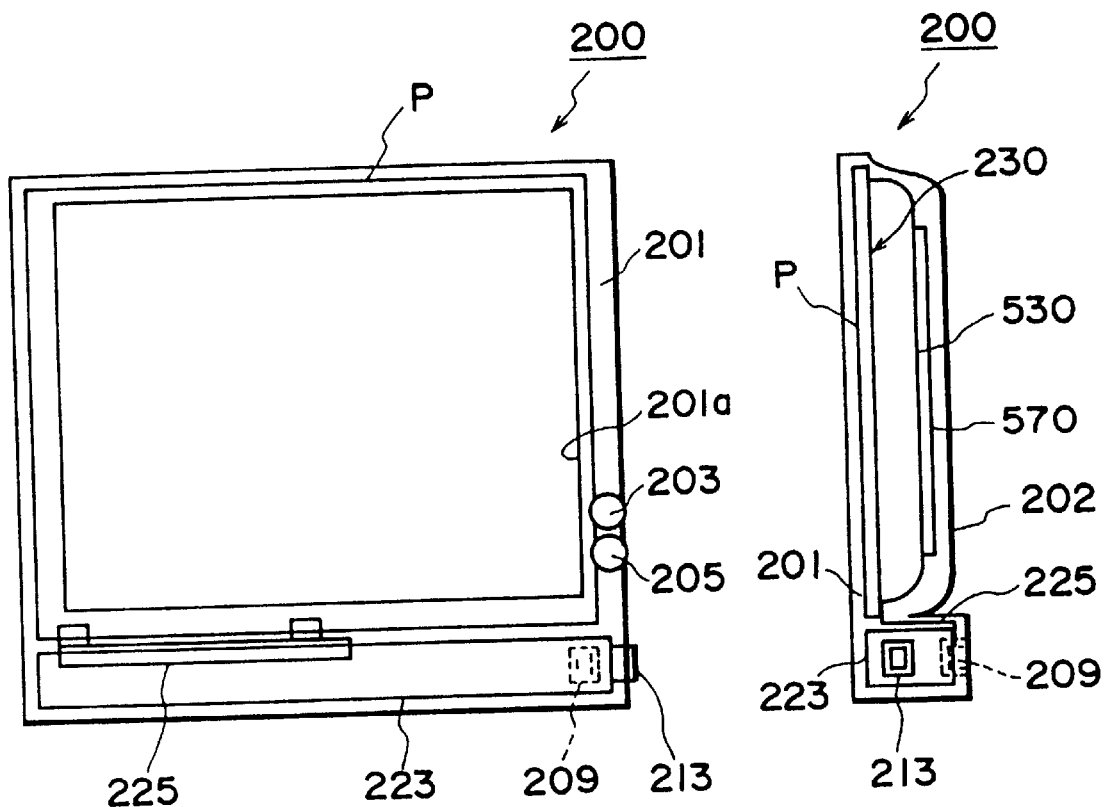
FIGS. 10A and 10B are a front view and a side view, respectively, of a display apparatus body for illustrating an effect of an insulating plate.

In this embodiment, an insulating plate 225 is disposed on an upper left surface part of the switching power supply unit 223 in order to solve the above problem. Hereinbelow, a further description will be made regarding the insulating plate 225 with reference to FIGS. 10 and 11.

Figures 11A, 11B:
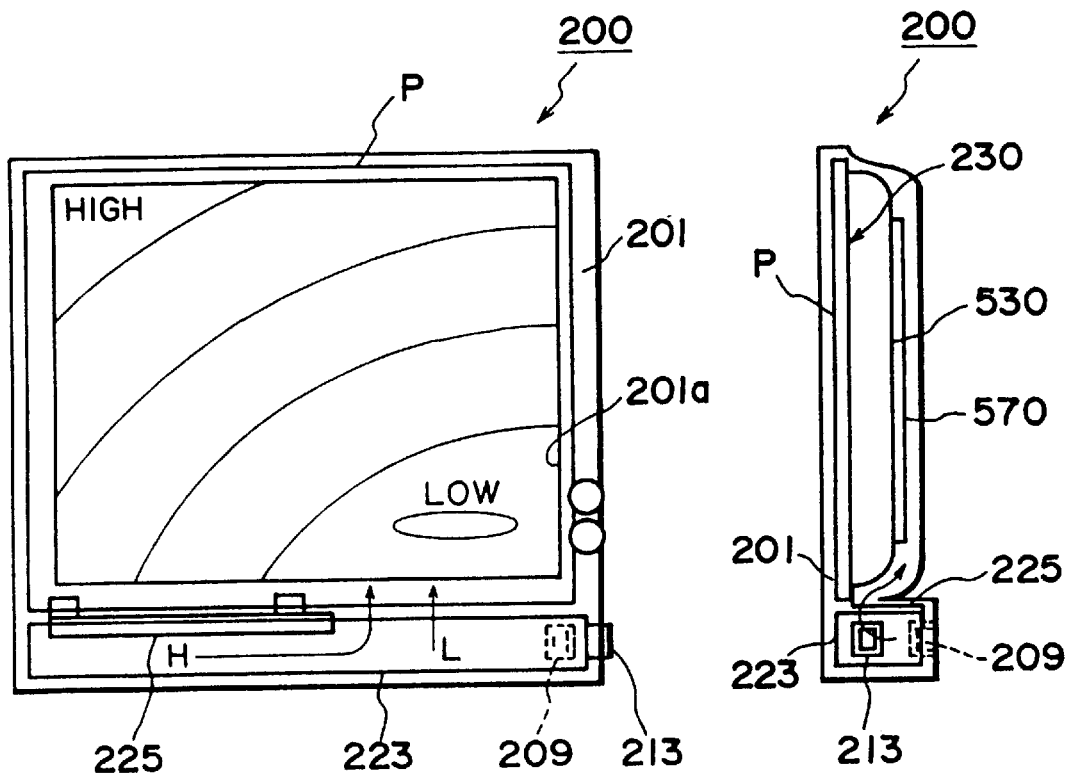
FIGS. 11A and 11B are a front view and a side view, respectively, of the display apparatus body for illustrating a position of the insulating plate.
Figure 85:
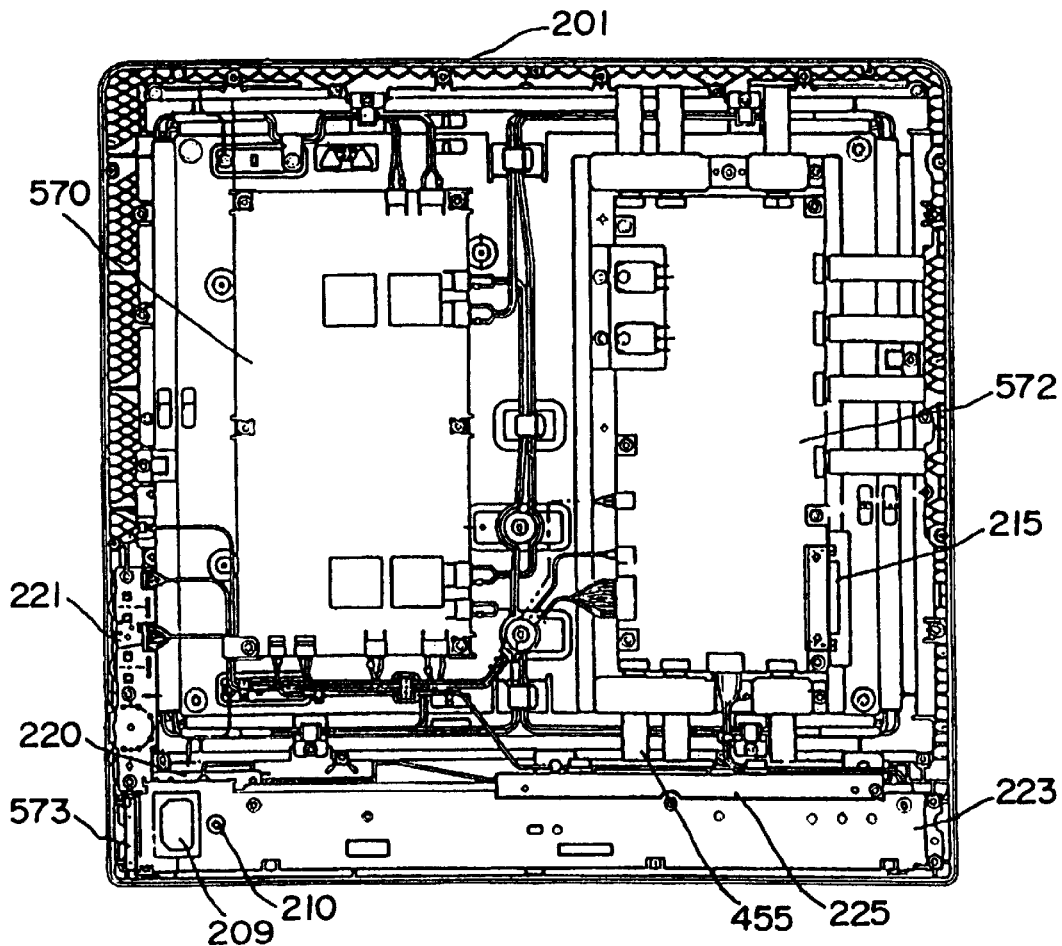
FIGS. 85 and 86 are a rear view and a side view, respectively, showing an affixing structure of a controller unit, etc.

As shown in FIG. 11A, FIG. 8 and FIG. 85, the insulating plate 225 is disposed on an upper surface and at a part of evolving larger heat (secondary side) (i.e., on a left side as viewed from the front (FIG. 11A) or on a right side as viewed from the back (FIG. 8 or FIG. 85) of the switching power supply unit 223) so as to suppress heat from the unit 223 to the liquid crystal panel P (display unit 230), etc. The insulating plate 225 may be composed of, e.g., vinyl chloride resin, and both ends thereof may be affixed to a backlight unit 530 (described later) and the power supply unit 223 by screws (not shown).

Owing to the insulating plate 225, heat evolved from the secondary side of the power supply unit 223 once flows rightwards (as viewed from the panel front) along the insulating plate 225 and then toward the liquid crystal panel P side as shown in FIG. 11A. As a result, the temperature at the lower right region is raised while the temperature increase at the upper left region is suppressed, whereby the temperature distribution of the liquid crystal panel P is uniformized to provide a uniform display quality.

An upper surface part of the power supply unit 223 not provided with the insulating plate 225 may be covered with a fine-mesh net member (not shown) so as to prevent foreign matter from intruding into the unit 203.

Further, in this embodiment, the inverter unit 570 and the controller unit 572 may be disposed above the power supply unit 223 and behind the display unit 230 and the backlight unit 530 as shown in FIGS. 8 and 85. As the inverter unit 570 evolves more heat than the controller unit 572, the inverter unit 570 may be disposed at a position above the part of smaller heat supply from the power supply unit 223, i.e., at an upper diagonal position with respect to the part of larger heat evolution (secondary side) of the unit 223 covered with the insulating plate 225. As a result, the liquid crystal panel P may be provided with a further uniform temperature distribution.

According to our experiment, the provision of the insulating plate 225 and consideration of other units as described above relative to the power supply unit 223 in this embodiment provided a reduction by ca. 1.1–1.5° C. in temperature difference along a liquid crystal panel P comprising a ferroelectric liquid crystal and provided a better display quality on the panel.

<Disposition of the display unit 230, etc.>

As shown in FIG. 11B, the display unit 230 is disposed above the insulating plate 225.

Figure 12:
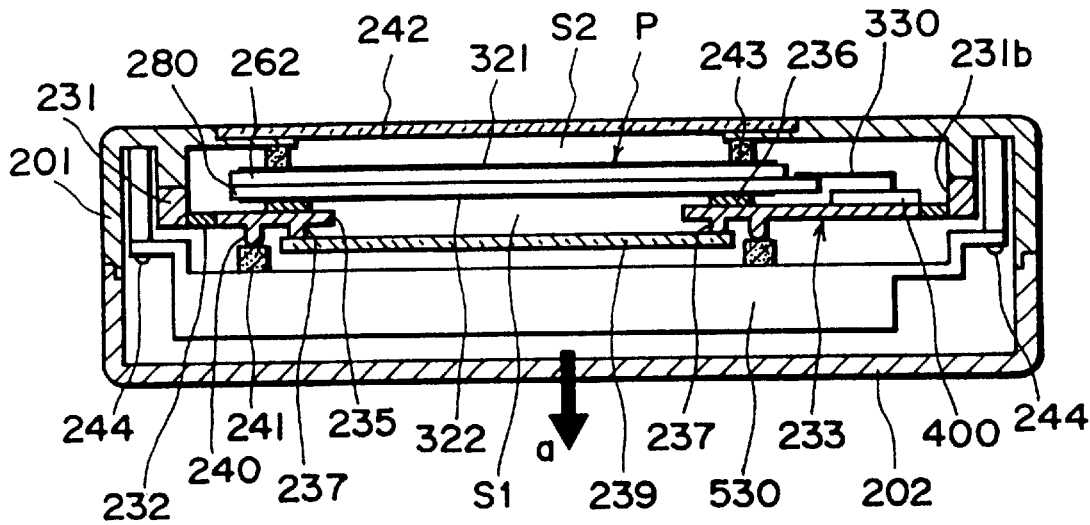
FIG. 12 is a sectional view showing an inner structure of a display apparatus body.

As shown in FIG. 12, the display unit 230 includes a panel frame 231, which is formed in a frame-shape and is provided with a multiplicity of screw holes 231a (FIG. 13) and is affixed to the front cover 201. The panel frame 231 is provided with an inner opening 231b, at which a panel-fixing plate 233 is supported via a panel holding elastic member 232 of, e.g., silicone resin. More specifically, the elastic member 232 may be composed of an elastomeric material and supports the panel-fixing plate 233 in an air-hanging state so as to suppress the transmission of vibration or impact between the panel frame 231 and the panel-fixing plate 233. The bonding with the elastic member 232 may be accomplished by holding the panel-fixing plate 233 within the panel frame 231 in position and filling the gap between the panel frame 231 and the panel-fixing plate 233 with a rubber-type adhesive, followed by curing thereof. The panel-fixing plate 233 is provided with an opening 235 as shown in FIG. 12 and may be composed of a glass fiber-reinforced resin.

On the upper surface of the panel-fixing plate 233, an elastic member (e.g., silicone resin) 236 is disposed along the periphery of the opening, and the liquid crystal panel (liquid crystal device) P is applied via the elastic member 236 to the panel-fixing plate 233. The liquid crystal panel P closes the opening 235 from the above. The elastic member 236 may be formed by applying a rubber-type adhesive of, e.g., silicone rubber, assuming an elasticity after curing in a frame-shape, and liquid crystal panel P is bonded to the elastic member 236 before curing. The elastic member 236 is fixedly disposed so as to surround a display area of the liquid crystal panel P.

Figure 14:
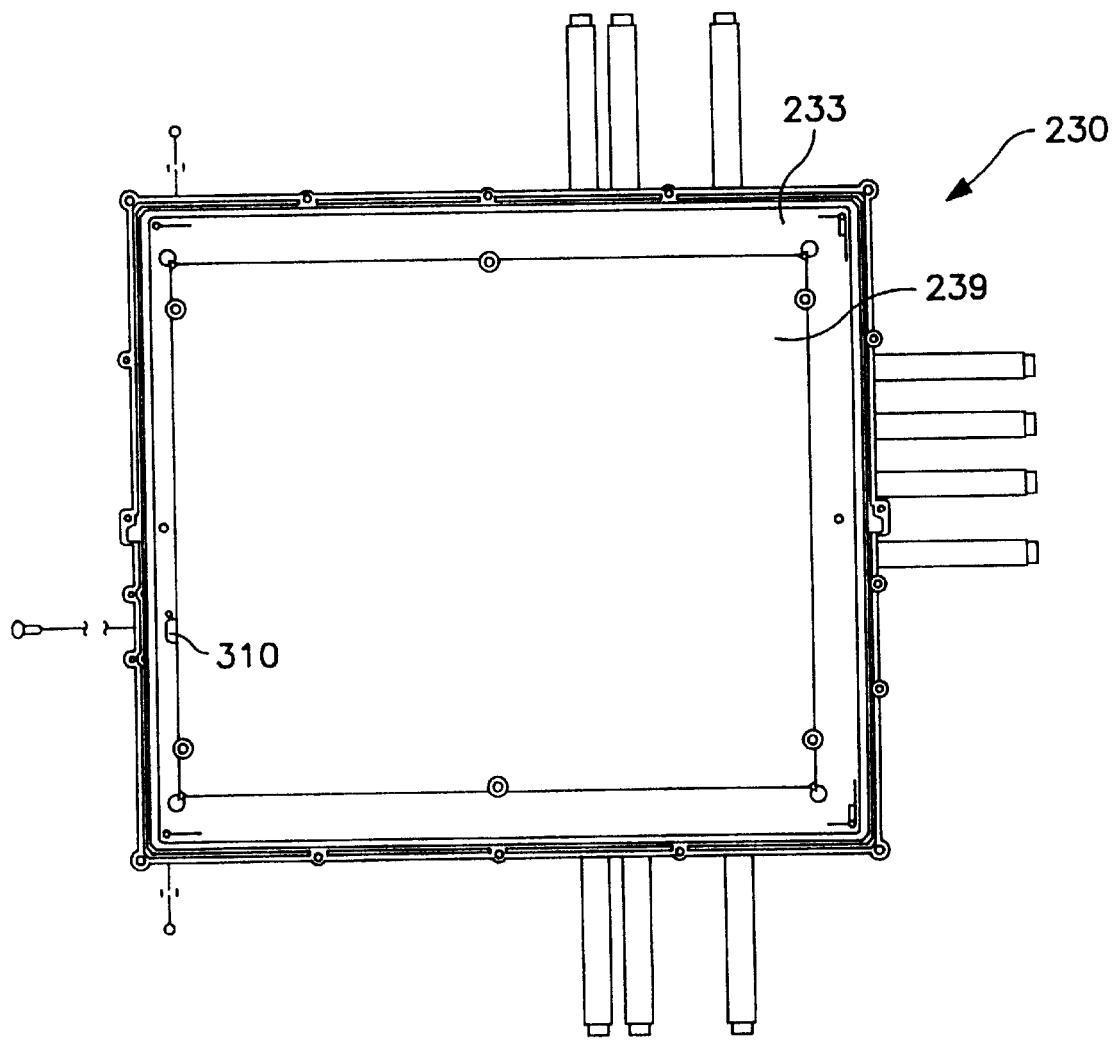

On the lower surface of the panel-fixing plate 233, a projection 237 is continuously formed along the entire periphery of the opening 235, and a diffusion plate 239 is applied to the projection 237 from therebelow to close the opening 235 (FIGS. 12 and 14). As a result, an almost closed space S1 is defined by the panel-fixing plate 233, the diffusion plate 239 and the liquid crystal panel P.

On the lower surface of the panel-fixing plate 233, a projection 240 having a narrower width is formed so as to surround the projection 237. Between a backlight unit 530 (described later) disposed below and the projection 240, a frame-shaped sponge member 241 is applied, whereby an almost closed space is defined by the diffusion plate 239, the panel-fixing plate 233, the projection 240, the sponge member 241 and the backlight unit 530, thus preventing the intrusion of dirt onto the light emitting surface of the backlight unit 530 and the lower surface of the diffusion plate 239. The sponge member 241 has an elasticity and functions to absorb a vibration which may be applied to the display unit 230.

The opening 201a of the front cover 201 is closed with a face plate 242, whereby the front cover 201, the face plate 242 and the liquid crystal panel P define an almost closed space S2, which shows an air damper effect for quickly attenuating an external impact applied to the display apparatus to alleviate an impact applied to the liquid crystal panel P. On the lower surface of the front cover 201, an elastic member 243 is applied in a frame shape along the entire periphery of the opening 201a between the liquid crystal panel P and the front cover 201, so as to enhance the closed state of the space S2 and the air damper effect and prevent the intrusion of dirt onto the surface of the liquid crystal panel P. Because of the elasticity, the elastic member 243 functions to absorb a variation applied to the display unit 230.

The liquid crystal panel P is electrically and mechanically connected via liquid crystal-drive TAB films (herein sometimes simply described as "TAB(s)") 330 to driver boards 400 (only one being shown in FIG. 12). These driver boards 400 are supported on the projection 437 on the panel-fixing plate 233. The detail of the structure and supporting structure of the TAB 330 and driver boards 400 will be described in further detail later.

Figure 15:
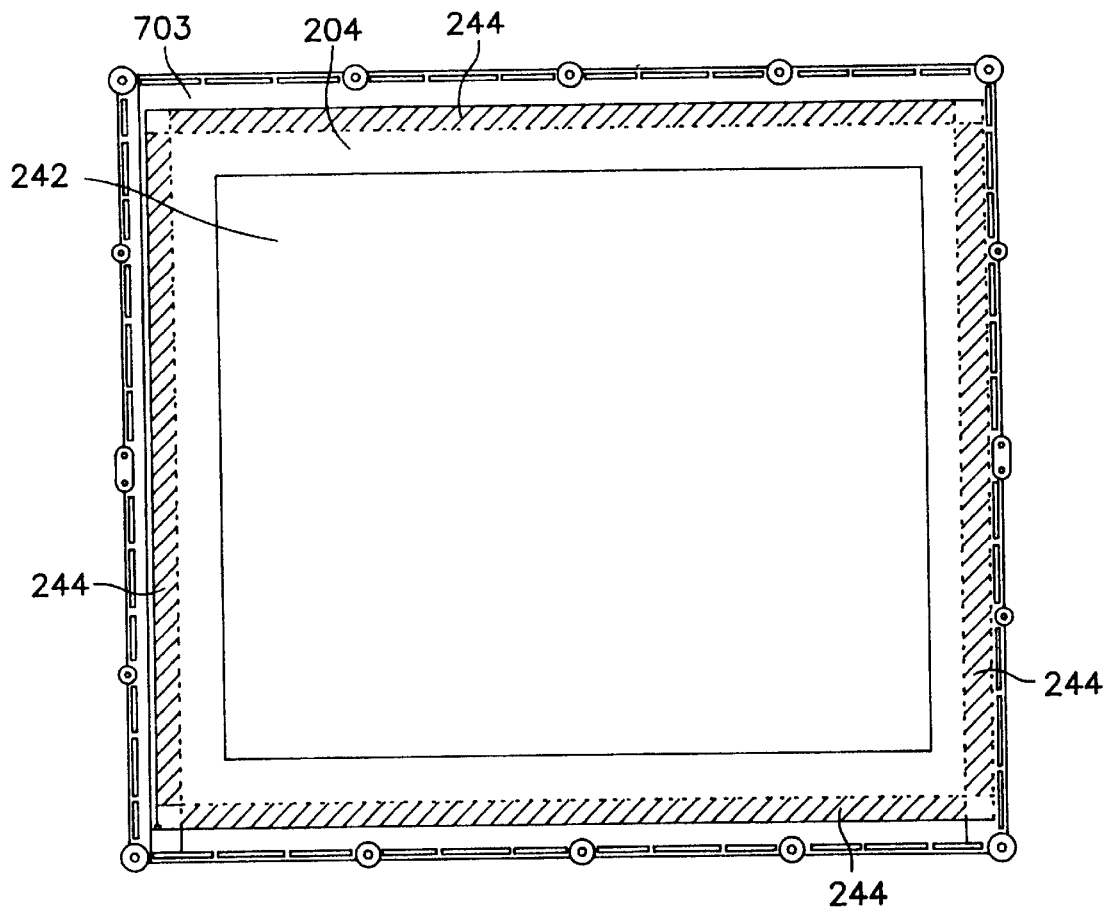
FIG. 15 is a rear view showing a state of affixing a face plate.
Figure 148:
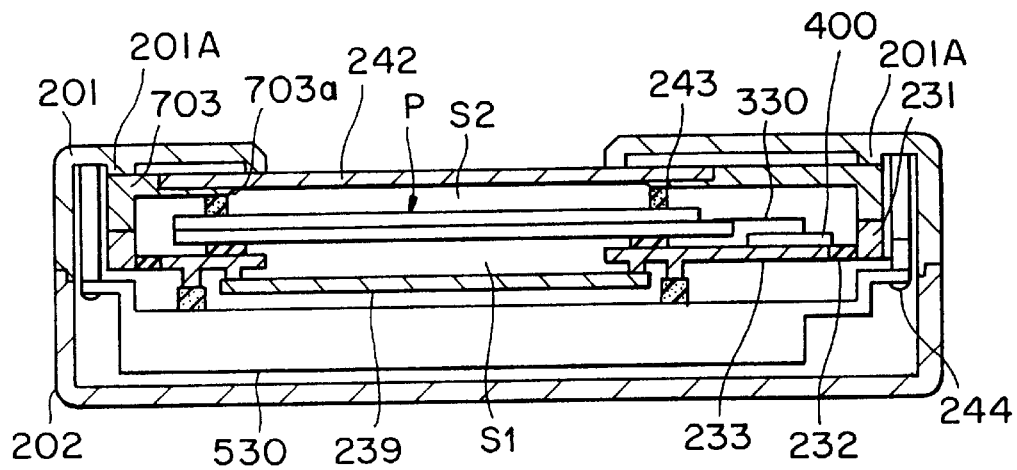
FIG. 148 is a sectional view showing another example of face plate-supporting structure.

The face plate 242 is attached to the surface of the front cover 201 in the embodiment of FIG. 12 but can also be attached onto a rear side (facing the liquid crystal panel P) of the front cover 231 via a panel cover 703 and an adhesive member 244 of, e.g., a double-side adhesive (as shown in FIG. 15 and as will be described further with reference to FIG. 148). In this case, the elastic member 243 of sponge, etc., may be applied in a frame-shape (FIG. 92) along the entire periphery of the opening 703a of the panel cover 703 between the liquid crystal panel P and the panel cover 703 (FIG. 148).

Figure 16:
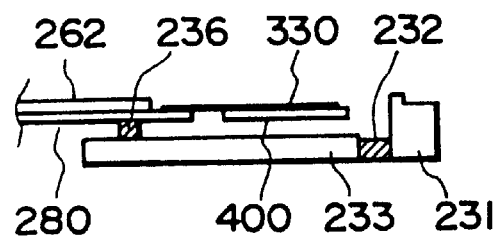
FIG. 16 is a partial sectional view showing a structure of a panel-fixing plate.

In the embodiment of FIG. 12, the lower surface of the panel-fixing plate 233 is provided with the projection 237 for attachment of the diffusion plate 239 and the projection 240 for abutment with the sponge member 241 but may be free from such projection as shown in FIG. 16. In this case, the diffusion plate 239 is applied onto the lower surface of the panel-fixing plate 233, and the sponge member 241 is abutted to the lower surface of the panel-fixing plate 233.

<Materials of the panel-fixing plate 233>

A liquid crystal panel P during drive is generally subjected to a temperature increase due to Joul's heat generated in transparent electrodes (i.e., scanning electrodes 269 and data electrodes 281) and heat evolved from the backlight unit 530. A portion of such heat at the peripheral portion of the liquid crystal panel P goes away through the panel-fixing plate 233, whereby a temperature distribution occurs along the panel P but it is not theoretically desirable because it adversely affects the drive performances of a ferroelectric liquid crystal. Accordingly, the panel-fixing plate 233 may desirably be composed of a material, such as resin, having a low thermal conductivity.

When an alignment is deteriorated, e.g., due to a mechanical stress applied during assemblage, the liquid crystal panel P has to be subjected to a re-aligning treatment by heating. At this time, as the liquid crystal panel P is attached to the panel-fixing plate 233, the panel-fixing plate 233 is also heated during the heating for re-alignment. For this reason, the panel-fixing plate 233 may preferably be composed of a material having a heat-distortion temperature higher than 80–100° C. at which the heating for re-alignment is performed. If the panel-fixing plate 233 is composed of a material causing a thermal expansion by heating to such a re-alignment temperature comparable to that of the panel substrates 262 and 280, it is possible to obviate an arcuate deformation during re-alignment leading to an alignment disorder.

From these points, the panel-fixing plate 233 may be composed of polycarbonate moldable and having a linear expansion coefficient of $6.6 \times 10^{-5}/\deg$. This means that, in case where a panel-fixing plate 233 having outer sizes of 300 mm×370 mm is subjected to a temperature raise from room temperature (25° C.) to 70° C., elongation differences of 1.218 mm on the shorter side and of 1.502 mm on the longer side occur. That is, the gap between the liquid crystal panel P and the driver board 440 is enlarged by ca. 0.6 mm on the shorter side and by ca. 0.75 mm on the longer side. The elongation in such a degree does not result in a serious arcuate deformation of the liquid crystal panel P during the re-aligning treatment. However, the elongation can be concentrated at a connection between the liquid crystal panel P and the liquid crystal drive TAB 330 or a connection between the driver board 400 and the liquid crystal drive TAB 330 to break the connection. Accordingly, if such a breakage at the connection is also taken into consideration, the panel-fixing plate 233 may preferably be composed of a material having a smaller linear expansion coefficient closer to that of a glass substrate used in production of liquid crystal panels.

Accordingly, in a preferred mode of this embodiment, the panel-fixing plate is composed of polycarbonate containing 30% of acicular glass fiber so as to provide a small linear expansion coefficient and also a small anisotropy of linear expansion coefficient.

Figure 17:
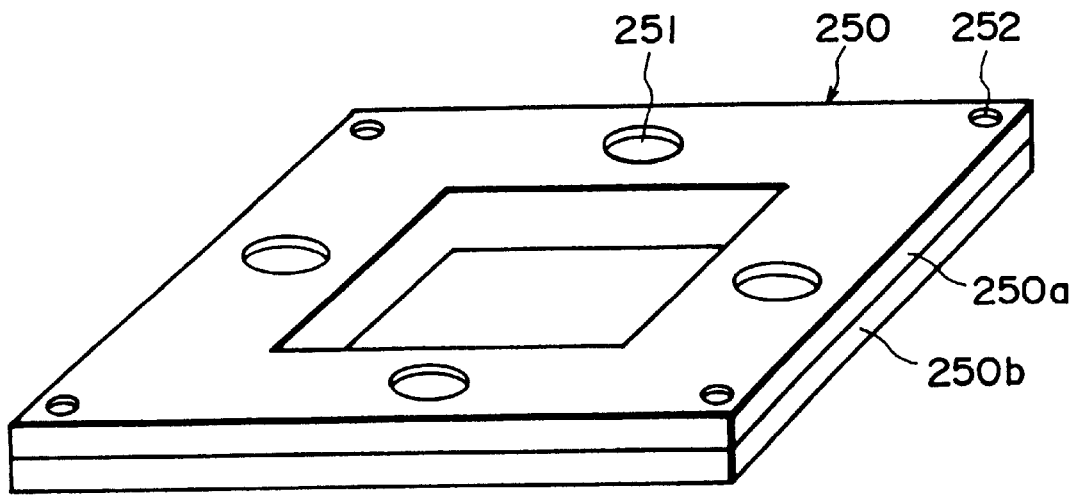
FIG. 17 is a perspective view of a mold for producing a panel-fixing plate.

When such a fiber-resin compound is simply injected into a mold to form a panel-fixing plate, the fiber can be dispersed in orientation along the flow of the compound. Accordingly, in a specific embodiment, a rectangular mold for the panel-fixing plate was provided with four injection ports each at a center of each side as shown in FIG. 17 so as to reduce the anisotropy of linear expansion. More specifically, the mold 250 comprised an upper mold (half) 250a and a lower mold (half) 250b, and the upper mold 250a was provided with four injection ports 251 each at a center of a side and four air-discharge holes 252 each at a corner. By using the mold, glass fiber was uniformly dispersed at random orientation.

Because of the above-described measures, it has become possible to prevent a breakage at a connection between the liquid crystal panel P and the liquid crystal drive TAB 330 or at a connection between the driver board 400 and the liquid crystal drive TAB 330 during the re-aligning treatment and also possible to prevent alignment deterioration due to a warp of the liquid crystal panel P during the re-aligning treatment.

<Liquid crystal panel P>

The structure of the liquid crystal panel P is described with reference to FIGS. 18–25.

Figure 18:
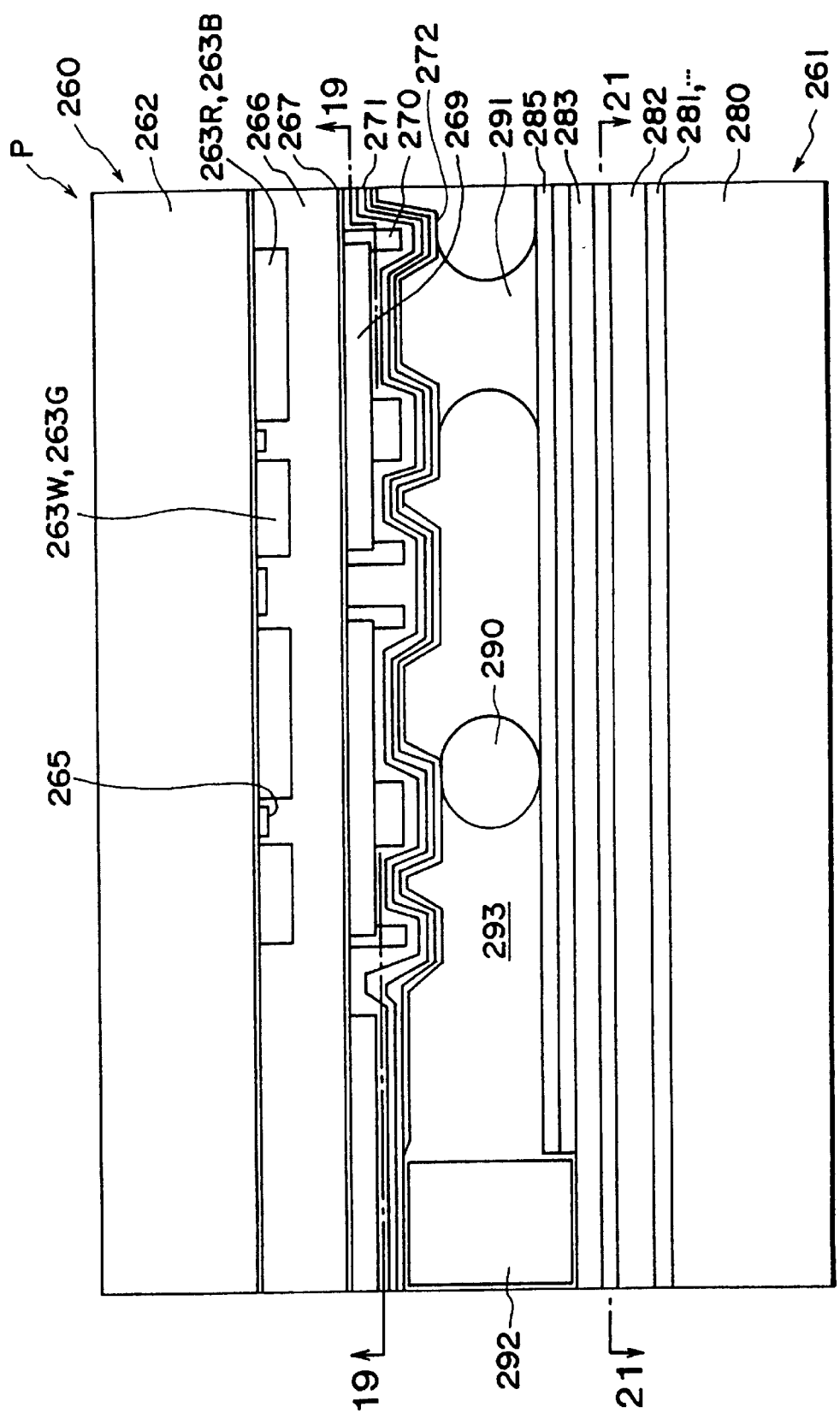
FIG. 18 is a sectional view showing an inner structure of a liquid crystal panel.

Referring to FIG. 18, the liquid crystal panel P includes a pair of oppositely and parallely disposed electrode plates 260 and 261.

Of these, the upper electrode plate 260 comprises a transparent 1.1 mm-thick glass substrate (upper substrate) 262 having thereon four-colored color filters 263R, 263G, 263B and 263W each in a thickness of 1.5 μm disposed with a prescribed gap therebetween, at which a black matrix mask 265 of, e.g., MoTa alloy is disposed in a thickness of 1000 Å. The upper substrate 262 is composed of a blue sheet glass, one side of which has been abraded and optionally coated with an $SiO_2$ film.

The black matrix mask 265 and color filters 263, etc., are coated with a 2.2 μm-thick passivation layer 266, which is further coated with a 500 Å-thick film 267 of, e.g., $SiO_2$. On the film 267, a multiplicity of stripe-shaped scanning electrodes 269 of ITO (indium tin oxide) are formed in a thickness of ca. 700 Å and, along the scanning electrodes 269, metal electrodes 270 having, e.g., a three-layer structure of MoTa (ca. 200 Å) are disposed so as to provide a lower electrical resistance and an increased liquid crystal panel drive speed.

The electrodes 269 and 270 are further covered with an insulating film 271 which comprise laminated structure including a 900 Å-thick $TaO_x$ layer and a 650 Å-thick Ti-Si layer and further fine particles dispersed therein. The insulating film 271 is further coated with a ca. 200 Å-thick alignment control film of polyimide.

The lower electrode plate 261 also includes a transparent 1.1 mm-thick glass substrate (lower substrate) 280 on which a multiplicity of stripe-shaped data electrodes 281 of ITO are disposed. The lower substrate may also be composed of a blue sheet glass, one side of which has been abraded and optionally coated with an $SiO_2$ film.

The data electrodes 281 and the scanning electrodes 269 are disposed to intersect each other to form an electrode matrix. Along the data electrodes 281, metal electrodes 282 having a three-layered structure of MoTa (ca. 400 Å)/AlSiCu (ca. 1000 Å)/MoTa (ca. 200 Å) are disposed and are further coated with an insulating film 283 and an alignment control film 285 similarly as in the above substrate 262.

The electrode plate 260 and 261 are disposed with a gap therebetween, at which a multiplicity of spacers 290 are disposed to make constant the gap, and also a particulate adhesive ("Toraypearl" (trade name)) and a sealing member are disposed so as to bond the plates 260 and 261 to each other. Further, the gap is filled with a ferroelectric liquid crystal 293.

The scanning electrodes 269 and data electrodes can comprise $In_2O_3$ instead of ITO.

The insulating film 271 or/and 283 can comprise $SiO_2$ film formed by sputtering or another insulating substance, such as $Ta_2O_5$, or an inorganic insulating film formed by applying an organo-metal compound containing at least one element of Si, Ti, Ta, Zr and Al, followed by calcination. The thickness may be in the range of 200–3000 Å.

The alignment film 272 or/and 285 may be formed by applying a polyimide forming solution by a spinner, followed by baking, e.g., at 270° C. for 1 hour. The alignment film can also comprise an organic insulating substance, such as polyvinyl alcohol, polyamideimide, polyesterimide, polyparaxylylene, polyester, polycarbonate, polyvinyl acetal, polyvinyl chloride, polyamide, polystyrene, cellulosic resin, melamine resin, urea resin or acrylic resin. The thickness may be in the range of 50–1000 Å. The alignment film 272 or/and 285 may be rubbed in one direction with, e.g., a nylon-cloth so as to be provided with a uniaxial alignment axis exerting an alignment control force in a direction substantially identical to the rubbing direction.

The application of the upper and lower substrates 262 and 280 may be performed, e.g., by dispersing spacer beads 290 of, e.g., silica, alumina, etc., of ca. 1.5 µm in average diameter onto one of the substrates, dispersing the particulate adhesive 291 and applying the sealing agent 292 by screen printing, superposing the substrates with a gap (determined by the spacer bead 290) of 0.1–3.0 µm, curing the adhesive 291 and the sealing agent to form a blank panel structure, which is then filled with the ferroelectric liquid crystal to form a liquid crystal panel P.

The color filters 263R, etc. will be described with reference to FIGS. 19–22.

Figure 19:
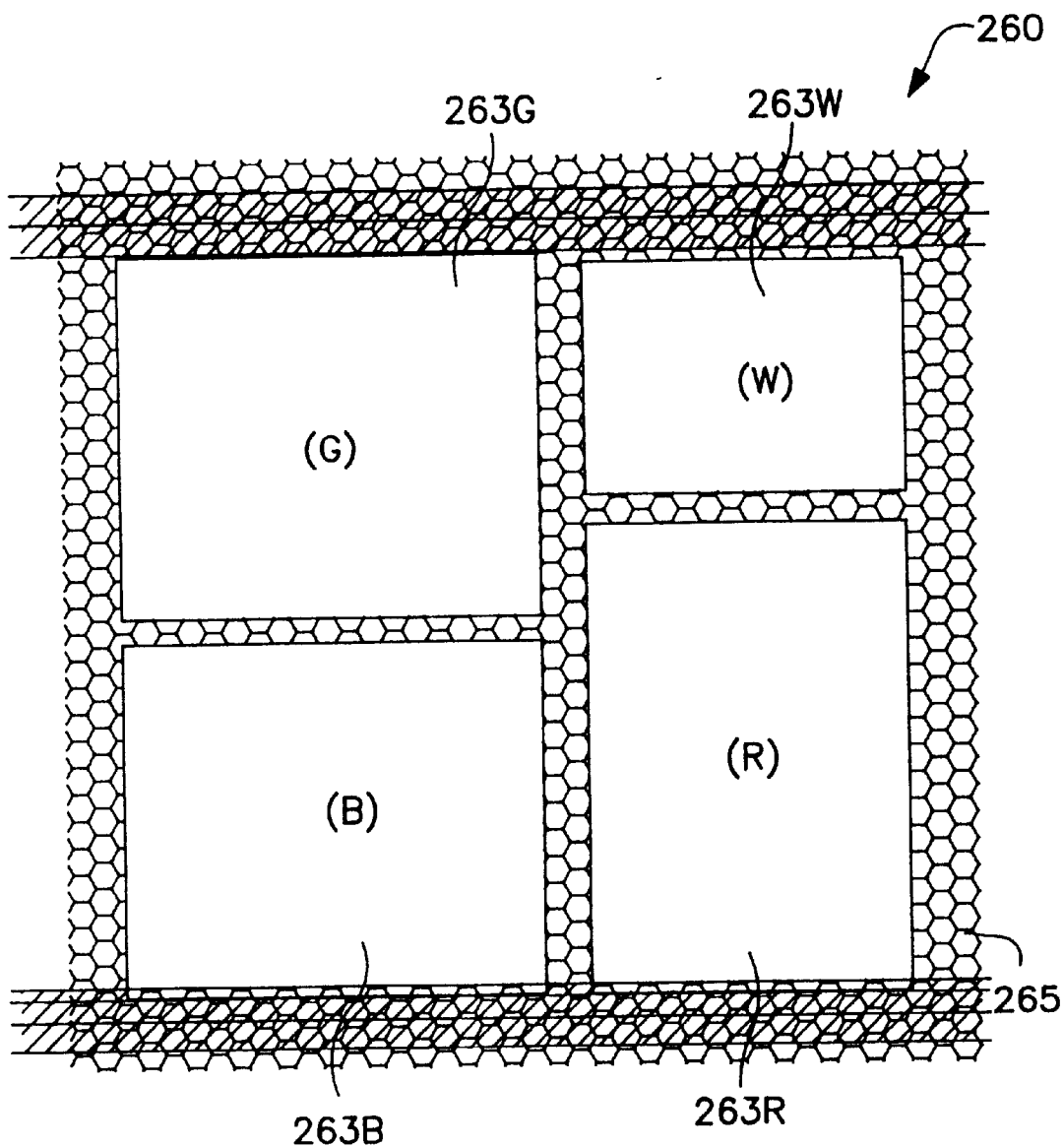
FIG. 19 is a plan view showing a color filter pattern.
Figure 20:
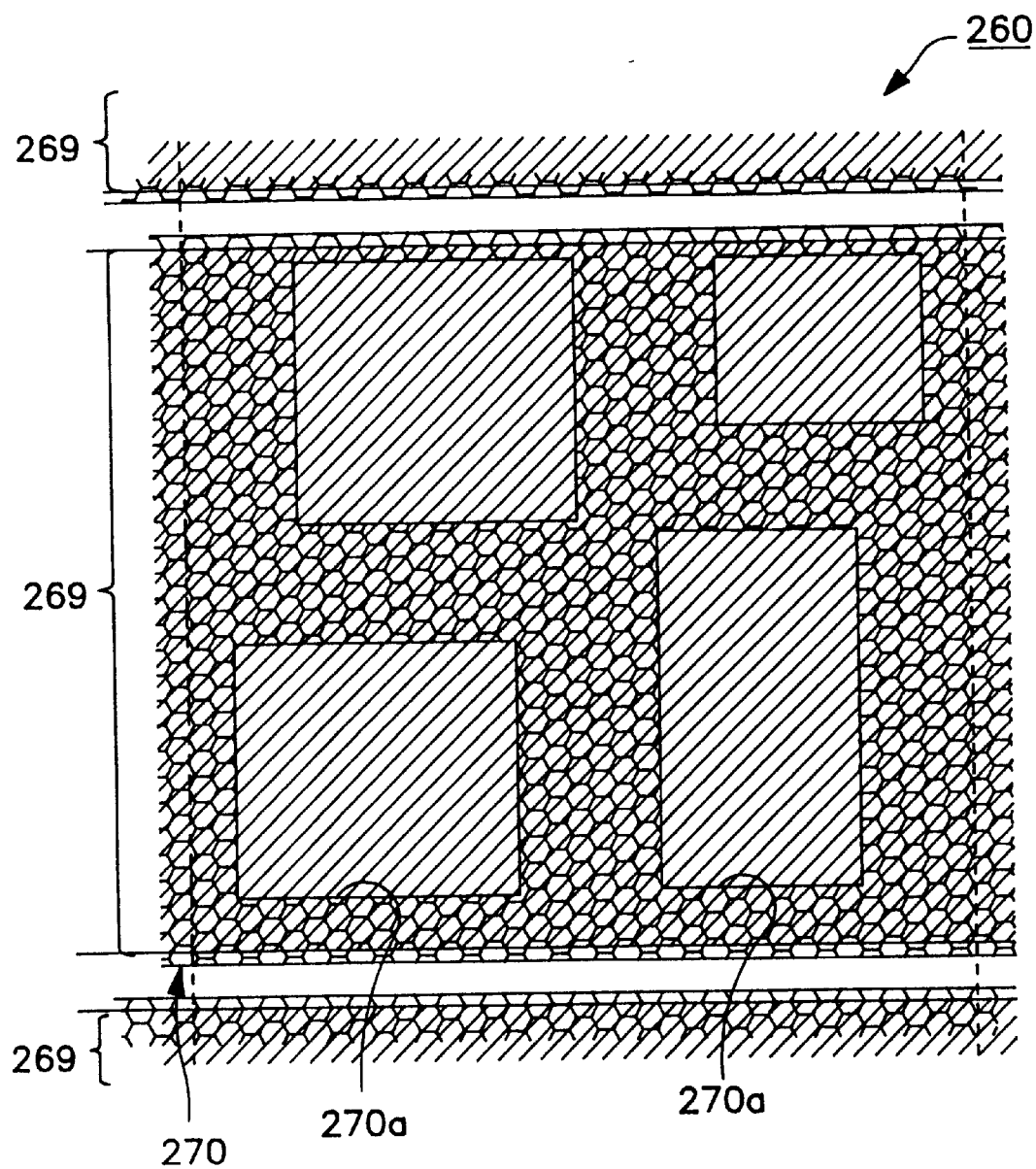
FIG. 20 is a plan view for illustrating a metal electrode arrangement.

FIG. 19 is a sectional view taken along a 19—19 line as view in the direction of the arrow. As shown in FIG. 19, the color filters or filter segments 273R, etc., in four colors of R, G, B and W are rectangular in shape and disposed adjacent to each other with a prescribed spacing therebetween. Portions with four color filters 263R, etc., forms respective pixels so that a combination of light flux transmitted through the color filters 263R, etc., will provide a prescribed color. Along the four color filters 263R, etc., a transparent scanning electrode 267 is disposed as shown in FIG. 20. A metal electrode 270 is provided with openings 270a at regions of the color filters 263R, etc., so as to allow the transmission of light from the backlight unit 530.

Figure 21:
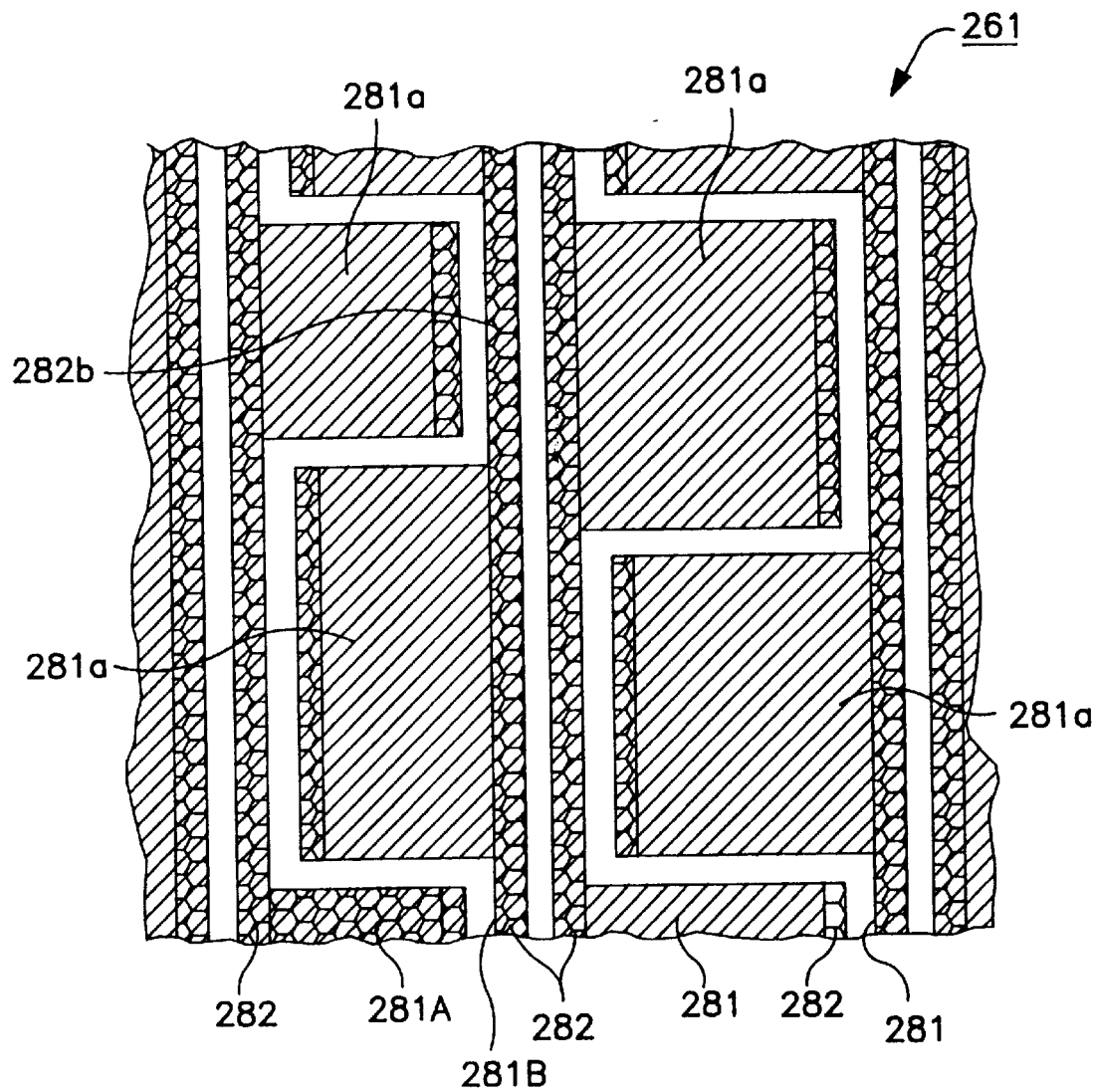
FIG. 21 is a plan view for illustrating a data electrode arrangement.
Figure 22:
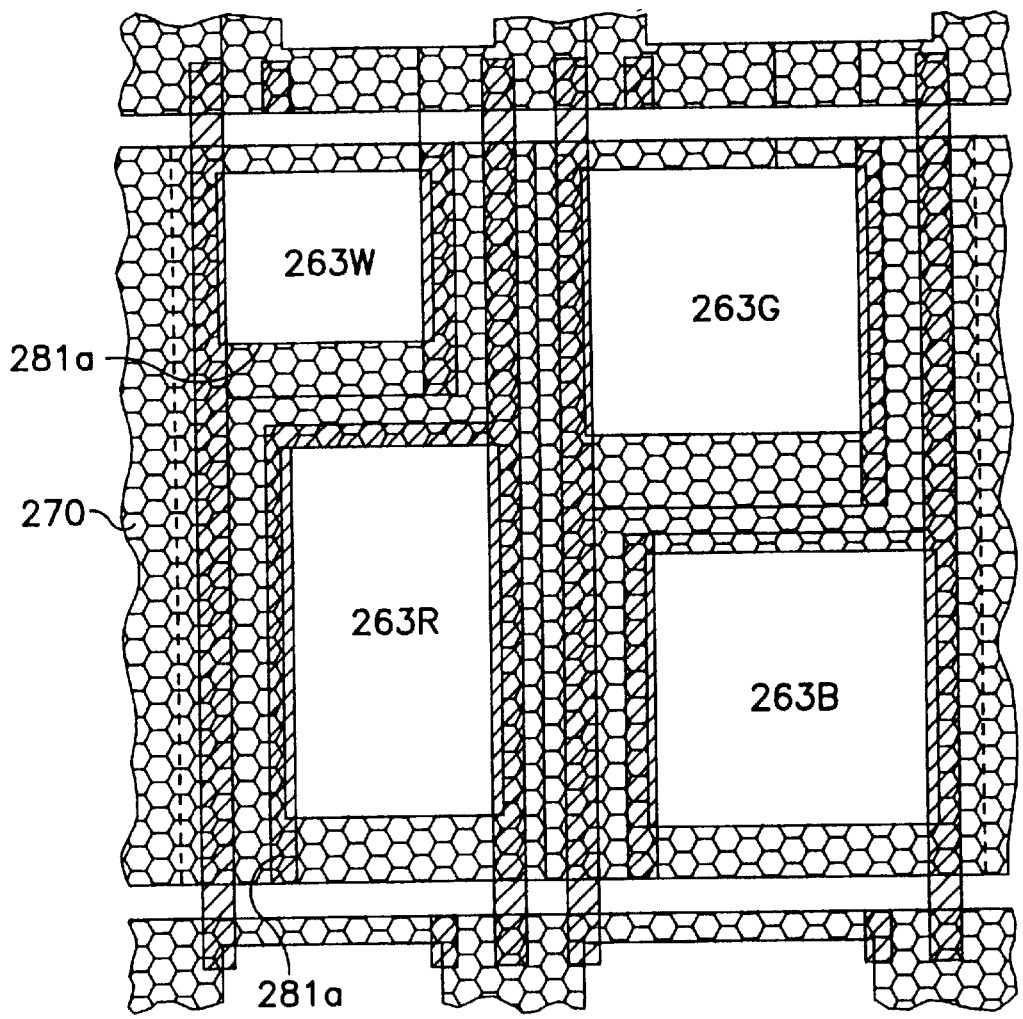
FIG. 22 is a plan view showing a positional relationship between data electrodes and a color filter pattern.

FIG. 21 is a sectional view taken along an A—A line as viewed in the arrow direction. As shown in FIG. 21, each data electrode 281 is formed in a comb-shape including a wider portion 281a (to be superposed with a color filter 263R, etc.) and a narrower portion 281b. An adjacent pair of data electrodes have alternating shapes engaged with each other so as not to interfere with each other. The four wider portions 281a (in FIG. 21) are superposed with the above-mentioned four color filters 263R, etc. (FIG. 20), respectively, to form four pixels (FIG. 22). The metals electrodes 282 are disposed to extend along an edge of each data electrode 281.

Figure 23:
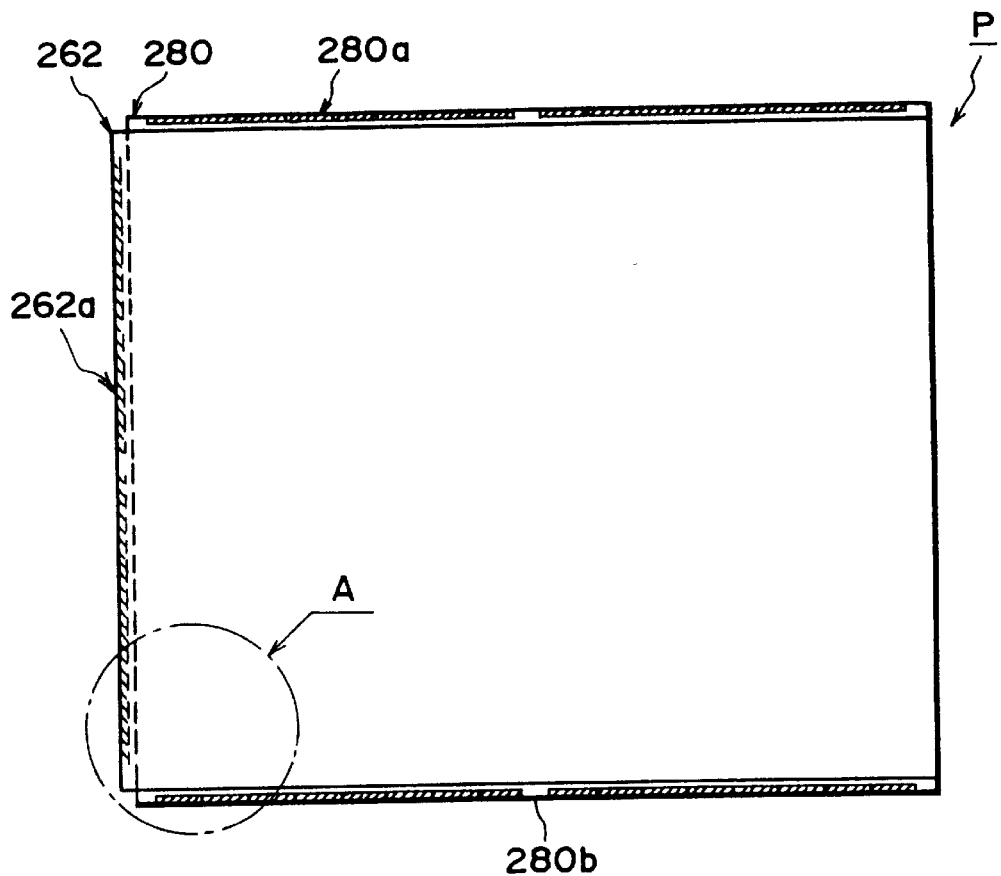
FIG. 23 is a plan view showing shapes of an upper substrate and a lower substrate.
Figure 24:
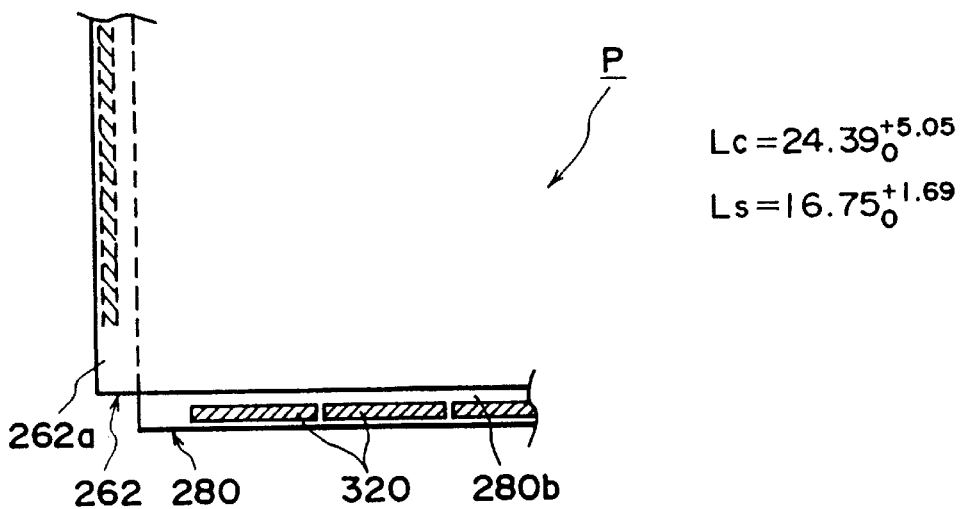
FIG. 24 is a partially enlarged view thereof.

The substrates 262 and 280 have different shapes as shown in FIGS. 23 and 24. More specifically, when the panel is viewed from the front, the laterally wide upper substrate 262a projects beyond the lower substrate 280 at a left edge 262a, and the vertically longer lower substrate 280 projects beyond the upper substrate 262 at upper and lower edges 280a and 280b. At the right edge as viewed from the front, the upper and lower substrates aligned with each other.

Figure 13:
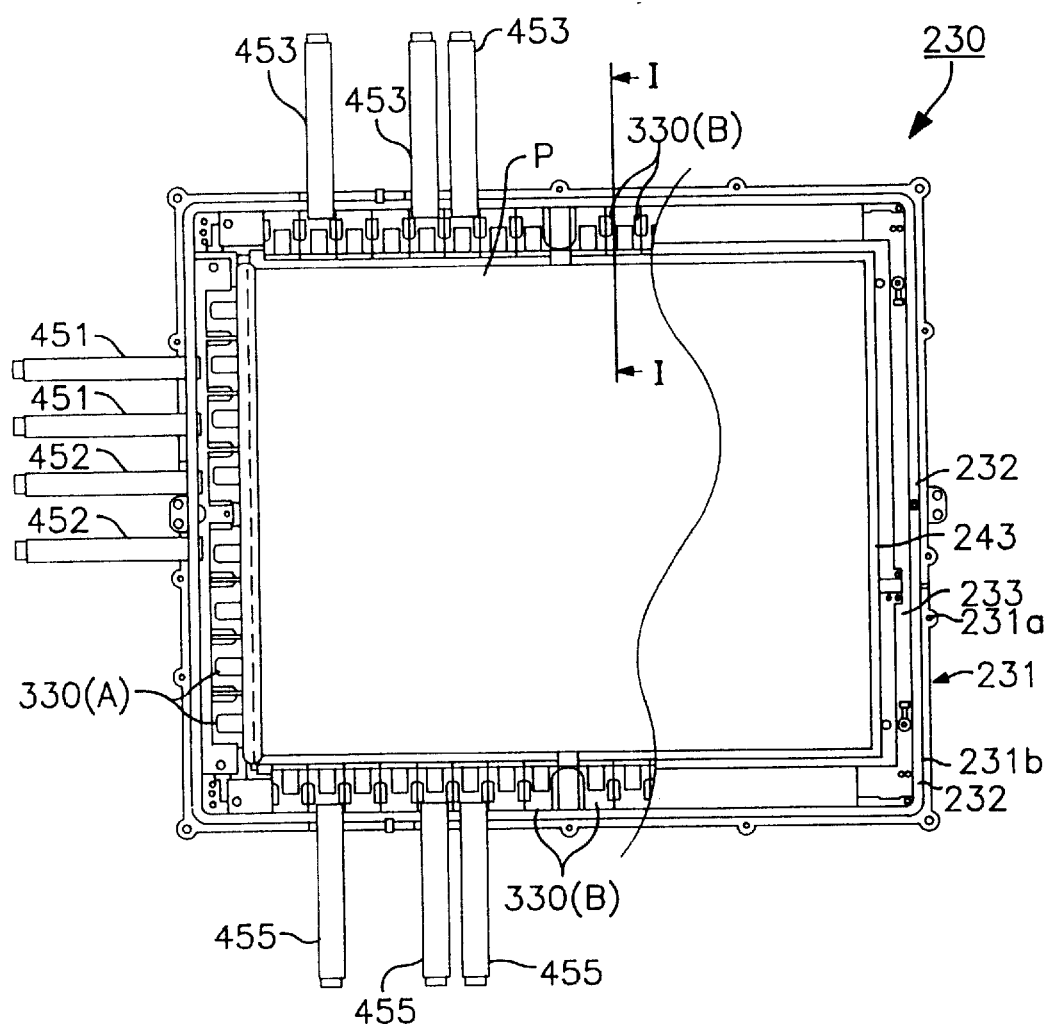
FIGS. 13 and 14 are a front view and a rear view, respectively, of a display unit.

In the liquid crystal panel P thus assembled, at least the left edge 262a (of the substrate 262) and the upper and lower edges 280a and 280b (of the substrate 280) may be used for mounting the liquid crystal drive TABs 330(A) and 330(B) as shown in FIG. 13. On the other hand, an edge not used for mounting the drive TABs may be provided with an injection port for introducing the liquid crystal into the panel.

Further, the right edge at which either the substrate 262 or 280 projects, is also provided with a thermistor 310 or detecting the temperature during liquid crystal drive of the panel to effect a temperature compensation of the display apparatus (described later in detail with reference to FIG. 28). The above-mentioned scanning electrodes 269 together with the metal electrodes 270 extend to the lower edge 262a of the upper substrate to be exposed outside thereat, and the data electrodes 281 together with the metal electrodes 282 extend to the upper and lower edges 280a and b of the lower substrate to be exposed outside thereat.

<Shape of respective electrodes at substrate edges>

The shapes of the respective electrodes at the substrate edges 262a, 280a and 280b will now be described. The shapes of the respective electrodes at the substrate edges are substantially identical to each other between the upper substrate 262 and the lower substrate 290. For this reason, the shapes of the scanning electrodes 269 and the metal electrodes at the left edge of the upper substrate will be described, and the shapes of the data electrodes 281 and the metal electrodes 282 at the upper and lower edges 280a and 280b of the lower substrate are omitted from description.

Figure 25:
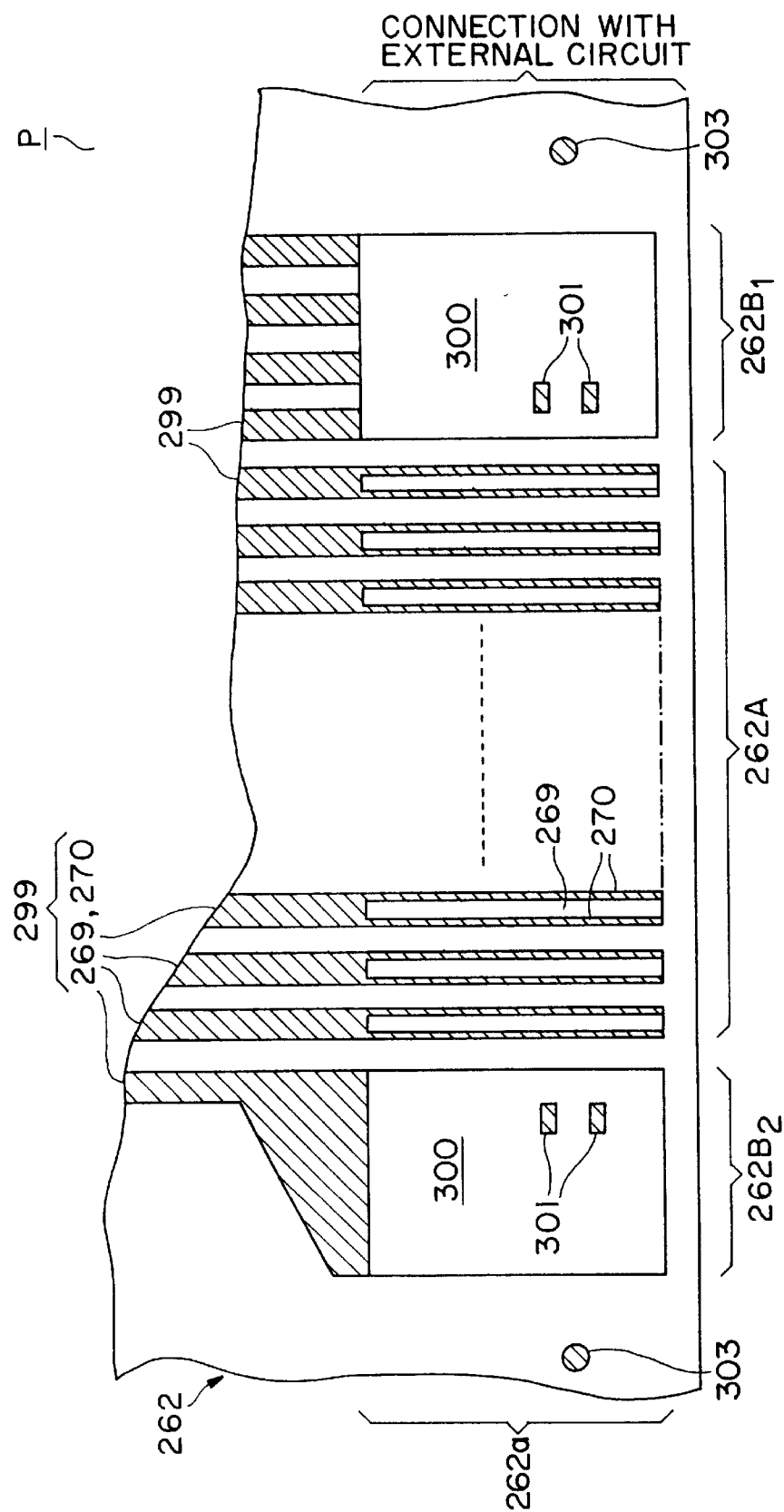
FIG. 25 is an enlarged partial plan view for illustrating an electrode terminal shape and an alignment mark shape.
Figure 26:
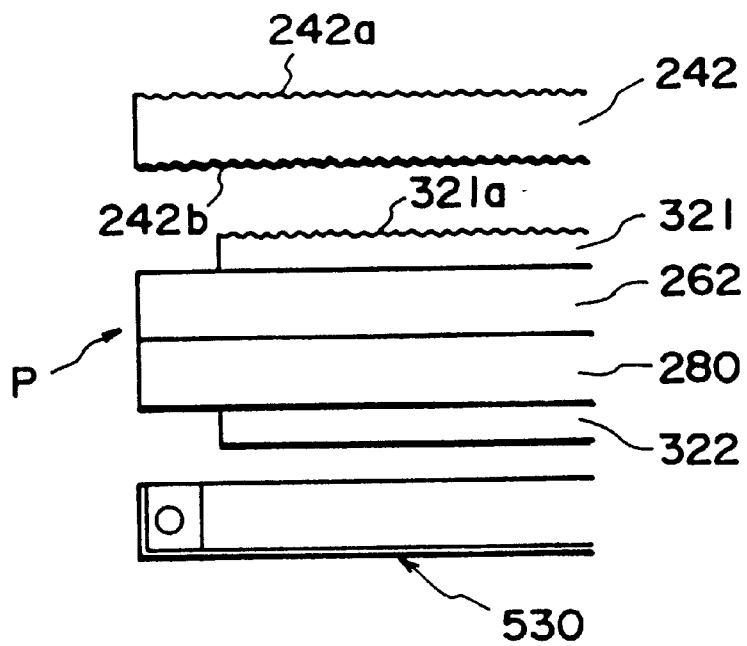
FIG. 26 is a schematic sectional view for illustrating a manner of diffusion treatment applied to, e.g., a face plate.

FIG. 25 is a partial plan view showing a layout of the scanning electrodes 269 and the metal electrodes 270 at the left edge 262a (in FIG. 24 but shown as a lower edge in FIG. 25) of the upper substrate 262. The lower edge portion 262a is hereinafter referred to as an exposed portion 262a. Hatched regions in FIG. 25 represent regions where a scanning electrode 269 and a metal electrode 270 are superposed.

Referring to FIG. 25, at a central region 262A of the upper substrate 262 (a central region of the upper substrate 262 in a lateral direction perpendicular to the longitudinal direction of the scanning electrodes 269), a multiplicity of stripe-shaped scanning electrodes are extended without changing their sectional shape up to the exposed portion 262a of the upper substrate 262, so that each metal electrode is laminated over a full width of a scanning electrode (with the proviso that it is provided with openings 270a at portions thereof corresponding to the color filter segments 263R, etc. as shown in FIG. 20). However, at the exposed portion 262a of the upper substrate 262, only both side edge portions of each scanning electrode are coated with metal electrodes, and a central portion of each scanning electrode 269 assumes a non-laminated single layer structure.

On the other hand, at the exposed portion in both side regions 262B1 and 262B2 outside the central region 262A, the transparent electrodes are formed in rectangular larger width portions 300 each provided with two alignment marks 301 for eye observation (second and fourth alignment marks, hereinafter called "substrate-side eye mark(s)"). The substrate-side eye marks 301 are formed in laterally elongated rectangles disposed in parallel with a prescribed spacing therebetween, and formed of an identical material with the metal electrodes 270. In a side region 262B1 adjacent to the region 262A and at a portion except for the exposed portion 262a, a plurality (4 in FIG. 25) of electrodes 299 are formed by lamination of the scanning electrodes 269 and the metal electrodes 270. The scanning electrodes 269 and the laterally enlarged portion 300 are electrically connected with each other. Further, in the other region 262B1 (shown on the left) and at a portion except for the exposed portion 262a, a single electrode 299 formed by lamination of a scanning electrode 269 and a metal electrode 270 is disposed, so that the scanning electrode 261 and the laterally enlarged portion 300 are similarly electrically connected with each other.

Outside the regions 262B1 and 262B2, alignment marks 303 in a shape of a small circle are respectively formed of a material identical to that of the metal electrodes 270. While the above-mentioned substrate-side marks 301 are designed to be observed with eyes, these alignment marks 303 are designed to be subjected to image recognition with a camera and called hereinafter "substrate-side auto-mark(s)". In this embodiment, the liquid crystal panel P is designed to be driven by electrodes 299 disposed in the region 262A, and the electrodes 299 in the other regions 262B1 and 262B2 are designed as electrodes for grounding.

<Polarizer 321>

On both surfaces of the liquid crystal panel P, polarizers 321 and 322 are applied, of which a polarizer 321 disposed opposite to the face plate 242 is provided with a diffusion treatment.

The face plate 242 is composed of a chemically reinforced glass plate, both surfaces of which may be subjected to an anti-glare treatment, boric acid treatment, honing, a chemical treatment for film formation, etc., or a physical treatment to be provided with diffusive surfaces 242a and 242b.

In this embodiment, for example, the polarizer 321 is formed to have a haze of 25% and the face plate 242 is provided with a haze of 5%, so that a diffusion surface (of the polarizer 321) closer to the liquid crystal panel P is designed to have a larger haze than a diffusion surface (242a or 242b of the face plate 242) remoter from the liquid crystal panel P. The diffusion treatment may be accomplished by providing the surface with an unevenness. In this embodiment, a diffusive surface has been formed by providing a surface unevenness pitch of 20–25 μm on an average (i.e., at ½ of a minimum pixel width) relative to a minimum pixel width of 50 μm of the liquid crystal panel P.

In this embodiment, all the surfaces of the members disposed on the observer's side with respect to the liquid crystal panel P have been subjected to diffusion treatment, so that the reflection of external light entering the panel is reduced to allow an easy recognition of a display on the liquid crystal panel P. According to our measurement, a specific display apparatus body 200 according to this embodiment showed a reflectance of 6%, which has been reduced to at most ⅓ of the conventional apparatus.

Incidentally, a diffusive surface showing a large haze as the above is generally liable to cause blurring of images, such as characters and figures displayed on the panel in a case where a large distance is provided between the panel P and the diffusion surface. In this embodiment, however, the polarizer 321 applied to the liquid crystal panel P is set to have a larger haze than that of the face plate 242 disposed farther from the panel P, so that such blurring can be reduced to allow a clearer recognition of a display content on the liquid crystal panel P.

Further, a diffusion surface given by a rough unevenness is liable to provide an optical irregularity resulting in a glaring appearance and, on the other hand, a diffusion surface given by a fine unevenness fails to blur a contour of a reflected image thus showing only a low non-glare effect. In this embodiment, the average unevenness pitch is set to be at most ½ of a minimum pixel width of the panel, a good display quality can be retained without incurring the above problem.

Figure 27:
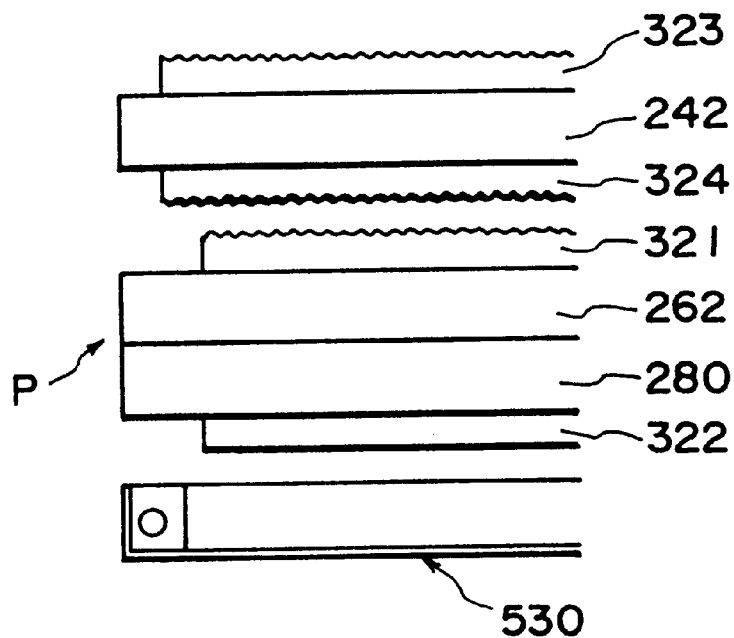
FIG. 27 is a schematic sectional view showing a state where a non-glare film is applied.

Instead of the formation of a diffusion surface by a chemical or physical treatment as described above, the face plate 242 can be provided with diffusive surfaces by applying commercially available non-glare films 323 and 324 of (PET (polyethylene terephthalate) showing a haze of ca. 5%) on both surfaces as shown in FIG. 27. Also in this case, the surface of the polarizer 321 may be diffusion-treated so as to provide an average unevenness pitch of at most ½ of a minimum pixel width. In this case, as the face plate 242 is composed of chemically reinforced glass which is more resistant to breakage than an ordinary glass sheet and less warpable, the spacing between the face plate 242 and the liquid crystal panel P can be reduced. As a result, the blurring of a display can be reduced to provide a better recognizability. Further, corresponding to a reduction in blurring, the haze of the face plate 242 can be increased by that much, thereby further lowering the reflectance. Further, as the films 323 and 324 are applied to the face plate 242, even if the face plate is broken by application of a large force, the broken fragments of the face plate are not scattered.

Further, the diffusive surfaces formed on the face plate 242 and the polarizer 321 may be coated with a low reflection coating or subjected to a low-reflection treatment. The coating may be applied by dipping, potting, spraying, sol-gel conversion or vapor deposition and may be formed in a single layer or plural layers, whereby a further lower reflectance can be provided. According to our measurement, the reflectance was reduced to about ⅙ of that obtained in a conventional apparatus.

<Thermistor 310>

Figure 28:
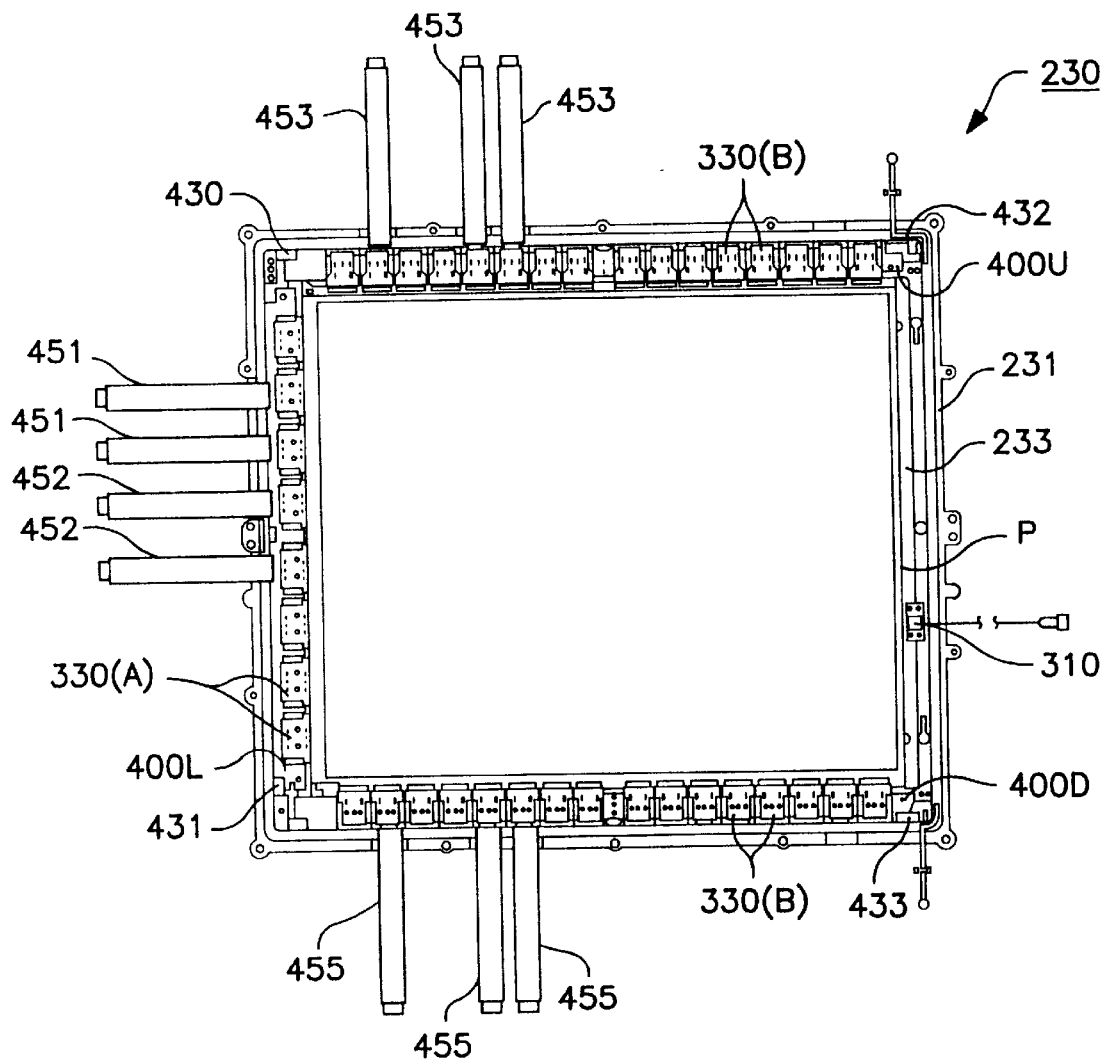
FIG. 28 is a front view showing a display unit structure including a thermistor position.

In this embodiment, as shown in FIG. 28, the right edge of the liquid crystal panel P as viewed from the front is free from connection with TABs 330, and a thermistor 310 is disposed so as to contact the edge. The structure of the thermistor 310 is described above with reference to FIGS. 29 and 30.

Figure 29:
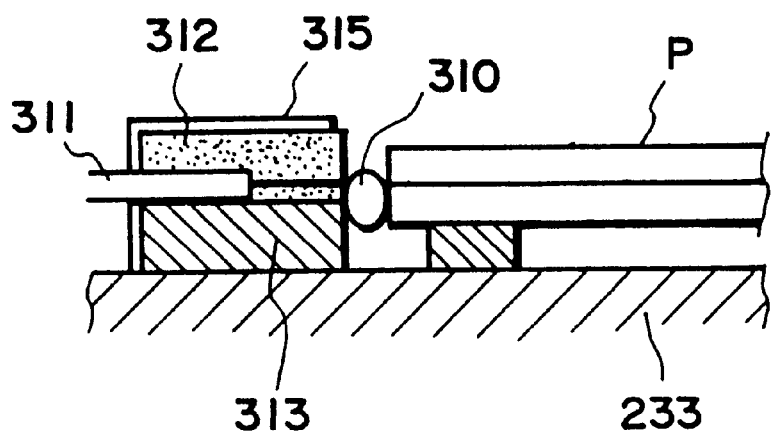
FIG. 29 is a sectional view showing a thermistor fixing structure.
Figure 30:
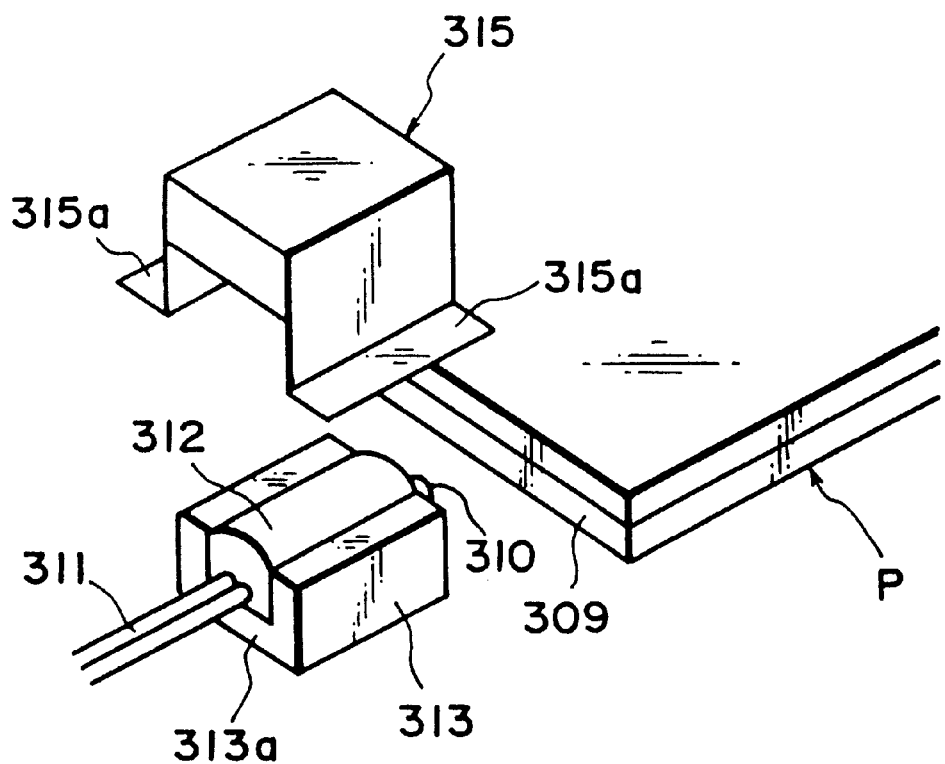
FIG. 30 is an exploded perspective view showing an inner structure of a thermistor.

As shown in FIG. 29, the thermistor 310 is connected with a lead wire 311, which is fixed to an elastic member 313 with silicone resin 312. The elastic member 313 is formed of, e.g., silicone foam sponge and in a sectional shape of almost "U" (FIG. 30). Enveloping the elastic member 313, etc., a fixing member 315 is disposed, so that lower ends 315a of the fixing member 315 are fixed to a panel-fixing plate 233 to dispose the thermistor in position. During the fixation, the elastic member 313 is pressed from its end surface 313a opposite the thermistor 310 to the liquid crystal panel P side so as to press the thermistor 310 to the liquid crystal panel P. In order to allow the thermistor 310 to accurately detect the temperature of the liquid crystal panel P, the thermistor 310 is surrounded by only air having a large heat conduction resistance except for the elastic member 313 of silicone foam sponge as shown in FIG. 29.

In this embodiment, the thermistor 310 is designed to be disposed at a position along a panel which is equally distant from various heat evolution sources or free from localization of heat. More specifically, from this viewpoint, the thermistor 310 is disposed along an edge for mounting of TABs and at a position below a vertically mid point. As a result, the thermistor 310 is allowed to detect a temperature which may be regarded as an average of the liquid crystal over the entire liquid crystal panel, thus allowing a more accurate temperature compensation in combination with a temperature uniformization over the liquid crystal panel.

<Anisotropic conductive adhesive film 320>

Figure 31:
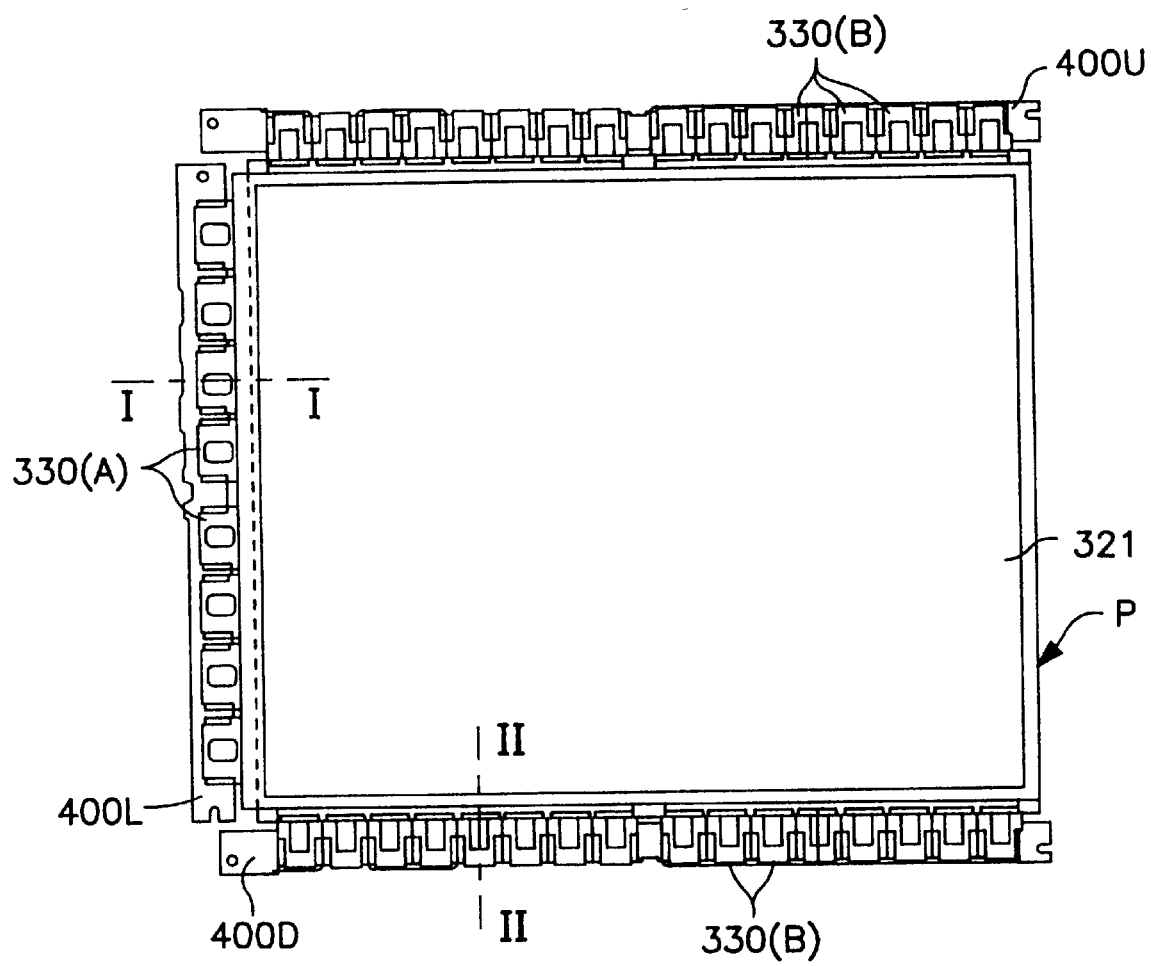
FIG. 31 is a plan view showing a disposition of liquid crystal drive TABs.
Figure 32:
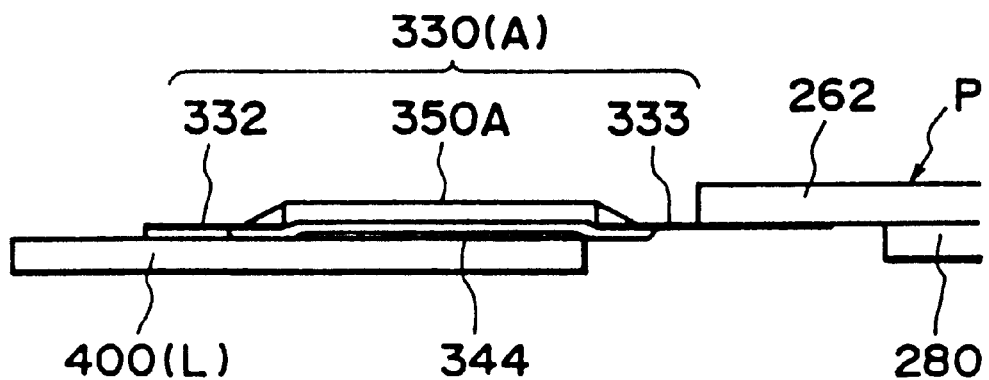
FIGS. 32 and 33 are sectional views showing a liquid crystal drive TAB for a scanning side and a data side, respectively.
Figure 33:
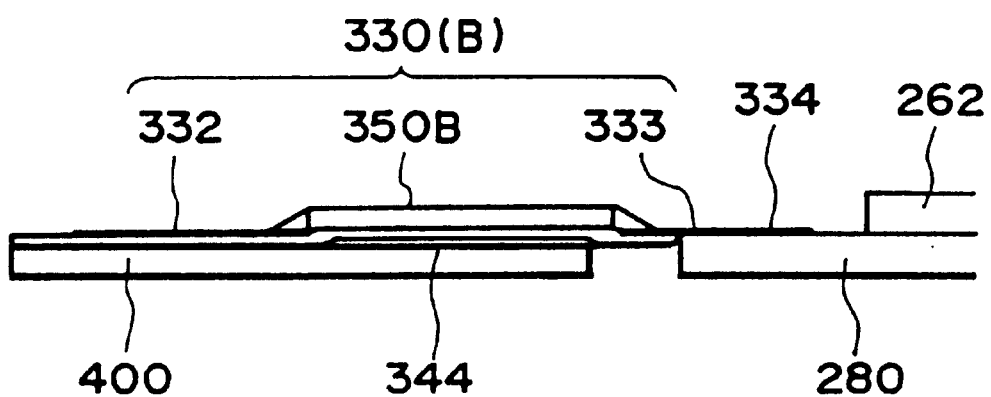

To the edges 262a, 280a and 280b of the substrates 262 and 280, a multiplicity of anisotropic conductive adhesive films 320 are applied as shown in FIG. 24, and the liquid crystal drive TABs (print boards) 330 are bonded to the substrates 262 and 280 via the anisotropic conductive adhesive films 320 (FIGS. 31–33). Regarding the liquid crystal drive TAB 330 connected to the upper substrate 262, as shown in FIG. 32, one surface (upper surface in the figure) is bonded to the driver board 400. On the other hand, regarding the liquid crystal drive TAB 330 connected to the lower substrate 280, as shown in FIG. 33, the TAB 330 is bonded with its one surface (lower surface in the figure) to the lower substrate 280 and the driver board 400.

The anisotropic conductive adhesive film 320 will now be described.

The anisotropic conductive adhesive film comprises a curable resin capable of forming a cured body under a prescribed heat setting or curing condition and electroconductive particles dispersed therein. The electroconductive particles may comprise particles of metals or alloys, such as Ni, Au, Ag or solder, or electroconductive particles formed by coating spherical resin particles with a metal such as Ni or Au. The spherical resin particles may comprise a resin having a linear expansion coefficient almost equal to that of the cured resin. The electroconductive particles may be contained in a proportion of 0.5–5 wt. parts, preferably 5–20 wt. parts, per 100 wt. parts of solid curable resin and may have an average particle size of 5–50 μm, preferably 10–30 μm.

The heat-curable or thermosetting resin may comprise thermosetting epoxy resin, thermosetting silicone resin or thermosetting polyimide resin.

<Structure of liquid crystal drive TAB 330>

Next, the structure of a liquid crystal drive TAB 330 will be described with reference to FIGS. 34–50. The liquid crystal drive TABs 330 used in this embodiment includes a scanning-side TAB (scanning-side print film) 330A for receiving a signal from a controller unit 572 to supply a scanning signal to the scanning electrodes 269, and a data-side TAB (data-side print film) 330B for receiving a signal from the controller unit 572 to supply data signals to the data electrodes 281.

Figure 34:
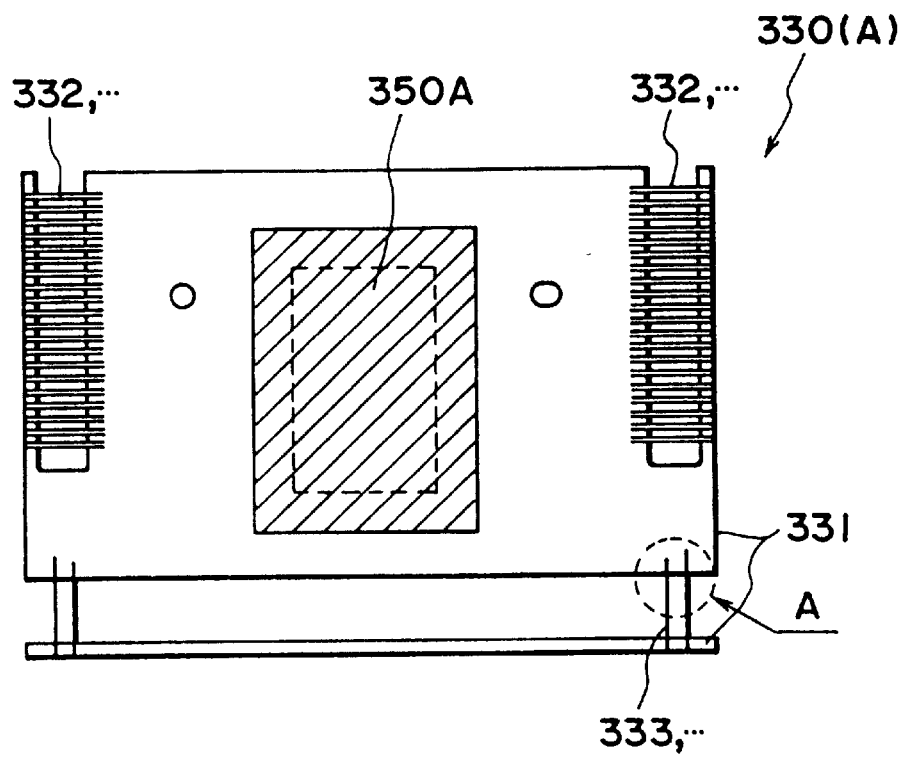
FIGS. 34 and 35 are plan views showing a fixed structure of a liquid crystal drive TAB for a scanning side and a data side, respectively.
Figure 35:
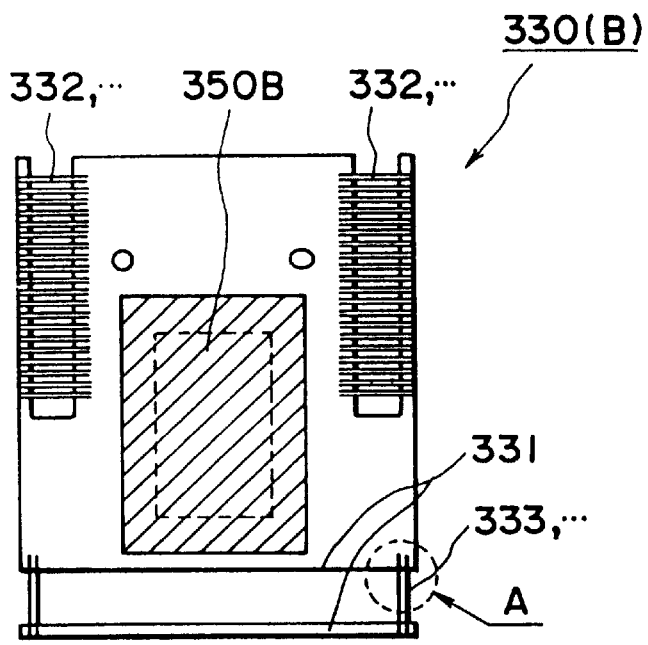
Figure 36:
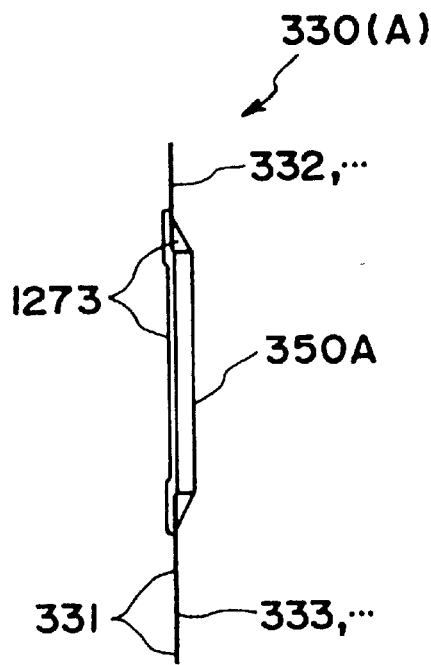
FIGS. 36 and 37 are side views showing a fixed structure of a liquid crystal TAB for a scanning side and a data side, respectively.
Figure 37:
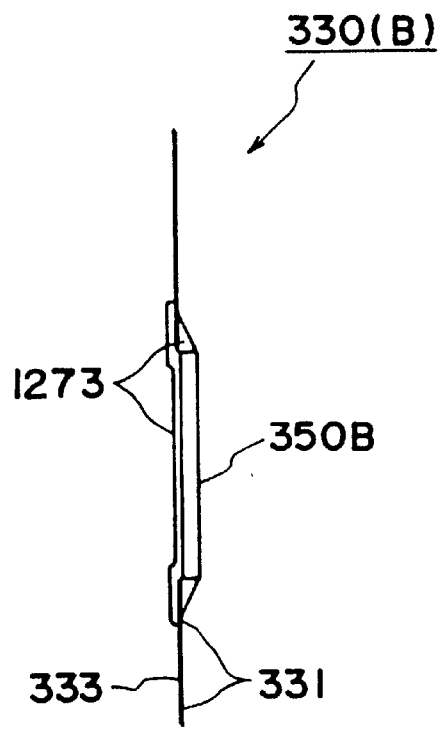

The liquid crystal drive TAB 330 includes a base film 331 as shown in FIGS. 34 to 35. The base film 331 comprises a flexible film carrier tape of, e.g., polyimide resin and may be formed by stamping the taper in a prescribed shape.

The base film 331 is provided with a circuit pattern of copper film (or foil), etc., forming input terminals 332 and output terminals 333. The terminals 332 and 333 have been formed by applying or forming a copper film, etching the copper film into stripes and plating the resultant copper stripes with Au, Sn or Ni. The input terminals 332 are laterally disposed and output terminals 333 are vertically (i.e., perpendicularly to the input terminals 332) in FIGS. 34 and 35.

Portions of the base film 331 have been removed to expose a portion of the input terminals 332 and the output terminal, thus providing a so-called overhang structure to those terminals. In this embodiment, the output terminals 333 of the liquid crystal drive TAB 330 are exposed in a width (D' in FIG. 52) of 2.5 mm, of which a width (E' in 52) of ca. 0.5–1 mm is left unconnected with the liquid crystal panel P. On the other hand, the input terminals 332 of the liquid crystal driver TAB 330 are exposed in a width (D in FIG. 54) of 2 mm, of which a width (E in FIG. 54) of ca. 0.5–1 mm is left unconnected with the driver board 400.

The input terminals 332 are connected with the driver board 400 to be supplied with signals, and the output terminals 333 are connected with the electrodes 269 or 281 of the liquid crystal panel P to supply signals thereto (described later in detail).

Portions of the terminals 333 bonded with the anisotropic conductive film have not be subjected to soft etching (for smoothening because it is originally smooth) and may preferably have a thickness of 20–25 μm. The terminals may desirably be exposed in a width (or length) of 1.5–2.5 mm.

The anisotropic conductive film 320 may have a strength F against flowing related with an exposed width b, electrode thickness h, electrode length l and electrode flexural strength σ, which strength may desirably determined to satisfy:

$$F \leq 46h^2/l^2.$$

The electrodes may desirably be arranged at a high density, i.e., at a pitch of at most 125 μm (at least 8 lines/mm), preferably at a pitch of at most 100 μm (at least 10 lines/mm), for attaining a better effect.

An optimum relationship may be determined between the electrode pitch and the electrode width depending on an anisotropic conductive film 320 used, particularly a size and a degree of dispersion of electroconductive particles dispersed therein. Anyway, it is ordinary to set a ratio between the electrode spacing and the electrode width to ca. 1:1.

Between the terminals 332 and 333, a liquid crystal drive IC 350 is mounted on the base film 331 to form a TAB circuit film (herein sometimes simply referred to as "TAB"). Now, the liquid crystal drive ICs 350 (including a scanning-side IC 350A on a scanning-side liquid crystal drive TAB and a data-side IC 350B on a data-side liquid crystal drive TAB) will be described with reference to FIGS. 38–43.

Figure 38:
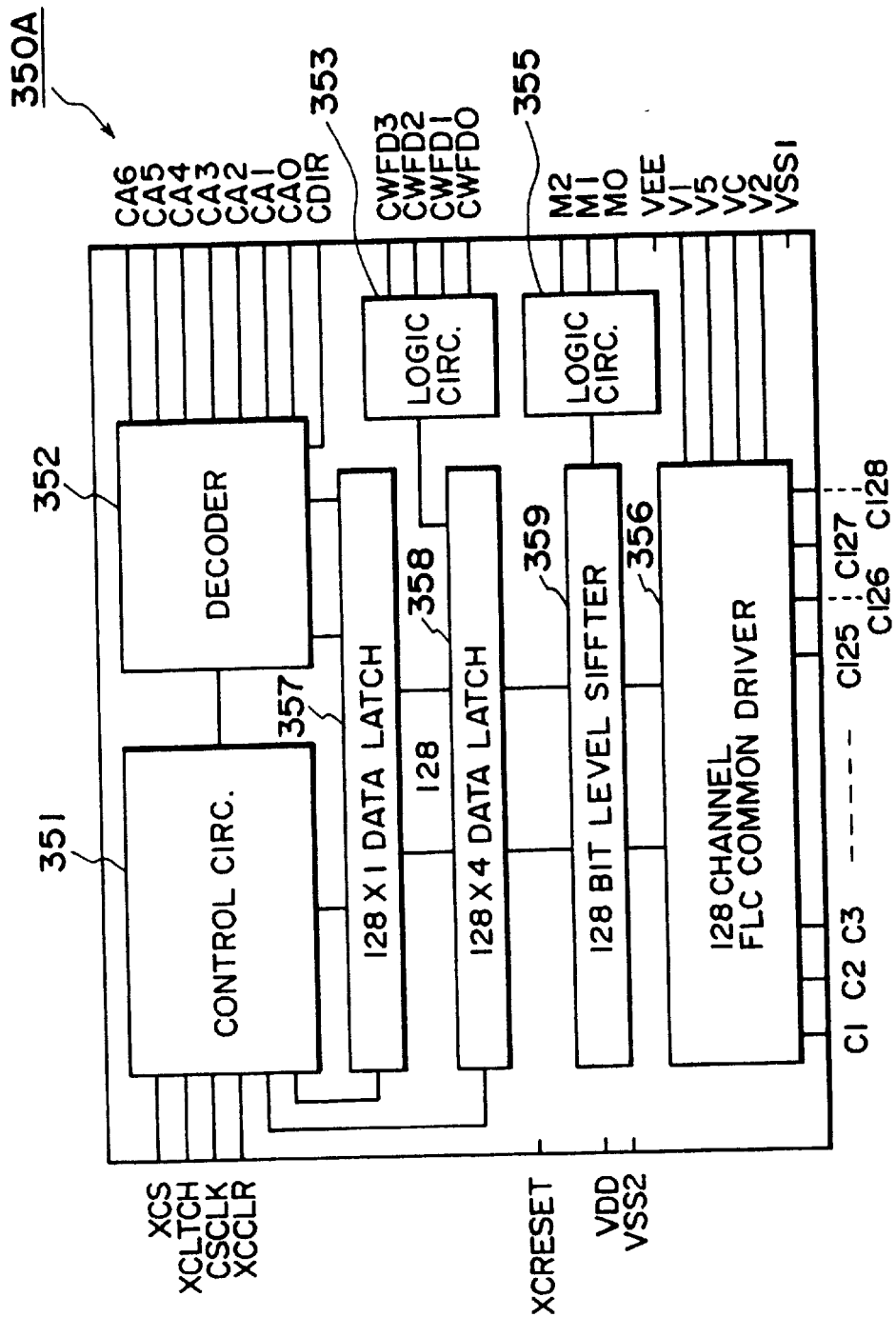
FIGS. 38 and 40 are block diagrams for illustrating internal structures of a scanning-side IC and a data-side IC, respectively.

As shown in FIG. 38, a scanning-side IC 350A includes a control circuit 351, to which various signals (chip select input signal XCS, common latch signal XCLTCH, common sampling clock input signal CSCLK, common output clear input signal XCCLR, etc.) are inputted from a drive controller 450 via a driver board 400. Herein, the chip select input signal XCS is a signal for selecting a chip (see Table 1 below).

TABLE 1

| XCS | Operation state |
|---|---|
| L | Select |
| H | Non-select (All channel VC outputted) |

Note:
Following an input-output timing at the time of double scanning.

The common latch signal XCLTCH is a signal for enabling transfer of sampled address data, and the common sampling clock input signal CSCLK is a signal for synchronizing CWFD0–CWFD3, XCLTCH, CA0–CA6 and XCS. If 1H is defined as a period from one "L" to a subsequent "L" of XCLTCH, CSCLK in 1H period include two clock signals. The common output-clear input signal XCCLR exclusively set the channel output to VC level regardless of the other logic input signal states (L active). At this time, the internal logic is continued to be operated.

On the other hand, the control circuit 351 is connected to a decoder 352, to which common address input signals CA0–6, common direction signal CDIR, etc., are inputted, wherein the common address input signals CA0–6 are signals for designating address data, and the common direction signal CDIR is a signal for switching a correspondence between the address data and output channels. An example is given in the following Table 2.

TABLE 2

| | CDIR CA0 - 6 SELECTION SCHEME | OUTPUT CHANNEL |
|---|---|---|
| L | 00H → 01H → single | C1 → C2 → |
| L | 00H → 02H → dual | C1 C2 → C3 C4 → |
| L | 00H → 04H → quad | C1~C4 → C5~C8 → |
| H | 00H → 01H → single | C128 → C127 → |
| H | 00H → 02H → dual | C128 C127 → C126 C125 → |
| H | 00H → 04H → quad | C128~C126 → C124~C121 → |

On the other hand, the scanning-side IC 350A includes two logic circuits 353 and 355, of which one logic circuit 353 is supplied with common waveform data CWFD0–CWFD3, which are data signals for setting quadruple output waveform (see Table 3):

TABLE 3

| CWFD3 | CWFD2 | CWFD1 | CWFD0 | |
| output selected by line memory | | output selected by decoder 1 | | output |
| voltage level | set data | voltage level | set data | level |
|---|---|---|---|---|
| L | L | L | L | V0 |
| L | H | L | H | V1 |
| H | L | H | L | V2 |
| H | H | H | H | V5 |

Note:
CWFD2 and CWFD3 are effective only at the time of double scanning.

Condition 1: CWFD0, CWFD1

(1) At the time of standard scanning (M2=L), voltage levels in 1H period of outputs selected by M0, M1, M2 and CAn are determined.

(2) At the time of double scanning (M2=H), voltage levels in a first 1H period of outputs selected by M0,M1, M2 and CAn are determined.

Condition 2: CWFD2, CWFD3

(1) At the time of standard scanning (M2=L), CWFD2 and CWFD3 are set to "L" or "H".

(2) At the time of double scanning (M2=H), voltage levels in a second 1H period of outputs selected by M0, M1, M2 and CAn are determined.

Voltage levels of outputs not selected by the conditions 1 and 2 are set to VC level.

The other logic circuit 355 is supplied with mode-setting inputs M0–M2 (see Table 4 below).

TABLE 4

| M2 | M1 | M0 | Scanning scheme | Selection scheme |
|---|---|---|---|---|
| L | L | L | standard | single |
| L | L | H | standard | dual |
| L | H | L | standard | quad |
| L | H | H | standard | single |
| H | L | L | double | single |
| H | L | H | double | single |
| H | H | L | double | dual |
| H | H | L | double | quad |
| H | H | H | double | single |

The scanning-side IC 350A further includes a common driver 356, which is supplied with four-level drive voltages (for FLC drive) to be supplied to scanning electrodes 269 to drive the liquid crystal panel P.

The scanning-side IC 350A is further supplied with a reset input signal XCRESET, which resets all the registers and sets all the channel outputs to VC level. Further, the scanning-side IC 350A is supplied with a voltage VEE for FLC drive output circuit and a voltage VDD for logic circuits, and is connected to a high withstand voltage output system CND VSS1 and a logic system CND VSS2.

Figure 39:
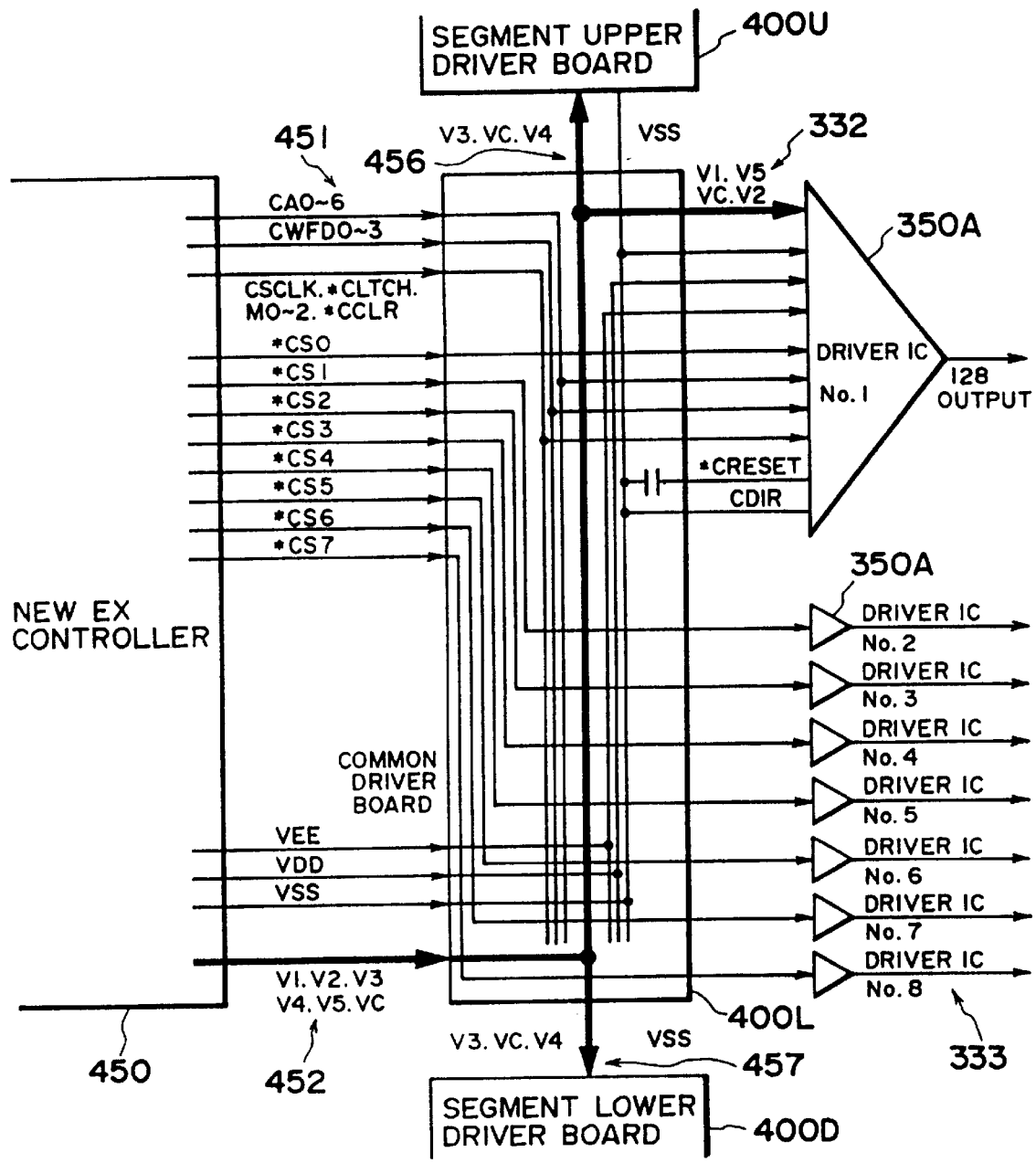
FIGS. 39 and 41 are block diagrams showing connections of a scanning-side IC and a data-side IC, respectively, with a driver board.

Based on the above-mentioned various signals inputted to the scanning-side IC 350A, the IC 350A outputs common signals (scanning signals) C1–C128 (see FIG. 39).

Figure 40:
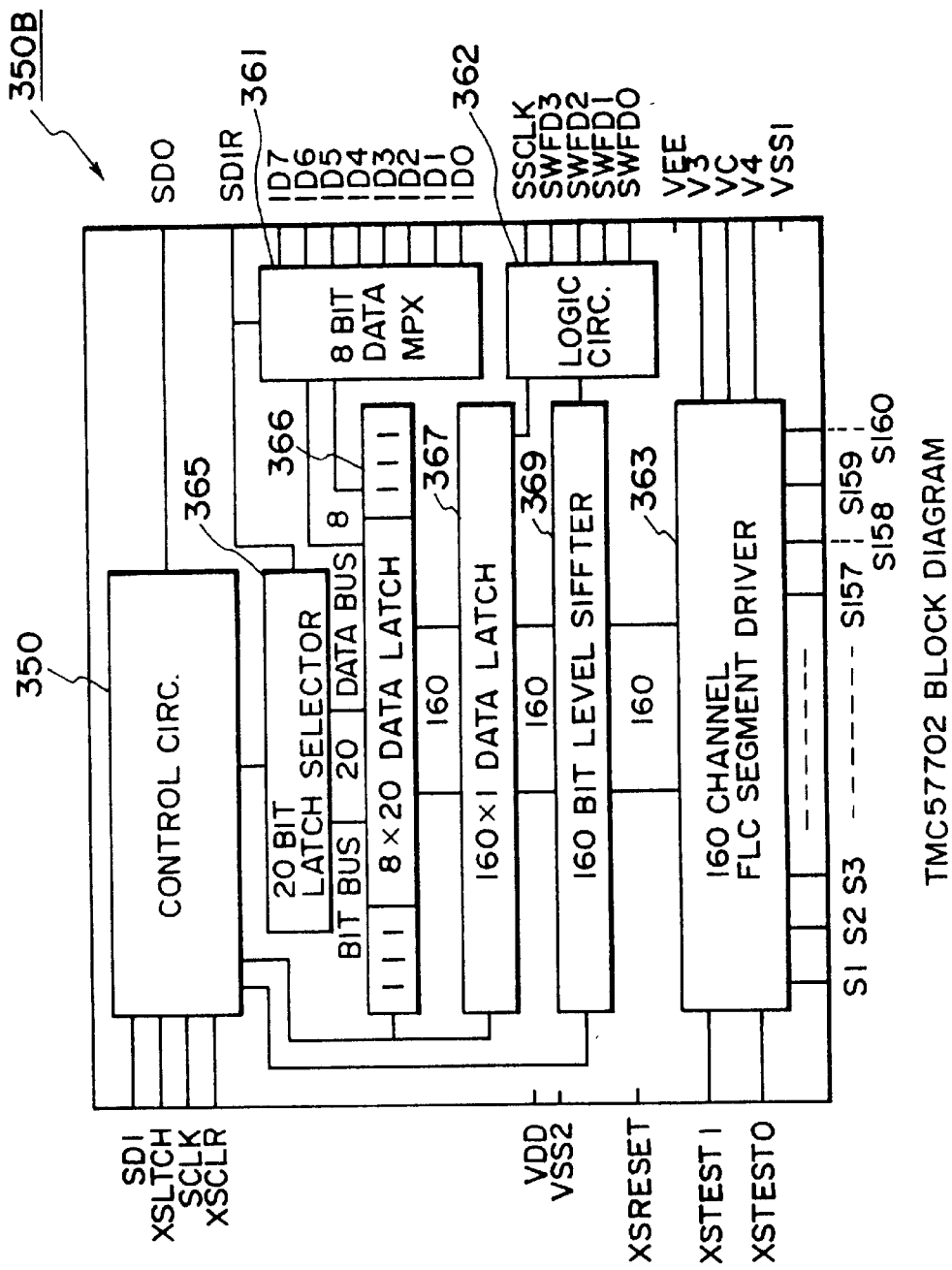

On the other hand, as shown in FIG. 40, a data-side IC 350B includes a control circuit 360, to which various signals (cascade input signal SDI, cascade output signal SDO, segment latch signal XSLTCH, clock input signal SCLK, segment output-clear input signal XSCLR) are inputted). Herein, the segment latch signal XSLTCH is a signal for controlling the sampling and holding of image data and dictates the sampling of image data at its L level and the holding of image data at its H level. The held data determine the segment outputs by SWFDn and XSCLR. Further, the clock input signal SCLK is a clock signal for a register and is designed to latch data ID0–ID7 at the rising edge. The segment output-clear input signal XSCLR is a signal for exclusively setting the channel output to VC level regardless of the other logic input signals. Even when the channel output is set to VC level, the operation of the internal logic is continued.

The data side IC 350B includes an 8-bit data MPX 361, which is supplied with input image data ID0–ID7, and a sampling direction setting input signal SDIR which is a signal for setting the order of sampling (leftward sampling or rightward sampling) of image data (see Table 5). An example of correspondence between image data and channels is given in Table 6.

TABLE 5

| SDIR | Channel sampling order |
|---|---|
| VSS | S1 → S2 → S3 . . . → S159 → S160 |
| VDD | S160 → S159 → S158 . . . → S2 → S1 |

TABLE 6

| SDIR | SCLK: | 1 | 2 | 3 | . . . | 19 | 20 |
|---|---|---|---|---|---|---|---|
| VSS | ID7 | S8 | S16 | S24 | . . . | S152 | S160 |
| (L) | ID6 | S7 | S15 | S23 | . . . | S151 | S159 |
| | ID5 | S6 | S14 | S22 | . . . | S150 | S158 |
| | ID4 | S5 | S13 | S21 | . . . | S149 | S157 |
| | ID3 | S4 | S12 | S20 | . . . | S148 | S156 |
| | ID2 | S3 | S11 | S19 | . . . | S147 | S155 |
| | ID1 | S2 | S10 | S18 | . . . | S146 | S154 |
| | ID0 | S1 | S9 | S17 | . . . | S145 | S153 |
| VDD | ID7 | S153 | S145 | S137 | . . . | S9 | S1 |
| (H) | ID6 | S154 | S146 | S138 | . . . | S10 | S2 |
| | ID5 | S155 | S147 | S139 | . . . | S11 | S3 |
| | ID4 | S156 | S148 | S140 | . . . | S12 | S4 |
| | ID3 | S157 | S149 | S141 | . . . | S13 | S5 |
| | ID2 | S158 | S150 | S142 | . . . | S14 | S6 |
| | ID1 | S159 | S151 | S143 | . . . | S15 | S7 |
| | ID0 | S160 | S152 | S144 | . . . | S16 | S8 |

The data-side IC 350B further includes a logic circuit 362, which is supplied with a segment sampling clock signal SSCLK, and segment waveform data signals SWFD0–SWFD3. The segment sampling clock signal SSCLK is a signal for sampling SWFD0–SWFD3 or XSLTCH at its rising edge. The segment waveform data signals SWFD0–SWFD3 are data signals for setting three-level output waveform (see Table 7).

TABLE 7

| Image data = H output voltage level set data | | Image data = L output voltage level set data | | Three output voltage levels |
|---|---|---|---|---|
| SWFD3 | SWFD2 | SWFD1 | SWFD0 | |
| L | L | L | L | VC |
| L | H | L | H | V3 |
| H | L | H | L | V4 |
| H | H | H | H | (OFF) |

The data-side IC further includes a segment drive 363, which is supplied with three-level voltages V3, VC and V4 and test input voltages XSTEST0 and XSTEST1 (see Table 8).

TABLE 8

| XSTEST1 | XSTEST0 | XSCLR | |
|---|---|---|---|
| H | H | X | ordinary operation state |
| H | L | H | all channel V4 level output |
| L | H | H | all channel V3 level output |
| L | L | H | non-determinative |

The data-side IC 350B is further supplied with a reset input signal XSRESET, which is designed to reset the channel output to VC level at its L level as shown in Table 9 (also having a power-on reset function).

TABLE 9

| XRESET | Operation state |
|---|---|
| L | reset state (VC output) |
| H | under control by other logic signals |

The data-side IC 350 is further supplied with a supply voltage VEE to FLC drive circuit and a supply voltage VDD to logic circuit and is connected to a high-withstand voltage output system GND VSS1 and GND VSS2.

Figure 41:
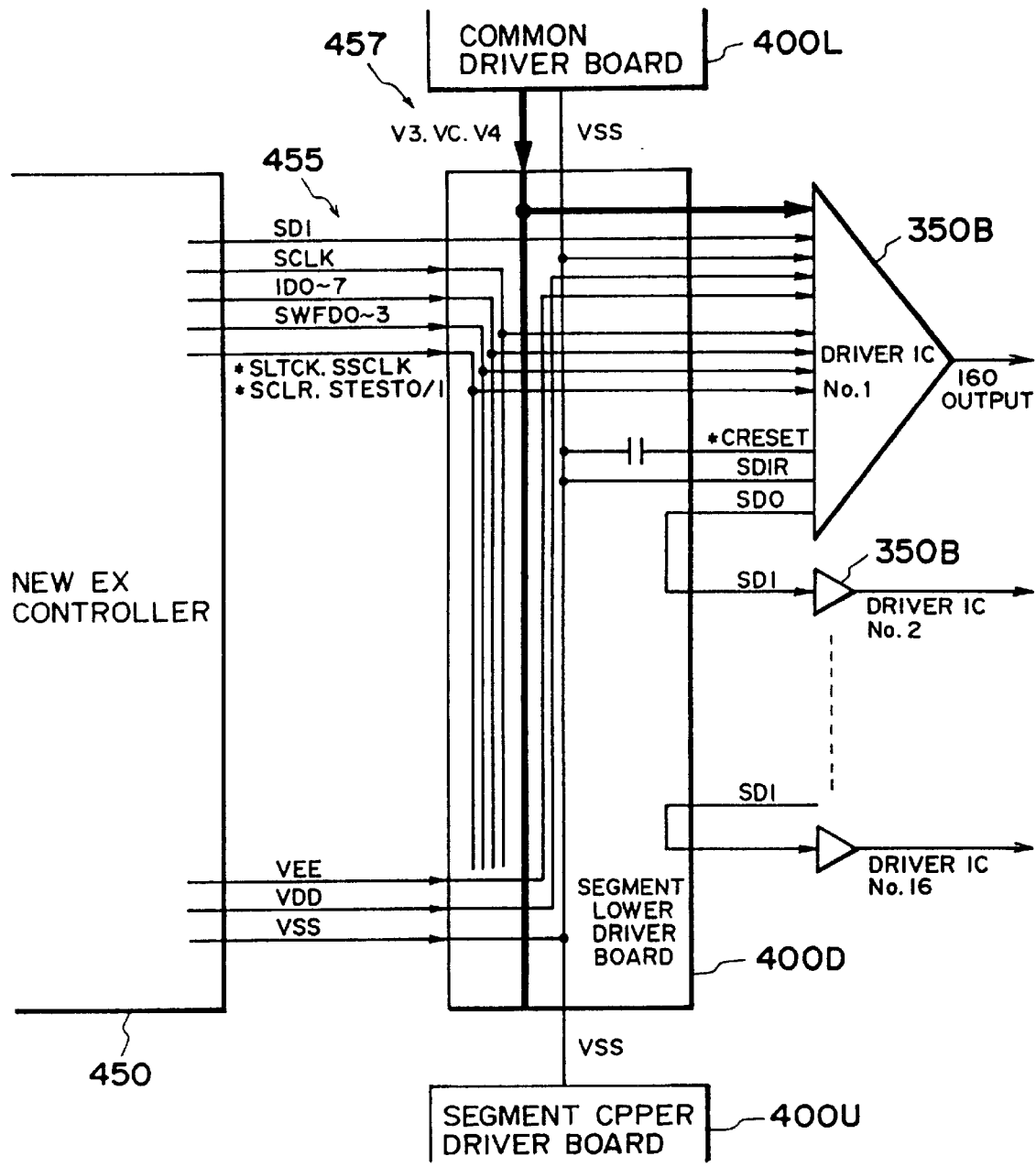

Based on the above-mentioned various signals inputted to the data side IC 350B, the data-side IC 350B outputs segment output signals (data signals) S1–S160 (see FIG. 41).

Figure 42:
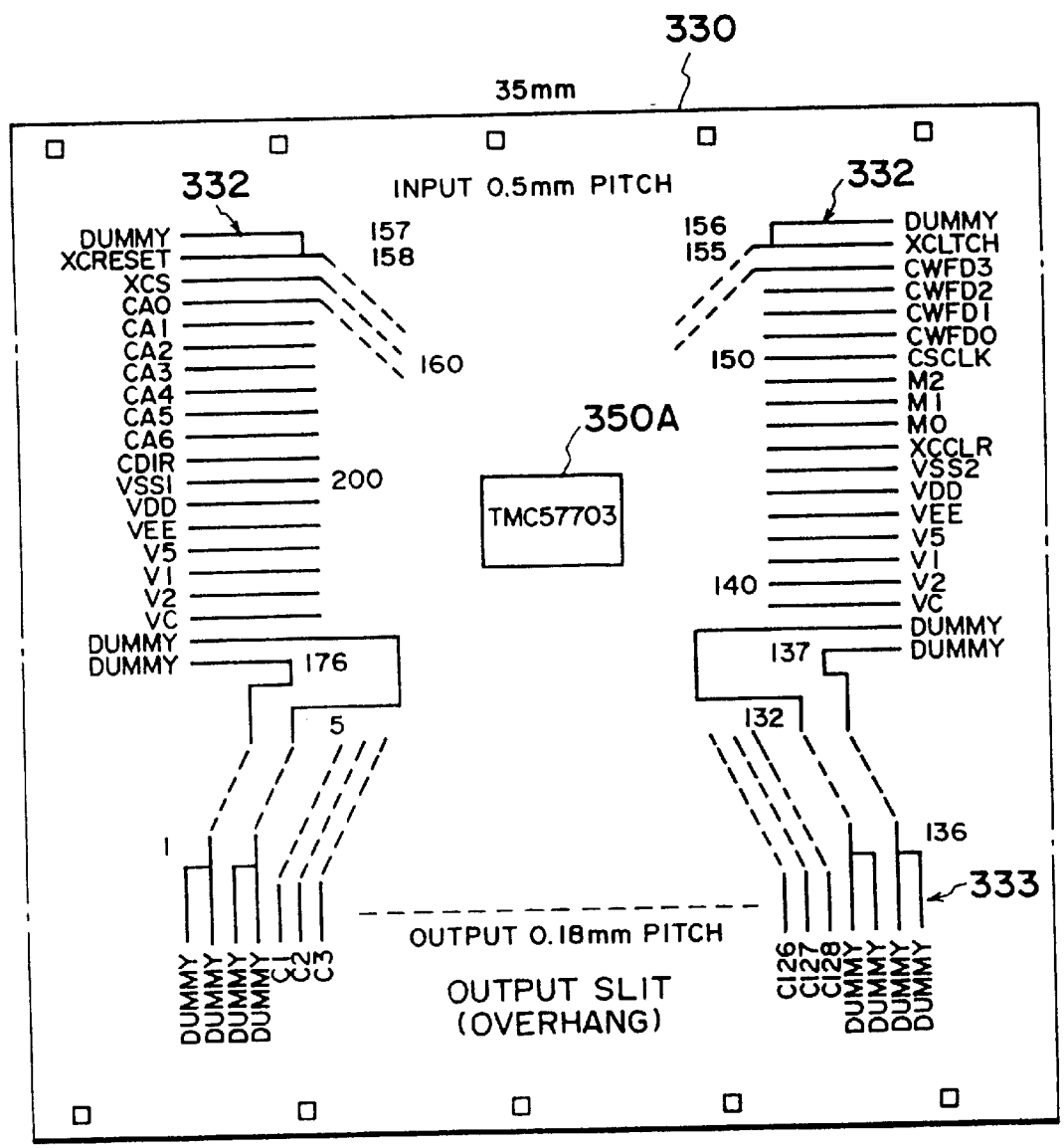
FIGS. 42 and 43 are side views showing structures of a scanning-side liquid crystal drive TAB and a data-side liquid crystal drive TAB, respectively.
Figure 43:
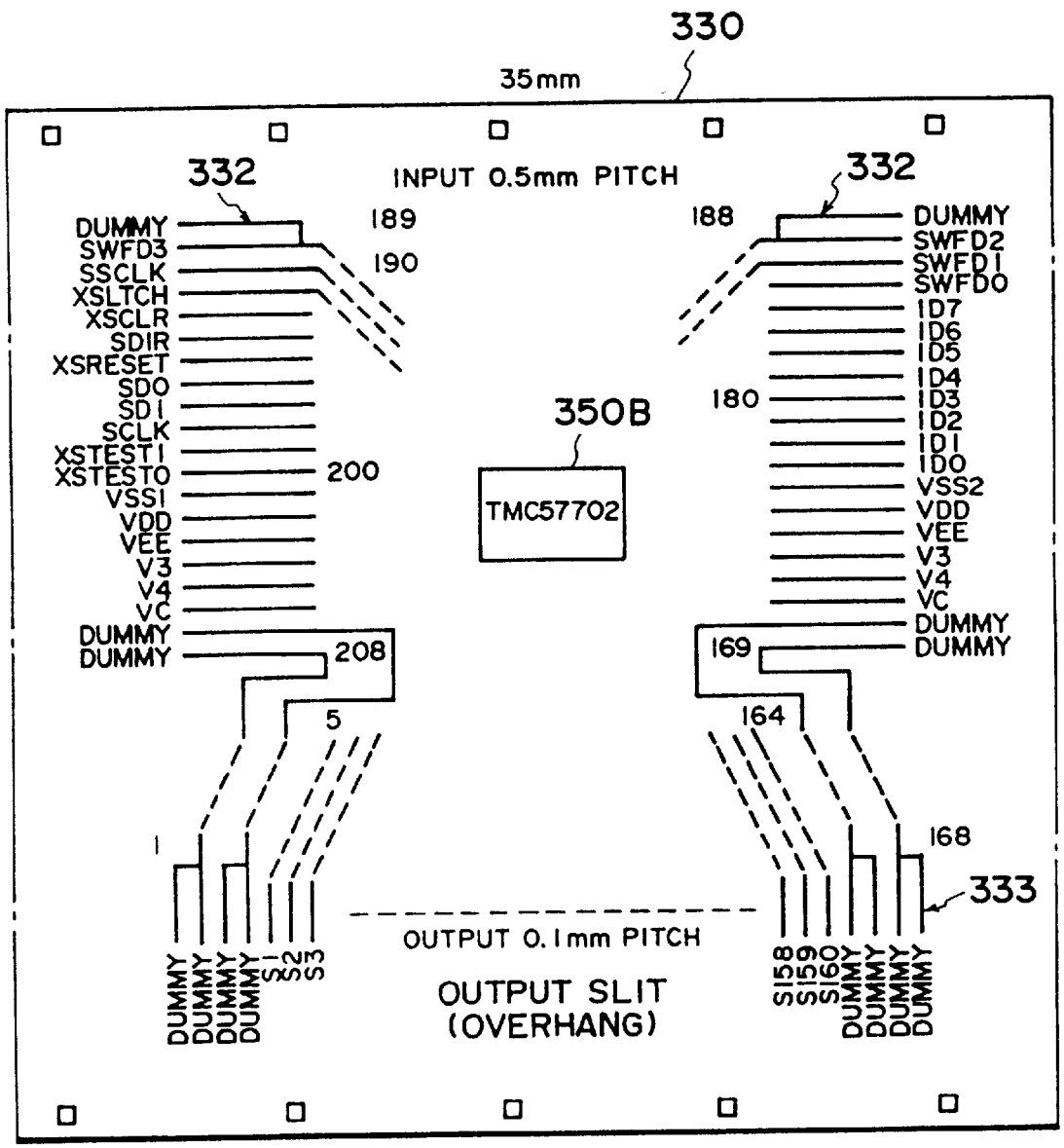

FIG. 42 and 43 show wiring states with the scanning-side IC 350A and the data-side IC 350B, respectively, on liquid crystal drive TABs 330.

Next, the detailed shape of output terminals will be described with reference to FIGS. 44 to 50.

Figure 44:
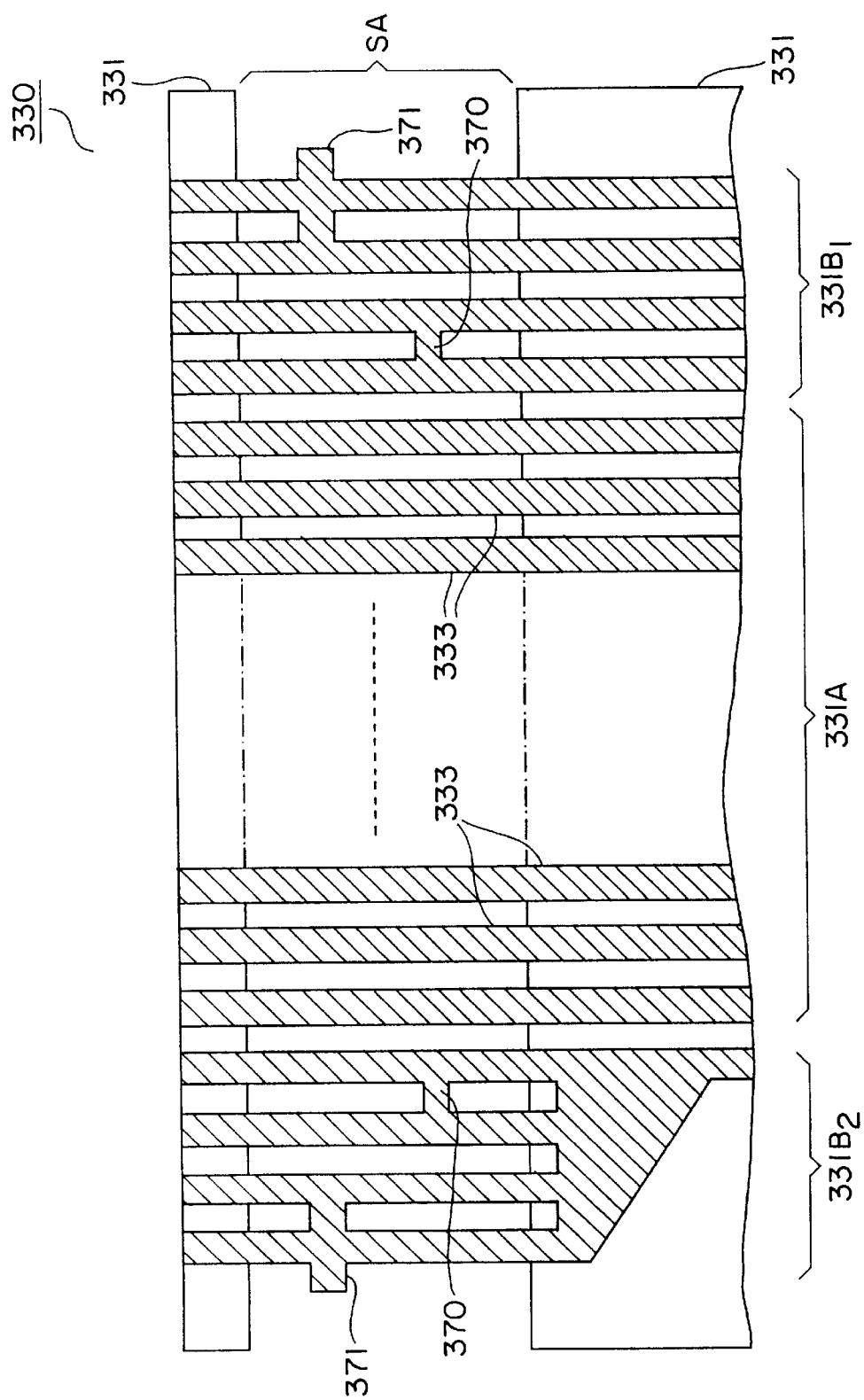
FIG. 44 is an enlarged partial view for illustrating the shapes of an output terminal and an alignment mark on a liquid crystal drive TAB.
Figure 45:
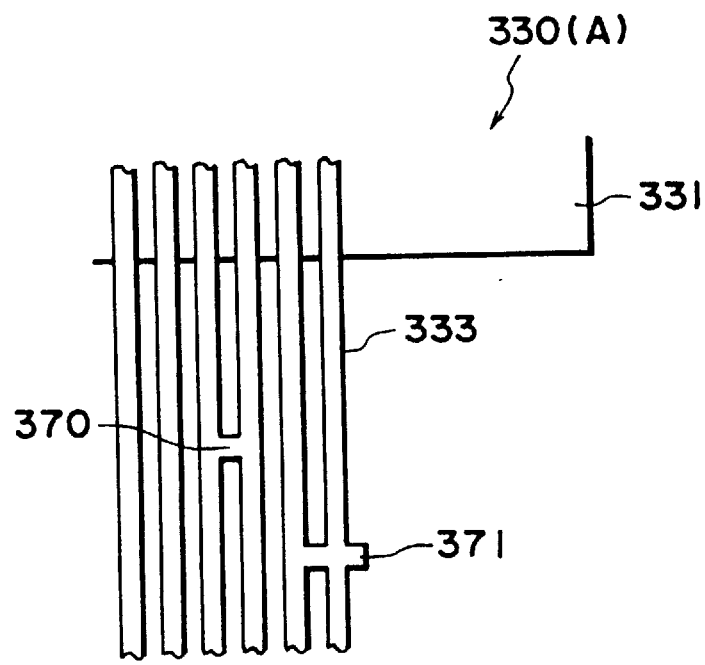
FIGS. 45 and 46 are illustrations of alignment marks on a scanning-side liquid crystal drive TAB and a data-side liquid crystal drive TAB, respectively.
Figure 46:
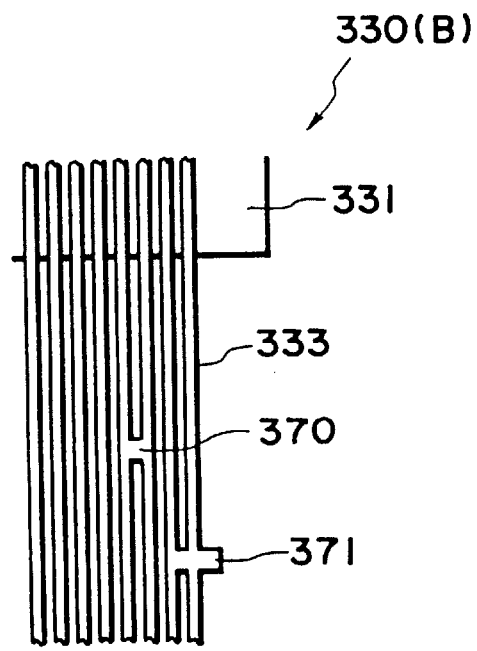
Figure 47:
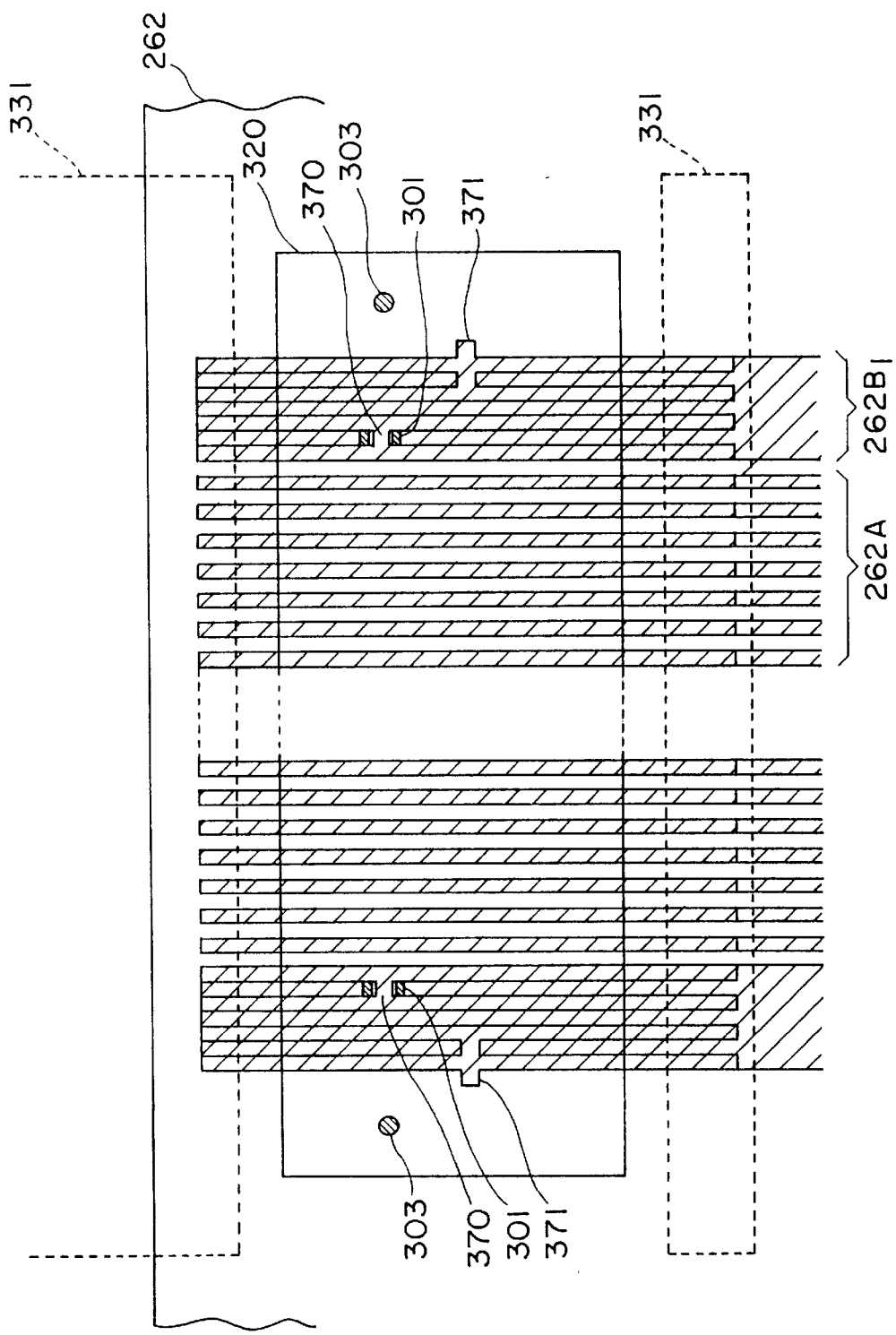
FIG. 47 is a partial plan view for illustrating a state of connection between a liquid crystal drive TAB and a liquid crystal panel.

The output terminals 330 of a liquid crystal drive TAB are provided with TAB-side marks (first alignment mark and second alignment mark) 370 and 371 a shown in FIGS. 44–46. More specifically, between the 3rd and 4th output terminals 333 respectively counted from outsides on both sides, two alignment marks 370 for adjustment with eyes ("TAB"-side eye mark(s)) are respectively disposed one on each side. Further, alignment marks 371 for automatic adjustment (TAB-side auto-mark(s)) disposed so as to cross the first and second output terminals respectively counted from the outsides on both sides. At these region SA where the marks 370 and 371 are formed, a portion of the base film 331 has been removed to expose the terminals 333. The marks 370 and 371 are composed of the same material as the output terminals 333, i.e., a copper film (or foil) plated with Au, Sn or Ni. More specifically, these marks are left unremoved during the formation of the output terminals 333 by etching. The output terminals 333 not associated with the marks 370 and 371 are formed in a number and a spacing corresponding to the electrodes 299 in the region 262A of FIG. 25 so as to be connected with the electrodes 299. Further, the output terminals 333 in a number of totally 4 on both sides associated with the marks 370 and 371 are designed to the laterally enlarged portions 300 formed in the regions 262B1 and 262B in FIG. 25. Further, as better shown in FIG. 47, in a proper connection state between the liquid crystal panel P and the liquid crystal drive TAB 330, the substrate-side eye marks 301 are designed to sandwich the TAB-side eye mark 371 without overlapping. Similarly, the TAB-side auto mark 371 and the substrate-side auto mark 303 are designed so as not to overlap each other.

The positional alignment between the liquid crystal drive TAB 330 and the liquid crystal panel P may be performed by using a positional alignment apparatus exclusively designed therefor.

Figure 48:
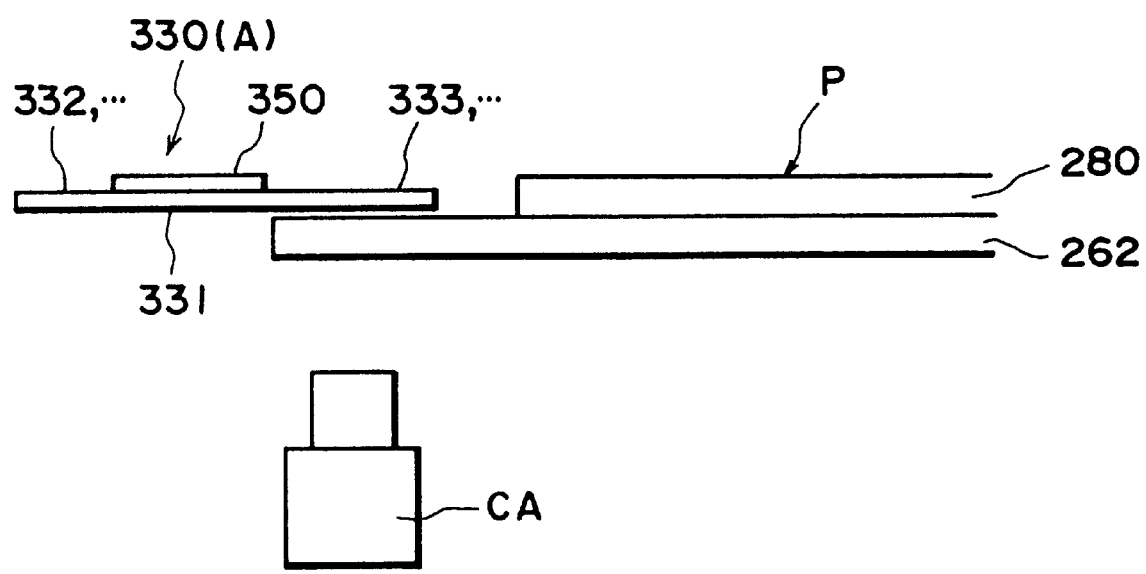
FIG. 48 is a schematic sectional view for illustrating a manner of positional alignment between a liquid crystal drive TAB and a liquid crystal panel.

The apparatus includes a liquid crystal panel alignment unit (not shown) for carrying a liquid crystal panel P, and the unit is arranged to be freely movable. The apparatus further includes a TAB alignment unit (not shown) for carrying the liquid crystal drive TAB 330. Further, on the back side of the liquid crystal panel P (i.e., on the opposite side of the liquid crystal drive TAB 330), a camera CA for monitoring the position of the liquid crystal panel P and the liquid crystal drive TAB 330 is disposed as shown in FIG. 48, so that the substrate auto mark 303 is observed under vertical falling illumination and the TAB side auto mark is observed under illumination with side illumination light.

Figure 49:
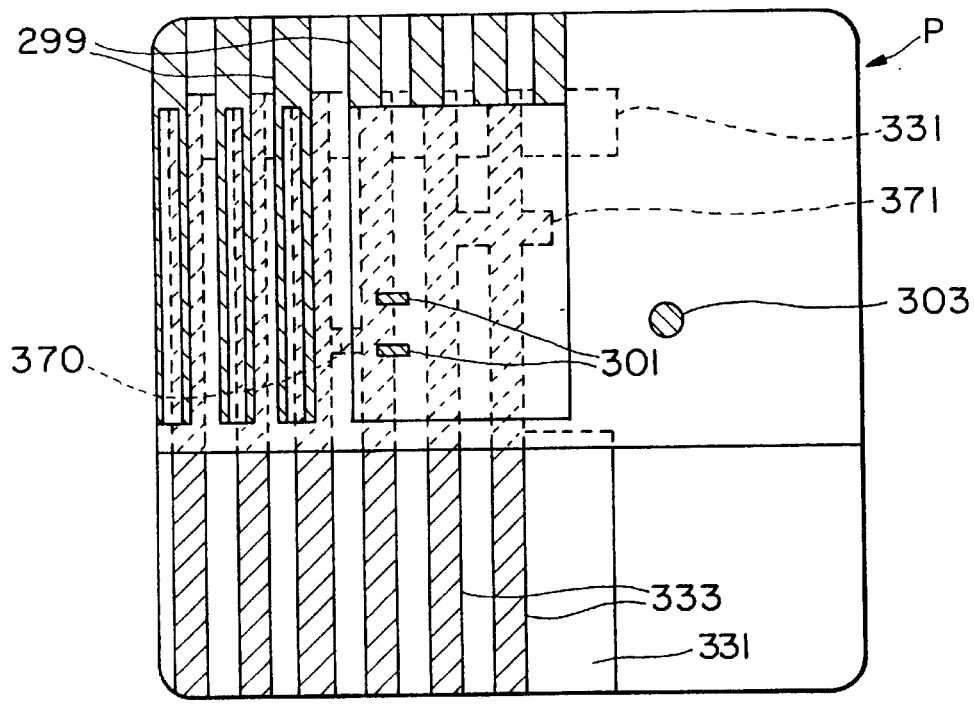
FIG. 49 and 50 are views showing states during and after the positional alignment, respectively.
Figure 50:
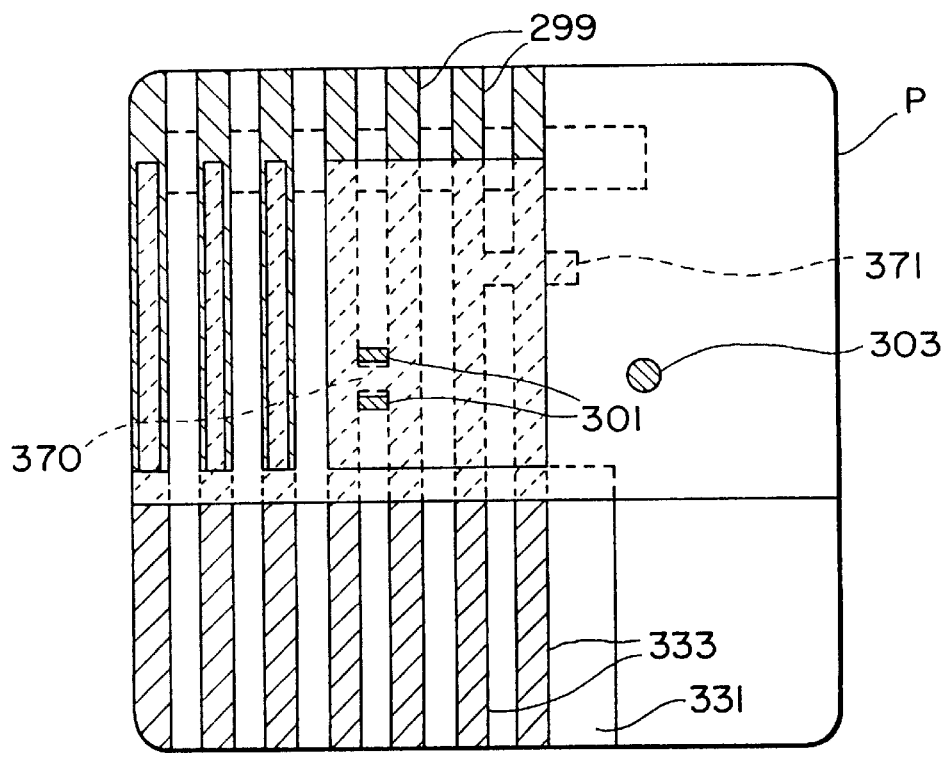

The positional alignment between the liquid crystal panel P and the liquid crystal drive TAB 330 may be performed in the following manner as will be described with reference to FIGS. 49 and 50, of which FIG. 49 shows an intermediate state during the alignment and FIG. 50 shows a state after the alignment (a normally aligned state).

Now, in case of connecting the liquid crystal drive TAB 330 with the liquid crystal panel P, the liquid crystal panel P is mounted on the liquid crystal panel alignment unit and the liquid crystal drive TAB 330 is mounted on the TAB alignment unit. The mounting operation may be performed automatically by using an apparatus therefor or may be performed manually by an operator.

Then, the outer shapes of the substrate 262 and the liquid crystal drive TAB 330 are observed with eyes, or the substrate-side-eye marks 301 and the TAB-side eye marks 370 are utilized to effect a rough positional alignment, so that the TAB-side eye marks 370 and TAB-side auto marks 371 are disposed at positions outside the region 262A (i.e., in regions 262 or outside thereof) and do not overlap with the metal electrodes 270. In the rough positional alignment stage, the TAB-side output terminals 333 and the substrate-side electrodes 299 are deviated as shown in FIG. 49.

Then, when an automatic fine adjustment is started by using a camera, etc., the TAB-side auto mark 371 disposed in a roughly appropriate position (within a recognizable range) is recognized by the camera CA through the transparent substrate 262, the anisotropic conductive film 320 (applied or transferred in advance to the substrate side), etc. The image recognition data by the camera is sent to a data process circuit (not shown), where a deviation (amount) between the marks 371 and 301 is calculated. The deviation is sent to an alignment drive unit (not shown), by which the fine positional alignment units is performed so that the deviation will be a proper value. As a result, the positional alignment between the liquid crystal panel P and the liquid crystal drive TAB 330 is completed to provide a positional relationship shown in FIG. 50. The fine positional alignment may be performed by moving either one or both of the liquid crystal panel alignment unit and the TAB alignment unit. The operator may confirm whether the automatic fine adjustment has been properly performed or not by observing a relative position of the eye marks 301 and 370.

<Heat-pressure bonding apparatus>

After the positional alignment between the substrate 262 and the liquid crystal drive TAB 330, a heat-pressure bonding is performed by using a heat-pressure bonding apparatus to connect the substrate 262 and the liquid crystal drive TAB 330 electrically and mechanically. The heat-pressure bonding apparatus will be described with reference to FIG. 51.

Figure 51:
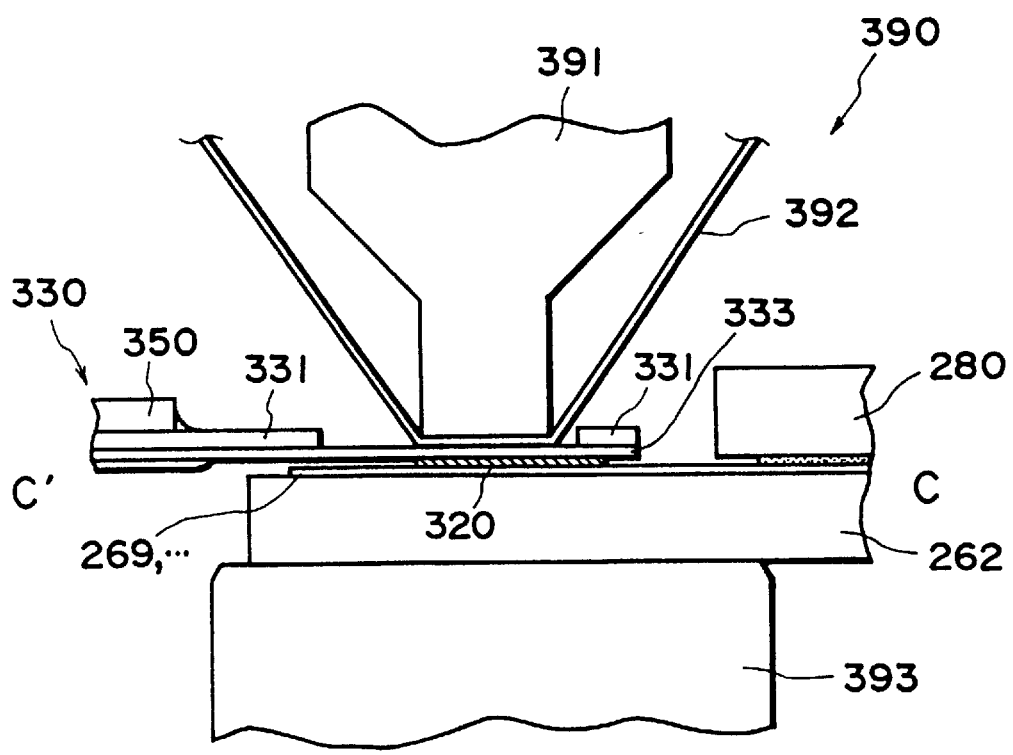
FIG. 51 is a schematic sectional illustration of a manner of heat bonding on a liquid crystal panel side.

A heat-pressure bonding apparatus 390 includes a heat-pressure bonding head 391 heated to 150–300° C., and the head 391 is designed to be vertically moved up and down by a means (not shown). The head 391 has a tip with a sectional shape as shown in FIG. 51 narrower than an exposed width of the output terminal 333 and is designed to press the liquid crystal drive TAB 330 only in the connection portion. More specifically, the connection portion may have a width of ca. 1.5–2.0 mm, and the head 391 has a width of 1.5 mm. The head 391 may be composed of a high-resistance metal or alloy, such as molybdenum or stainless steel and is connected to a heating power supply (not shown) to be supplied with a power (generally a voltage of 50–500 volts, preferably 80–200 volts; a current of 0.1–10 A, preferably 1–5 A). The heat-pressure bonding time may be on the order of several seconds.

Below the heat-pressure bonding sheet 391, a pressure application sheet 392 (of, e.g., 0.5 mm-thick teflon film ("NITOFLON No. 900 UL", available from Nitto Denko K.K.) is disposed. The pressure-application sheet 392 may preferably comprise a film material having a compression strength of 70–170 kgf/cm$^2$ of a fluorine-containing resin. A stage 393 is disposed below the head 391, and an edge portion of the liquid crystal panel P is disposed on the stage 393 at the time of the heat-pressure bonding.

For the connection between the liquid crystal panel P and the liquid crystal drive TAB 330, the anisotropic conductive film 320 is placed in advance on the surface of the substrate 262 as described above. Then, the liquid crystal panel P and the liquid crystal drive TAB 330 are positionally aligned as described above and, in the aligned state, the heat-bonding is performed by the heat-pressure bonding head 391 heated to 150–300° C. via the pressure-application sheet 392 to connect the liquid crystal panel P and the liquid crystal drive TAB 330.

The heat-pressure bonding head 391 need not necessarily be 1.5 mm but may be at most 80% of the exposed width of the terminal 333, more specifically in the range of 1–2 mm. As a result, the adhesive resin in the anisotropic conductive adhesive film 320 is caused to flow to a portion not contributing to the connection of the terminal 333 (the longitudinal direction of the terminal 333) to reduce the resin remaining between the liquid crystal panel-side electrode and the terminal 333. Further, by appropriately setting the exposed width and the width of the heat-pressure bonding head 331, the length of the electrode 333 contributing to the connection can be made at least 1 mm to retain a high connection reliability.

The thickness of the pressure-application sheet 392 need not necessarily be 0.05 mm but may be in the range of 25–50 μm so as to better exhibit an effect of clamping the TAB-side terminal 333 while retaining a good thermal conductivity.

The connector structure between the liquid crystal panel P and the liquid crystal drive TAB 330 will be described with reference to FIG. 52.

Figure 52:
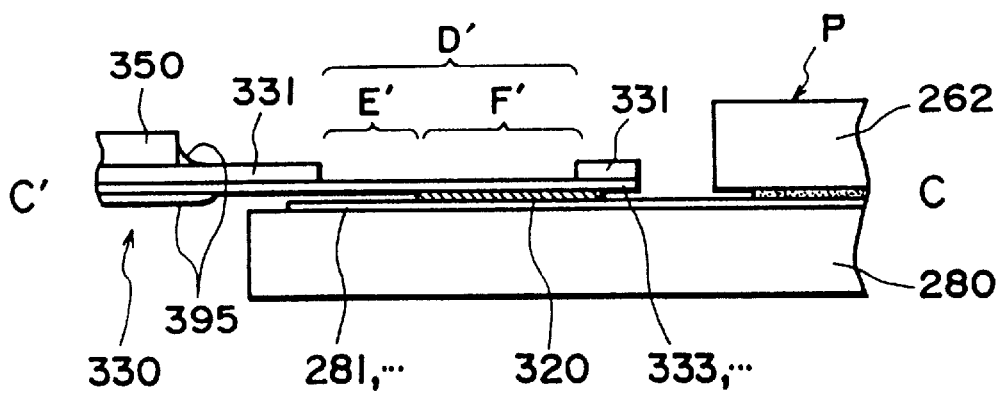
FIG. 52 is a schematic sectional illustration of a state of connection between a liquid crystal drive TAB and a liquid crystal panel.

As shown in FIG. 52, with respect to the liquid crystal drive TAB 330, the base film 331 is partly removed at a region DT to expose the output terminals 333, which are aligned with and connected to the scanning electrodes or the data electrodes 281.

The anisotropic conductive adhesive film 320 is placed in advance on the surface of the substrate 262 or 280 at a region F' of the output terminals 333, the electrode terminals and the substrate 262 or 280 (more exactly the scanning electrodes or the data electrodes 281) are connected only at a region F', and the terminals are exposed without connection at the region E'. Numeral 395 refers to a coating resin.

Figure 53:
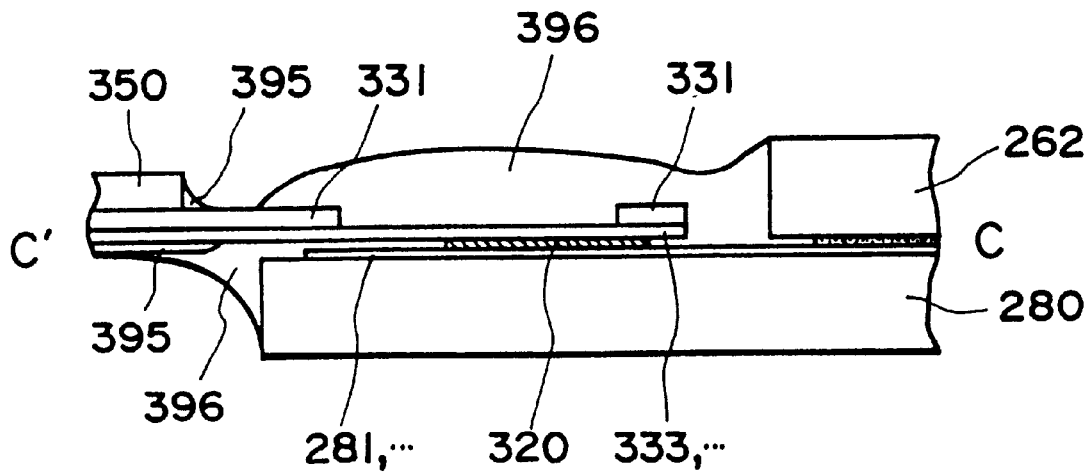
FIGS. 53 and 54 are schematic sectional illustrations of states of connection of a liquid crystal drive TAB with a liquid crystal panel and a driver board, respectively.

As shown in FIG. 53 (sectional view taken along 53—53 line in FIG. 57), the connection between the liquid crystal panel P and the liquid crystal drive TAB 330 may be coated with silicone resin 396 so as to improve the corrosion resistance and strength of the connection, thus improving the reliability of the display apparatus body 200. The silicon resin may have a hardness (JIS A rubber hardness) of at most 50 deg. so as to retain a softness of the connection between the liquid crystal panel P and the liquid crystal drive TAB 330 and prevent breakage upon application of a deformation stress.

<Driver board 400>

The output terminals of 333 of the liquid crystal drive TAB 330 are connected to the liquid crystal panel side as described above, but the other input terminals 332 are connected to the driver board 400.

In this embodiment, three driver boards 400 are used and disposed on the left side, upper side and lower side of the liquid crystal panel P. The left-side driver board 400 (scanning-side driver board) 400L is connected via liquid crystal drive TABs 330A to the scanning electrodes 269, and the upper and lower driver boards 400U and 400D are connected via liquid crystal drive TABs 330 to the data electrodes 281. As shown, the data electrodes 281 are disposed to extend upward and downwards alternately. In the case where the driver boards should be referred to separately, the left driver board is called the common driver board 400L; the upper driver board, the upper driver board 400U; and the lower driver board, the lower driver board 400D. In the case where no differentiation is required, a term driver board 400 is simply used.

The structure of a driver board 400 will be described with reference to FIG. 60.

A driver board 400 is composed of 6 layers with glass fiber-containing epoxy resin as a substrate, and both surfaces thereof are coated with a resist film (not shown). Each substrate carries a copper wiring layer.

In a first layer 401, a multiplicity of connection electrodes 401a are formed and connected with the liquid crystal drive TABs 330 (described later) so as to supply liquid crystal drive voltages V1, V5, VL, and C2 are various signals to the liquid crystal drive ICs 350A and 350B. The second layer 402 is a signal line layer for transmitting address signals CA0–CA6 and waveform setting signals CWFD0–3. The third layer 403 is a GNC layer and is held at a reference potential VSS. The fourth layer 405 is an analog power supply layer to be supplied with an output channel voltage VEE. The fine layer 405 is a logic power supply layer and is supplied with a voltage VDD for logic circuits. The sixth layer 407 provides a surface for mounting connectors 490 for exchanging signals and voltages with the other driver board 400 and driver controllers 450.

A driver board 400 of the above-described structure is electrically and mechanically connected to a liquid crystal drive TAB 330, and the connection structure will be described with reference to FIGS. 57–59.

Figure 54:
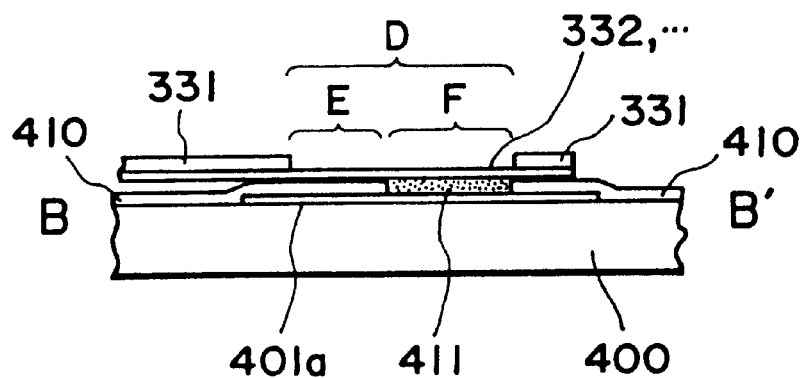
Figure 55:
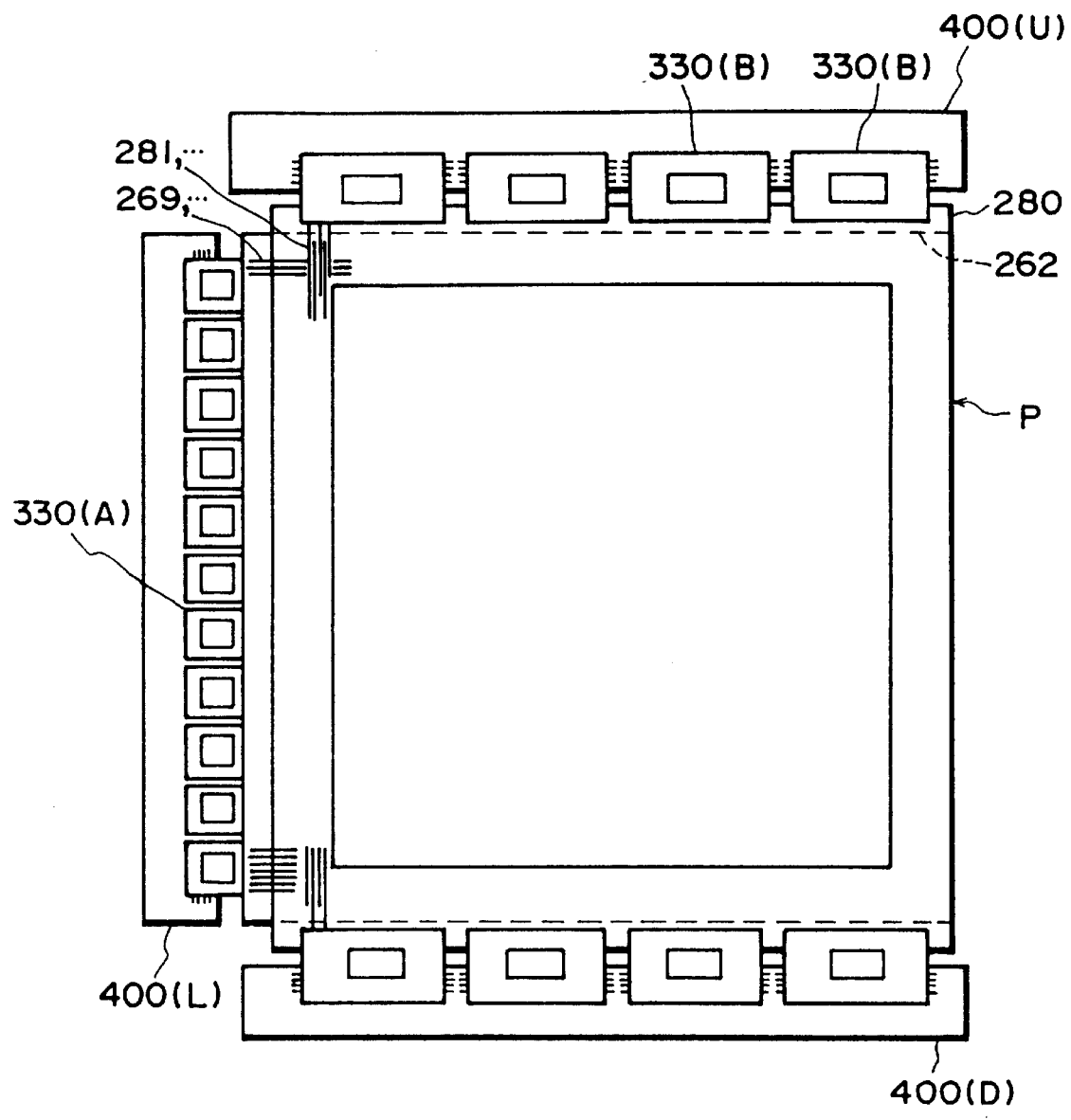
FIG. 55 is a plan view showing an arrangement of liquid crystal drive TABs.
Figure 57:
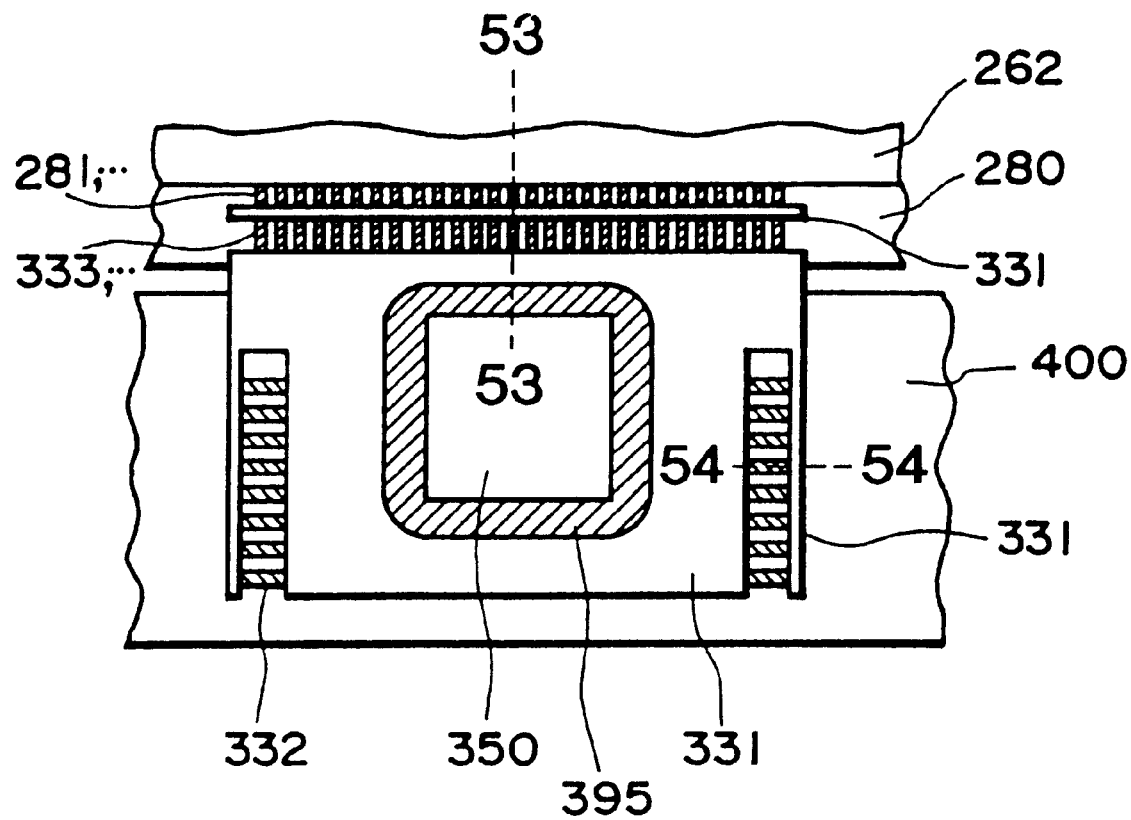
FIG. 57 is a partial plan view showing a state of liquid crystal panel—liquid crystal drive TAB—driver board connection.

In a liquid crystal drive TAB 330, the base film 331 is partly removed to expose the input terminals 332 as shown in FIG. 57 and FIG. 54 (sectional view taken along a line 54—54 in FIG. 57).

On the other hand, the connection electrodes 401a of the driver board 400 are provided with an opening of a solder resist 410 at a part corresponding to an end region F of the input electrodes 332 and provided with a plated solder 411. The input terminal electrodes 332 of the liquid crystal drive TAB 330 are connected by soldering with the driver board 40 in their exposed state only at a region F (FIG. 52) and are not connected with the driver board 400 in their exposed state at a region E (FIG. 52). The solder 411 before the connection with the liquid crystal drive TAB 330 is formed to have a height larger than the surrounding solder resist 410 as shown in FIG. 58. The input terminals 332 of the liquid crystal drive TAB 330 are arranged in a direction perpendicular to an associated side of the substrate 280 as shown in FIG. 57, and the solder 411 may also be arranged in a direction perpendicular to the side of the substrate 200.

Figure 59:
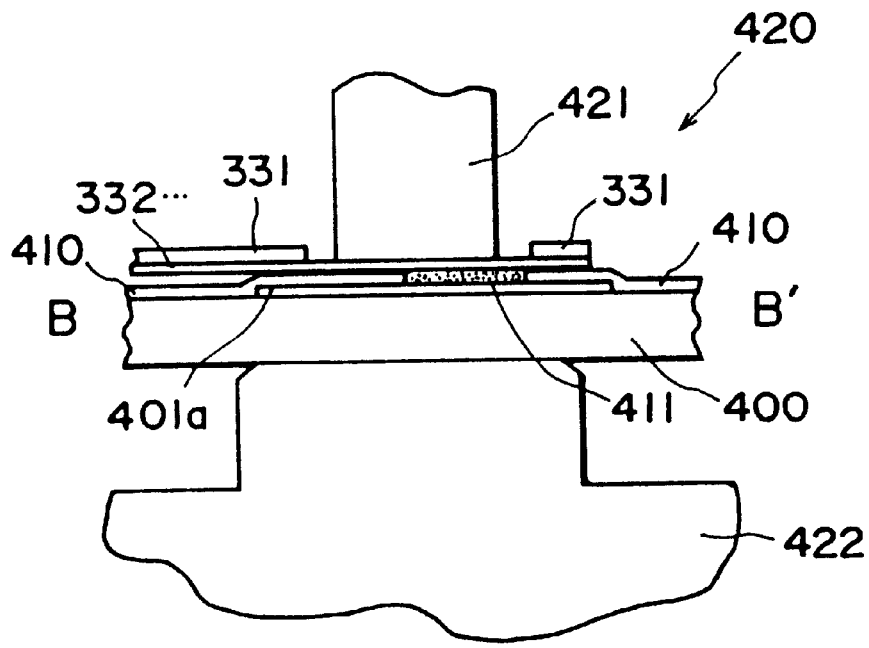

Referring to FIG. 59, a manner of connection between the driver board 400 and the liquid crystal drive TAB 330 will be described. An apparatus 400 used for the connection 420 has a heat-pressure bonding head 421 heated to 200–300° C., and the head 421 is supported so as to be movable vertically upwards and downwards. Below the head 421, a stage 422 is disposed to mount a driver board 400 thereon. The head 421 has a head width of 1.2 mm.

For the connection between the driver board 400 and the liquid crystal drive TAB 330, a flux is applied on the solder resist 410 on the driver board side, and a positional alignment is performed between the driver board 400 and the TAB 330.

Then, the head 421 is heated to 200–300° C. and moved downward to apply pressure and heat to the driver board 400 and the liquid crystal drive TAB 330 between the head 421 and the stage 422. In other words, a part covering both the solder resist 410 and the solder 411 is heat-bonded via the input terminals 332 to connect the input terminals 332 and the connection electrodes 401a.

The driver boards 400 may be supported by the panel-fixing plate 233, and the supporting structure will be described with reference to FIGS. 60–63.

Figure 60:
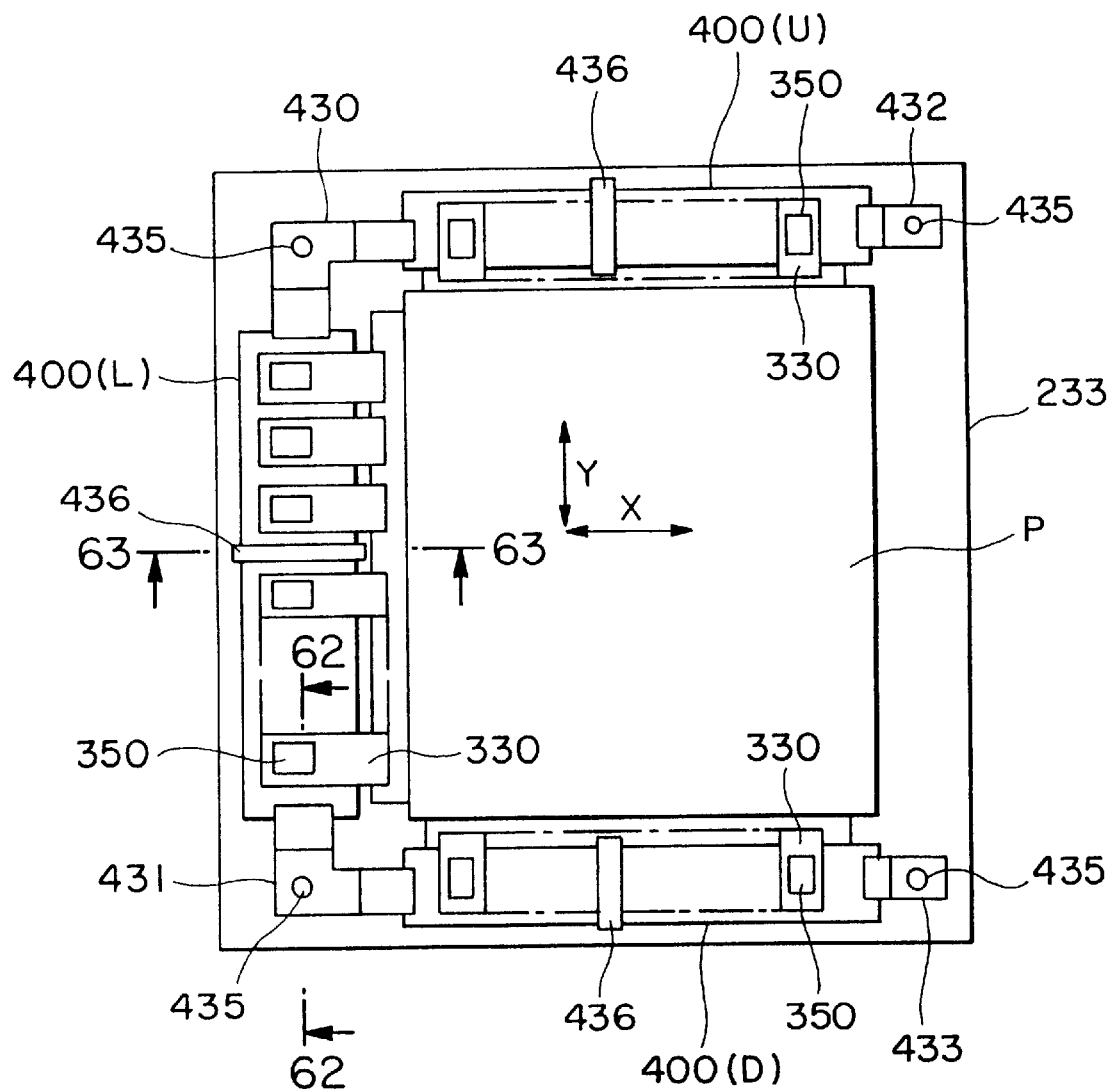
FIG. 60 is a schematic plan view for illustrating a structure of display unit including a holding plate.
Figure 61:
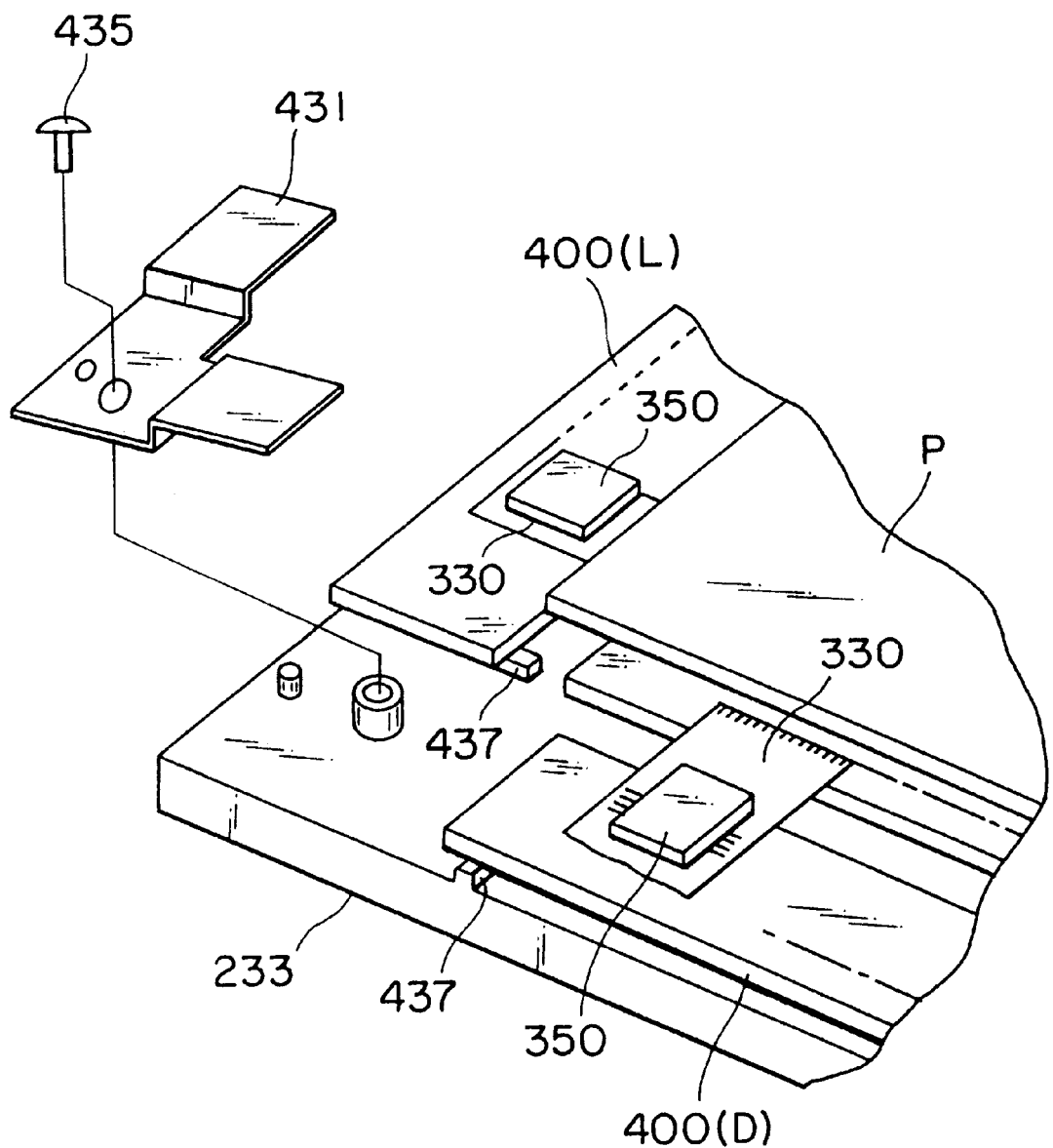
FIG. 61 is an exploded sectional view for illustrating shapes of a holding plate and associated members.
Figure 62:
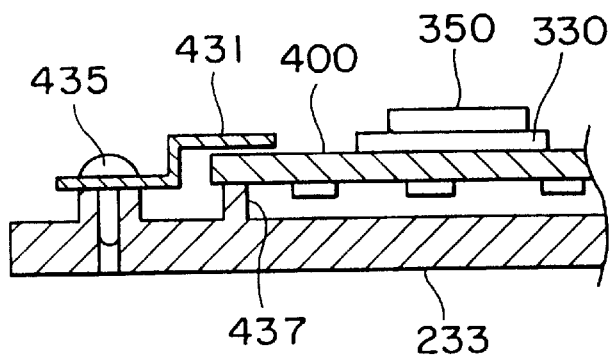
FIGS. 62 and 63 are sectional views taken along lines 62—62 and 63—63, respectively, in FIG. 60.
Figure 63:
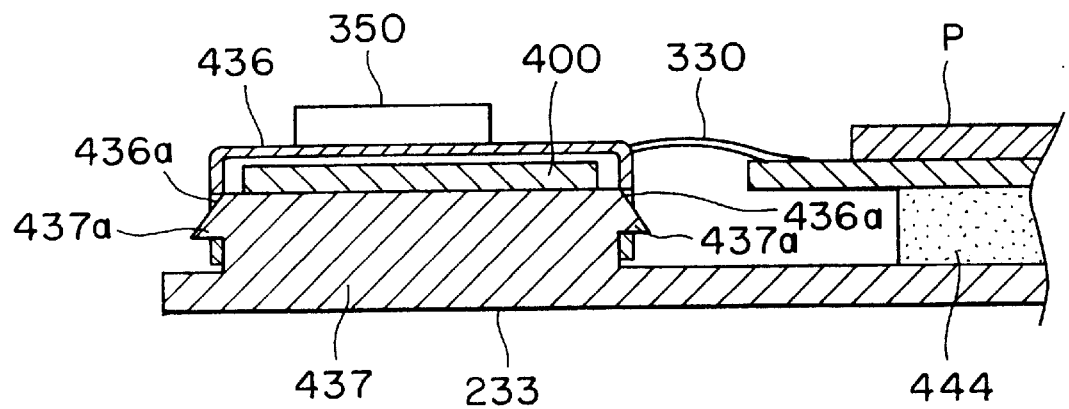

At four corners of a panel-fixing plate 233, four holding plates 430–433 are fixed by screws 435 as shown in FIG. 60. Among the four holding plates 430–433, two holding plates 430 and 431 disposed on the left side of the liquid crystal panel P have a planar shape of "L", and the remaining two holding plates 432 and 433 have a planar shape of "I". The four holding plates 430–433 all have a stepwise bent shape as shown in FIGS. 61 and 62, and their front ends are disposed above a driver board 400 at a position free from a liquid crystal drive TAB 330 to hold the driver board 400 with a slight gap of 0.1–0.2 mm left. A holding plate 436 is disposed at a central portion of each driver board 400. Each holding plate 426 has perpendicularly bend end portions to assume a sectional shape of an inverted "U", and the bent end portions thereof are provided with perforations 426a. At parts where the driver boards 400 are disposed, the panel-fixing plate 233 is provided with projections 437 and at parts where the holding plates 436 are disposed, the projections 437 are further provided with side projections 437a at their side walls. Then, the driver boards 400 may be fixed to the panel-fixing plate 233 by placing the driver boards 400 on the projections 437, disposing the holding plates 436 so as to cover the driver boards 400 and engaging the apertures 436a of the holding plates 436 with the side projections 437a. The holding plates 436 are also disposed with a small gap (0.1–0.2 mm) above the driver boards 400 at parts of the boards 400 free from the liquid crystal drive TAB 330. The projections 437 on the panel-fixing plate 233 may have a width which is set to be slightly wider than the width of the driver board 400, so as to allow some movement of the driver board 400.

Next, a function of the display apparatus body 200 when an environmental temperature is changed, will be described.

When the display apparatus body 200 is subjected to an environmental temperature change or a temperature stress during the production process, the liquid crystal panel P causes a thermal expansion or shrinkage. However, as the driver boards 400 are movably supported by the panel-fixing plate 233, the driver boards are allowed to move along the surface of the panel-fixing plate 233 to follow the liquid crystal panel P even when the display apparatus body 200 is subjected to a temperature change. As a result, the liquid crystal drive TABs 330 and the solder connections on both sides thereof are free from stress, thus avoiding breakage of these parts.

On the other hand, the driver boards 400 may be supported by the holding plates 430 so as to be free from a jumping from the panel-fixing plate even when the display apparatus body 200 is subjected to a vibration or impact.

<Wiring between driver boards>

In a driver board 400, the sixth layer 407 thereof provides a surface for mounting connectors 400 to exchange signals and voltages between the driver boards and with the driver controller 450. Hereinbelow, such wiring between the driver boards and between a diver board 400 and the driver controller will be described with reference to FIGS. 64–66.

Figure 64:
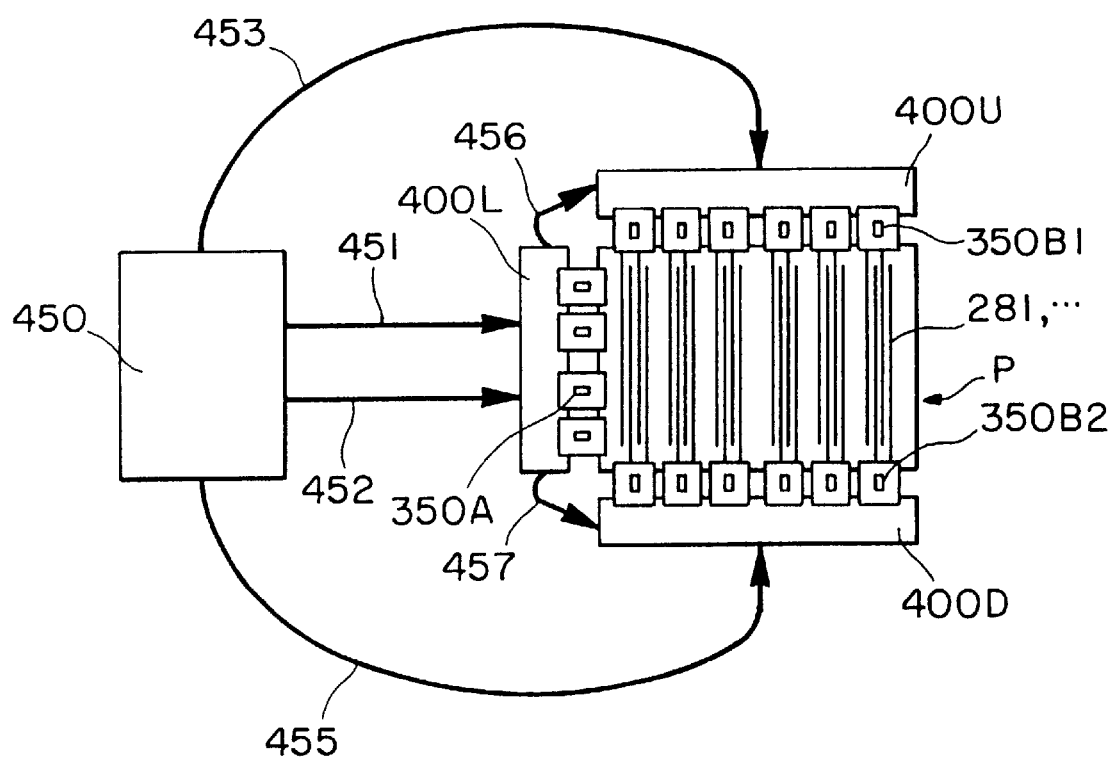
FIG. 64 is a schematic illustration of a connection of a flat cable.

As shown in FIG. 64, the display apparatus in this embodiment is provided with three driver boards 400L, 400U and 400D, of which one (common driver board) 400L is disposed on the left side of the liquid crystal panel P and connected to the liquid crystal panel P (more exactly, the upper substrate 262 thereof) via the liquid crystal driver TABs 330. On the upper and lower sides of the liquid crystal panel P, the upper driver board 400U and the lower driver board 400D are disposed and connected to the liquid crystal panel P (the lower substrate 280) via the liquid crystal drive TABs 330.

The common driver board 400L and the driver controller 450 are connected via two flat cables 451 and 452, of which one cable 451 transmits various signals inclusive of address signals CA0–6, waveform setting signals CWFD0–3, etc., and the other cable 452 transmits drive voltages V1, V2, V3, V4, V5 and VC for driving the liquid crystal panel P.

The upper and lower driver boards 400U and 400D are connected to the driver controller 450 respectively via one cable 453 or 455, respectively, so as to receive voltages and signals for driving the respective drive ICs 350. Further, the common driver board 400 is connected to the other driver boards 400U and 400D via flat cables 456 and 457, respectively, as shown in FIGS. 64 and 39, so as to supply drive voltages V3, VC and V4 from the driver board 400L to the other driver boards 400U and 400D.

Figure 65:
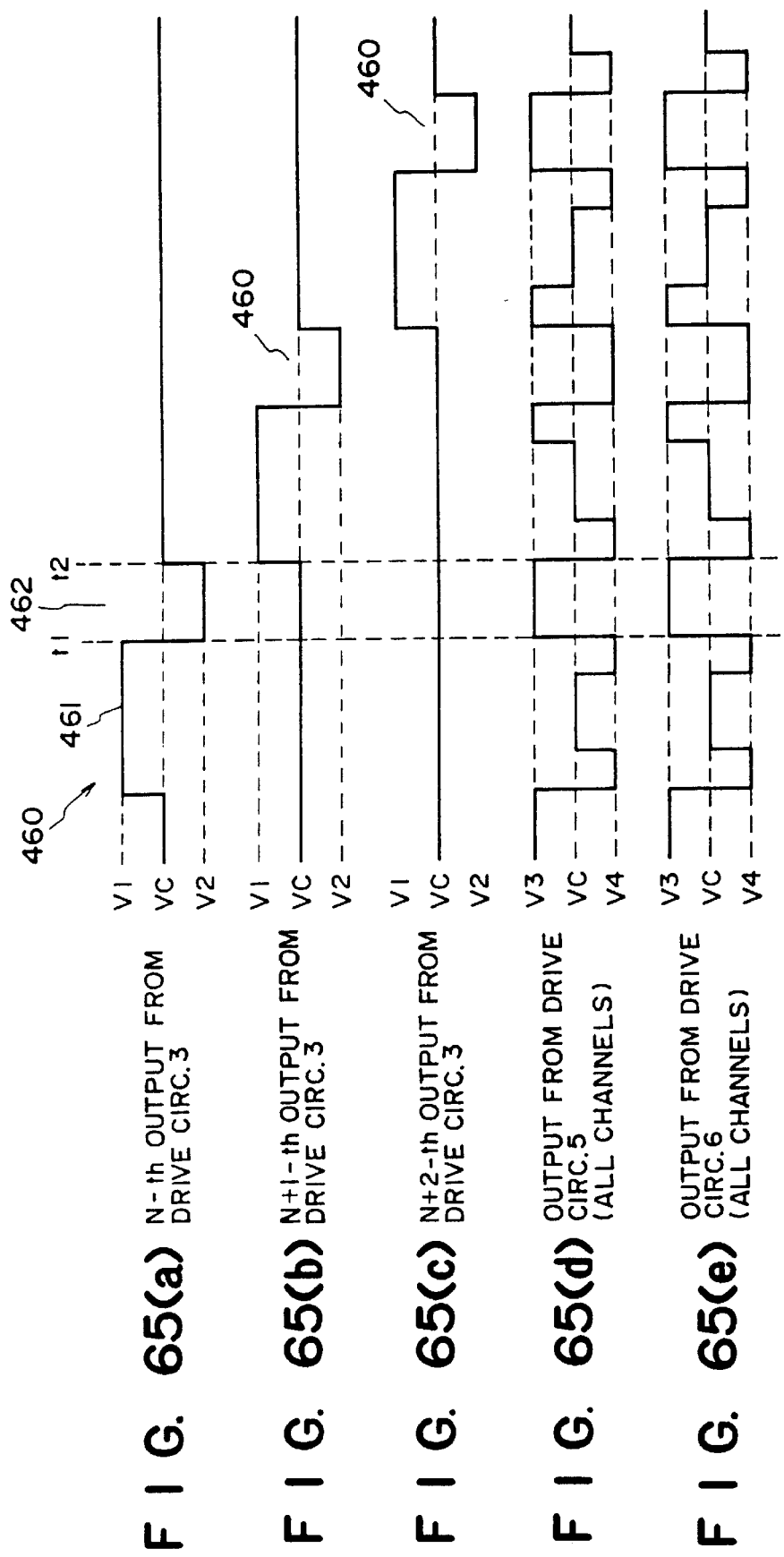
FIG. 65 is a waveform diagram showing scanning signals and data signals.

The scanning-side ICs 350A having received the voltages V1, VC and V2 are designed to supply a scanning signal to the respective scanning electrodes 269. The scanning signal 460 comprises a reset pulse 461 and a selection pulse 462 subsequent to the reset pulse as shown at FIG. 65($a$) and is sequentially applied to the scanning electrodes 269 (line-sequential scanning scheme) as shown at FIGS. 65($a$)–65($c$), which show a manner of line-sequential scanning by indicating the scanning signals sequentially applied to n-th, n+1-th and n+2-th scanning electrodes, while the other scanning electrodes are also subjected to similar line-sequential scanning. Further, as is understood from FIGS. 65($a$)–($c$), during a period when one scanning electrode (e.g., an n-th scanning electrode) is supplied with a scanning signal 460, the other scanning electrodes (other than the n-th scanning electrode) are supplied with a constant voltage VC. In other words, in case of a $\frac{1}{480}$ duty, when one arbitrary line receives a voltage of V1 or V2, the other 479 lines are supplied with a voltage of VC.

On the other hand, the data-side ICs 350B1 and 350B2 having received the voltages V3, VC and V4 are designed to apply data signals having waveforms shown at FIG. 65($d$) and ($e$) to the data electrodes 281.

On the other hand, in this embodiment, by-pass capacitors C3 and C4 are disposed on a driver board 400, which will be described with reference to FIG. 66.

Figure 66:
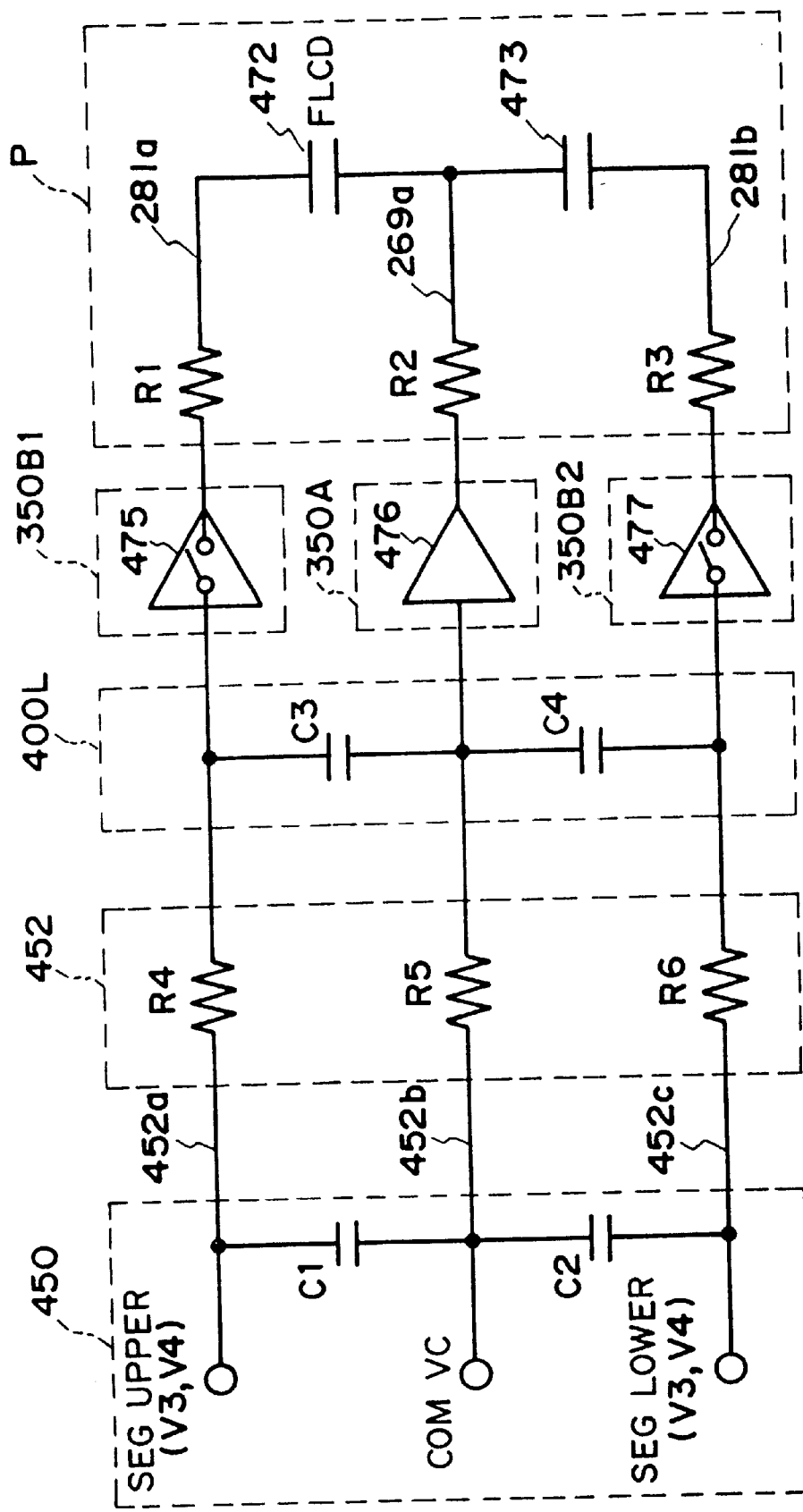
FIG. 66 is a block diagram showing a wiring state.

Referring to FIG. 66, numeral 247 represents a pixel formed at an intersection of one data electrode 281a and one scanning electrode 269a, and numeral 473 represents a pixel formed at an intersection of another data electrode 281b and the scanning electrode 269a. Further, R1, R2 and R3 represent the internal resistances of the electrodes 281a, 269a and 281b, respectively. Further, numerals 475, 476 and 477 represent switching elements disposed in the liquid crystal drive ICs 350B1, 350A and 350B2, respectively.

On the other hand, numeral 452a represents a (power supply) line supplying voltage V3 or V4, which is applied from the driver controller 450 via the line 452a, the driver board 400L and the data-side IC 350B1 to the data electrode 281a as shown in FIG. 66.

Numeral 452b represents a (power supply) line supplying voltage VC, which is applied from the driver controller 450 via the line 452b, the driver board 400L and the scanning-side IC 350A to the scanning electrode 269a as shown in FIG. 66. Further, numeral 452c represents a (power supply) line supplying voltage V3 or V4, which is applied from the driver controller 450 via the line 452c, the driver board 400L and the data-side IC 350B2 to the data electrode 281b as shown in FIG. 66. R4, R5 and T6 represents the internal resistances of the lines 452a, 452b and 452c, respectively. The cable 452 includes a multiplicity of such wire lines 452a.

On the other hand, in the driver controller 450, by-pass capacitors C1 and C2 are inserted respectively between the lines 452b and 452a, and between the lines 452b and 452c. Further, in the drive board 400, by-pass capacitors C3 and C4 are inserted respectively between the lines 452b and 452a and between the lines 452b and 452c. Accordingly, these by-pass capacitors C3 and C4 are disposed at points on a downstream side of the lines 452a–452c and on an upstream side of the data electrodes 281a . . ., i.e., at positions between the supply lines 452a–452c and th e data electrodes 281a . . . As a result, even when a liquid crystal switching is performed by a switching element 475, the peak current is supplied from the by-pass capacitors C3 and C4, so that a peak current does not flow through the power supply lines 452a–452c.

Now, the operation of the display apparatus according to this embodiment will be described.

When the display apparatus body 200 is driven, power and signals for driving the scanning-side ICs 350A are supplied from the driver controller 450 via the cable 451 and the common driver board 400L to the scanning-side ICs 350A, and power and signals for driving the data-side ICs 350B1 and 350B2 are supplied from the driver controller 450 via the cables 453 and 455 and driver boards 400U and 400D to the data-side ICs 350B1 and 350B2.

On the other hand, power or drive voltages V1, VC and V2 are supplied from the drive controller 450 to the scanning-side ICs 350A via the cable 452 and the driver board 400L to be converted into a scanning signal 460 having the above-mentioned waveform. The scanning signal 460 is sequentially applied to the scanning electrodes 269 according to the above-mentioned line-sequential scanning scheme. On the other hand, power or drive voltages V3, VC and V4 are supplied via the cable 452 to the driver board 400L and then via two flat cables 456 and 457 and the driver boards 400U and 400D to the data side ICs 350B1 and 350B2, where the data signals having the waveforms shown at FIG. 65(d) and (e) are generated and supplied to the data lines 281. In this instance, the data signals have an identical average voltage and therefore all the data electrodes on the liquid crystal panel P are always placed at an averagely constant potential.

Now, a behavior at time t1 is considered in an extreme case where all the data electrodes receive identical waveform signals as shown at FIG. 65(d) and (e). At time t1, most scanning electrodes not receiving the scanning signal 460 are supplied with a constant voltage VC as described above, and all the data electrodes are supplied with a voltage V3 (>VC) (based on the above assumption). Accordingly, at the respective pixels formed at the intersections of such scanning electrodes 269 and the data electrodes 281 (FIG. 66), a current instantaneously flows from the data electrodes 281 to the scanning electrodes 269. Further, at time t2, all the data electrodes 281 are supplied with a voltage V4 (<VC) and most scanning electrodes 269 are supplied with a constant voltage VC, so that a current instantaneously flows from the scanning electrodes 269 to the data electrodes 281. Such an instantaneous current flow occurs not only at time t1 or t2 but also at any time in an extreme case. As a result, accompanying the occurrence of such an instantaneous current flow, an abrupt rush current can flow through the flat cables 456 and 457. In this embodiment, however, as the by-pass capacitors C3 and C4 are formed on the driver board 400L, the above-mentioned abrupt rush current components are removed and the cables 451 and 452 are not adversely affected by such rush currents. In other words, abrupt rush current components of the total current flowing via the flat cables 456 and 457 between the driver board 400L and the driver board 400U and 400L and consumed at the internal resistance R1, etc. of the electrodes 269 and 281 are caused to moderately flow through the flat cables 452, 456 and 457.

In this embodiment, the cables 456 and 457 supplying the drive voltages V3, V4 and VC are short cables in close proximity to the liquid crystal panel, so that the impedance can be lowered and it is possible to supply a drive waveform causing little delay to the liquid crystal panel P, thereby providing a good display characteristic.

An abrupt rush current possibly occurring at the time of liquid crystal switching is removed by the by-pass capacitors C3 and C4, it is possible to obviate the occurrence of an induction current at the cables 451 and 452, thus avoiding a malfunction of the drive ICs 350.

In this embodiment, the drive voltages V3, V4 and VC are supplied to the data electrodes 281 via the driver board 401 and the data side ICs 350B1 and 350B2, and the signals for driving the data-side ICs are supplied separately through the cables 452 and 455. This is advantageous from the viewpoint of space economization.

In the embodiment shown in FIG. 64, two cables (flat cables 451 and 452) are used for connecting the common driver board 400L and the driver controller 450, and one cable each (flat cable 453 or 455) is used for connecting the upper or lower driver board 400U or 400D with the driver controller 450. It is however possible to increase the number of cables depending on the quantity of signals to be sent. FIGS. 13, 26, 68 and 69 show examples of using increased numbers of flat cables 451, 452, etc.

<Flat cable 451 and connector 490>

Figure 56:
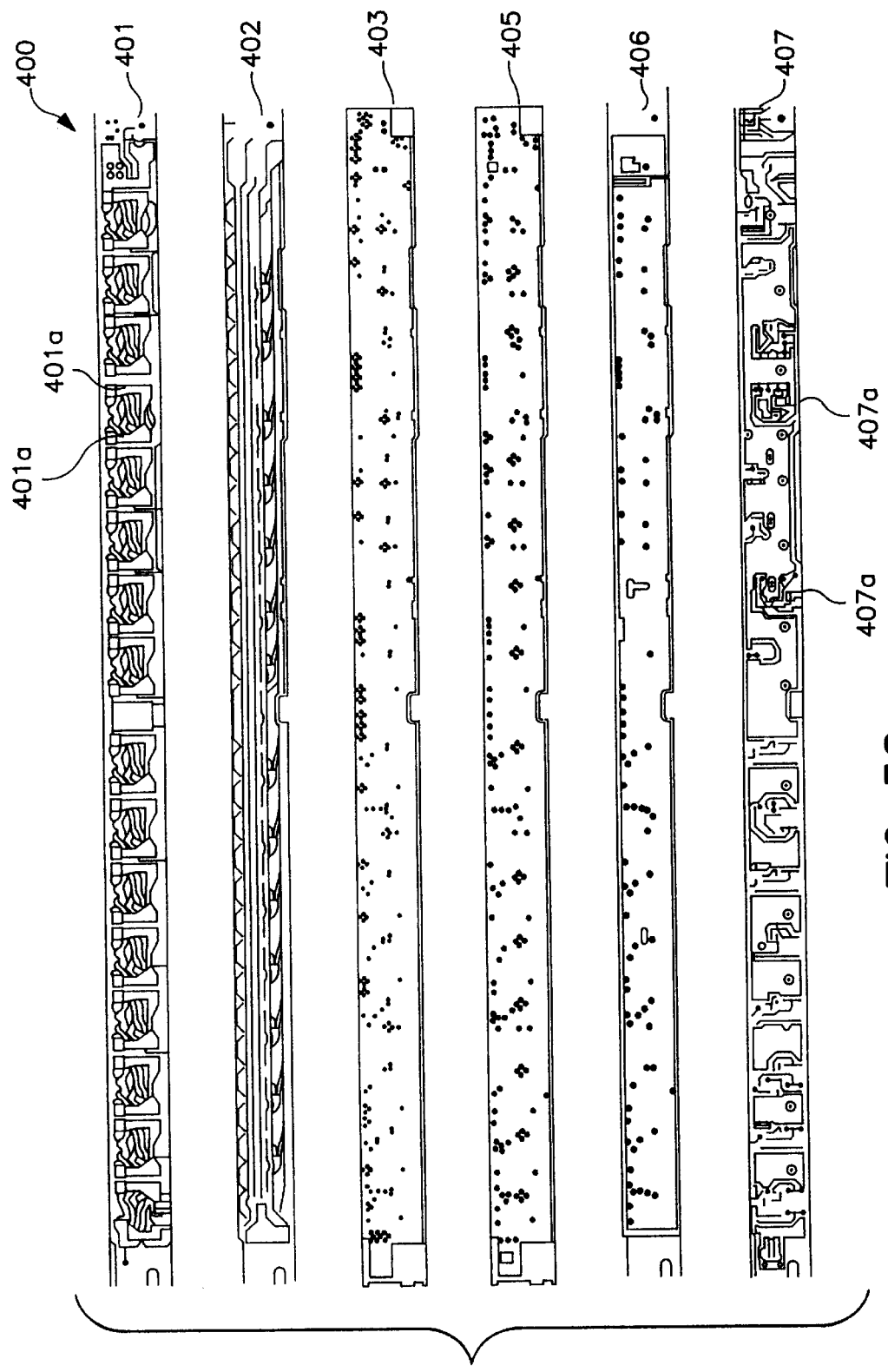
FIG. 56 is an exploded view for illustrating a structure of a driver board.

The above-mentioned flat cables 451 are connected to the sixth layer 407 (FIG. 56) of the driver board 400 via connectors 490. Now, the structures of a flat cable 451 and a connector 490 will be described with reference to FIG. 67.

Figure 67:
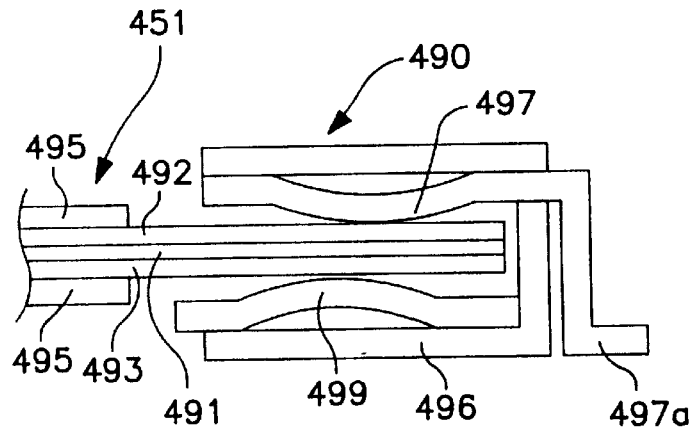
FIG. 67 is a sectional view showing a structure of a flat cable and a connector.

As shown in FIG. 67, a flat cable 451 includes an insulating support layer (base film) 491, and a shield conductor layer (reference potential line) 492 and a signal conductor layer (preferably including a group of conductors) 493, respectively, formed on both surfaces of the base film 491. The layers 492 and 493 are coated with insulating layers 495, respectively.

To the flat cable 451 is connected a connector 490, which includes a housing in the form of a laterally fallen U-shaped mold 496 and contacts 497 and 499 disposed therein on the upper side and the lower side, respectively, so that the contact 497 contacts the signal conductor layer 493 and the contact 499 contacts the shield conductor layer 492. The contacts 497 and 499 are respectively composed of an inwardly convex electroconductive member so as to sandwich the upper and lower surfaces of the flat cable 451. The electroconductive member providing the contact 497 is optionally extended to provide a contact 497a to be soldered.

The signal conductor layer 493 may preferably comprise a layer of a metal, such as Al, Cu, Ni, Pt, Au or Ag. The insulating layer 491 and the protective layers 495 may preferably comprise a flexible film or layer of a polymer, such as polyester, polyamide or polyimide.

Each sheet or layer may have a thickness appropriately selected from the range of 10–500 μm.

In the above, only a flat cable 451 disposed between the driver controller 450 and the common driver board 400L has been described, but another flat cable 452 may also have a similar structure.

In this embodiment, as a result of using the flat cables 451 and the connectors 490 described above, it is possible to realize a high-density packaging and obviate adverse effects of noises (radiation noise) and reference voltage change to prevent a malfunction of logic circuits, thus contributing to provision of a larger size panel.

The above effects are better exhibited when the signal conductors are arranged at a pitch of at most 3 mm, more preferably at most 1 mm.

Figure 68:
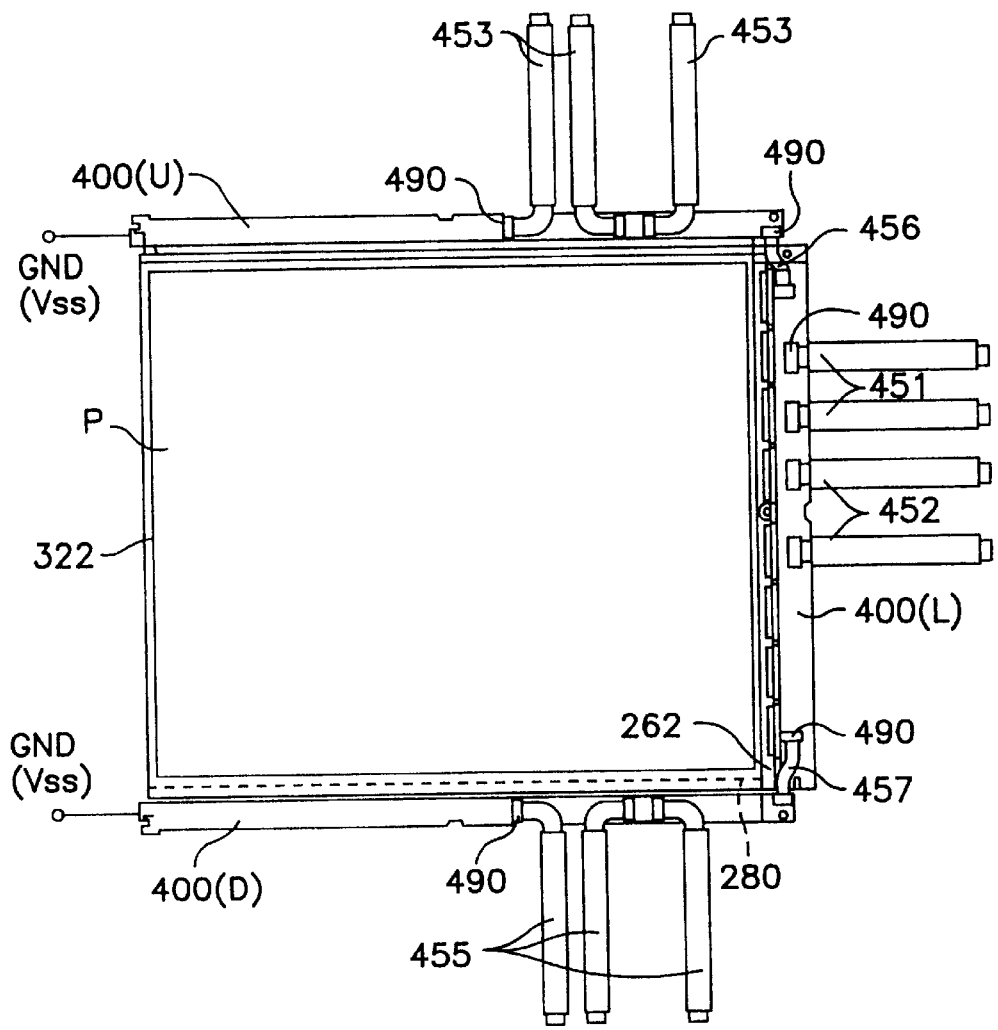
FIGS. 68 and 69 are a bottom plan view and a top plan view, respectively, of a display unit including an affixed flat cable.
Figure 69:
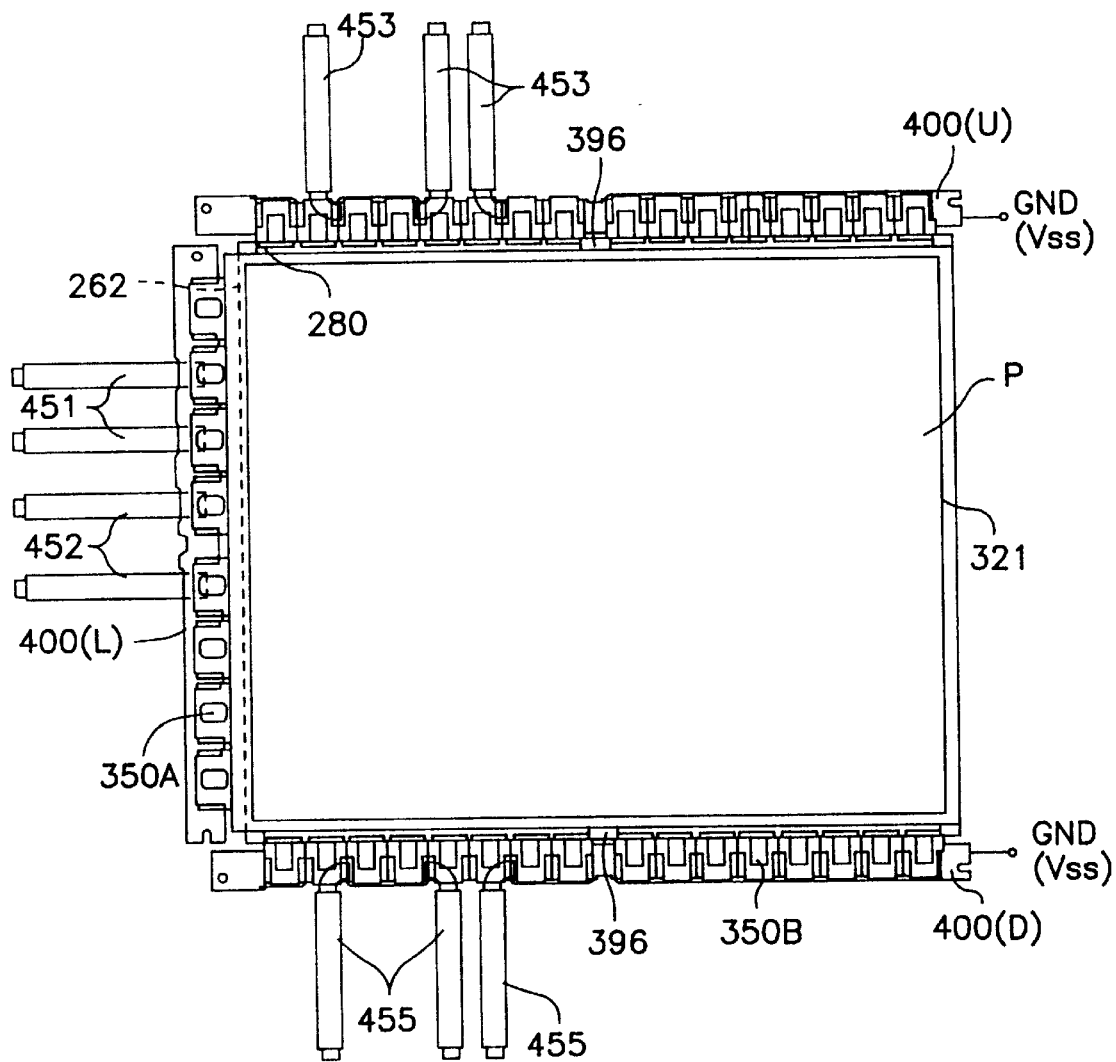

The flat cables 451 are connected to the driver boards 400 via the connectors 490 as shown in FIGS. 68 and 69, wherein FIG. 68 shows a display unit 230 as viewed from its backside (backlight 530 side) and FIG. 69 shows the display unit 230 as viewed from the front side.

<Backlight unit 530>

Now, the structure of a backlight unit 530 used in this embodiment will be described with reference to FIGS. 70 and 71.

Figure 70:
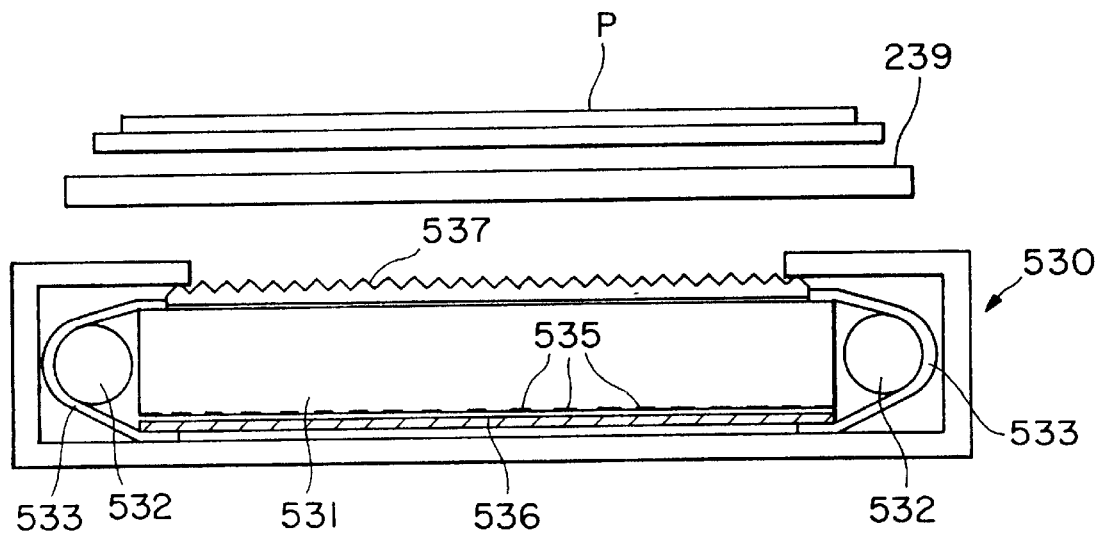
FIG. 70 is a sectional view showing a structure of a backlight unit.
Figure 71:
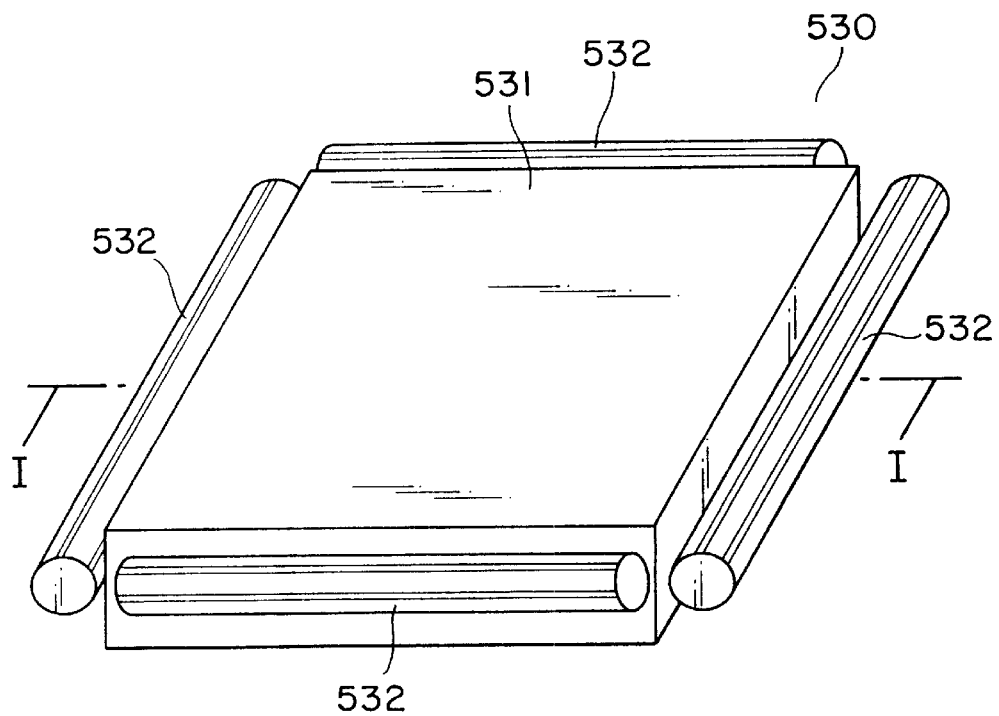
FIG. 71 is a perspective view illustrating a disposition of linear light sources and a light-guide plate.

Referring to FIG. 70, the backlight unit 530 includes a rectangular light-guide plate (light-guide means) 531 comprising a transparent acrylic resin, etc. On the opposite four sides of the light-guide plate 531, four linear light sources 532 are disposed to sandwich the light-guide plate 531. Each linear light source may comprise a high-luminance lamp, such as a hot cathode tube (HCT) inclusive of a three-wavelength light issuing these wavelengths of R, G an B. Backing the linear light sources 532, reflection plates (reflection means) 533 are disposed so as to surround the linear light sources and effectively causing light from the light sources 532 to enter the light-guide plate 531. The reflection plates 533 may be composed of an aluminum plate, etc., and may be coated with a high-reflectance silver-deposited film on their inner surfaces.

Behind (or below, as shown in FIG. 70) the light-guide plate 531, a diffusive reflection pattern (luminance control means) 535 is formed. The reflection pattern 535 is composed of a multiplicity of dots arranged in a prescribed distribution pattern so as to effectively reflect and diffuse a light flux incident thereto through the light-guide plate toward the liquid crystal panel P side, thereby increasing the emission light quantity and uniformizing the luminance to improve the display quality of the liquid crystal panel P (described further later). The diffusive reflection pattern 535 may be formed by applying a white paint on the back of the light-guide plate by printing, etc.

Along the back surface of the light-guide plate 531, a rear reflection plate (diffusive reflection means) 536 is disposed. The rear reflection plate 536 may be formed by coating a surface of an aluminum plate, etc. directed to the light guide plate with a silver deposition film.

On the other hand, in front (on the upper side as shown) of the light-guide plate, a prism sheet 537 is disposed so as to uniformize the directionality of the illumination light. The prism sheet 537 has a multitude of prism elements in the form of angular ridges extending perpendicularly to the drawing and providing their apexes directed toward the liquid crystal panel P side.

Now, the fixing structure of the accessories such as the reflection plate 533 will be described with reference to FIGS. 72–75.

Figure 72:
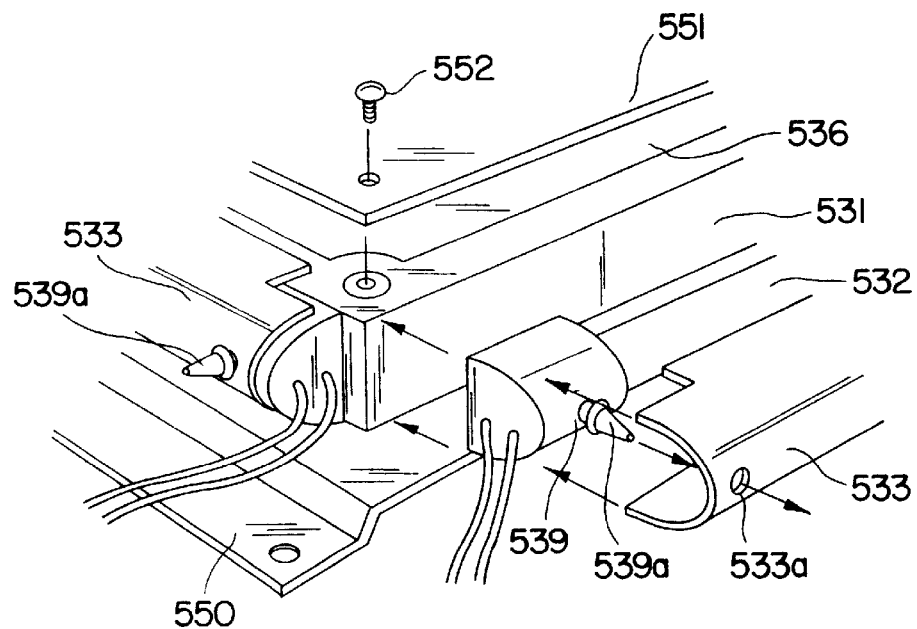
FIG. 72 is a partial exploded perspective view for illustrating a backlight unit structure.
Figure 73:
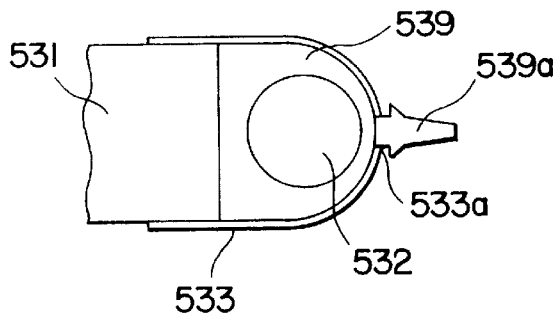
FIGS. 73 and 74 are sectional views of a backlight unit.

In this embodiment, each linear light source 532 is provided with a grommet 539 comprising a resin having a high thermal conductivity as shown in FIGS. 72 and 73. The grommet 539 is provided with an engaging projection 539a. On the other hand, the reflection plate 533 is provided with a perforation 533a to be engaged with the projection 539a, so that the linear light source 532 and the reflection plate 533 are integrated by engagement between the perforation 533a and the projection 539a. The reflection plate 533 is curved and extended toward the light-guide plate 531 as shown.

Figure 74:
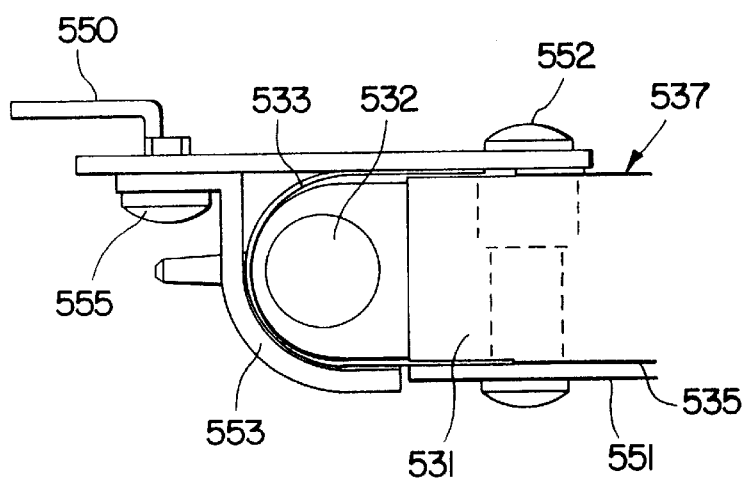
Figure 75:
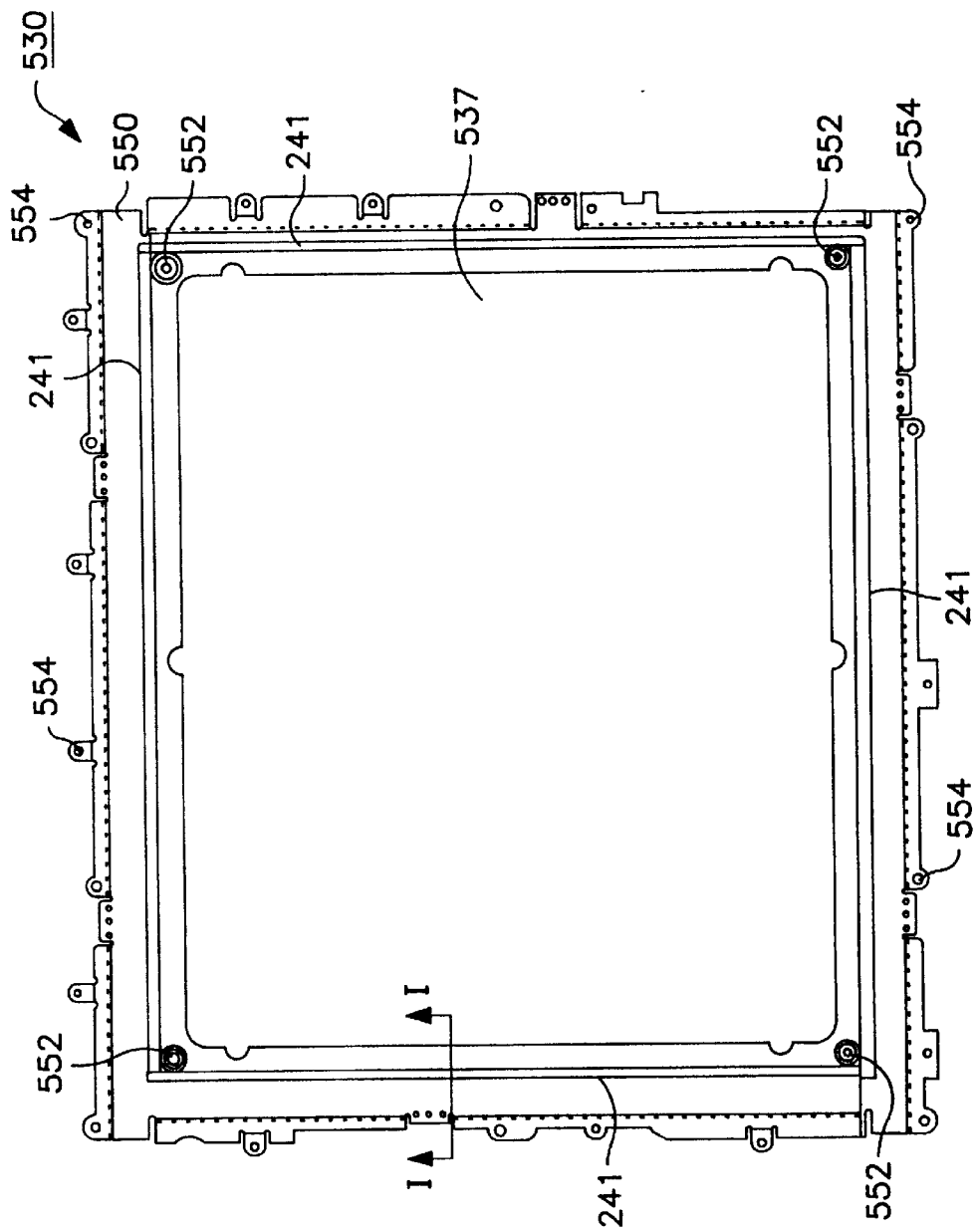
FIG. 75 is a plan view of a backlight upper plate.

On the other hand, above the light-guide plate 531, a backlight upper plate 550 of a metal sheet (e.g., of thin steel plate) is disposed as shown in FIG. 74. The backlight upper plate 550 is formed in a frame shape so as to expose a light-emission area (FIG. 75) and is provided with a plurality of screw holes 554 to be screwed to the front cover 201 of the display apparatus body 200.

Below the light-guide plate 531, a backlight lower plate of a metal sheet (e.g., thin steel plate) is disposed so as to be along almost the entire lower surface of the light-guide plate 531. The back surface of the backlight lower plate 551 is provided with projecting flanges (cut and set-up portion, e.g., 551a shown in FIG. 191) for affixing the inverter unit 570 and the controller unit 572. By using the flanges, the inverter unit 570, etc., are screwed to the lower plate 551.

Between the upper and lower plates 550 and 551, the end portions of the reflection plates are sandwiched. The upper and lower plates 550 and 551 are affixed to the light-guide plate 531 with screws 552, so that the backlight upper and lower plates 550 and 551, reflection plates 533, linear light sources 532 and light-guide plate 531 are integrated. The thus-integrated backlight unit 530 is affixed via the backlight upper plate 550 to the front cover 201 as mentioned above.

Behind the reflection plate, lamp holders 553 are respectively disposed and affixed to the backlight upper plate 550 with screws 555. As a result, the linear light source 532 are surely held. The exchange of linear light sources 532 may be performed by taking off the screws 555.

In the above structure, only by engagement between the projections 539a an the perforations 533a, the linear light sources 532 and the reflection plates 533 can be easily and surely held to each other, whereby these members can be held at appropriate positions with respect to the light-guide plate to exhibit their objective performances without causing luminance irregularity. The assembling efficiency is also improved.

In the above structure, the engaging projections 539a of the grommets 539 may be provided with an elasticity and a diameter in proximity to their roots which is a little larger than the perforations 533a of the reflection plates 533 so as to push the reflection plates 533 to effect the engagement between the projections 539a and the perforations 533, whereby an unintentional separation of the reflection plate 533 from the grommet 539 can be prevented. If the engagement projection 539 is provided with a length of ca. 10 mm, the operation for the engagement may be facilitated by pulling. After the assemblage, unnecessary projections can be cut off if such interfere with the other members. Then engagement projections 539a may be in the shape of cones or pyramids, and the shapes of the perforations may be determined corresponding thereto.

<Diffusive reflection pattern 535>

The distribution density of the diffusive reflection pattern 535 will now be described with reference to FIGS. 76–84.

Figure 76:
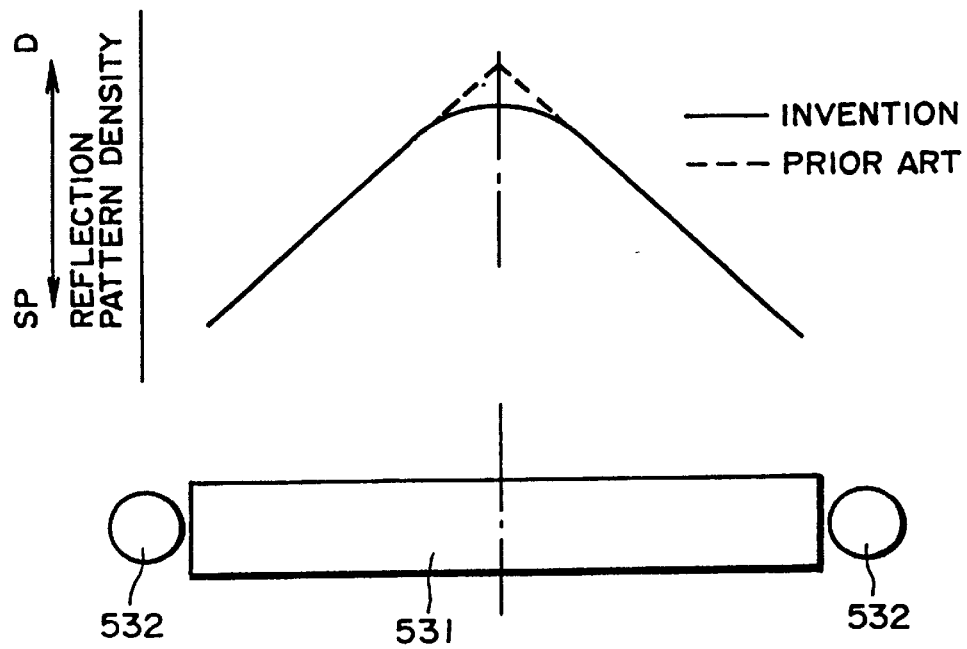
FIGS. 76 and 77 are a schematic sectional illustration and a planar illustration, respectively, of a reflection pattern density distribution.
Figure 77:
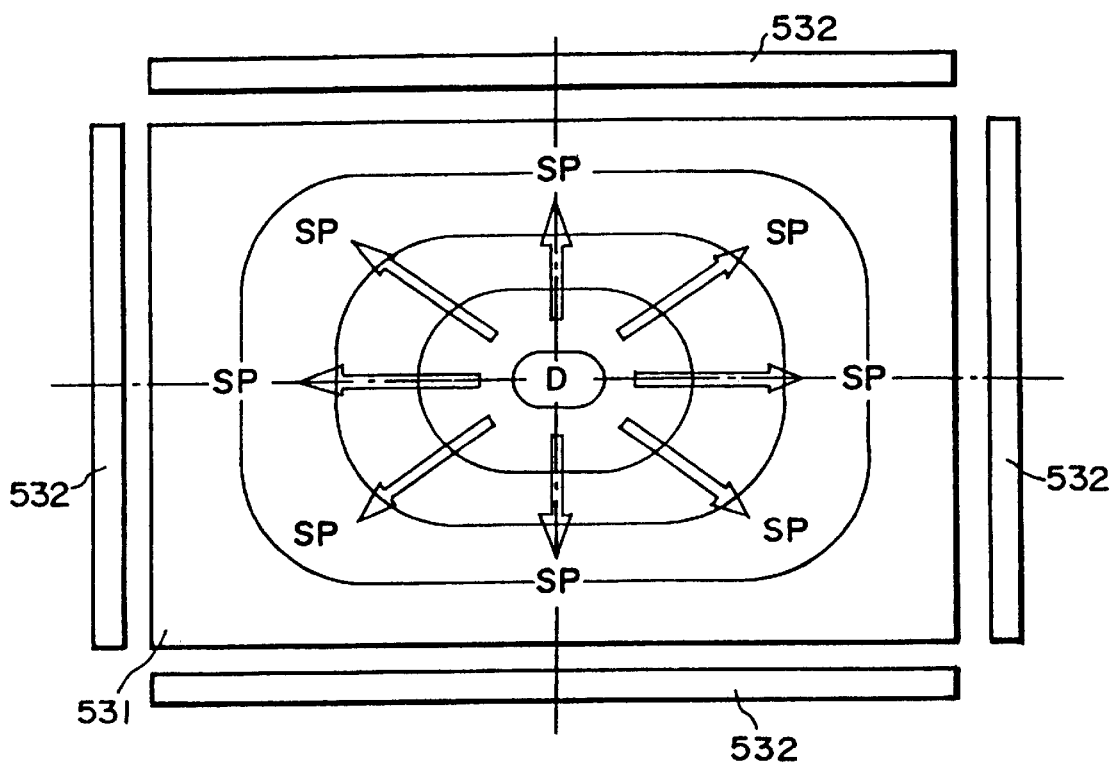

In this embodiment, the diffusive reflection pattern 535 has a distribution density as shown in FIGS. 76 and 77. More specifically, the distribution density (areal percentage of diffusive reflection pattern segments (dots) per unit area of the light guide member) of the diffusive reflection pattern 535 along a section including mutually oppositely disposed linear light sources 532 and passing through a center of the backlight unit 530 is represented by a solid line in FIG. 76 and is set to be the lowest at the parts in the vicinities of the light sources 532 and to be higher as the position leaves away from the light source 532. Further, the distribution density is designed to continuously vary gently along a smooth curve (i.e., not to provide a discontinuity in change rate of the distribution density) at a central part of the backlight unit. Further, the areal distribution density of the diffusive reflection pattern 535 along an illumination surface of the light guide plate 531 is designed to be the highest in the vicinity of the center of the light guide plate and lower at positions closer to the periphery or edges of the light guide plate as shown in FIG. 77. Each iso-distribution density curve forms an angle-free closed loop, preferably an angle-free closed loop which is almost similar in shape to the outer contour of an effective emission surface of the light-guide plate 531 (a rectangle in this embodiment). More specifically, the iso-distribution density curve is designed to draw a closed loop having a long axis/short axis ratio substantially equal to a long side/short side ratio of the effective emission surface. Herein, the term "effective emission surface" refers to a surface of a light guide plate 531 from which light is emitted toward the liquid crystal panel P.

Figure 78:
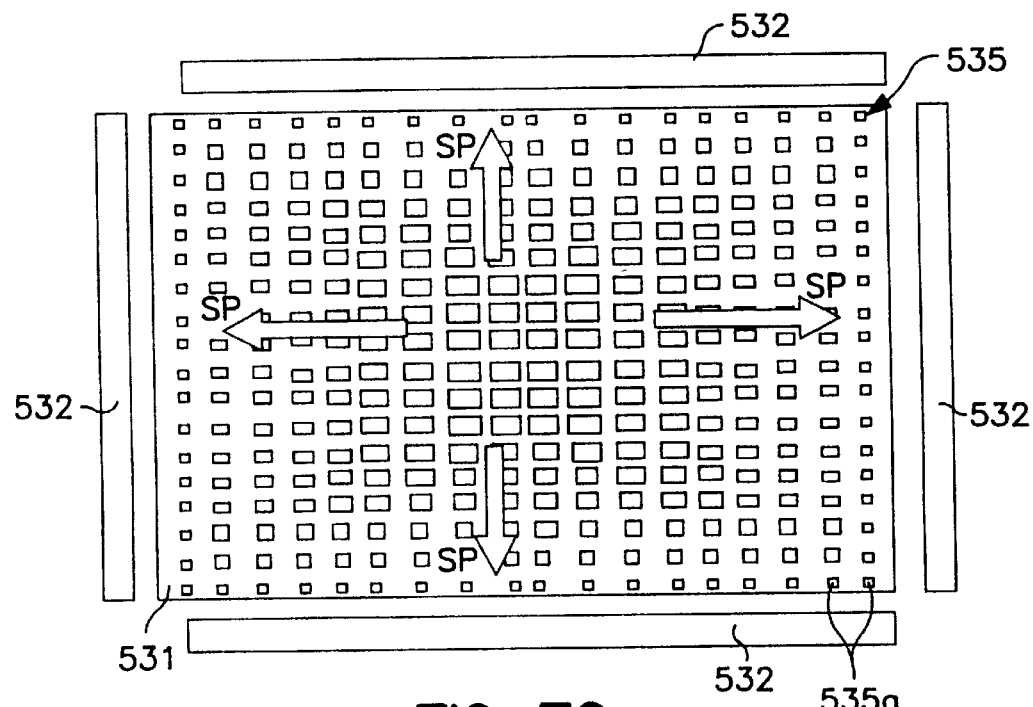
FIGS. 78–80 are schematic plan views each showing a conventional reflection pattern density distribution.
Figure 79:
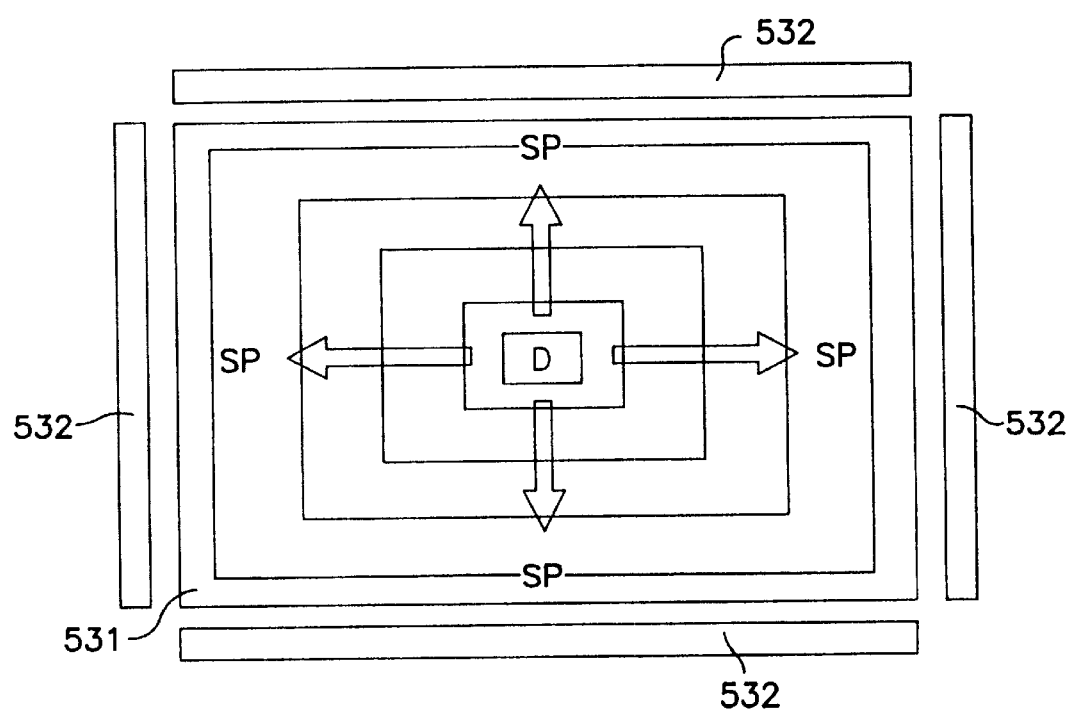
Figure 80:
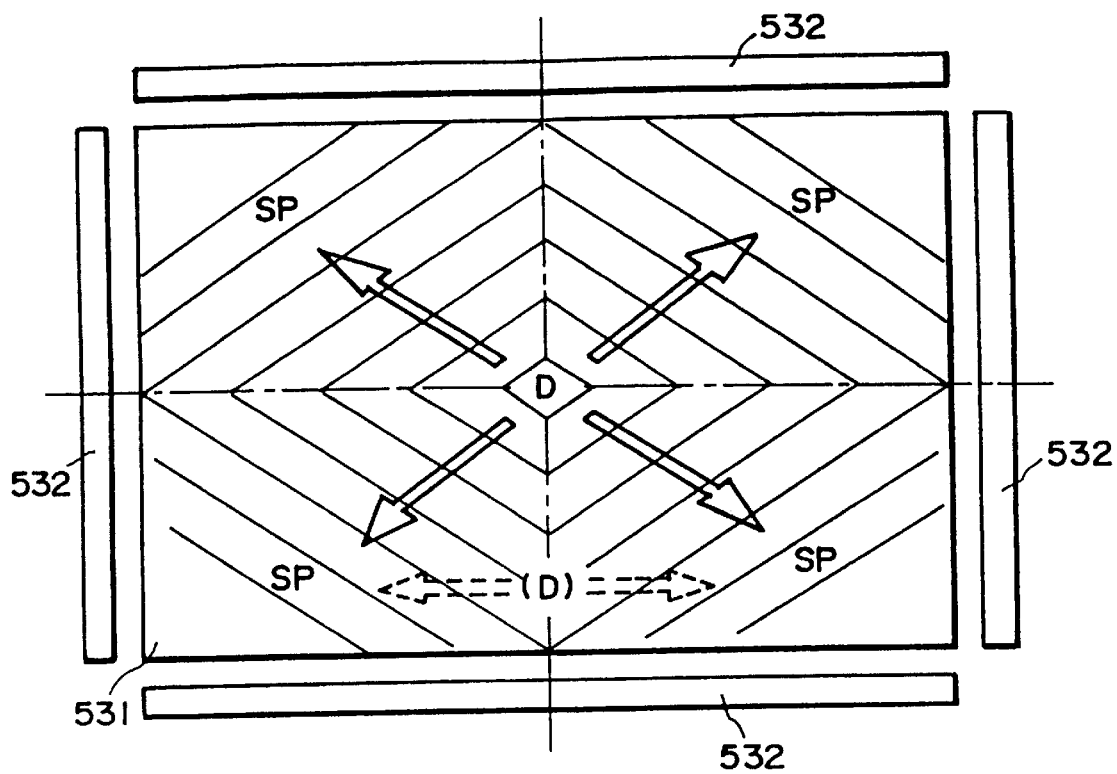

It has been a general practice that dots 535a of a diffusive reflection pattern 535 are formed in a larger size and with a smaller spacing at a central portion of the light-guide plate 531 and in a smaller size and with a larger spacing at positions approaching the edges of the light-guide plate 531 as shown in FIG. 78, wherein a character "SP" represents that the distribution density of the dots 535a is sparse. The planar density distribution has been one represented by iso-(distribution) density curves as shown in FIG. 79, wherein concentric regular iso-density curves are drawn and a character "D" represents a dense distribution density of the dots 535a. Further, the density distribution in a section including the oppositely disposed pair of linear light sources 532 has been one represented by a broken line shown in FIG. 76 showing a lowest density in proximity to the linear light sources 532 and a density which increases proportional to a distance from the linear light sources 532. As a result, a larger amount of light is emitted in a fore direction from the light-guide plate 531 at a position with a higher density of the diffusive reflection pattern 535 (or dots 535a thereof) and a smaller amount of light is emitted at a position with a lower density of the diffusive reflection pattern 535. Further, a diffusive reflection pattern 535 showing concentric diamond-shaped iso-distribution density curves as shown in FIG. 80 has also been known in addition to the one shown in FIG. 79.

As a result, regarding light transmitted through the light-guide plate 531, a portion thereof is totally reflected by the light-guide plate 531, a portion thereof is reflection at random by the diffusive reflection pattern 535, and a further portion thereof is reflected by the rear reflection plate 536, thereby illuminating the liquid crystal panel P.

Figure 81:
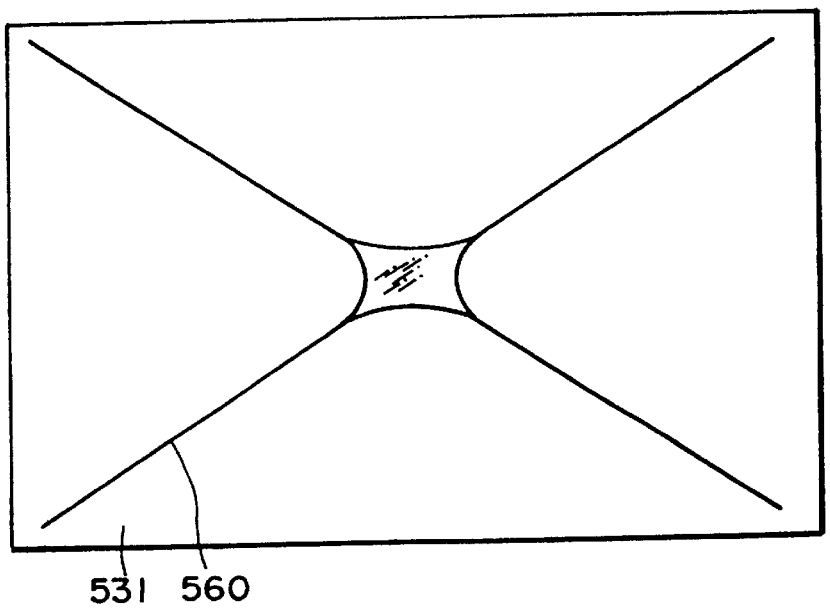
FIGS. 81–82 are schematic plan views each showing a problem accompanying a conventional backlight unit.
Figure 82:
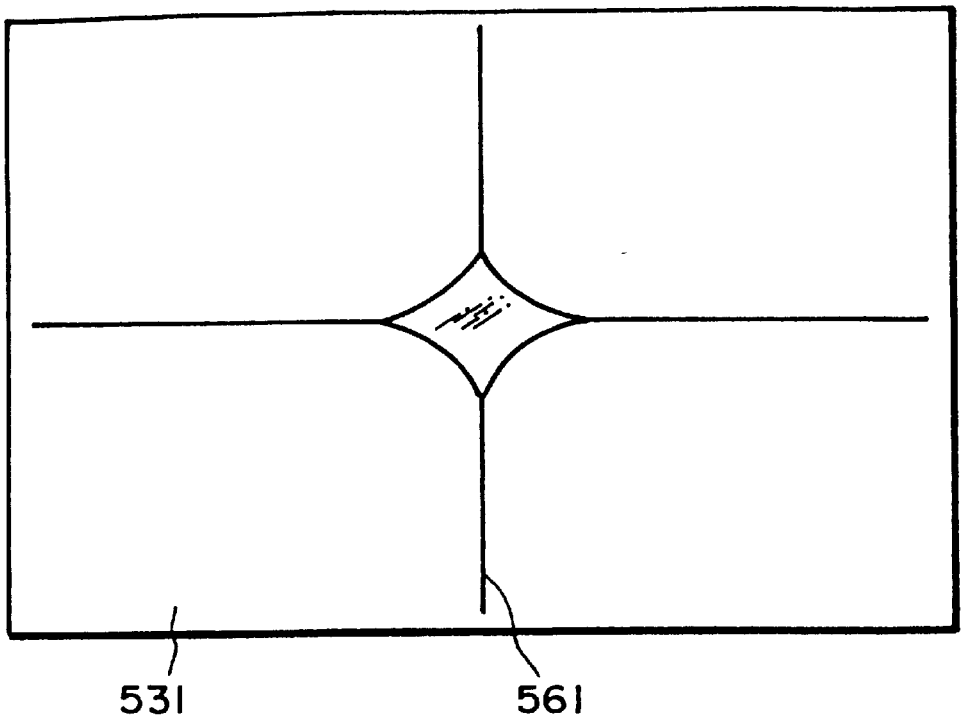

However, in the above-described conventional backlight unit designed to dispose the diffusive reflection dots 535a so as to show a distribution density curve represented by the broken line in FIG. 76 which includes an acute-angular change at a point in the central region, i.e., a distribution density curve which change discontinuously at a point providing a maximum of distribution density of the diffusive reflection pattern, the luminance takes the maximum at the central point and bright lines occur from the point as the center, thereby lowering the display quality of the liquid crystal panel. Particularly, in case where the reflection dots 535a are formed to provide a planar distribution pattern as shown in FIG. 79 including rectangular iso-distribution density lines, bright lines 560 occur along lines connecting corners of the iso-distribution density lines, i.e., along diagonal lines, so as to draw an "x"-shaped pattern as shown in FIG. 81. Further, in a case of a planar distribution density pattern as shown in FIG. 80, bright lines 561 occur so as to draw a "+"-shaped pattern as shown in FIG. 82.

In recent years, backlights of a larger size and a higher luminance are being used in accordance with provision of larger-sized and/or color liquid crystal panels, so that the total light flux quantity has to be increased. As a result, the above-mentioned problem has become particularly noticeable.

Figure 83:
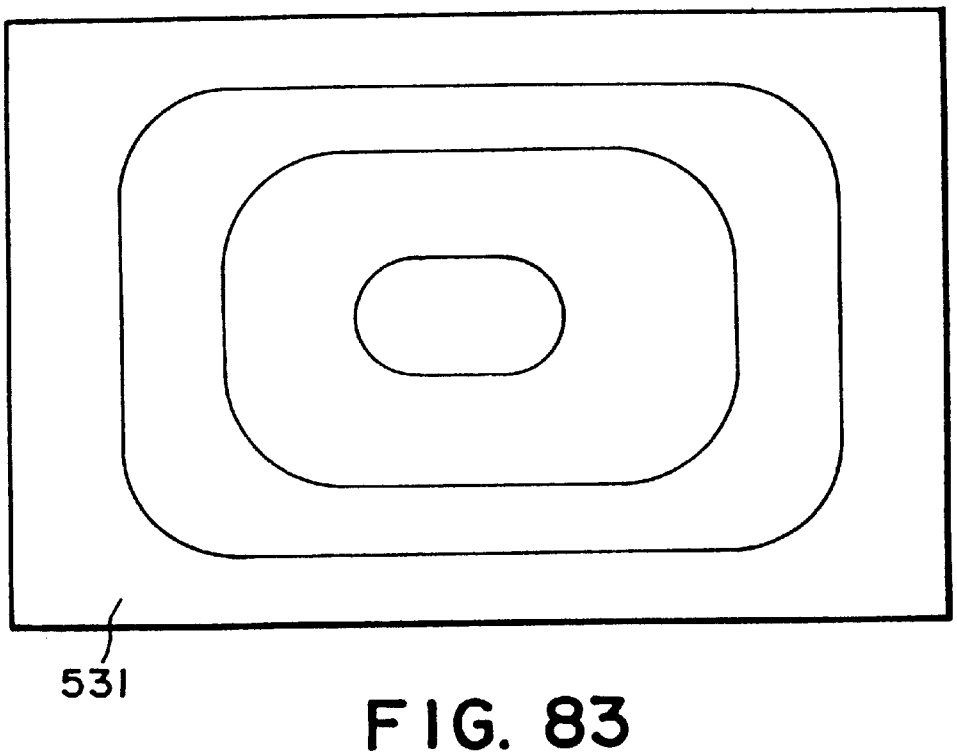
FIG. 83 is a planar illustration of a backlight unit luminance distribution.

According to this embodiment, the occurrence of bright lines on an illumination surface of the backlight unit is suppressed to provide a uniform planar luminance distribution, thereby providing the liquid crystal panel with good display qualities. FIG. 83 shows a luminance distribution represented by iso-luminance curves (loops) based on a measured luminance distribution of such a backlight unit. FIG. 83 shows that the luminance does not change remarkably anywhere on the emission surface but provides a substantially continuous luminance-changing rate and moderate luminance distribution.

Figure 84:
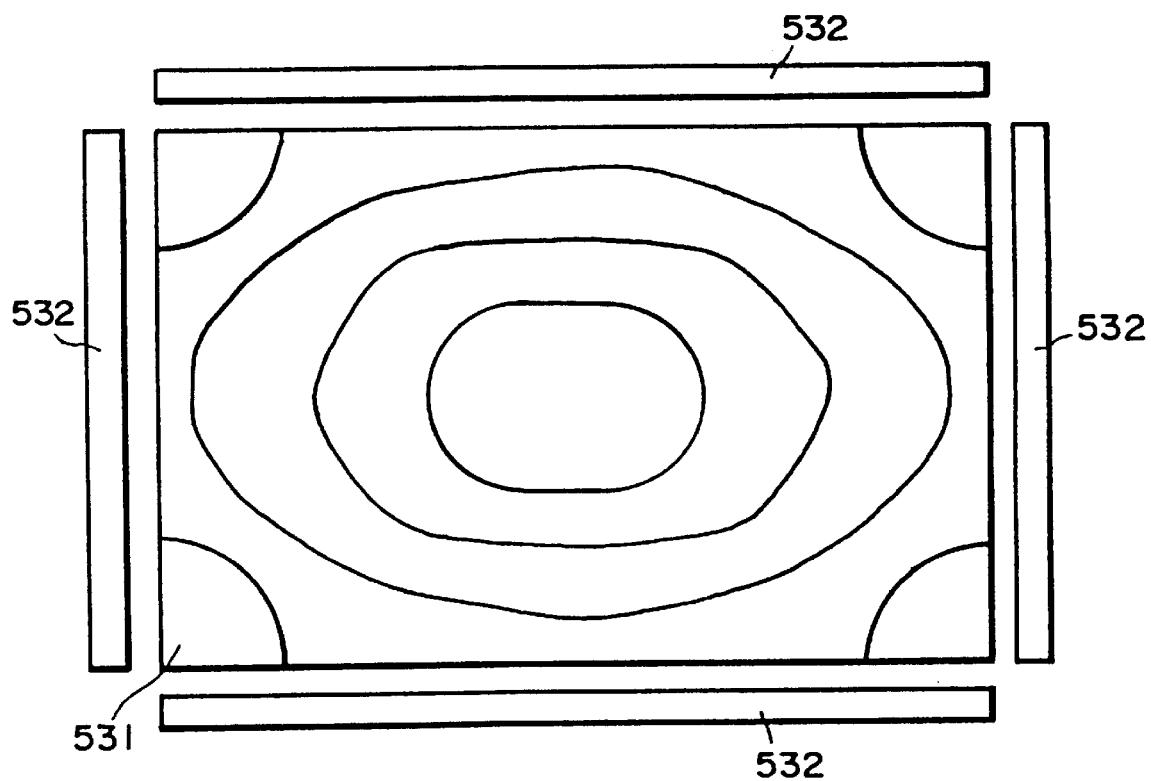
FIG. 84 is a planar illustration of another example of reflection pattern density distribution.

In the above embodiment, the diffusive reflection pattern 535 is disposed in a distribution density as shown in FIG. 77. However, this is not limiting. For example, in a case where the light guide plate 531 provides four corner portions where the luminance is lowered, it is possible to provide a higher distribution density of the diffusive reflection pattern 535 than the surrounding regions, thereby increasing the luminance of light emitted from such corner regions to moderate and substantially uniformize the luminance distribution over the entire illumination surface (as shown in FIG. 84). On the other hand, in a case where there is a locally excessive luminance portion, it is possible to lower the distribution density of the diffusive reflection pattern 535 than in the surrounding region, thereby uniformizing the luminance distribution over the entire surface. Such an adjustment of the distribution density may be performed depending on the type (characteristic) and disposition of the light source used.

In the above-embodiment, the (diffusive) reflection pattern 535 has been generally described to be formed in a dot pattern but may also be formed in a mesh pattern.

Further, the light guide member has been described as a light-guide plate 531, such as an acrylic plate, but it is also possible to use a light guide space in place of the light-guide plate 531.

<Inverter unit 570>

Figure 86:
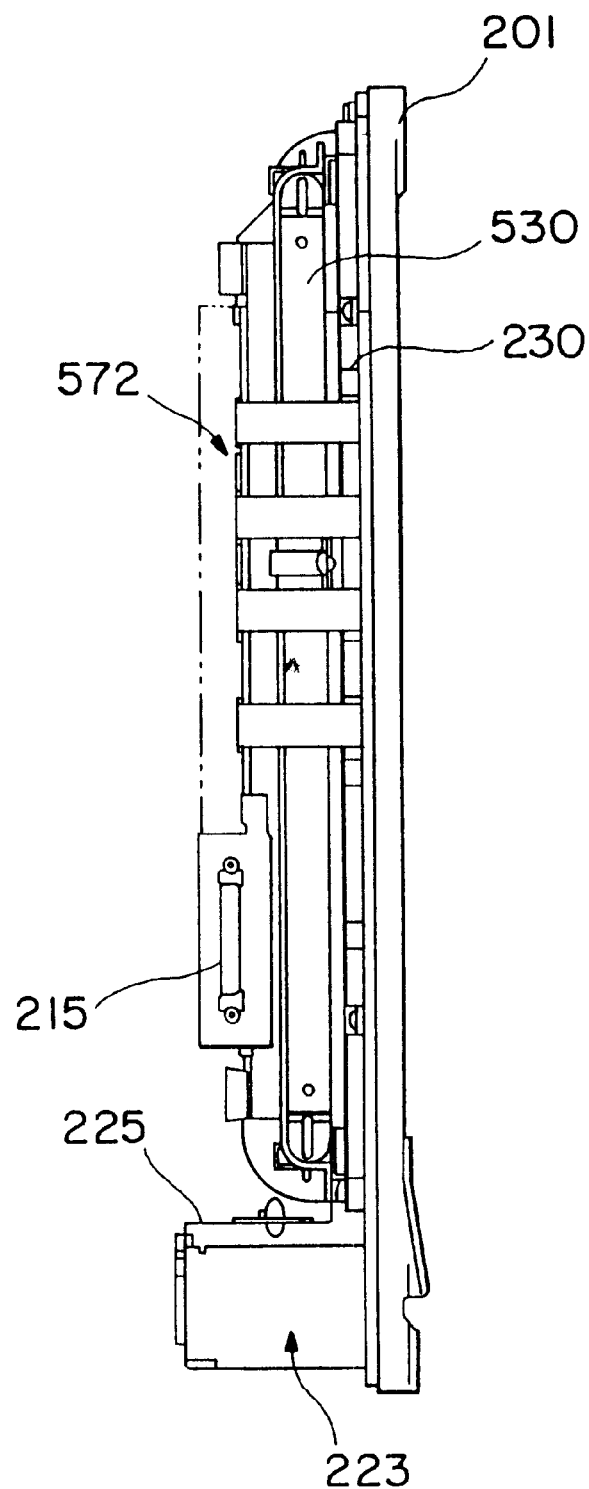

On the back surface of the above-mentioned backlight unit 530, an inverter unit 570 is attached via an insulating plate 571 and, adjacent the inverter unit 570, a controller unit 572 is attached as shown in FIG. 8 (and also FIGS. 85 and 86). The insulating plate 571 ensures an electrical isolation between the inverter unit 570 and the backlight unit 530.

Figure 87:
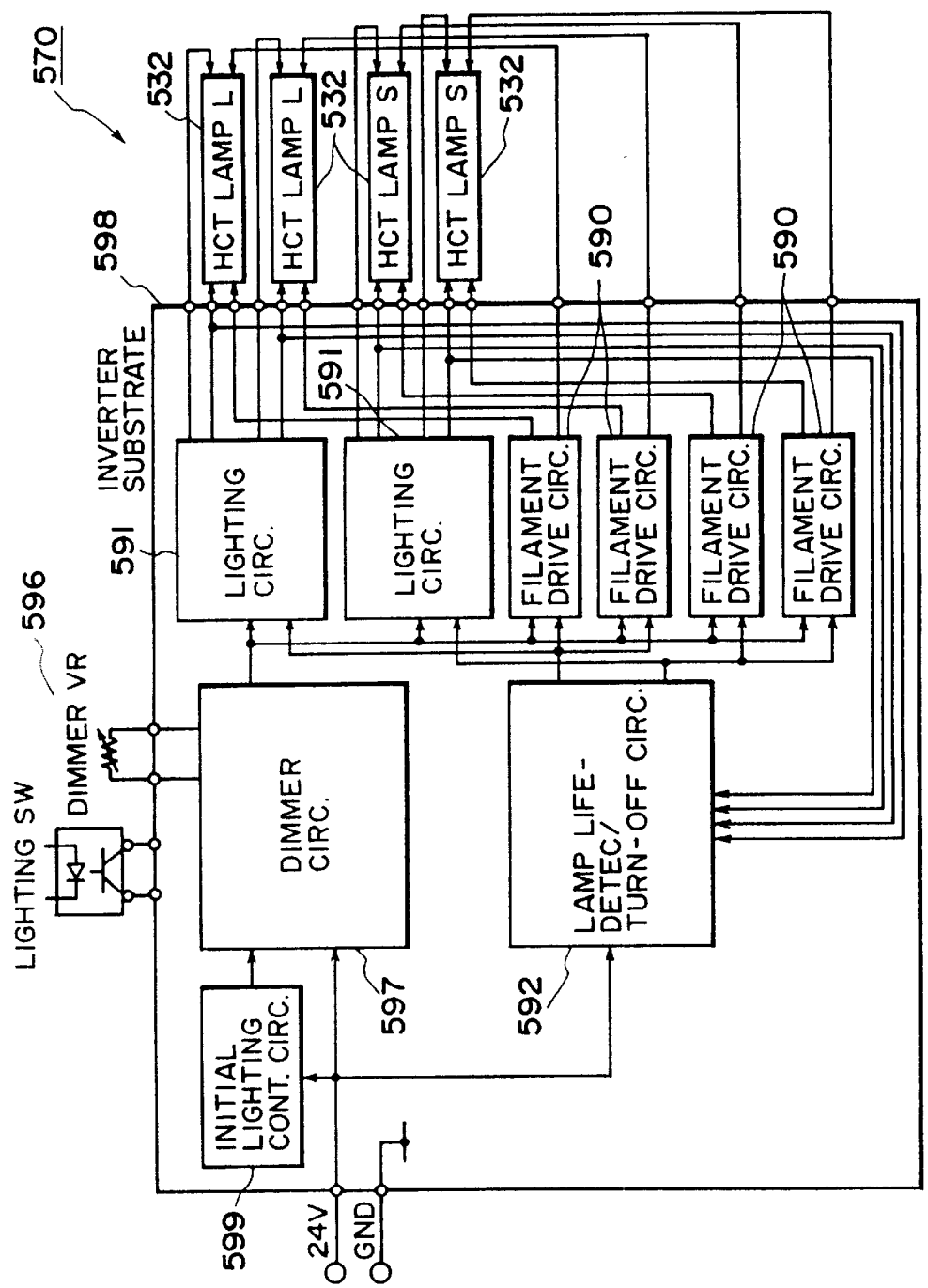
FIGS. 87 and 88 are respectively a block diagram showing an internal structure of an inverter unit.

As shown in FIG. 87, the inverter unit 570 includes four filament drive circuits 590, by which the filaments of four linear light sources 532 are pre-heated.

Further, the inverter unit 570 includes two lighting circuits 591 each designed to energize oppositely disposed two light sources 532.

The inverter unit 570 further includes a lamp life detection/turn-off circuit 592. As shown in more detail in FIG. 88, the lamp life detection/turn-off circuit 592 includes four life-detection circuits 593 each connected to a linear light source 532 and also to one of four turn-off circuits 595. Each life detection circuit 593 always monitors a lighting voltage between both ends of a linear light source after lowering the voltage by resistance division and rectification. Further the life detection circuit 593 includes a comparator, such as a comparator IC, so as to send out a life detection signal to an associated turn-off circuit when the lighting voltage of a linear light source exceeds a prescribed value. Further, among the four turn-off circuits, two turn-off circuits 595 corresponding to a pair of oppositely disposed linear light source 532 are connected to one lighting circuit so that, when either one of the pair of oppositely disposed linear light sources 532 approaches its life end, the pair of oppositely disposed linear light sources 532 are both simultaneously turned off by the control of the lighting circuit 591. Further, as shown in FIG. 87, the inverter unit 570 includes a dimmer circuit 597 connected to a dimmer dial 596 so as to control the luminance of the linear light sources 532. The inverter unit further includes an initial lighting control circuit 599.

Now, the operation of the inverter unit 570 will be described.

When a linear light source 532 approaches its life end, the lighting voltage of the light source is gradually increased to exceed a prescribed value, whereby the life detection circuit 593 sends a life detection signal to the associated turn-off circuit 595. Based on the life detection signal, the turn-off circuit 595 controls the associated lighting circuit 591 to turn off the linear light sources 532. As a single lighting circuit 591 controls oppositely disposed two light sources 532, these two light sources are simultaneously turned off based on the signal from the turn-off circuit 595, whereby the illumination of the liquid crystal panel P is continued by the remaining two light sources.

<Diffusion plate 239>

In the above-described backlight unit 530, light emitted from the linear light sources 532 is reflected by the rear reflection plate 535 and emitted through the prism sheet 537. The emitted light is transmitted through a diffusion plate 239 while being diffused thereby (FIG. 70).

The diffusion plate 239 may be formed of a transparent sheet member, inclusive of a transparent plastic material, such as acrylic resin or polycarbonate, or a glass sheet, subjected to matting on both surfaces.

The viewing angle-dependent luminance characteristic in case of using such a diffusion plate 239 will now be described with reference to FIG. 85.

Figure 89:
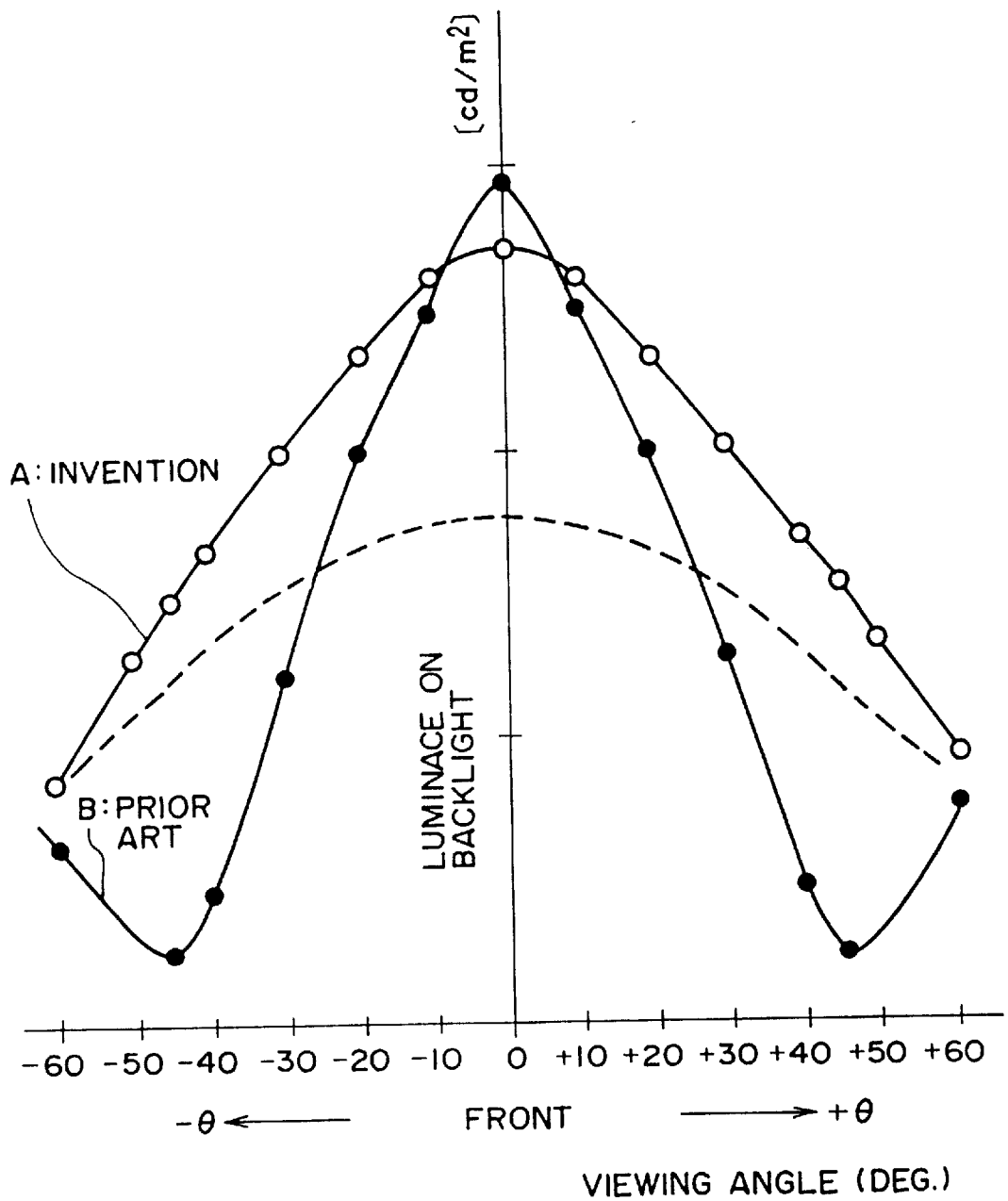
FIG. 89 is a graph showing luminance distribution characteristics of backlight units.
Figure 90:
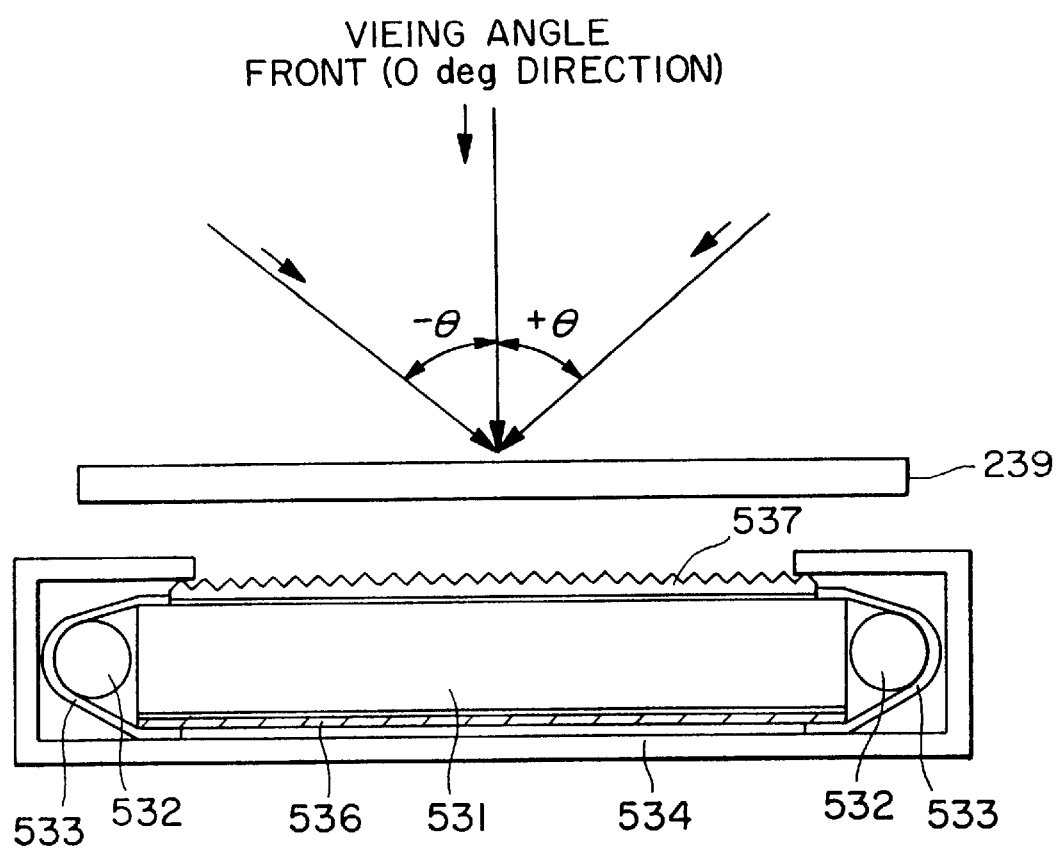
FIG. 90 is a schematic sectional illustration of a manner of measuring a luminance distribution of a backlight unit.

The luminance characteristic curve shown in FIG. 89 represents data obtained by measurement performed in a manner as illustrated in FIG. 90, wherein the luminance (cd/m$^2$) on the light emission or luminance surface was measured by a color luminance meter ("TOPCON BM-7") while changing the viewing angle (θ) within a range of ±60 deg. counted from the right front (0 deg.) of the light emission surface.

In case where the prism sheet 537 in the backlight unit 530 has an apex angle of ca. 90 deg. and no diffusion plate 239 is used, a luminance as represented by a curve B (FIG. 89) is attained showing a high front luminance (higher by ca. 50% than in the case of using a diffusion plate) but also a remarkably low luminance in the vicinity of viewing angle of ±45 deg. and again a higher luminance at a higher viewing angle. Such a luminance characteristic can be a fatal defect for a large area display panel expected to have a wide viewing angle characteristic. Thus, when the liquid crystal panel is viewed at a certain point in an oblique direction, the panel becomes too dark to see. The luminance characteristic not only provides an abrupt luminance change but also results in tinging of a display in a viewing angle direction coinciding with the oblique prism surface direction of the prism sheet 537 because of the reflection by the oblique surface.

In contrast thereto, in the case of using the diffusion plate 239, a luminance characteristic as represented by a curve A (FIG. 89) is attained. Thus, the front luminance enhanced by the prism sheet 537 is little attenuated. Further, the entire light emitted through the prism sheet is directed toward the front side within a viewing angle range of ±60 deg owing to the diffusive action of the diffusion plate 239, thus obviating a fall of luminance near a viewing angle of ±45 deg. Thus, by disposing the diffusion plate 239, it is possible to provide a large area planar distribution showing a high luminance and a good viewing angle characteristic.

Further, because of the presence of the diffusion plate 239, the prism pitch or the prism sheet becomes unnoticeable due to diffusion and no moire is caused between the liquid crystal panel P and the prism sheet 537.

Incidentally, when the transmitted light quantity from edge lamps was measured in two cases of using the diffusion plate 239 and using a transparent plate not subjected to matting, the former case provided a light quantity which was larger by 5% than in the latter case. This is because the non-matted transparent plate caused a partial reflectance of light from the light guide plate 531, thus reducing the transmitted light quantity by that much.

Further, as a result of experiment, the matting treatment for the diffusion plate 239 may preferably be finer and be applied in a thickness of 1.0 mm or more so as to provide a better viewing angle characteristic.

<Controller unit 572>

The controller unit 572 will be described with reference to FIG. 91.

Figure 91:
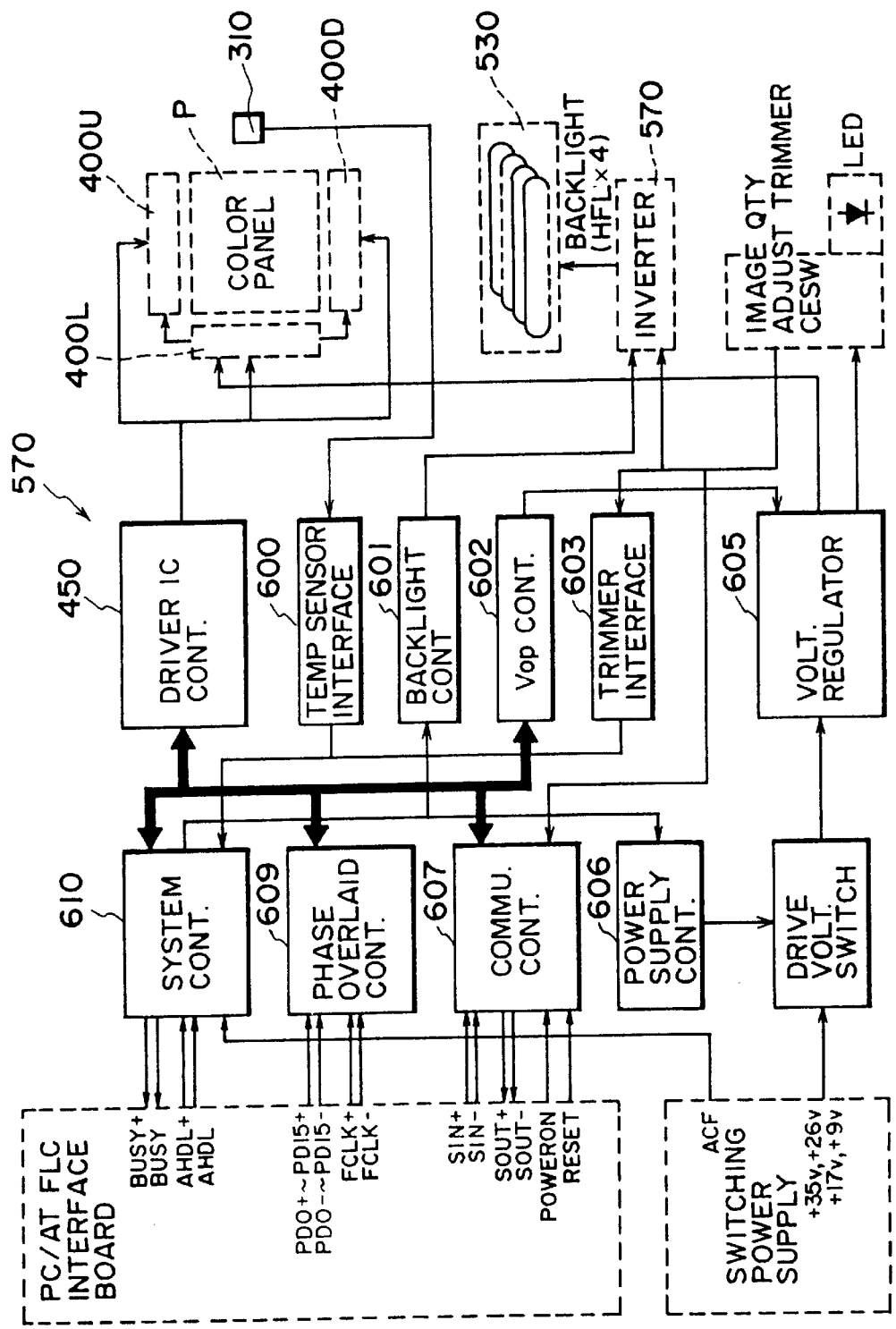
FIG. 91 is a block diagram showing an internal structure of a controller unit.

As shown in FIG. 91, the controller unit 572 includes a drive controller 450, a temperature sensor interface 600, a backlight controller 601, Vop controller 602, and an image adjustment trimmer interface 603.

Of these, the driver controller 450 is connected to the system controller 610 and is connected via the driver board 400 and the liquid crystal drive TAB 330 to the liquid crystal panel P to send out various signals as described above.

The temperature sensor interface 600 is connected with a thermistor 310 to effect a temperature detection and effect a temperature compensation based on the detected temperature.

The backlight controller 601 is connected to the inverter 570 and controls the inverter 570 to reduce the luminance of the backlight unit 530 when the liquid crystal panel P is not used for more than a prescribed period.

The Vop controller 602 controls the drive voltages, and the image adjustment trimmer interface 603 is designed to effect a trimmer unit control.

<Support structure>

Figure 93B:
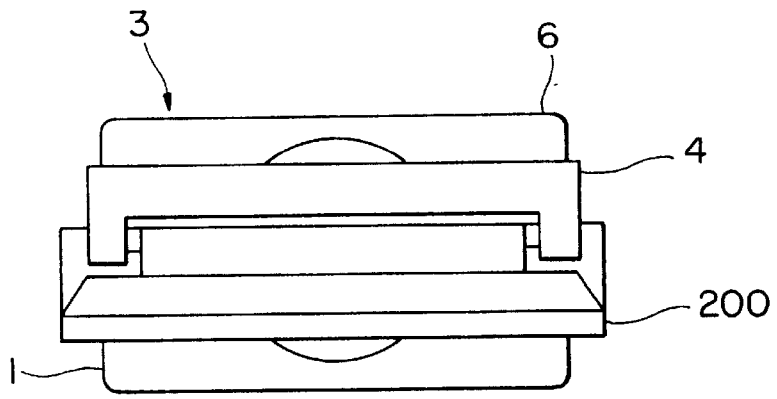
FIGS. 93A, 93B and 93C are a front view, a top plan view and a side view, respectively, of an entire liquid crystal display apparatus.
Figure 93A:
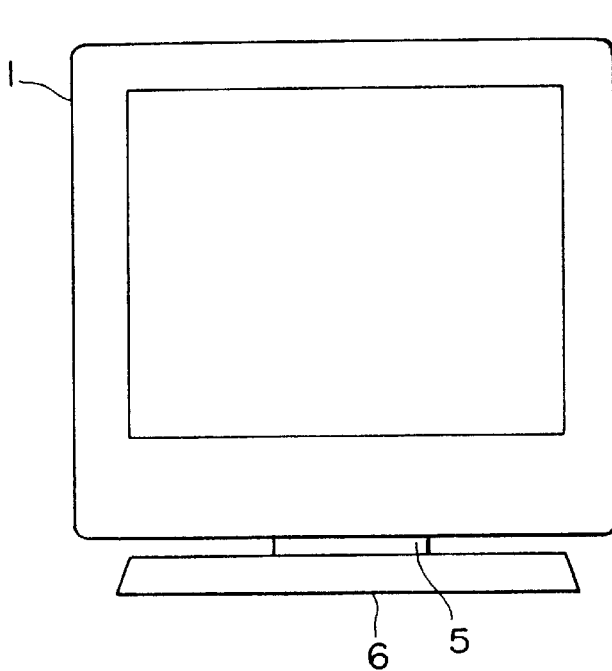
Figure 93C:
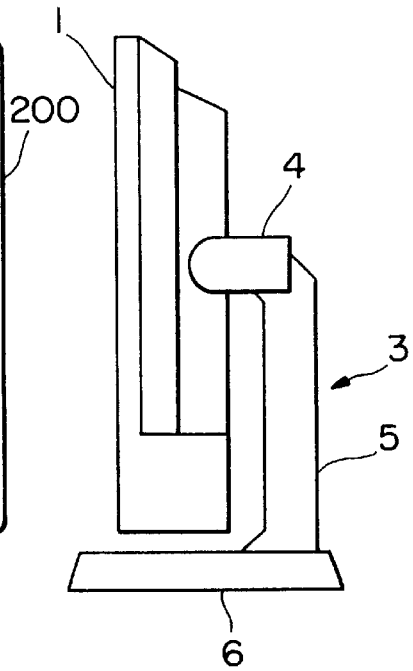

The display apparatus 1 according to this embodiment includes a display apparatus body 200 of the above-mentioned structure, which is supported by a support structure 3 as shown in FIGS. 93A–93C. The support structure 3 will be described hereinafter.

Figure 94:
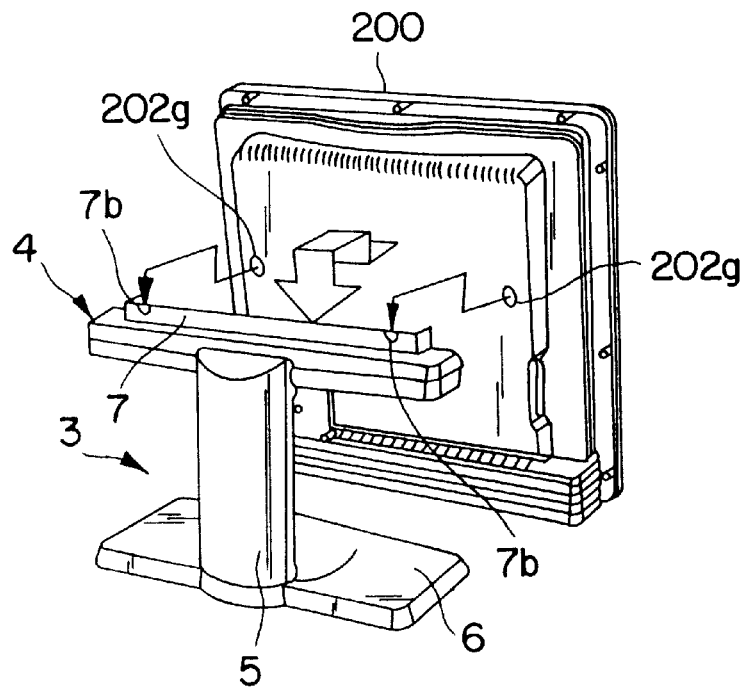
FIG. 94 is a perspective view for illustrating a manner of mounting and detaching of a display apparatus body on and from a tilting member of a support structure.
Figure 95:
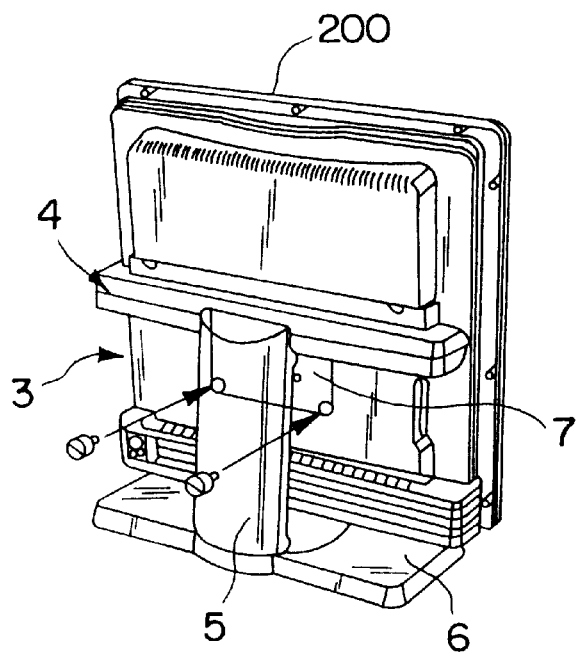
FIG. 95 is a perspective view showing a display apparatus body mounted on a tilting member.

As shown in FIGS. 94 and 95, the support structure 3 is formed in the shape of roughly a laterally fallen character "H" as viewed from its back side, and its rotation or tilting center (pivot) is positioned behind the gravity center of a combination of the support structure 3 and the display apparatus 200 mounted thereon. The support structure 3 supports the display apparatus body 200 so that the display apparatus body 200 can assume an arbitrary angular position (i.e., a face direction) within prescribed vertical and lateral angular ranges.

Figure 96:
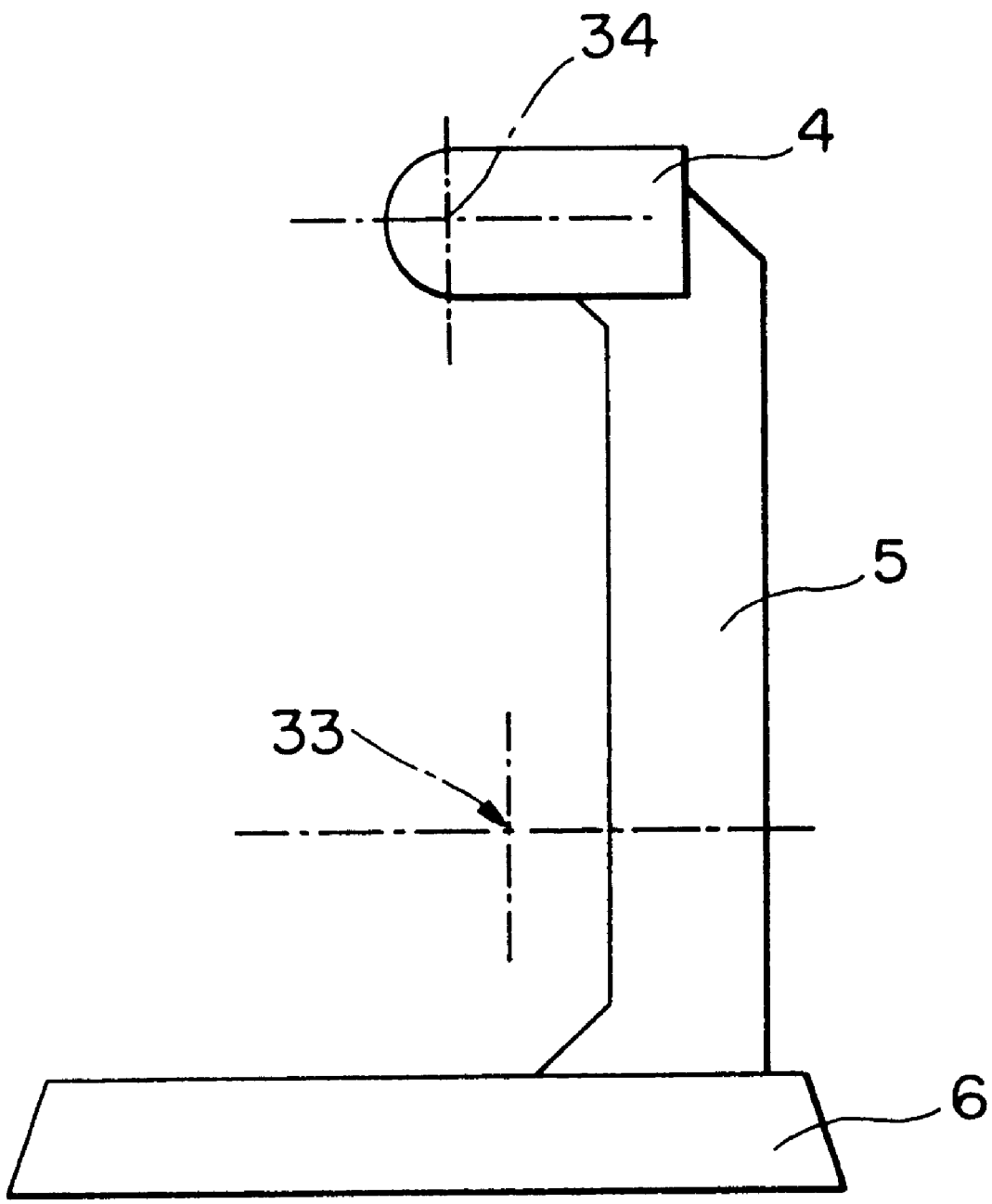
FIG. 96 is a side view of a support structure alone.
Figure 97:
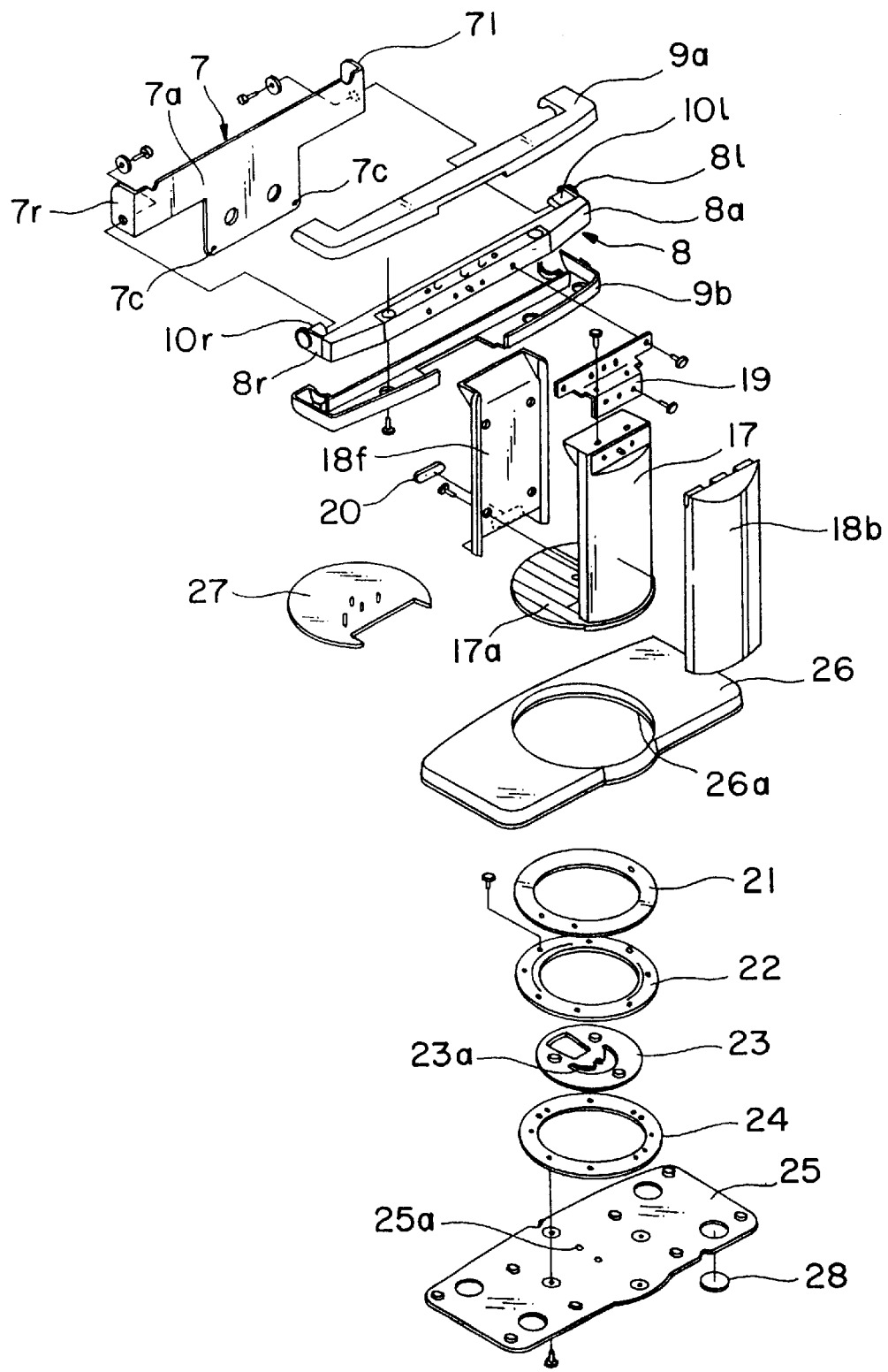
FIG. 97 is an exploded perspective view of the support structure.

The support structure 3 includes a support base 6 and a stand support 5 turnably secured to the support base 6 so as to be turnable laterally at an arbitrary angle within a prescribed range. At an upper end of the stand support 5, a display attachment member 4 for supporting the display apparatus body 200 thereon is laterally mounted. The support structure 3 is designed to have a gravity center 33 which is device backward in a horizontal direction than the rotation or tilting center (pivot) 34 in a state not mounted with the display apparatus body 200 as shown in FIG. 96 and has a gravity center shifted and deviated horizontally forward than the pivot 34 when mounted with the display apparatus 200. Further, as will be described later, the support structure 3 is designed to obviate unnecessary electromagnetic radiation from the display apparatus body.

First, the display attachment member 4 will be described.

Figure 101A:
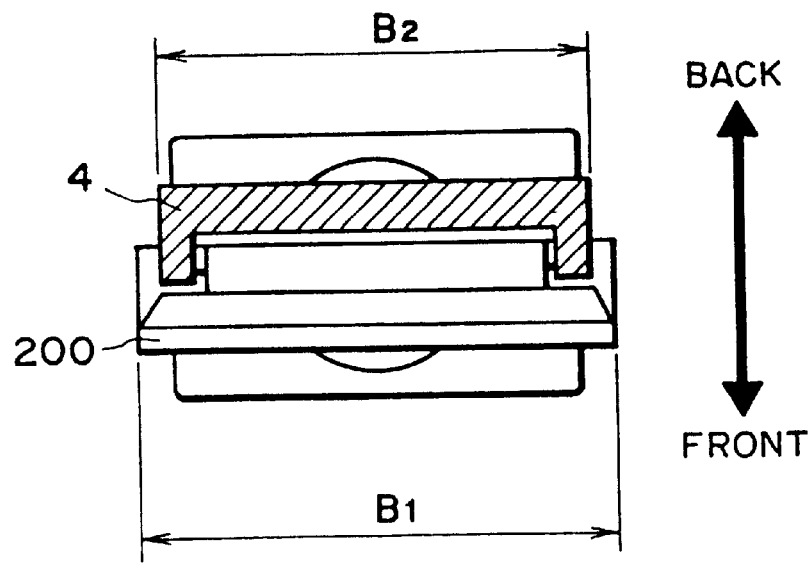
FIGS. 101A and 101B are a schematic plan view and a schematic side view, respectively, of a combination of a display apparatus body and a support structure for illustrating a size relationship.
Figure 101B:
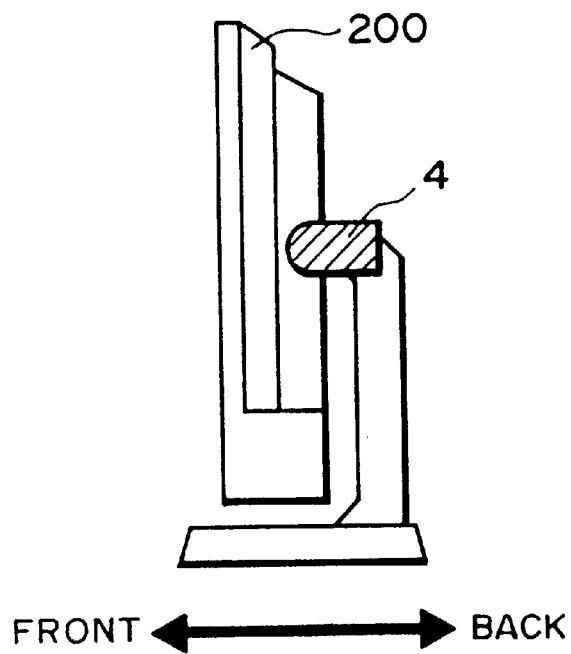
Figure 102A:
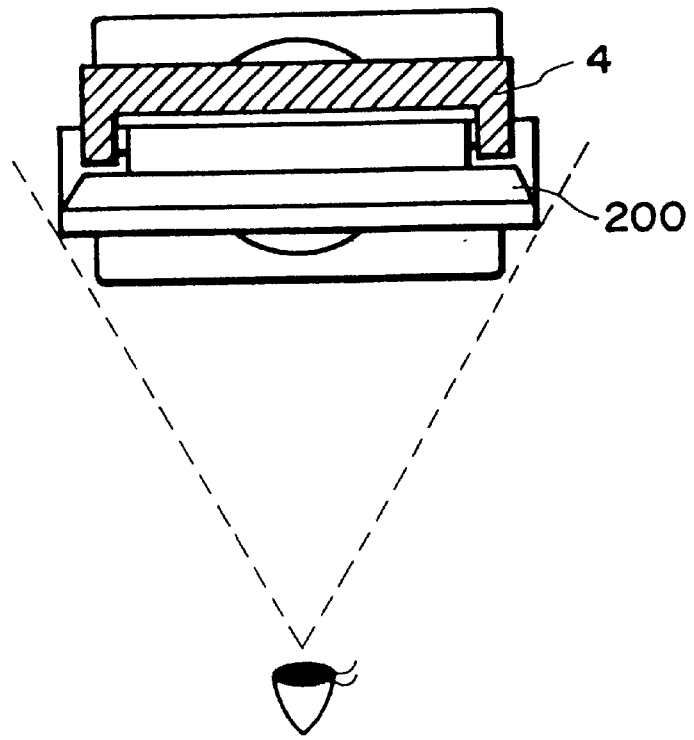
FIGS. 102A and 102B are a schematic plan view and a schematic side view, respectively, of a combination of a display apparatus body and a support structure for illustrating a positional relationship.
Figure 102B:
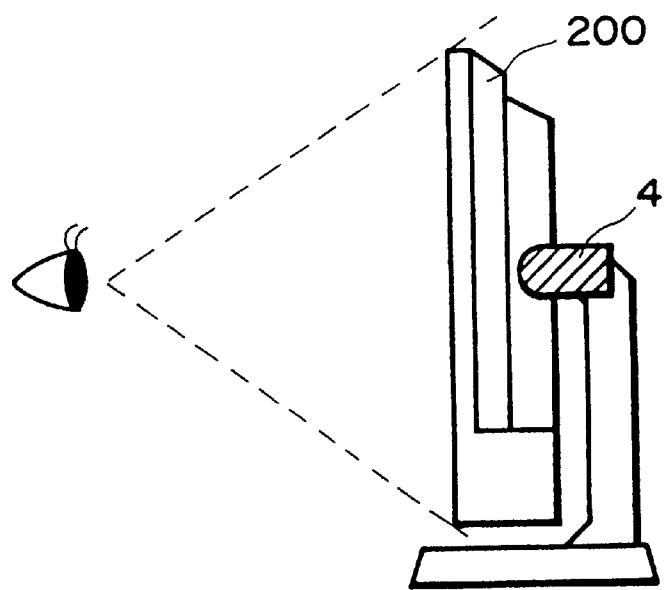

As shown in FIGS. 97 to 100, the display attachment member 4 includes a tilting member (display holder) 7 having a planar shape of "U", a support body disposed outside and parallely with the display holder 7, and a resistance force-adjusting mechanism (tilting mechanism) 10r and 10l for tilting the display holder 7 with respect to the support body. The display attachment member 4 is designed to have a lateral width B2 which is narrower than a lateral width B1 of the display apparatus body 200 (FIG. 101A) and a vertical length smaller than that of the display apparatus 200, so that the attachment member 4 is not observable when the display picture is viewed from the front of the display apparatus body 200 (FIGS. 200A and 200B). In other words, the display attachment member 4 is disposed within a whole projection area of the display apparatus body 200.

Figure 98:
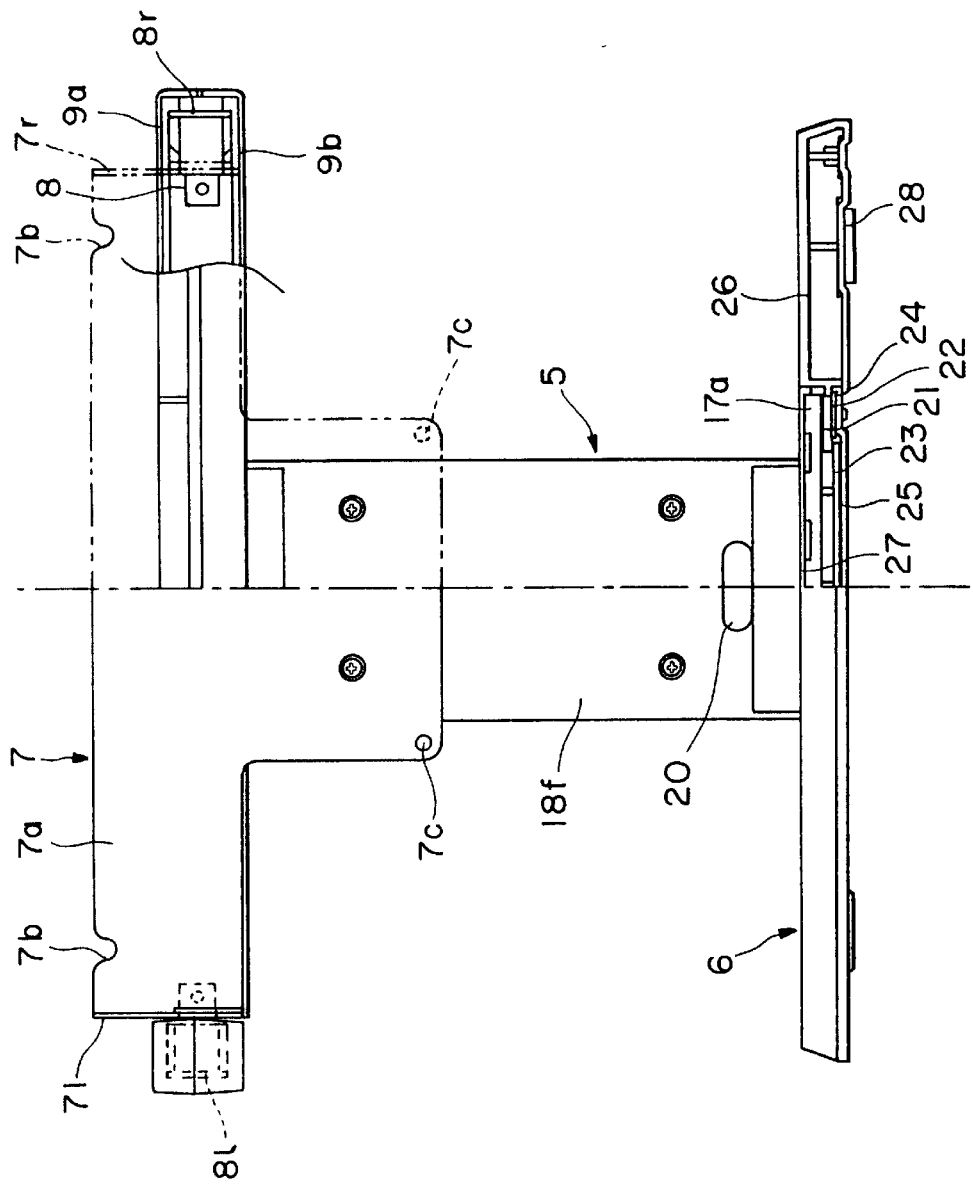
FIGS. 98, 99 and 100 are a front view, a side view and a plan view, respectively, of the support structure.
Figure 99:
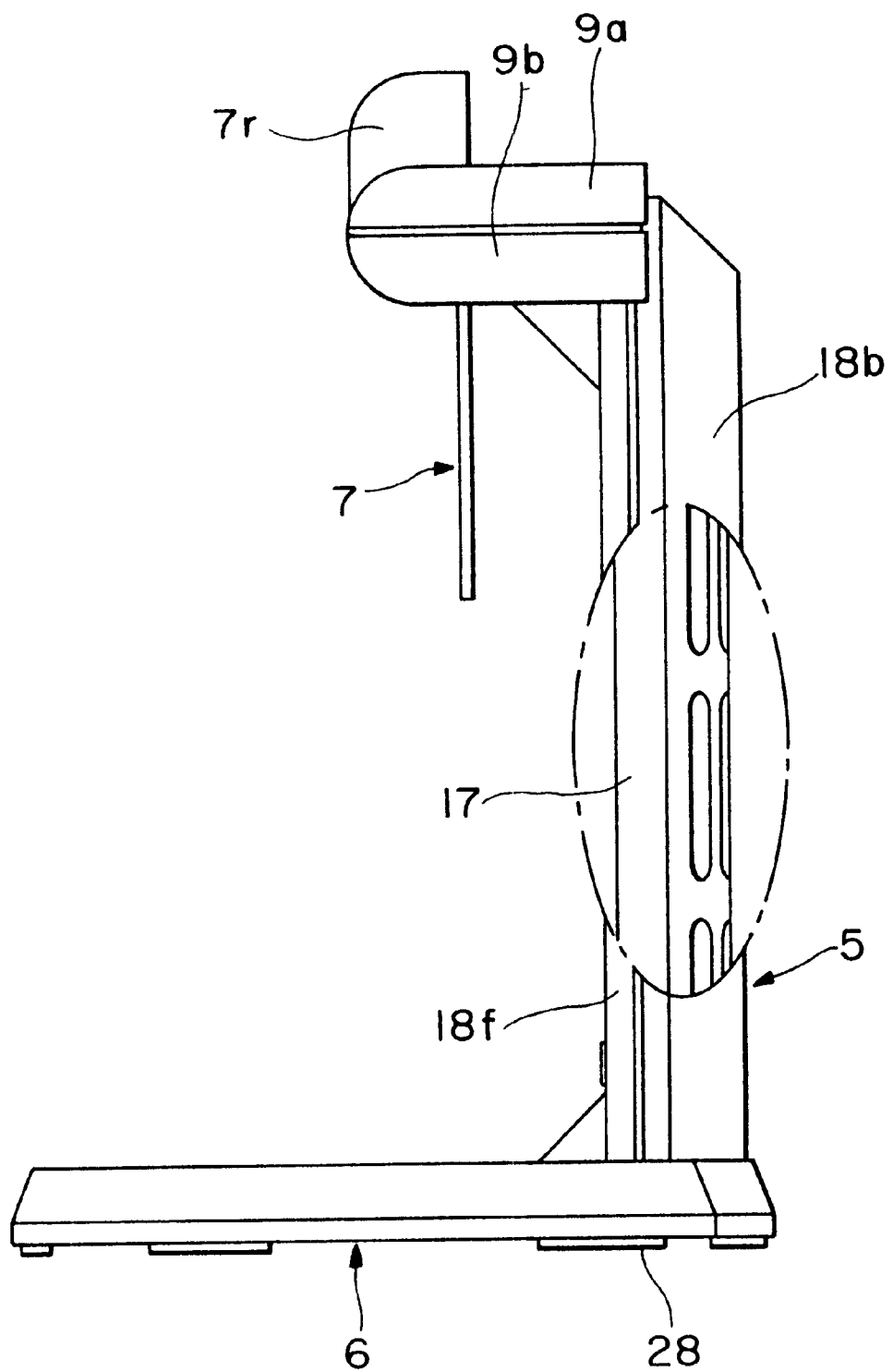
Figure 100:
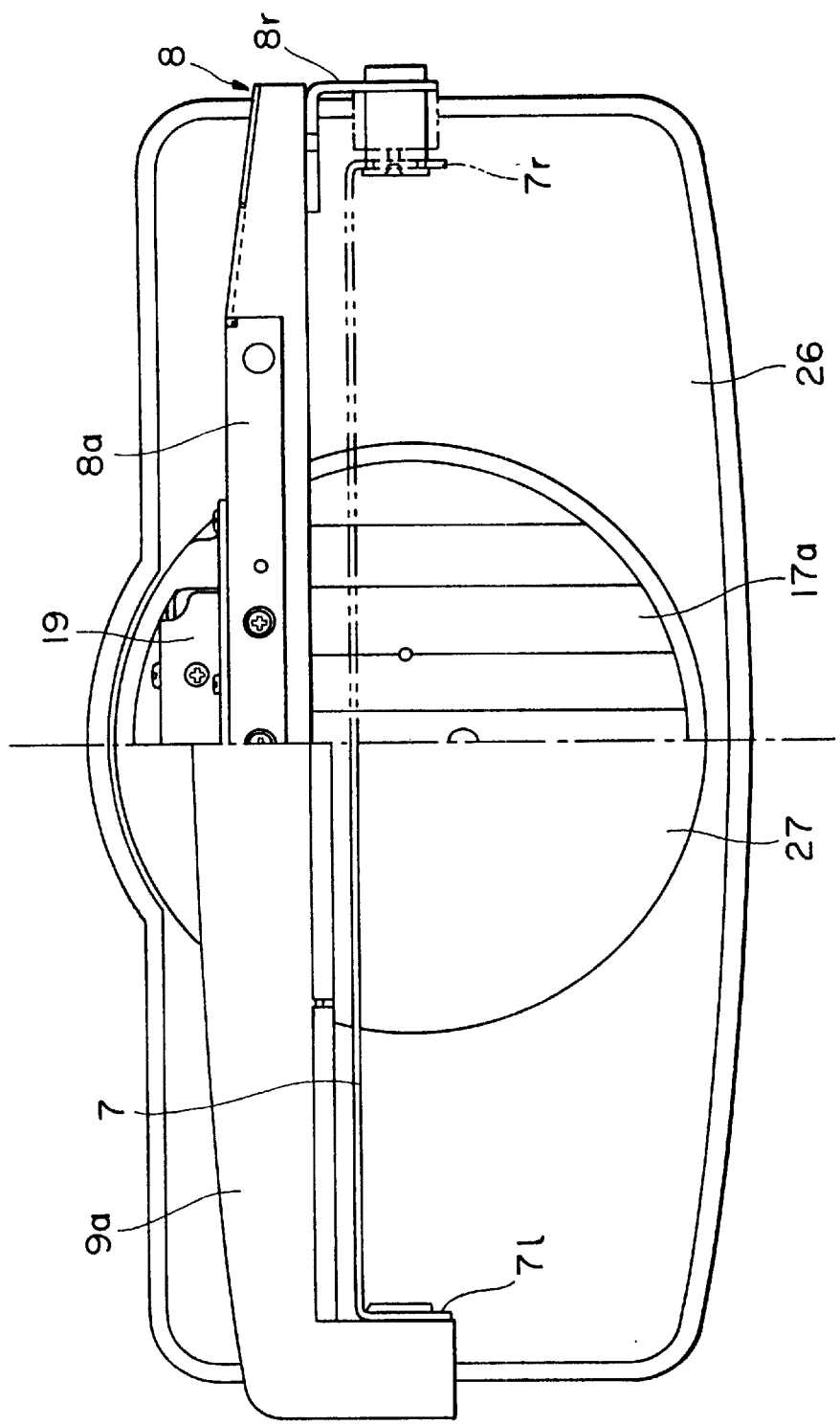

The display holder 7 comprises a metal member of, e.g., stainless steel for supporting the display apparatus body (FIGS. 93A–93C). As shown in FIG. 98, the display holder 7 is formed by leaving an intermediate portion 7a thereof so as to be disposed along the back of the display apparatus body 200 and bending both side end portions to be opposite to the sides of the display apparatus body 200 to form axis supporting parts 7r and 7l. At upper edge portions of the intermediate portion 7a, engagement recesses 7b for engagement with projecting pins 202g projecting out of the back of the display apparatus body 200 (FIG. 94) are formed. At lower portions of the intermediate member 7a, screw holes 7c for screwing the display holder 7 to the back of the display apparatus body 200 are provided.

The above-mentioned support body is formed by a support arm 8 and upper and lower arm covers 9a and 9b for covering the support arm 8 from above and below the arm 8. The upper and lower arm covers 9a and 9b may be formed of a synthetic resin material, such as an acrylonitrile-styrene-butadiene copolymer (ABS). The support arm 8 is formed to have a coupling portion or member 8a longer than the intermediate portion 7a of the display holder 7 and, at both lateral ends thereof, brackets 8r and 8l are formed integrally so as to be opposite to the axis supporting parts 7r and 7l.

As shown in FIG. 98, at the left and right ends respectively, the tilting mechanisms 10r and 10l are fitted between the axis supporting parts 7r, 7l of the display holder 7 and the brackets 8r, 8l of the support arm 8.

The right and left tilting mechanisms 10r and 10l respectively include a laterally disposed axis member 12, a rocking spring 13, and a bearing 14 holding one end of the rocking spring 13 and also functioning as a rotation stopper, so that the rocking springs 13 at both ends are disposed to have an identical winding direction. Further, the rotation or tilting center (pivot) of the axis member 12 is designed to be at a position shifted horizontally backward from the gravity center of the display apparatus when the display apparatus body 200 is mounted. The home position (normal position) of the display apparatus body may be arbitrarily set to a position with an inclination at an arbitrary angle within a prescribed angle range or a vertical position.

Figure 103A:
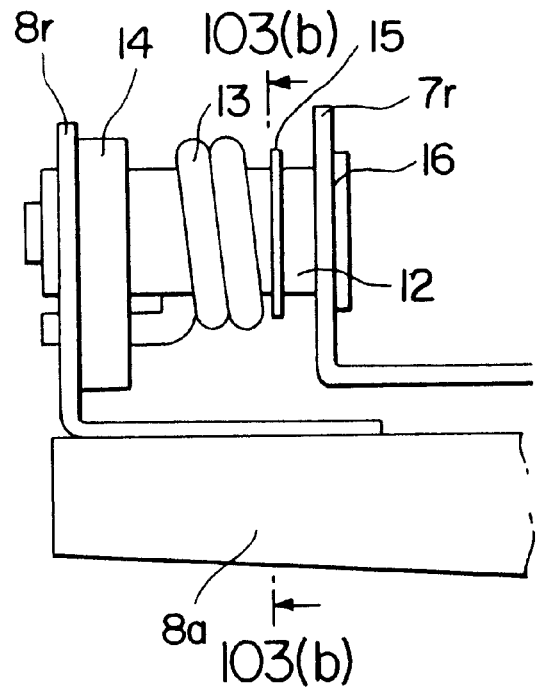
FIG. 103A is a partial plan view showing a tilting mechanism.
Figure 103B:
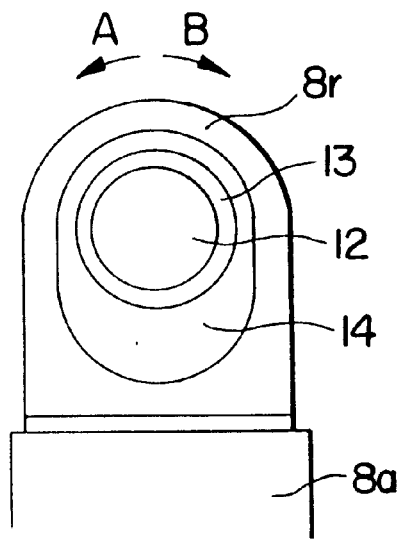
FIG. 103B is a sectional view taken along a line b—b in FIG. 103A.

The rocking spring 13 is formed to have an inner diameter smaller than the outer diameter of the axis member 12, and one end thereof extends through the stopper and bearing 14 to be engaged with the bracket 8r or 8l. The other end of the rocking spring 13 is made free whereas the elongation of the spring 13 is suppressed by a spring holder 15 through which the axis member 12 is inserted. The inner end of the axis member 12 is integrally screwed to the axis supporting port 7r (or 7l) via a washer 16, and the outer end thereof is rotatably supported by the stopper bearing 14 and the bracket 8r (or 8l). The rocking spring 13 is wound about the axis member 12 so that its inner diameter is enlarged when the display holder 7 is turned upward (in an arrow A direction in FIG. 103) and the inner diameter is decreased when the display holder is turned downward (in an arrow B direction in FIG. 103(b)).

Accordingly, the turning or tilting direction of the tilting mechanisms is downward in a case where the movement of the display apparatus body 200 coincides with the direction of a torque WX about the axis member 12 caused by a weight W of the display apparatus body and a bias X between the gravity center of the display apparatus 200 and the rotation center, and upward in the opposition direction. According to this definition, the tilting mechanisms 10r and 10l are designed to generate a resisting downward torque $Tr_1$ which is exerted by the tilting mechanisms in resistance to an operation for turning the display apparatus body upward by an arbitrary angle within a prescribed range, which torque $Tr_1$ is smaller than an upward torque $Tr_2$ which is exerted by the tilting mechanisms in response to an operation for turning the display apparatus body downward by an arbitrary angle within a prescribed range. Moreover, the difference $\Delta T$ (=$Tr_2$–$Tr_1$) between the upward torque $Tr_2$ and the downward torque $Tr_1$ may be set depending on the torque WX caused by the own weight of the display apparatus body 200. As a result, it is possible to reduce the difference in operation force between the upward operation and the downward operation. The torque difference $\Delta T$ may be given by a combination of the right and left tilting mechanisms.

Figure 112A:
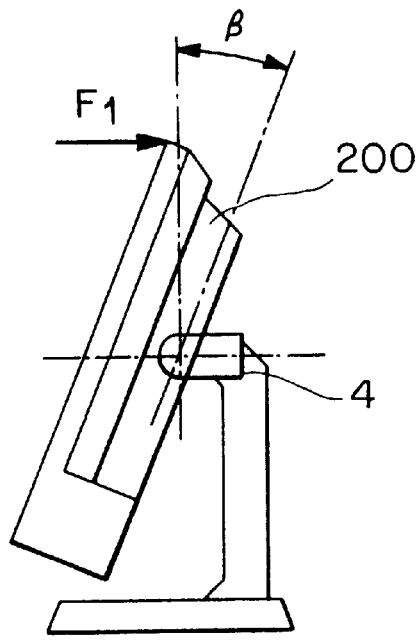
FIGS. 112(a)–112(c) are illustration of a display apparatus due to an up-and-down movement including FIG. 112(a) showing an upwardly inclinable range, FIG. 112(b) showing a downwardly inclinable range and FIG. 112(c) showing a home position, respectively, of a display apparatus body.
Figure 112B:
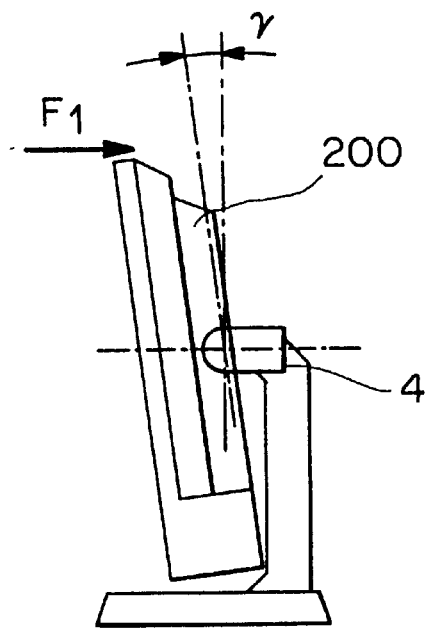

The display apparatus body 200 is designed to be tiltable by a prescribed angle β in the upward direction (FIG. 112A) and by a prescribed angle γ in the downward direction (FIG.

112B). In order to allow the upward tilt of angle β and the downward tilt of angle γ as described above, the coupling member 8a (or 8b) may be disposed at a position determined by the following formula (1) and (2), below.

Figure 112C:
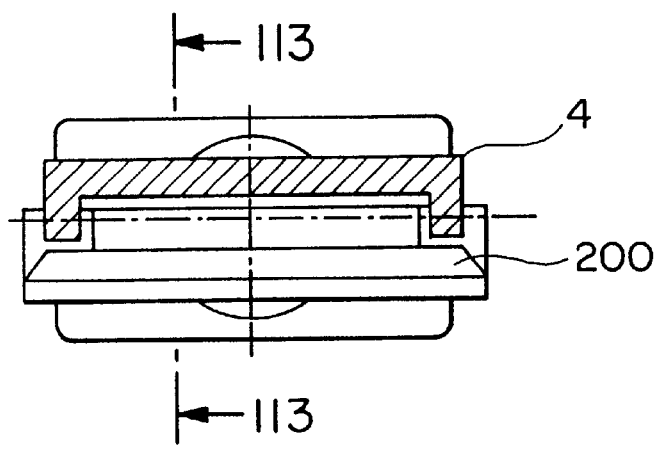
Figure 113:
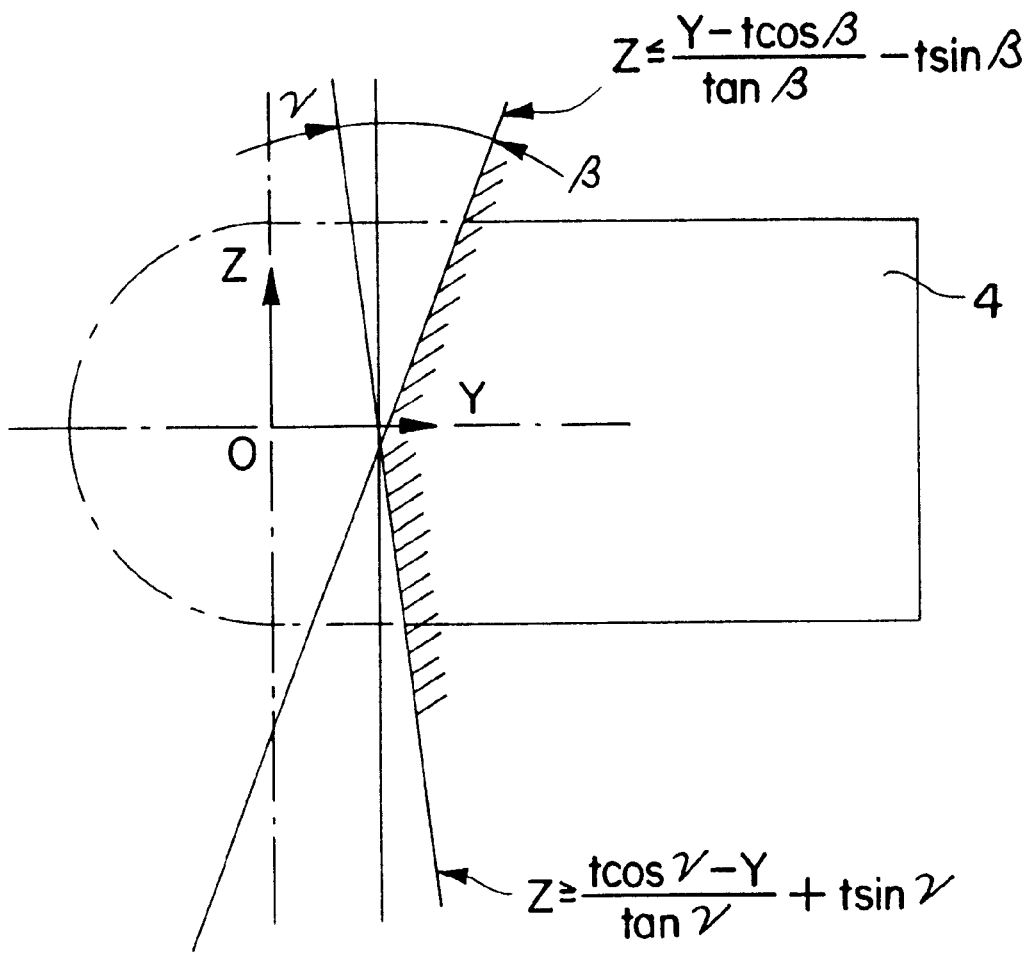
FIG. 113 is an illustration of an inclinable range of a section taken along a line A—A in FIG. 112(c).

More specifically, as shown in FIG. 113 which is a sectional view taken along a line 113—113 in FIG. 112C, the position of the axis member 12 is taken as the origin, the forward-backward direction is taken on a Y-axis and the vertical direction is taken on a Z-axis to define a Y-Z coordinate system. Then, the upward and downward tiltable angles of the display panel of the display apparatus 200 are denoted by β and γ, respectively, and the distance between the rear surface of the display apparatus body 200 and the axis member 12 in the horizontal direction is denoted by t. Then, the upward tiltable angle β is given by:

$$Z \leq \{(Y - t\cdot\cos\beta)/\tan\beta\} - t\cdot\sin\beta \qquad (1),$$

and the downward tiltable angle is given by:

$$Z \geq \{(t\cdot\cos\gamma - Y)/\tan\gamma\} + t\cdot\sin \qquad (2).$$

More specifically, the upward tiltable angle β may be set at 20 deg., and the downward tiltable angle may be set at 5 deg. Based on the above formulae (1) and (2), it is possible to determine the allowable maximum size and strength of the support arm 8 and the upper and lower arm covers 9a and 9b for storing the tilting mechanisms 10r and 10l.

In the state where no operational force for changing the tilt angle is applied to the display apparatus body 200 and the display apparatus body 200 is in its home position, the tilting mechanisms 10r and 10l are designed so that the own weight W of the display apparatus body 200 causes a torque about the axis member 12 due to a forward bias of the gravity center acting in a direction to tightly winding the rocking spring 13 to reduce the inner diameter of the spring 13, thereby tightly holding the axis member 12.

Figure 104:
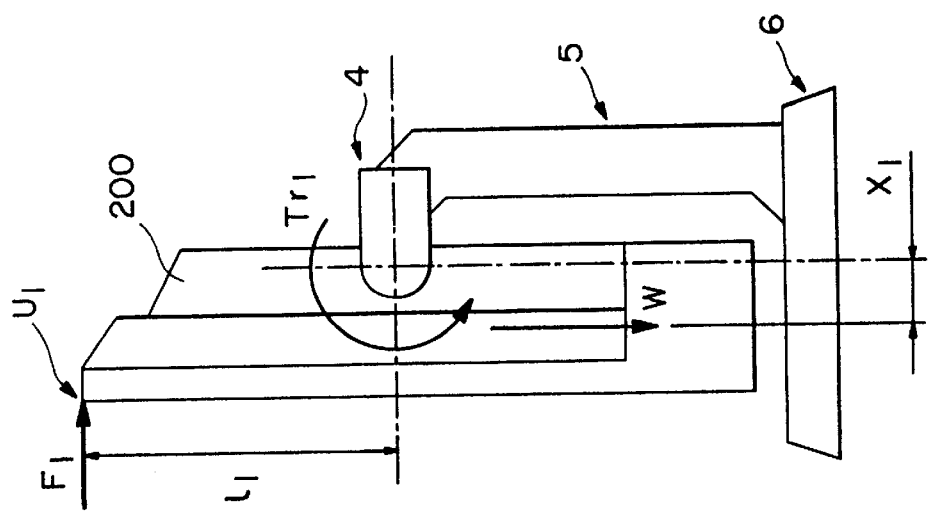
Figure 114:
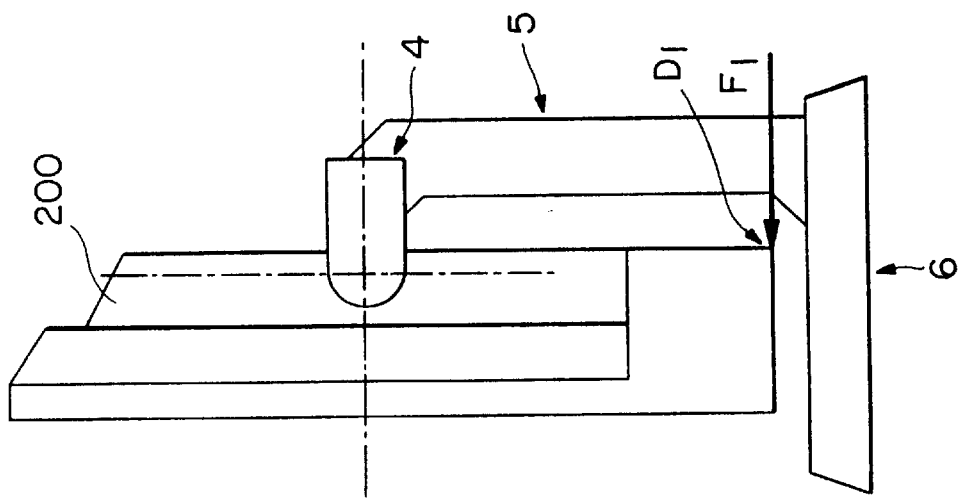
FIGS. 114 and 115 are schematic side views showing points of application at an upper end and a lower end, respectively, of a display apparatus body mounted on a support structure.

Referring to FIG. 114, when an upper application point $U_1$ of the display apparatus body 200 placed in its vertical home position is pushed at an operation force $F_1$ exceeding a prescribed value to tilt the display apparatus body 200 upwards, the tilting mechanisms 10r and 10l are so designed that the axis member 12 is turned via the display holder 7 relative to the rocking spring 13, thereby enlarging the inner diameter of the rocking spring 13 to reduce the pressure contact force acting onto the axis member 12. As a result, when the display apparatus body 200 is tilted or turned upward, the downward resisting torque $Tr_1$ is reduced to relatively increase the upward tilting operational force $F_1$ than the downward resisting torque $Tr_1$ and the downward torque due to the own weight of the display apparatus body 200, thereby facilitating the upward turning or tilting of the display holder 7 (FIG. 104).

Figure 105:
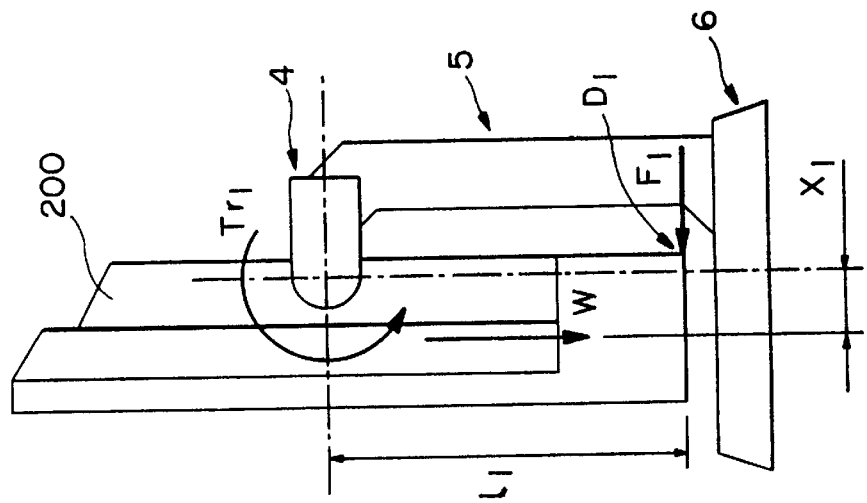
FIGS. 104–107 are respectively a schematic side view of a display apparatus for illustrating an operation when an operation force is applied to an indicated application point (corresponding to those shown in FIGS. 114, 115, 117 and 118, respectively).
Figure 115:
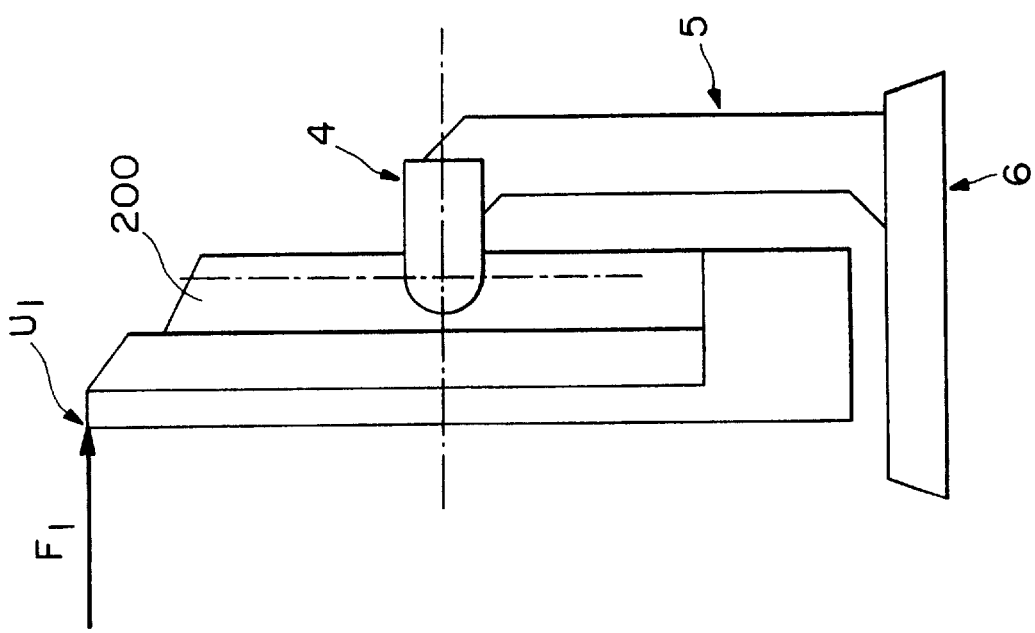

Similarly, referring to FIG. 115, when a lower application point $D_1$ of the display apparatus body 200 placed in its vertical home position is pushed at an operation force $F_1$ exceeding a prescribed value to tilt the display apparatus body 200 upwards, the tilting mechanisms 10r and 10l are so designed that the axis member 12 is turned via the display holder 7 relative to the rocking spring 13, thereby enlarging the inner diameter of the rocking spring 13 to reduce the pressure contact force acting onto the axis member 12. As a result, when the display apparatus body 200 is tilted or turned upward, the downward resisting torque $Tr_1$ is reduced to relatively increase the upward tilting operational force $F_1$ than the downward resisting torque $Tr_1$ and the downward torque due to the own weight of the display apparatus body 200, thereby facilitating the upward turning or tilting of the display holder 7 (FIG. 105).

Figure 116:
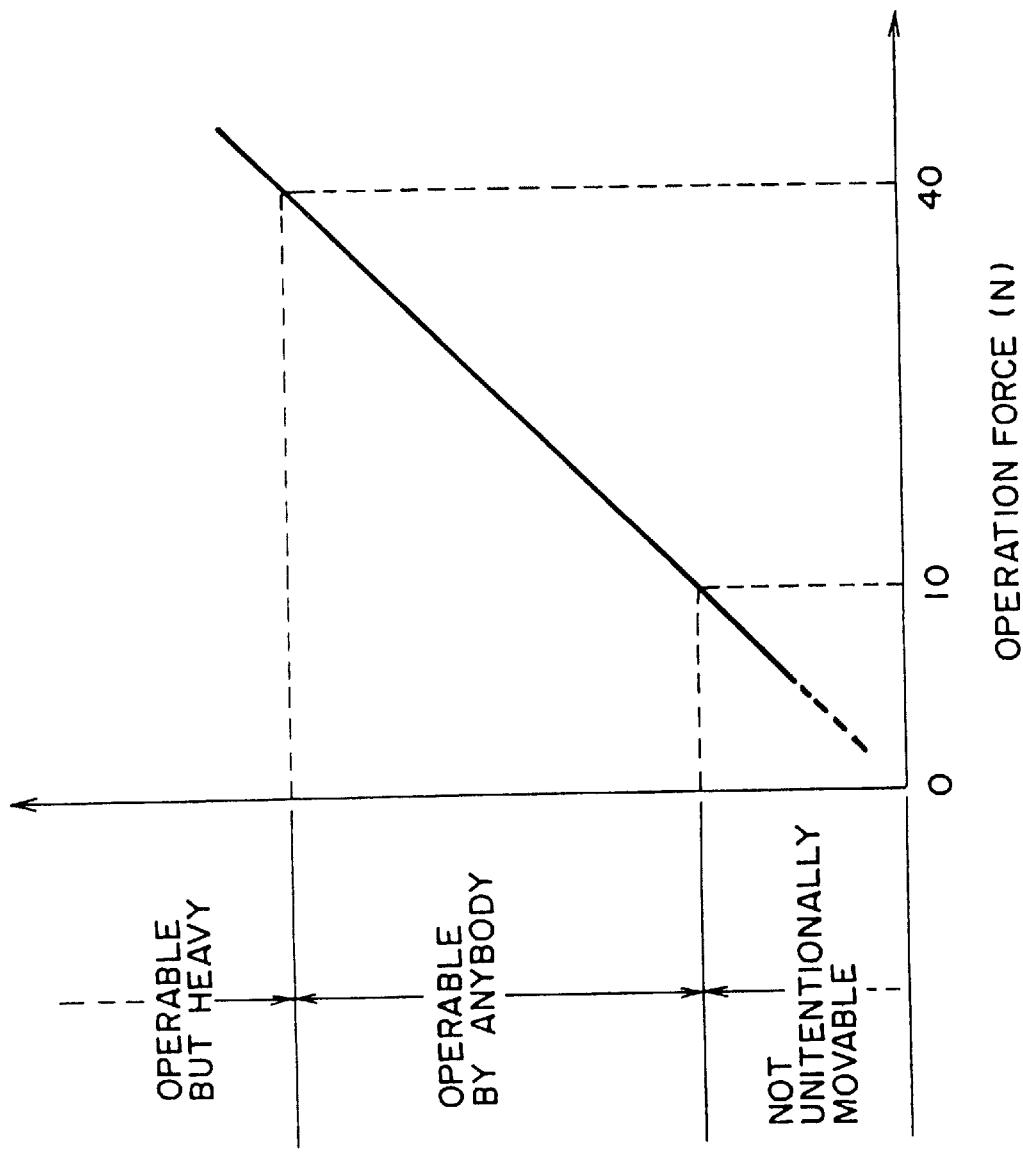
FIG. 116 is a view for illustrating a set range for operation force.

In this instance, if too large an operational force $F_1$ is required as shown in FIG. 116, the upward turning of the display apparatus body 200 becomes difficult by a human force, so that the upper limit of $F_1$ may be set to 40 N (Newton) as a range of force of readily exertable as a human force. On the other hand, if operational force $F_1$ is too small, the display apparatus body 200 is turnable at an unintentionally applied force, so that the lower limit of $F_1$ may be set to 10 N.

On the other hand, the downward torque $Tr_1$ occurring at the time of enlarging the rocking spring 13 and the vertical length $l_1$ from the axis member 12 to the action point $U_1 (D_1)$ are determined values, and the operational force $F_1$ is set within a prescribed range, so that the bias length $X_1$ from the axis member 12 to the gravity center of the display apparatus body 200 may be determined by the following equation (3):

$$X_1 = (F_1 l_1 - Tr_1)/W \qquad (3).$$

As a more general consideration, the display apparatus body 200 is not necessarily in a vertical position. In a case where the axis member 12 is at a backwardly deviated position relative to the gravity center at any tilting state of the display apparatus body 200, the following equation (4) is given:

$$F_1 \{Tr_1 + W(X \cos\alpha + l_2 \sin\alpha)\}/(l_1 \cos\alpha + X_3 \sin\alpha) \qquad (4),$$

wherein $l_2$ denotes a vertical length between the axis member 12 and the gravity center of the display apparatus body 200;

$X_3$ denotes a deviation between the axis member 12 and the application point $U_1$ (or $D_1$); and α denotes a turning angle of the display apparatus body 200 in upward and downward directions (the sign is taken as positive for an upward turning).

In this instance, the operational force $F_1$ for turning or tilting the display apparatus body 200 may be set within the range of $10 \leq F_1 \leq 40$.

Figure 106:
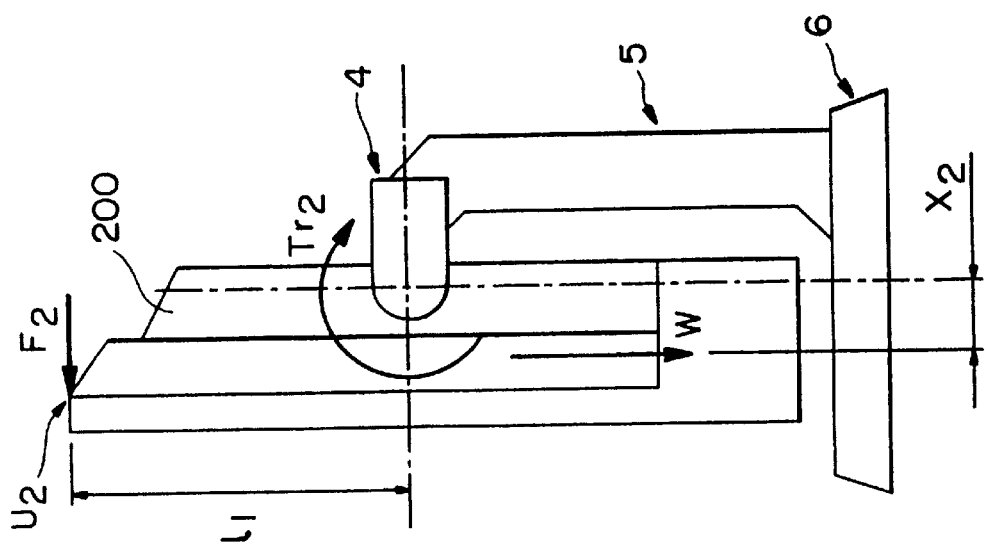
Figure 117:
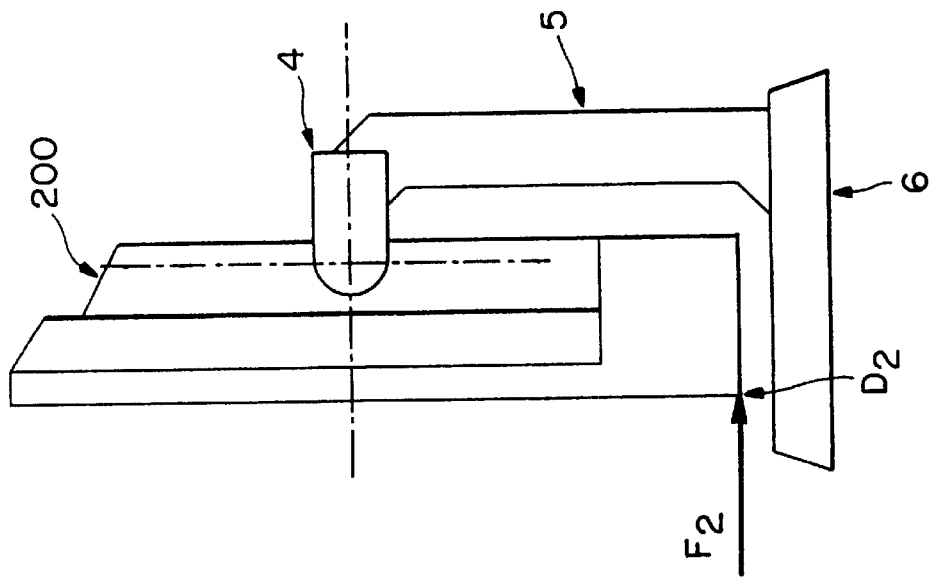
FIGS. 117 and 118 are schematic side views showing points of application at an upper end and a lower end, respectively, of a display apparatus body mounted on a support structure.

As a further consideration, referring to FIG. 117, when an upper application point $U_2$ of the display apparatus body 200 placed in its vertical home position is pushed at an operation force $F_2$ exceeding a prescribed value to tilt the display apparatus body 200 downwards, the tilting mechanisms 10r and 10l are so designed that the axis member 12 is turned via the display holder 7 relative to the rocking spring 13, thereby reducing the inner diameter of the rocking spring 13 to increase the pressure contact force and frictional force acting onto the axis member 12. However, as the moment based on the own weight of the display apparatus body 200 is added to the operation $F_2$ to exceed the upward resisting torque $Tr_2$, the display apparatus body 200 can be turned downward (FIG. 106).

Figure 107:
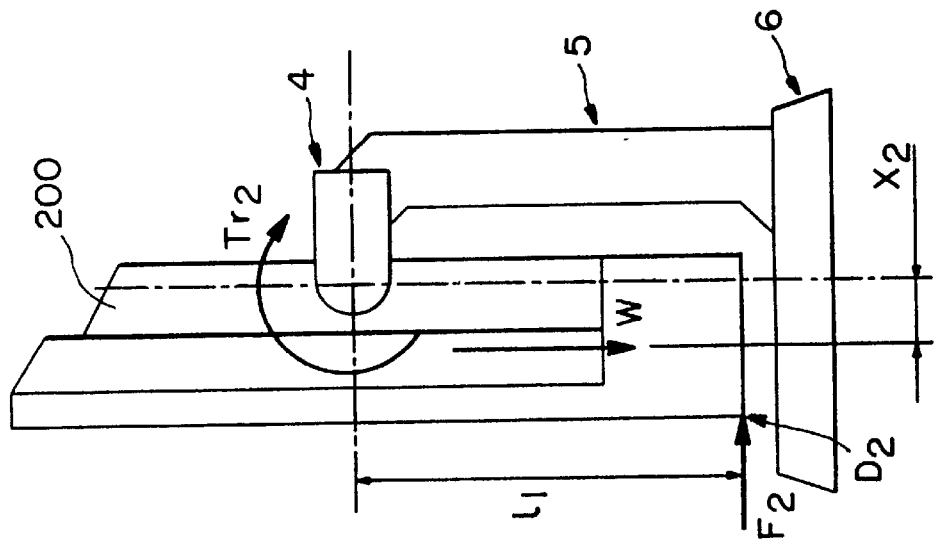
Figure 118:
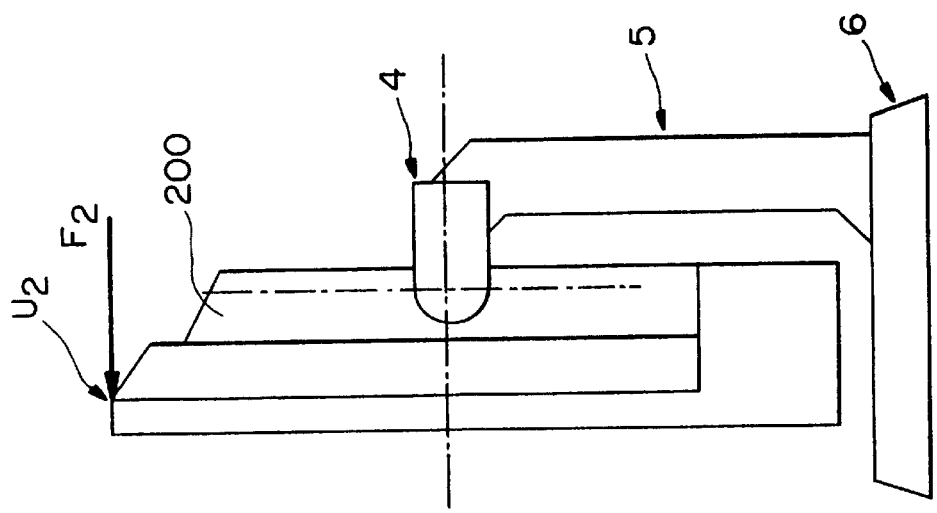

Similarly, referring to FIG. 118, when a lower application point $D_2$ of the display apparatus body 200 placed in its vertical home position is pushed at an operation force $F_2$ exceeding a prescribed value to tilt the display apparatus body 200 downwards, the tilting mechanisms 10r and 10l are so designed that the axis member 12 is turned via the display holder 7 relative to the rocking spring 13, thereby reducing the inner diameter of the rocking spring 13 to increase the pressure contact force and frictional force acting onto the axis member 12. However, as the moment based on the own weight of the display apparatus body 200 is added to the operation $F_2$ to exceed the upward resisting torque $Tr_2$, the display apparatus body 200 can be turned downward (FIG. 107).

In this instance, if too large an operational force $F_2$ is required as shown in FIG. 116, the downward turning of the display apparatus body 200 becomes difficult by a human force, so that the upper limit of $F_2$ may be set to 40 N (Newton) as a range of force of readily exartable as a human force. On the other hand, if operational force $F_2$ is too small, the display apparatus body 200 is turnable at an unintentionally applied force, so that the lower limit of $F_2$ may be set to 10 N.

On the other hand, the upward torque $Tr_1$ occurring at the time of reducing the rocking spring 13 and the vertical length $l_1$ from the axis member 12 to the application point $U_1$ ($D_1$) are determined values, and the operational force $F_2$ is set within a prescribed range, so that the bias length $X_1$ from the axis member 12 to the gravity center of the display apparatus body 200 may be determined by the following equation (5):

$$X_2=(Tr_2-F_2l_1)/W \qquad (5).$$

By setting the bias length X to a smaller one of $X_1$ and $X_2$, it is possible to prevent an unnecessarily large increase of torque WX due to the own weight.

As a more general consideration, the display apparatus body 200 is not necessarily in a vertical position. In a case where the axis member 12 is at a backwardly deviated position relative to the gravity center at any tilting state of the display apparatus body 200, the following equation (6) is given:

$$F_2=\{Tr_2+W(X\cos\alpha+l_2\sin\alpha)\}/(l_1\cos\alpha+X_3\sin\alpha) \qquad (6).$$

By setting the dimensions of the associated members so as to satisfy $10 \leq F_1$ and $F_2 \leq 40$ based on the equations (4) and (6), it is possible to ensure a smooth tilting operation from any (tilting) position of the display apparatus body 200.

<Stand support 5>

As shown in FIGS. 97–100, the stand support 5 includes a post member 17 having a turnable base 17a at its root and a front post cover 18f and a rear post cover 18b covering the post member 17. The post member 17 may be formed from an unsaturated polyester resin compound of bulk-molding type, and the front and rear post covers 18f and 18h are formed from acrylonitrile-styrene-butadiene copolymer (ABS).

At the upper end of the post member 17, an arm support plate 19 is attached and, at a lower part of the front post cover 18f, a stopper 20 is attached so as to be abutted by the lower end of the display apparatus body 200 when the body is tilted downward.

Figure 119:
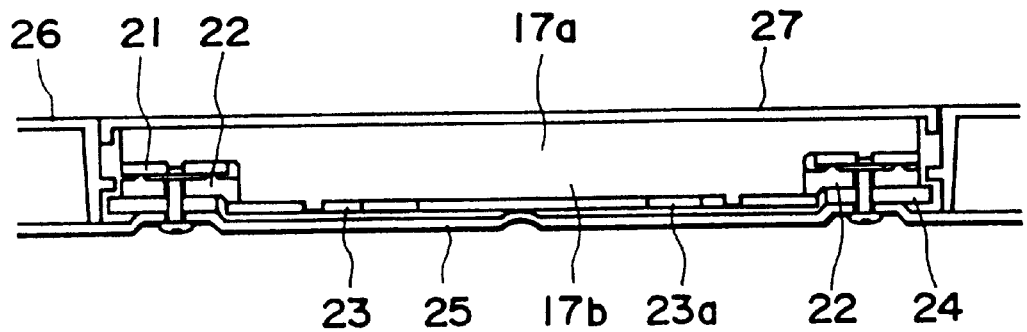
FIGS. 119–121 are sectional views taken along line 119—119, line 120—120 and line 121—121, respectively, shown in FIG. 122.
Figure 120:
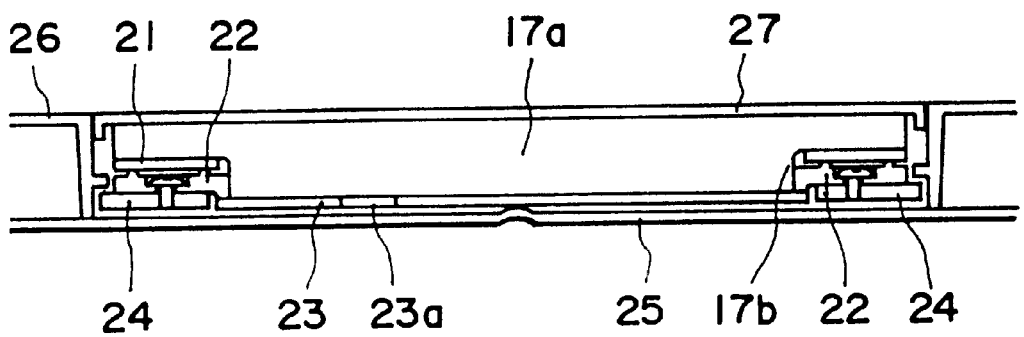
Figure 121:
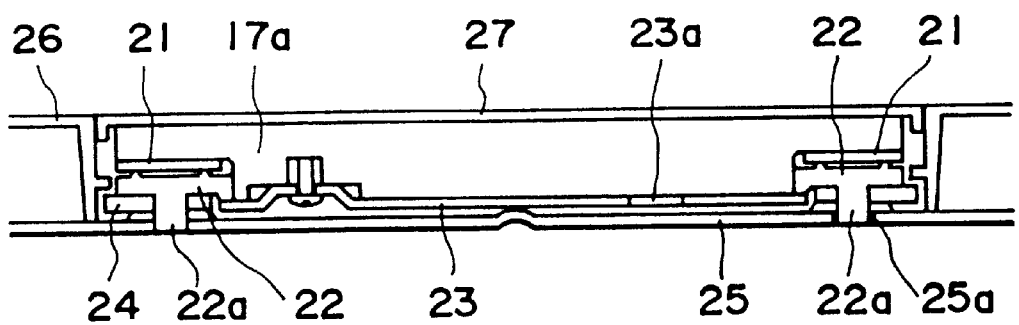

As shown in FIGS. 119–121, the lower surface of the turnable base 17a is provided with an axial projection 17b at its center and, along the periphery of the lower surface of the turnable base 17a, a fixed ring 21 of a metal, such as stainless steel, and a horizontal turn-assist ring 22 of polyacetal resin (assisting the turning of a post member-fixed plate combination) are arranged in this order. These members are inserted by the axial projection 17b. The fixed ring 21 is fixed surrounding the lower surface of the turnable base 17a. At the center of the lower surface of the turnable base 17a, a post member stopper plate 23 shown in FIG. 122 having an outer diameter slightly larger than the inner diameter of the horizontal turn-assist ring 22 as shown in FIGS. 119–121 is attached, and the horizontal turn-assist ring 22 is inserted between the post member stopper plate 23 and the fixed ring 21. The horizontally turn-assist ring 22 is fixed to an assist ring support plate 24 as shown in FIG. 120, and the horizontally turn-assist ring 22 and the ring support plate 24 are fixed to the stand base 25 as shown in FIG. 119.

Figure 122:
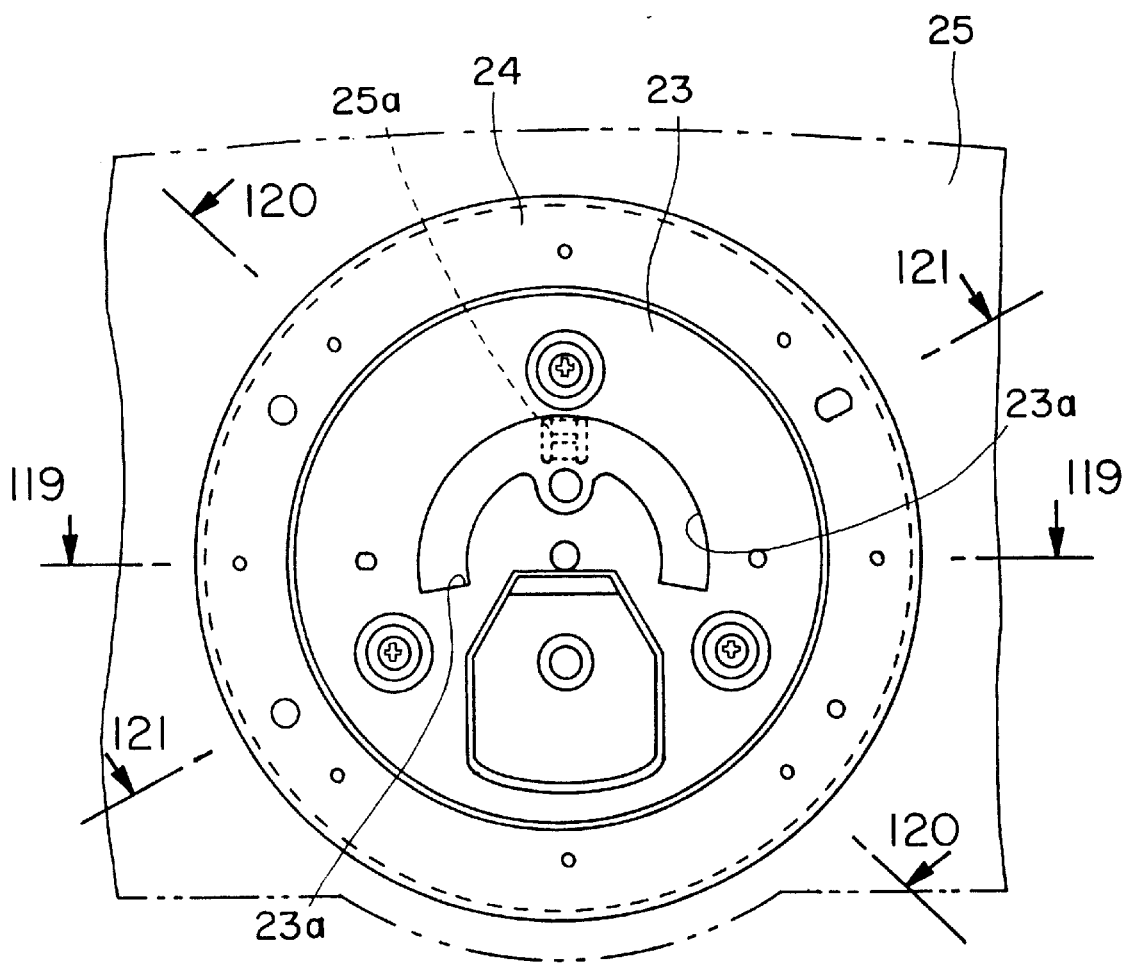
FIG. 122 is a plan view showing a post member-stopper plate.

The lower surface of the turn-assist ring 22 is provided with a plurality of bosses 22a as shown in FIG. 121 so as to facilitate the assemblage of the turn-assist ring 22 and the stand base 25, so that the bosses 22a are fitted into fitting holes 25b formed in the stand base 25 through the turn-assist ring support plate 24. Further, the post member stopper 23 is provided with a crescent-shaped aperture 23a as shown in FIG. 122.

In the above-described stand support 5, a turnable combination of the post member 17 and a disk-like member including the fixed ring 21 and the post member stopper plate 23, and a combination of the horizontal turn-assist ring 22, the assist ring support plate 24 and the stand base 25, are respectively integrated and separately turnable relative to the other. More specifically, a sliding surface is given between the fixed ring 21 and the horizontal turn-assist ring 22. For this reason, the horizontally turnable ring 22 may be composed of polyacetal showing good self-lubricity to exhibit good slidability relative to the fixed ring 21 which is actually turnable together with the post member 17.

As described above, the support structure 3 is formed by securing the stand support 5 horizontally or laterally turnable within an prescribed angle range relative to the support base 6 and attaching the display attachment-member 4 so as to be tiltable up- and downwardly to the stand support 5, whereby the display apparatus body 200 is mounted securely onto the display attachment member 4. On the other hand, display apparatus body 200 is supplied with electricity for displaying information or data inputted, e.g., from a key board of a main electronic apparatus. For this purpose, a cable 31 including a power cable and an interface cable has to be connected to the display apparatus body 200.

Figure 123:
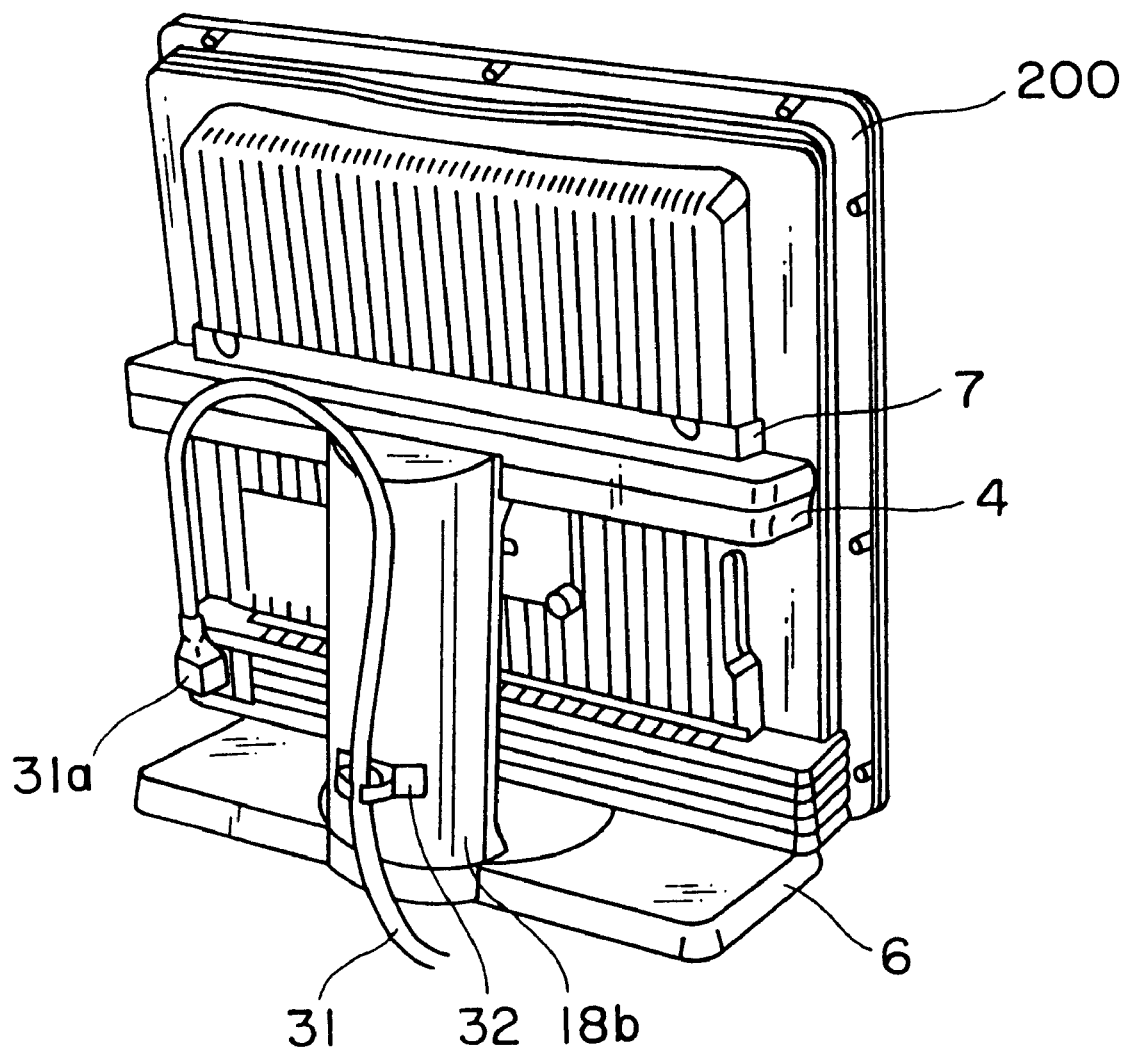
FIG. 123 is a rear perspective view of a display apparatus.

Accordingly, in the display apparatus 1 equipped with the support structure 3 according to this embodiment shown in FIG. 123, a character C-shaped clamp 32 as a cable clamping member is projectively attached to a lower part of the rear post cover 18b of the stand support 5 so as to prevent difficulties accompanying the provision of the cable 31, including the disorder of surrounding materials, such as cup and vases, on a place (such as a desk), and the insertion of the cable below the support stand 6.

As a result, as shown in FIG. 123, the plug 31a of the cable 31 may be connected to a socket disposed on the back of the display apparatus body 200 while forming a loop with an intermediate portion of the cable 31 to clamp a part of the cable 31, whereby the connection from the other appliances to the display apparatus body 200 is ensured without causing disorder by the cable. For example, as the display apparatus body 200 is laterally turned integrally with the stand support 5, the cable neatly affixed to the stand support 5 is not moved vigorously to cause disorder or impair the stability of the support structure 3.

<Support base 6>

Figure 124:
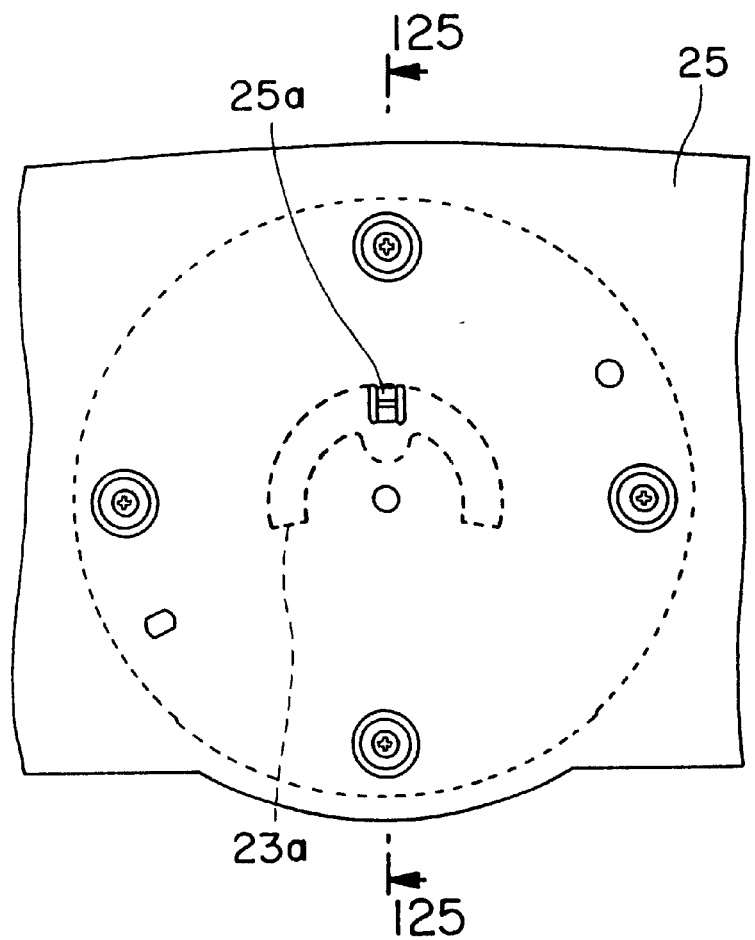
FIG. 124 is a bottom plan view of a support stand base.
Figure 125:
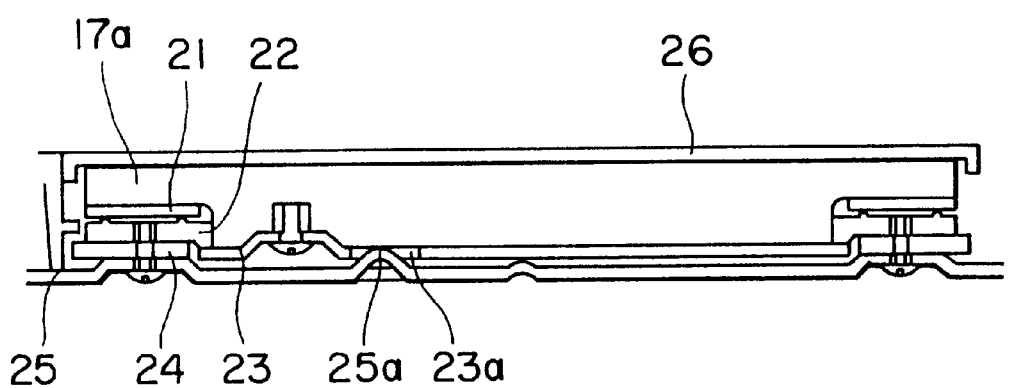
FIG. 125 is a sectional view taken along line 125—125 in FIG. 124.

The support base 6 is formed by covering the stand base 25 to which the horizontal turn-assist ring 22 and the assist ring support 24 are fixed as shown in FIG. 124 with a base cover 26. The stand base 25 is provided with a projection 25a to be engaged with the aperture 23a of the post member stopper plate 23 shown in FIG. 122 (FIG. 125). As a result of an association between the projection 25a and the aperture 23a, the laterally turnable range of the stand support 5 is regulated.

The base cover 26 is provided with an turnable base-accommodable aperture 26 (FIG. 97) through which the turnable base 17a is inserted, and a turning member cover 27 is fitted into the aperture 26 to close the aperture 26.

The stand base 25 is further provided with a stoppage prevention seat 28 of, e.g., rubber or sponge, attached at its four corners so as to prevent the movement of the stand base accompanying the lateral turning of the stand support 5.

To the support structure 3 of this embodiment, a relatively heavy display apparatus body 200 may be attached, it is necessary to take care of ensuring the stability of the display apparatus 1 set on a surface inclined within an allowable extent is tilted vertically.

For this purpose, a plurality of the slippage prevention seats 28 are disposed to ensure the stability of the display apparatus 1. More specifically, the seats 28 placed on an inclined setting surface are projected onto a horizontal reference plane, the projected seats are connected successively to form an imaginary horizontal region defining an effective supporting region. Then, the display apparatus 1 is placed on a setting surface having a maximum tolerable inclination angle θ, and a vertical line is drawn from the gravity center of the display apparatus 1 to the horizontal reference plane. The slippage prevention seats 28 are disposed so that the vertical line drawn in the above-described manner always falls within the effective supporting region at any tilted position of the display apparatus body 200.

Figure 132:
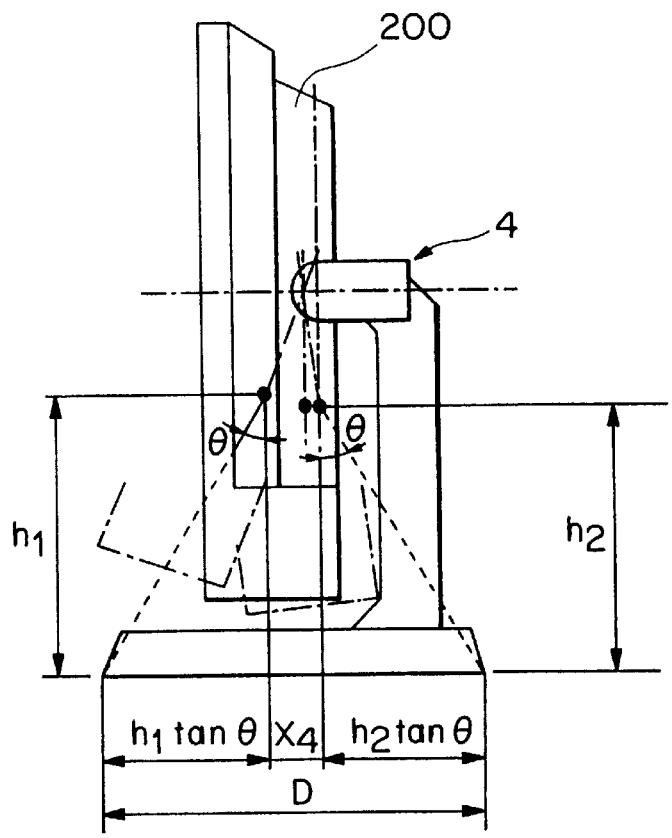
FIG. 132 is an illustration for defining a depth D of a support stand.
Figure 133:
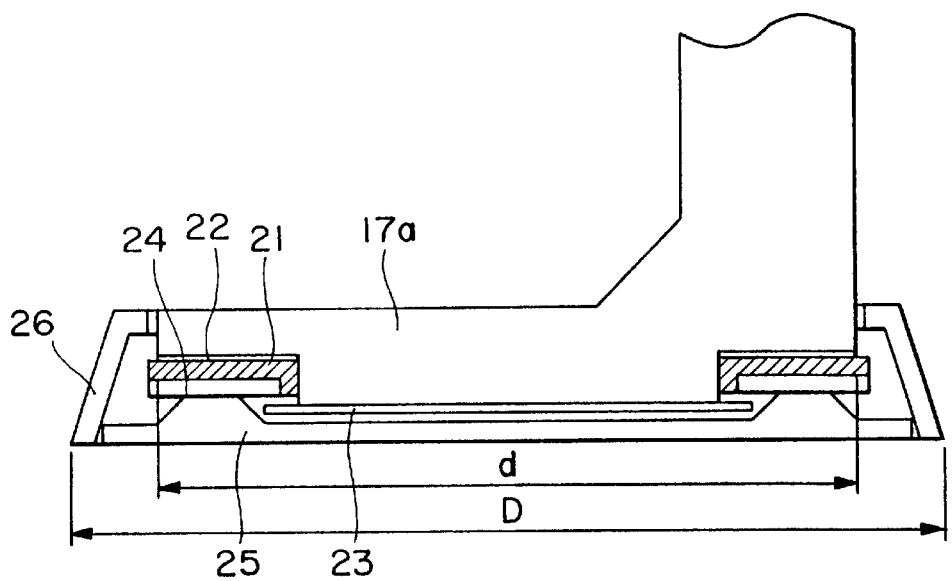
FIG. 133 is a partial side view for illustrating a turning base diameter and a support stand depth.

The relationship may be defined by the following equation (7) with reference to FIG. 132. Thus, in case where the gravity center of the display apparatus 1 is moved in front and rear directions, $h_1$ is taken as a height of the gravity center from the setting surface when the gravity center is at the frontmost position, $h_2$ is taken as the high of the gravity center at the rearmost position, $X_4$ is taken as a horizontal distance between the frontmost position and the rearmost position and H is taken as an intersection of a vertical line from the gravity center and the effective supporting region. At this time, the width of the effective region, i.e., the distance between the seats D, encompassing the movable range of H in the front and rear direction is given by the following equation (7):

$$D = X_4 + (h_1 + h_2) \tan \theta \quad (7).$$

If the seats 28 are disposed to provide a distance exceeding D given by the equation (7), the stability of the display apparatus 1 can be ensured.

Incidentally, the above equation has been derived based on a premise that the maximum tolerable inclination angle is identical for both the forward and rearward inclinations.

More specifically, the support structure 3 includes a stand support 5 turnable about a vertical axis relative to the support base 6, and the stand support 5 includes a disk-shaped unit having a peripheral portion turnable relative to the support 6. The disk-shaped unit has a diameter d which is set to be smaller than the width of the effective supporting region D.

Figure 126:
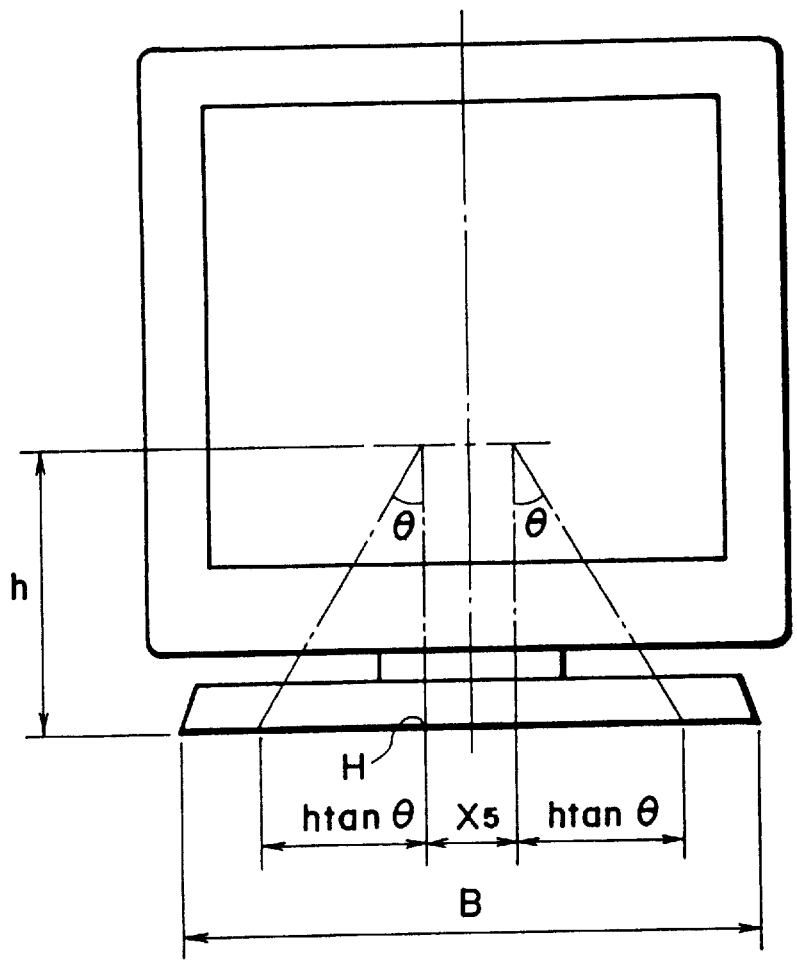
FIG. 126 is an illustration for giving a definition of width B of a support stand.

The same consideration has to be in leftward and rightward turning as shown in FIG. 126 wherein h denotes a height of the gravity center from the setting surface on which the whole surface of the stand base 25 is assured to be placed, θ denotes a maximum tolerable inclination of the setting surface, and $X_5$ denotes a deviation in horizontal direction of the gravity center between the leftward and rightward turnings. A required minimum lateral distance B between the seats 28 may be given by the following equation (8):

$$B = 2h \tan \theta + X_5 \quad (8).$$

Thus, by setting the lateral distance between the seats 28 to exceed the value B, the stability of the display apparatus 1 against the lateral turning is ensured.

<Measure against electric wave>

In recent years, there have been remarkably developed electronic devices utilizing electromagnetic wave, such as portable telephones. Accordingly, electromagnetic wave (radiation interference wave) radiated from electronic devices has been causing electromagnetic and electric wave difficulties on surrounding apparatus. For this reason, it is required to pay attention to electromagnetic compatibility (EMC) of an apparatus or system so that it is free from an electromagnetic environmental condition and free from an adverse effect to other apparatus so as not to cause performance deterioration or malfunction.

The EMC measures include a reduction of electromagnetic interference (EMI) inclusive of unnecessary radiation of unnecessary electromagnetic signals or electromagnetic noise causing performance deterioration, malfunction or failure of electronic apparatus, and immunity from electromagnetic susceptibility (EMS) of normally operating even if the electronic apparatus receives electromagnetic interference from other apparatus.

In Japan, it has become obligatory to reduce the radiation interference wave emitted from an electronic apparatus to below a prescribed level according to VCCI standards. In the United States and Europe, FCC standards and ES standards stipulate similar obligations, respectively.

A radiation interference wave exceeding the prescribed level is generally given by a harmonic component issued from an electronic circuit having a high clock pulse frequency, and only a portion of the frequency range of the harmonic exceeds the prescribed level. Accordingly, if a measure is taken to reduce the amount of the frequency exceeding the limit to below a certain low level, the radiation interference wave can be economically and effectively suppressed.

On the other hand, flat displays, such as a liquid crystal display apparatus have been rapidly developed, and the size thereof is being gradually enlarged. It has been a recent trend to support a large-area flat display apparatus by a lateral H-shaped or a reverse T-shaped metal support structure of metal material.

However, such an ordinary metallic stand support structure is resonant with a certain frequency of radiation interference wave to amplify the noise.

The support structure 3 in this embodiment is effective for solving the above problem. Referring to FIGS. 94 and 95, the support structure 3 is formed by securing a stand support 5 against a support base 6, and attaching a display attachment member 4 to the upper end of the stand support 5, wherein the stand support is formed by using an insulating material. The performance thereof may be evaluated in the following manner.

A color ferroelectric liquid crystal display apparatus body 200, driven at a maximum clock pulse frequency of 20 MHz, is mounted on such a support structure 3 provided with an anti-resonance measure regarding radiation interference wave and a support structure provided with no anti-resonance measure and driven in an open cite, while the level of radiation interference wave is measured by an antenna standing at a point 10 m distant from the display apparatus.

Figure 127:
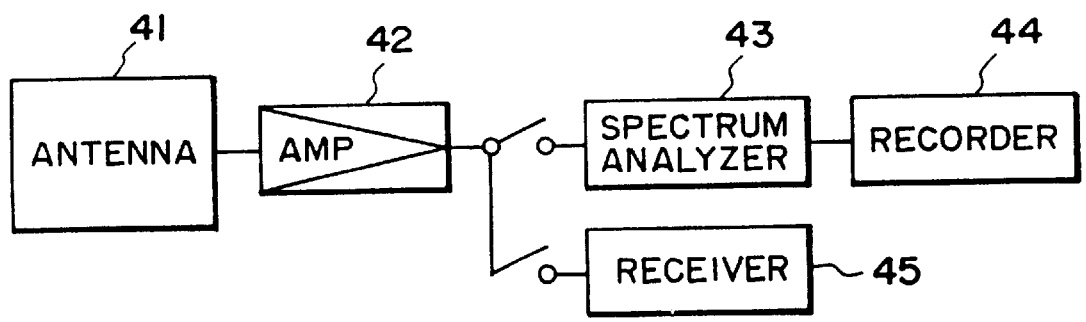
FIG. 127 is a block diagram of an instrument for measuring an electromagnetic field intensity.

The measurement apparatus may have an organization as shown in FIG. 127 including an antenna for receiving radiation interference waves from the display apparatus body 200, an amplifier 42 for amplifying the received signal, a spectrum analyzer 43 for indicating amplitudes of respective frequency components so as to effectively observe harmonic distortion, a recorder 44 for recording the overall frequency distribution of the radiation interference wave swept by the spectrum analyzer 43, and a receiver 45 disposed in parallel with the spectrum analyzer 43 and the recorder 44 for measuring the level of the radiation interference wave at a specific frequency.

The antenna 41 may include a biconical antenna for a region of 30 mHz–300 MHz and a logperiodic antenna for a higher frequency.

The measurement may be performed as follows. The radiation interference wave received by the antenna 41 is swept for the entire wavelength region by the spectrum analyzer 42 to record the entire state of the radiation interference wave by the recorder. Then, for a specific frequency component, the level of the radiation interference wave is again accurately measured by the receiver 44 to examine whether the level is within a specified limit or not.

Figure 128:
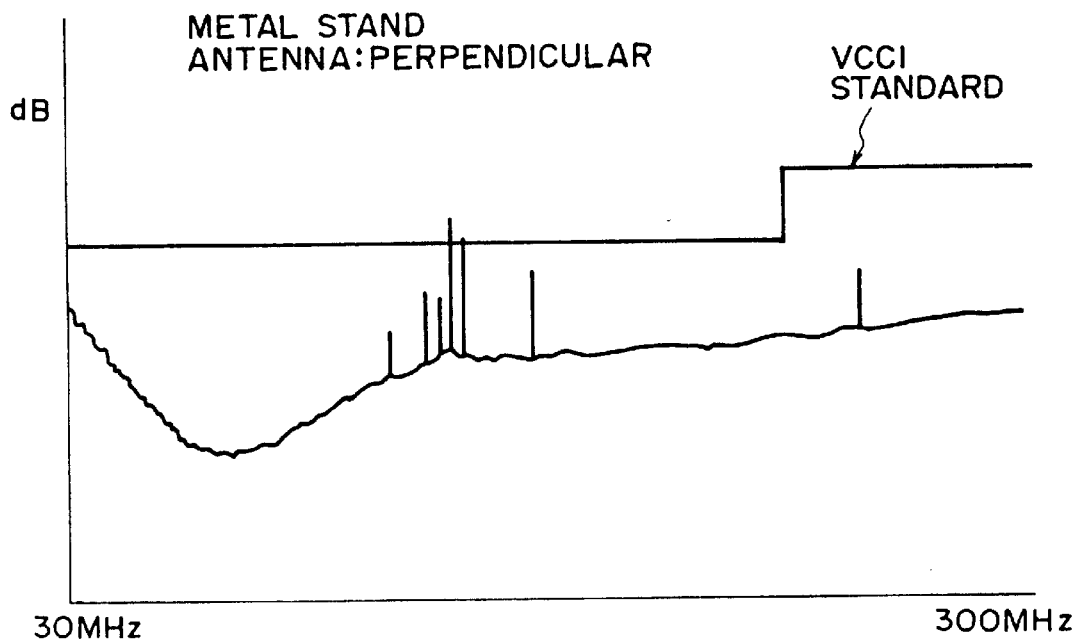
FIGS. 128 and 129 show measured electromagnetic intensity distributions in cases where a counter-measure for preventing resonance with obstructing radiation is not taken and is taken, respectively.
Figure 129:
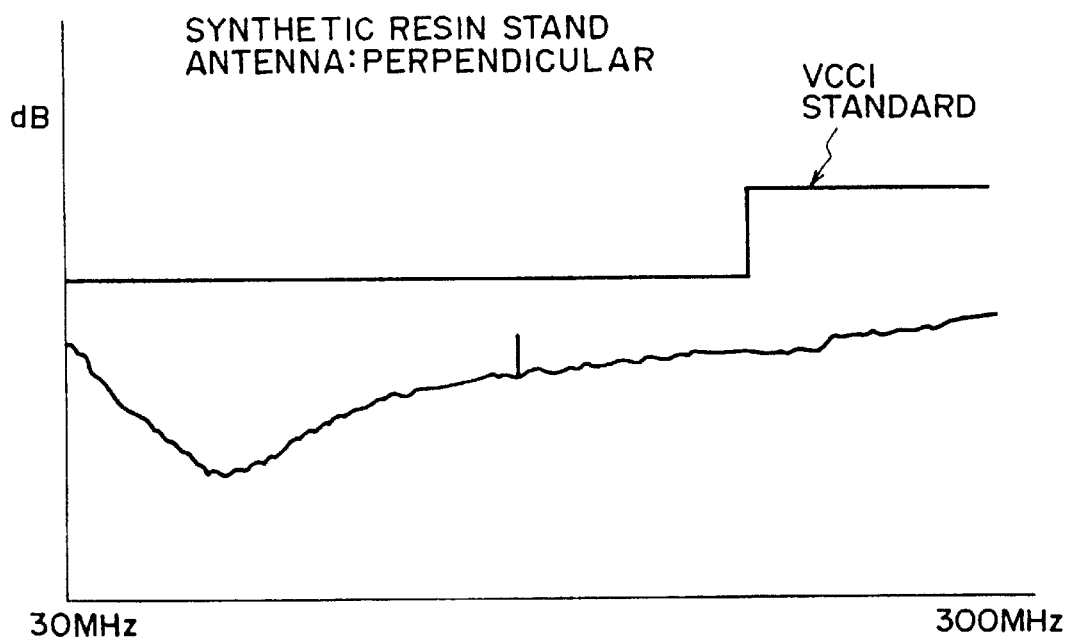
Figure 130:
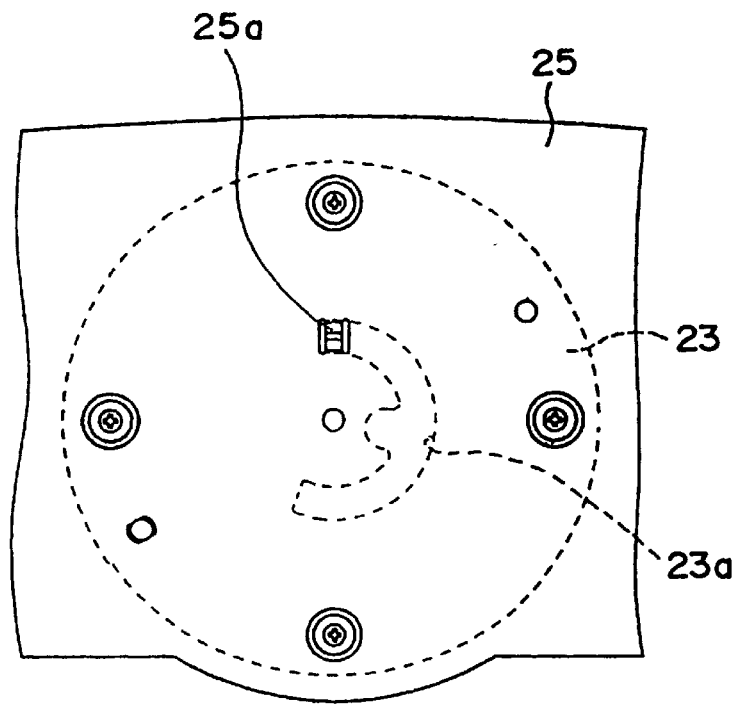
FIGS. 130 and 131 show states where a post member-stopper plate is turned clockwise and counter-clockwise, respectively, with respect to a support stand base.
Figure 131:
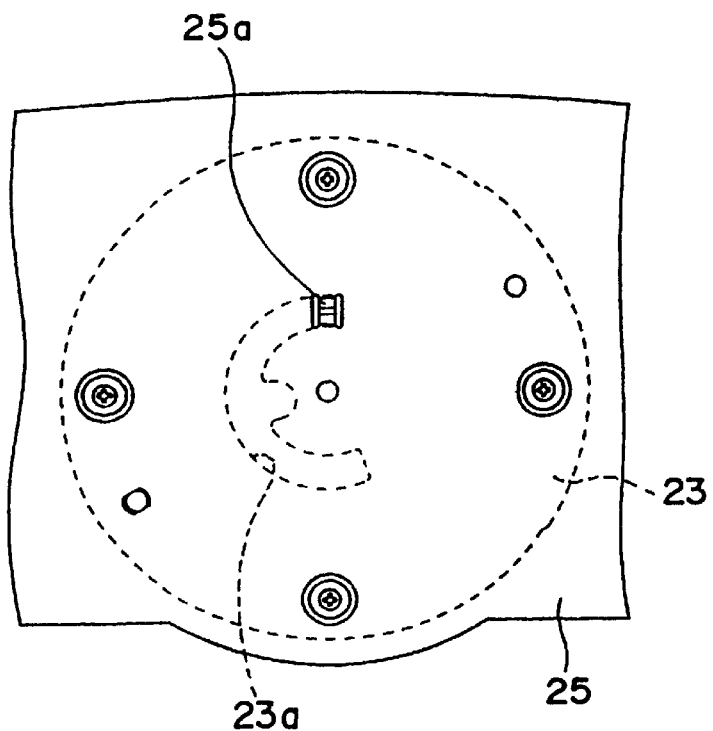

As a result of an actual comparative measurement in the above-described manner, the apparatus using the support structure with no anti-resonance measure provided an electromagnetic intensity distribution of vertical polarized plane wave as shown in FIG. 128, whereas the apparatus using the support structure of the embodiment provided with the anti-resonance measure provided a result shown in FIG. 129.

As shown in FIGS. 128 and 129, the support structure with no anti-resonance measure caused radiation interference wave exceeding the VCCI level at some frequencies (FIG. 128), but the support structure 3 of this embodiment resulted in no radiation interference wave exceeding the level of the VCCI standard at any frequency.

In a specific embodiment 1, a support structure 3 as shown in FIG. 98 was formed by supporting an insulating stand support 5 by a support base 6 and laterally mounting a display attachment member 4 at the upper end of the standard support. As a result of measurement by mounting a ferroelectric liquid crystal display apparatus, the support structure provided a result satisfying the VCCI standard as shown in FIG. 129 while having satisfactory mechanical strength and production cost.

In a specific embodiment 2, the support arm 8 of the lateral attachment member was formed of an insulating synthetic resin. This type of support structure was satisfactory in respect of the VCCI standard, but the support arm showed a lower mechanical strength.

In a specific embodiment 3, the display attachment member 4 and the stand support 5 were connected via an electrically insulating member. As a result, the radiation interference wave showed a somewhat higher level than in the above embodiments 1 and 2 but satisfied the VCCI standard over the entire frequency region.

In a comparative example giving the result of FIG. 128, the support stand 5 and the lateral attachment member 4 were both formed of metal. The support structure provided satisfactory mechanical strength and production cost, but the radiation interference wave exceeded the VCCI level.

The above-described measurement was performed in an environment of 23° C. by using a drive voltage of 20 volts and a frame frequency of ca. 15 Hz for repetitively display an "H" pattern as ordinarily used radiation interference measurement.

As shown above, when the support structure 3 is constituted by selecting component materials therefor, it has become possible to obviate a resonance of the support structure 3 with radiation interference wave issued from a liquid crystal display drive circuit in a display apparatus body 200 (or with an electromagnetic wave of a particular frequency entering from outside). A support structure composed of a metal material may generally cause induced radiation with radiation interference wave, and a support structure having an antenna structure may amplify the radiation interference wave and electromagnetic wave of a particular frequency entering the support structure.

The display apparatus body 200 may be mounted on the display holder 7 by engaging the pins 2028 with the recesses 7b of the display holder 7 (FIG. 94), and then screwing the display apparatus body 200 and the display holder 7 to each other (FIG. 95).

The tilting (turning) in vertical directions of the display apparatus body will now be supplemented.

When the display apparatus body is at an arbitrary home position without application of any operation force F, the torque occurring about the axis member 12 due to the forward deviation X of the gravity center from the axis member 12 and the own weight W of the display apparatus body 200 acts in a direction of tightly winding the rocking spring 13 to decrease the inner diameter 13 and tighten the axis member 12, whereby the display apparatus body is held in position due to the frictional force acting between the rocking spring 31 and the axial member.

Figure 108:
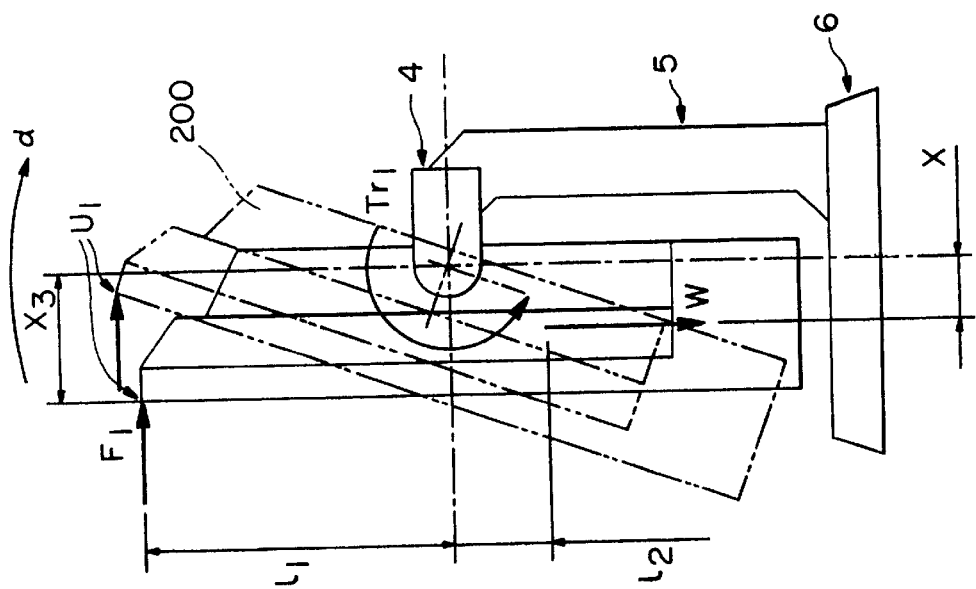

Then, in order to tilt the display apparatus body 200 in a home position as shown in FIG. 108 upward, an application point $U_1$ at the upper end of the display apparatus body 200 may be pushed at an operation force $F_1$ exceeding a prescribed value. As a result, the operation force $F_1$ acting on the point $U_1$ turns the axis member 12 via the display holder 7 in a direction of enlarging the inner diameter of the rocking spring 13. As a result, the pressure contact force acting onto the axis member 12 is reduced to reduce the resisting downward torque $Tr_1$ occurring in resistance to upward tilting of the display apparatus main body 200, so that the upward turning operation force $F_1$ becomes larger than the downward torque $Tr_1$ and the torque WX based on the own weight of the display apparatus body 200 to allow an upward tilting of the display apparatus body 200. During the pushing of the display apparatus body 200 at an operating force $F_1$ exceeding the prescribed value, the display apparatus body 200 is turned upward. Thereafter, when the operation force $F_1$ is released, the internal diameter of the rocking spring 13 is reduced to restore the original pressure contact force against the axis member 12, whereby the display apparatus body 200 is stopped at a position where the operation force $F_1$ is released.

Figure 109:
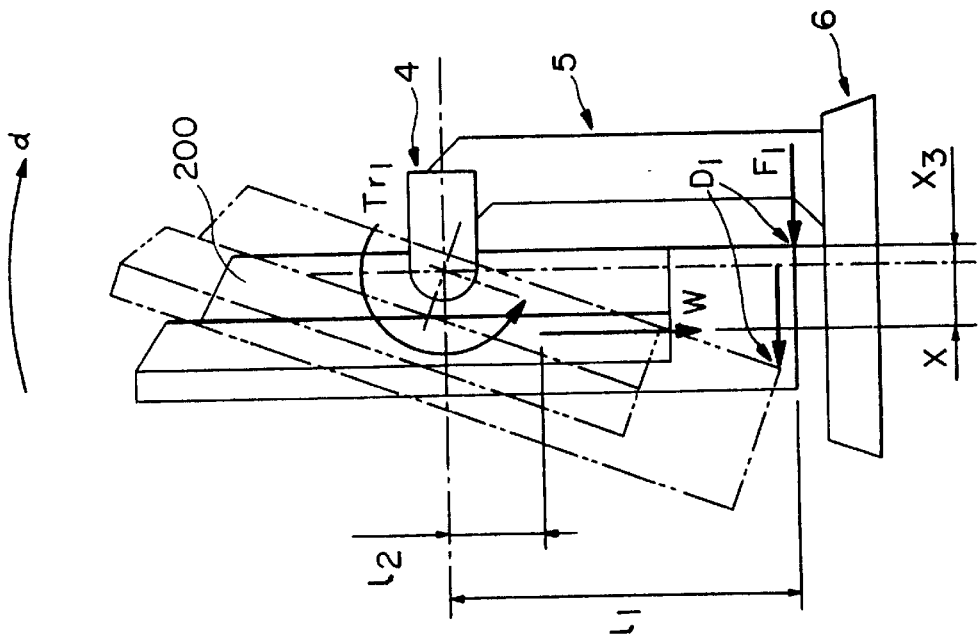
FIGS. 109–111 are respectively an operational illustration for illustrating an operation force, a torque occurring on an actual member and moment occurring based on its own weight (corresponding to FIGS. 114, 115, 117 and 118, respectively).

Further, in order to tilt the display apparatus body 200 in a home position as shown in FIG. 109 upward, an application point $D_1$ at the lower end of the display apparatus body 200 may also be pushed at an operation force $F_1$ exceeding a prescribed value. As a result, the operation force $F_1$ acting on the point $D_1$ turns the axis member 12 via the display holder 7 in a direction of enlarging the inner diameter of the rocking spring 13. As a result, the pressure contact force acting onto the axis member 12 is reduced to reduce the resisting downward torque $Tr_1$ occurring in resistance to upward tilting of the display apparatus main body 200, so that the upward turning operation force $F_1$ becomes larger than the downward torque Tr and the torque WX based on the own weight of the display apparatus body 200 to allow an upward tilting of the display apparatus body 200. During the pushing of the display apparatus body 200 at an operating force $F_1$ exceeding the prescribed value, the display apparatus body 200 is turned upward. Thereafter, when the operation force $F_1$ is released, the internal diameter of the rocking spring 13 is reduced to restore the original pressure contact force against the axis member 12, whereby the display apparatus body 200 is stopped at a position where the operation force $F_1$ is released.

As described above, the display apparatus body 200 can be tilted upward to an arbitrary position by applying an operation force $F_1$ exceeding a prescribed resisting force including a downward resisting torque $Tr_1$. Further, by abutment of the back surface of the display apparatus body 200 against the coupling member 8a of the support arm 8, a further upward turning of the display apparatus body 200 is regulated.

Figure 110:
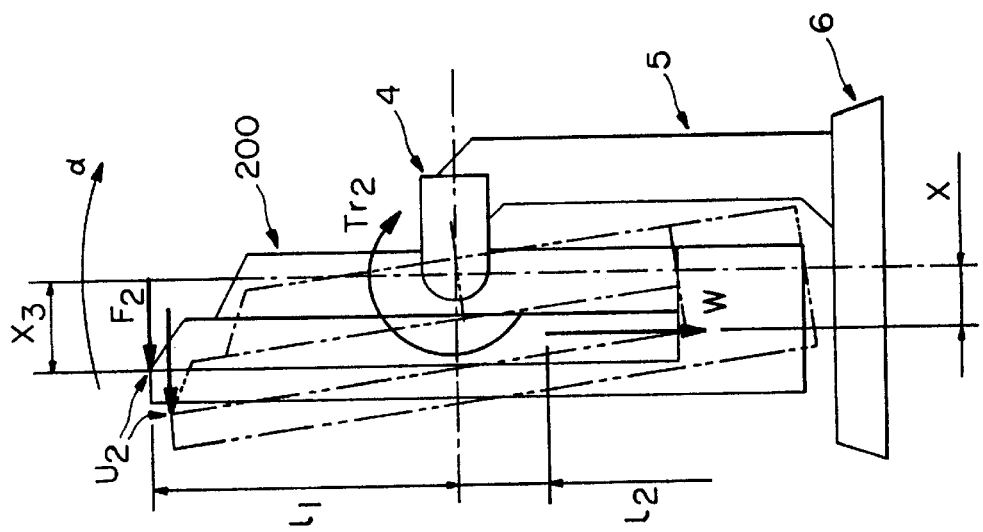

Then, in order to tilt the display apparatus body 200 in a home position as shown in FIG. 110 downward, an application point $U_2$ at the upper end of the display apparatus body 200 may be pushed at an operation force $F_2$ exceeding a prescribed value. As a result, the operation force $F_2$ acting on the point $U_2$ turns the axis member 12 via the display holder 7 in a direction of decreasing the inner diameter of the rocking spring 13. As a result, the pressure contact force and frictional force acting onto the axis member 12 are increase to increase the resisting upward torque $Tr_2$. However, as the torque based on the own weight of the display apparatus body 200 is added to the downward turning operation force $F_2$ to exceed the upward torque $Tr_2$, thereby allowing a downward tilting of the display apparatus body 200. During the pushing of the display apparatus body 200 at an operating force $F_2$ exceeding the prescribed value, the display apparatus body 200 is turned downward. Thereafter, when the operation force $F_2$ is released, the internal diameter of the rocking spring 13 is restored to the original value, and the display apparatus body 200 is stopped at a position where the operation force $F_2$ is released.

Figure 111:
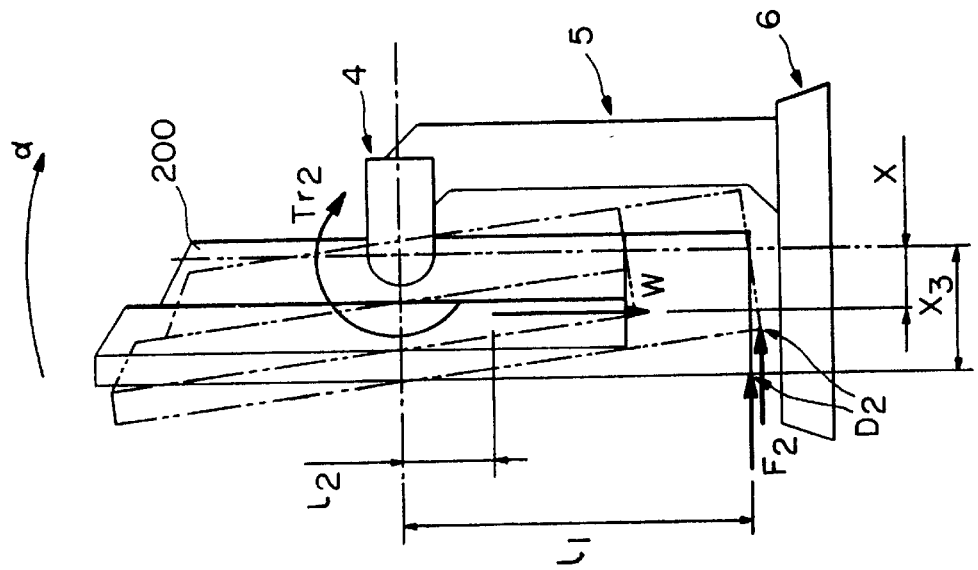

Further, in order to tilt the display apparatus body 200 in a home position as shown in FIG. 111 downward, an application point $D_2$ at the lower end of the display apparatus body 200 may also be pushed at an operation force $F_2$ exceeding a prescribed value. As a result, the operation force $F_2$ acting on the point $D_2$ turns the axis member 12 via the display holder 7 in a direction of decreasing the inner diameter of the rocking spring 13. As a result, the pressure contact force and frictional force acting onto the axis member 12 are increased to increase the resisting upward torque $Tr_2$. However, as the torque based on the own weight of the display apparatus body 200 is added to the downward turning operation force $F_2$ to exceed the upward torque $Tr_2$, thereby allowing a downward tilting of the display apparatus body 200. During the pushing of the display apparatus body 200 at an operating force $F_2$ exceeding the prescribed value, the display apparatus body 200 is turned downward. Thereafter, when the operation force $F_2$ is released, the internal diameter of the rocking spring 13 is restored to the original value, and the display apparatus body 200 is stopped at a position where the operation force $F_2$ is released.

As described above, the display apparatus body 200 can be tilted downward to an arbitrary position by applying an operation force $F_2$ exceeding a prescribed resisting force including an upward resisting torque $Tr_2$. Further, by abutment of the back surface of the display apparatus body 200 against the stopper 20 of the stand support 5, a further downward turning of the display apparatus body 200 is regulated.

As an overall effect of the above-described operation mechanism, the display apparatus body 200 can be tilted upward and downward at almost equal operation forces. The tilting may be performed smoothly, and the display apparatus body 200 can be placed in an arbitrary tilted position within a prescribed value.

On the other hand, in order to turn the display apparatus body 200 in lateral directions (i.e., leftwards and rightwards), an operation force may be applied to an application point on a side of the display apparatus body 200 to turn the body 200 relative to the support structure 3. As described above, the horizontal turnable ring 22 is inserted between the post member stopper plate 23 and the fixed ring 21 affixed to the post member 17, and the horizontal turn-assist ring 22 and the assist ring support plate 24 are fixed to the stand base 25. Further, the projection 25a of the stand base 25 is inserted into the aperture 23a in the post member stopper plate 23. As a result, the display panel of the display apparatus body 200 may be turned leftwards, for example, by turning the crescent-shaped post member stopper plate 23 so as to slide its aperture 23a along the projection 25 (which is initially positioned at the center of the crescent aperture 23a) as shown in FIG. 122 whereby the display apparatus body 200 can be turned clockwise by nearly 90 degs. Similarly, the display apparatus body 200 may be turned rightwards by turning the stopper plate 23 so as to slide its aperture along the projection 25a of the stand base 25, whereby the display apparatus body 200 cm be turned counterclockwise by nearly 90 degs.

Further, by defining the minimum depth D and the minimum width B of the support base 6 by the equations (7) and (8), the gravity center of the display apparatus can be retained within the effective supporting region of the support base even if the display apparatus body is turned by 90 deg. either leftwards or rightwards provided that the support 6 is placed on a setting surface within a tolerable inclination angle range. As a result, a stable turning in lateral directions of the display apparatus body is ensured.

Next, some advantageous features of the display apparatus including the support structure according to this embodiment will be described.

In this embodiment, the switching power supply unit 223 is disposed together with the display unit 230 within a common housing defined by the front cover 201 and the rear cover 202, the temperature of the display unit 230 is raised due to the heat generated from the power supply unit 223. Particularly, in the case of a display unit 230 using a ferroelectric liquid crystal, the temperature of the display unit 230 is raised by the evolved heat of the power supply unit 223 to accelerate the response speed of the ferroelectric liquid crystal, thereby retaining a good image quality. Further, in this embodiment, the power supply unit 223 is disposed almost below the display unit 230, the heat from the power supply unit 223 is effectively transferred to the display unit 230 side, thereby accelerating the response speed of the ferroelectric liquid crystal to retain a good image quality.

Further, in this embodiment, the insulating plate 225 is disposed at a prescribed position between the switching power supply unit 223 and the liquid crystal panel P, and the inverter unit 570 and the controller unit 572 are disposed in a specific positional relationship, whereby the liquid crystal panel P is provided with a uniform temperature distribution over the entire display area and therefore a uniform display quality.

Further, as the front cover 201 and the rear cover 202 are provided with a multitude of heat radiation holes, the temperature distribution along the display unit 230 (liquid crystal panel P) can be further controlled in combination with the insulating plate 225. Accordingly, the temperature distribution along the liquid crystal panel is made uniform to uniformize the display quality.

According to this embodiment, a separate heater or a control circuit therefor is not required for warming the display unit 230 to improve the temperature distribution over the liquid crystal panel P. As a result, the power consumption is reduced and the number of components is reduced to provide improved assembling and maintenance performances and a lower weight, which favors transportation and movement. The production cost is also reduced.

Further, as the display unit 230 and the switching power supply unit 223 are integrally accommodated within a common housing (between the front and rear covers 201 and 202) and are not separated, the movement of the display apparatus body 200 is facilitated.

Further, as the switching power supply unit 223 is disposed on a lower side of the other units inclusive of the display unit 230, the backlight unit 530, the inverter unit 570 and the controller unit 572, the entire thickness of the display apparatus body 200 can be reduced to reduce the setting space therefor. This is advantageous particularly when the display apparatus body 200 is set on a desk. Further, in this embodiment, the inverter unit 570 and the controller unit 572 are disposed in parallel on the back side of the backlight unit 530, so that the thickness of the display apparatus body can be further reduced.

Further, according to this embodiment, the display apparatus body 200 is supported by the support structure 3 so as to allow an arbitrary angle adjustment, a user can dispose the display apparatus body at an arbitrary angular position allowing easy observation of the display images, whereby an improved observability is imparted to the liquid crystal display apparatus 1.

On the other hand, in this embodiment, the thermister 310 is attached surely and easily by the fixing member 315. The thermister 310 can be attached by utilizing only a small space within the display apparatus body 200. Further, by fixing the thermistor 310 with the elastic member 313 having a low thermal conductivity so that only air showing a large thermal resistivity is allowed to be present near the thermistor 310 except for the elastic member 313, an accurate temperature measurement of the liquid crystal panel P is ensured.

Figure 134:
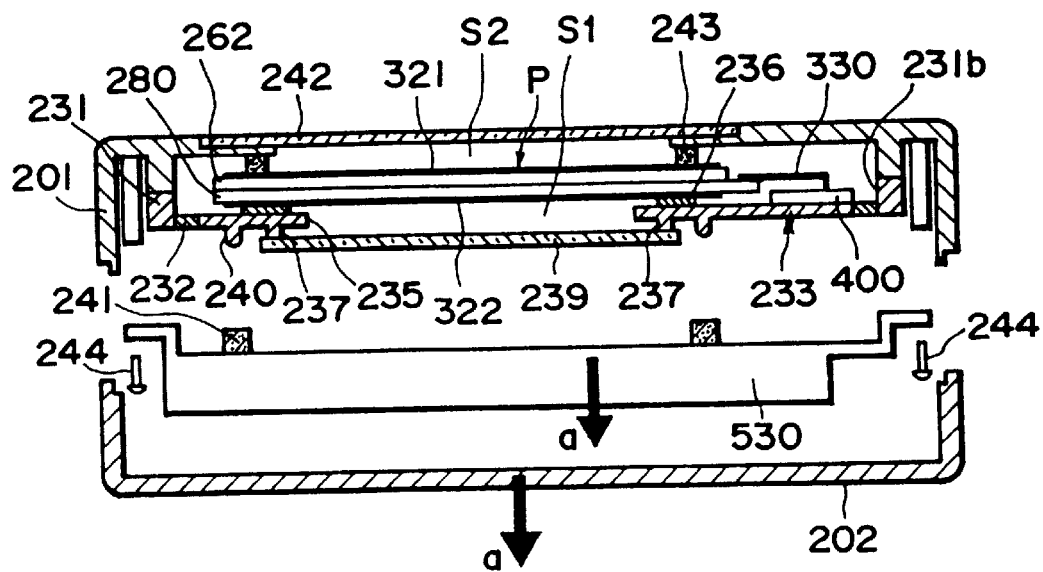
FIG. 134 is a sectional view showing a manner of exchanging a backlight unit.
Figure 135:
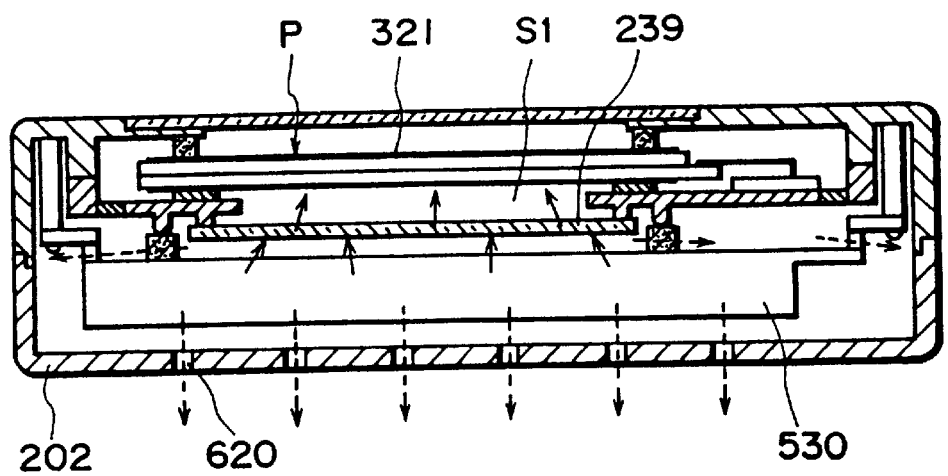
FIG. 135 is a sectional view illustrating a function of air perforations provided in a rear cover.

In this embodiment, the front cover 201 and the rear cover 202 can be easily detached to facilitate the maintenance of the internal components. For example, the backlight unit 530 or lamps therein can be easily exchanged even when high-luminance lamps having a shorter life are used. The backlight unit 530 can be exchanged without impairing the spaces S1 and S2 formed below and above the display unit 230 as shown in FIG. 134, so that the attachment or dirt onto the liquid crystal panel P leading to display defects is obviated. Accordingly, no wiping for dirt removal is required, and the exchange can be performed simply without using a clean room. At the time of backlight exchange, the diffusion plate 239 is exposed so that dirt can be attached to the lower surface of the diffusion plate 239. However, the diffusion plate 239 is not adversely affected by a mechanical stress unlike the liquid crystal panel P, so that the wiping thereof is possible. Further, even if dirt remains attached thereon, the attached dirt is less recognizable because of the light diffusion effect of the diffusion plate 239 per se, so that a display defect is not likely to be caused thereby.

On the other hand, as an almost closed space S2 is formed above the display unit 230, an impact or vibration possibly applied to the display apparatus can be quickly attenuated by the air damper effect of the space S2 to prevent display quality deterioration.

In this embodiment, the face plate 242 is composed of glass plate showing a longitudinal elastic modulus which is ca. 30 times as large as that of a transparent resin plate (e.g., acrylic resin plate), so that less warp is caused in resistance to an external stress. Accordingly, even if the space S2 causes repetitive expansion and shrinkage accompanying the vibration of the display unit 230, the face plate is not substantially warped thereby to effectively retain the air damper effect of the space S2 and attenuate the vibration of the display unit 230 in a short period.

Further, as the backlight unit 530 is not required to participate in formation of such an almost closed space, the rear cover 202 may be provided with perforations 620 for ventilation to effectively discharge most of the heat evolved from the backlight unit 530 through the perforations. The portion of heat not discharged through the perforations is interrupted by the diffusion plate 239 disposed between the display unit 530 and the liquid crystal panel P. Accordingly, the heat transferred by connection within the space S1 to the liquid crystal panel P is substantially reduced to provide a uniform temperature distribution.

In this embodiment, the positional alignment between the liquid crystal drive TAB 330 and the liquid crystal panel P is accurately performed by alignment marks 301, 303, 370 and 371.

The substrate-side marks 301 an 303 are made of metal, and the regions 262B1 and 262B2 near the marks are free from metal electrodes 270, so that a large contrast is given between the substrate-side marks 301, 303 and the regions 261B1, 262B2. Accordingly, during vertical falling illumination by using a camera for image recognition, the image recognition accuracy is not affected by transparent electrodes (scanning electrodes 269 and data electrodes 281) to allow an improved accuracy of positional alignment between the liquid crystal panel P and the liquid crystal drive TABs 330.

In general, if the image recognition of the TAB-side auto-marks 371 is performed through a liquid crystal panel P, the image recognition becomes impossible if the TAB-side marks 371 overlap an opaque member such as metal electrodes. However, in this embodiment, the transparent regions 262B1 and 262B2 are formed on the substrate 262, the image recognition is always possible as far as the regions 262B1 and 262B2 are concerned, and the above problem is obviated.

On the other hand, the substrate-side marks 301 and 303 are easily formed in the step of forming the metal electrodes 270, and a separate step is not required for production thereof. Accordingly, it is possible to obviate the increase in production cost of the liquid crystal panel P and the complication of the production steps.

In this embodiment, the panel-side auto marks 303 and the TAB-side auto marks 371 are formed so as to have a prescribed spacing therebetween even in their normal connection position. As a result, in a case where only either one of the liquid crystal panel P and the liquid crystal drive TAB 330 is set on their alignment units or where both are placed on the alignment units but either one of the alignment marks 303 and 371 is recognized due to the presence of the other mark outside the recognition range of the camera. In such a case, if the marks 301 and 371 are not designed to have a spacing in their normal positions, the above state can be erroneously recognized to indicate the completion of positional alignment. Such a problem can be obviated in this embodiment.

Further, in this embodiment, the eye observation marks 301 and 370 are provided so that the positional alignment and positional confirmation can be performed by eye observation. Accordingly, by performing the automatic positional alignment and the position confirmation by eye observation in combination, the positional alignment accuracy can be further improved. Further, even in a case where the auto-alignment marks 303 and 371 cannot be satisfactorily recognized because of, e.g., an incomplete shape, the positional alignment can be performed by eye observation.

In this embodiment, the connection between the liquid crystal panel P and the liquid crystal drive TABs 330 may be performed automatically, thereby reducing the production cost.

In this embodiment (FIG. 60), the driver boards 400 are supported by the holding plates 430 so as not to be separated from the panel-fixing plate 233 beyond a certain distance, so that the driver boards 400 are appropriately supported without jumping even when an impact or vibration is applied to the display apparatus body 200, whereby the connections between the driver boards 400 and the liquid crystal drive TABs 330 are not impaired to allow a smooth display on the liquid crystal panel P.

Further, as the holding plates 430 support the driver boards 400 so as to allow a slight movement along the panel-fixing plate 233, the driver boards 400 can follow the deformation of the liquid crystal panel P even when the liquid crystal panel P causes a thermal expansion or shrinkage due to an environmental temperature charge, etc. Accordingly, no connection failure is caused between the driver boards 400 and the liquid crystal drive TABs 330 or between the liquid crystal drive TABs 33 and the liquid crystal panel P. Further, no conductor breakage in the liquid crystal drive TAB is caused.

Further, in this embodiment, by use of the holding plates 430, the driver boards 400 can be supported by using only a small area of their upper surfaces. Thus, the supporting area required of the driver boards can be remarkably reduced, thereby reducing the sizes of the driver boards and finally that of the display apparatus body 200. Further, as plural driver boards 400 are supported by a single holding plate 430 or 431, the number of components is reduced, and the assemblage is simplified.

In this embodiment, the panel fixing plate is composed of glass fiber-containing polycarbonate having a low thermal conductivity, causing less heat dissipation from the liquid crystal panel P to favor a uniform temperature distribution on the liquid crystal panel P.

In this embodiment, the input terminals of a liquid crystal drive TAB 330 may be disposed in a direction perpendicular to the output terminals 333.

As a tape carrier used in a liquid crystal drive TAB is expensive to occupy a substantial part of the liquid crystal drive TAB, so that it is preferred to use a smaller area of the tape carrier in a drive TAB. For this reason, it is desired to dispose the input terminals and the output terminal in parallel to each other to shorten the carrier tape length. This parallel arrangement is however accompanied with the following problems.

Figure 136:
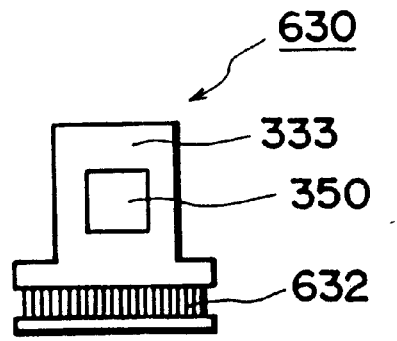
FIGS. 136–138 are respectively a view for illustrating a problem accompanying a conventional liquid crystal drive TAB.
Figure 137:
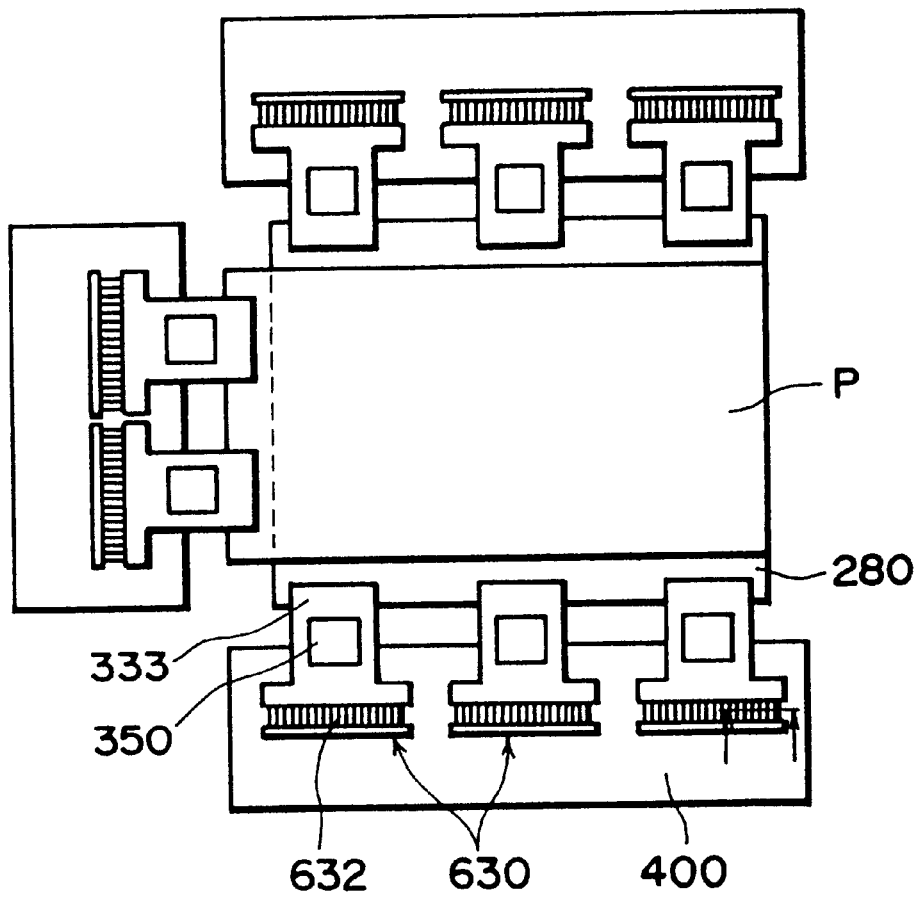

In a high-definition display using a large number of pixels, the spacing between the transparent electrodes (scanning electrodes 269 and data electrodes 281) becomes narrow. Accordingly, the spacing between the output terminals on the liquid crystal device TAB also becomes narrow. Further, the width of a liquid crystal drive TAB 330 and the spacing between adjacent TABs 330 are also narrowed. In contrast thereto, if the input terminals of a liquid crystal drive TAB 330 are formed at an optimum spacing so as not to cause a difficulty such as short circuit or connection failure for connection with a driver board 400, the total width (of arrangement) of the input terminals 632 becomes larger than the total width of the output terminals (FIGS. 136 and 137). If such liquid crystal drive TABs are used for a high-definition liquid crystal panel P, the liquid crystal drive TABs (more exactly, the input terminals 632 thereof) overlap each other, so that the connection with the driver board 400 becomes impossible.

On the other hand, the driver boards 400 are connected via the liquid crystal drive TABs 630 with the liquid crystal panel P, so that the total length of a driver board 400 has to correspond to the liquid crystal panel P. Further, the connection electrodes 401a has to be formed in accurate positions on the driver board 400.

Figure 138:
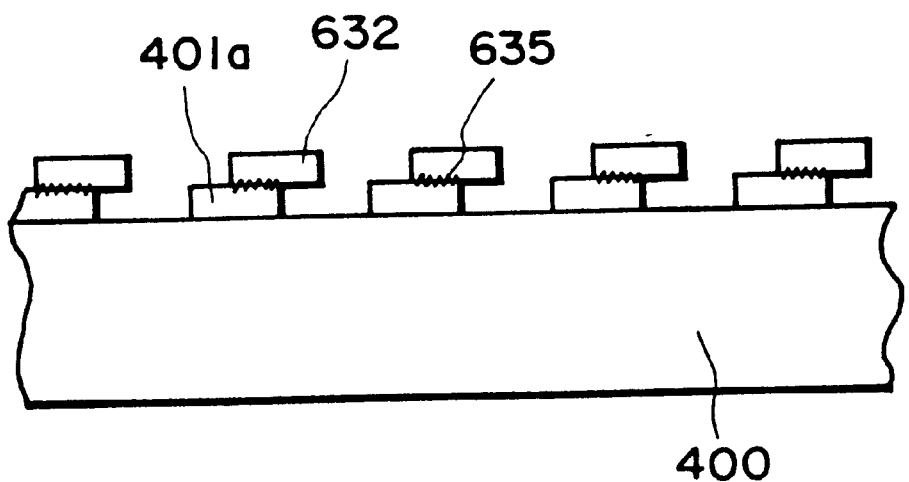
Figure 139:
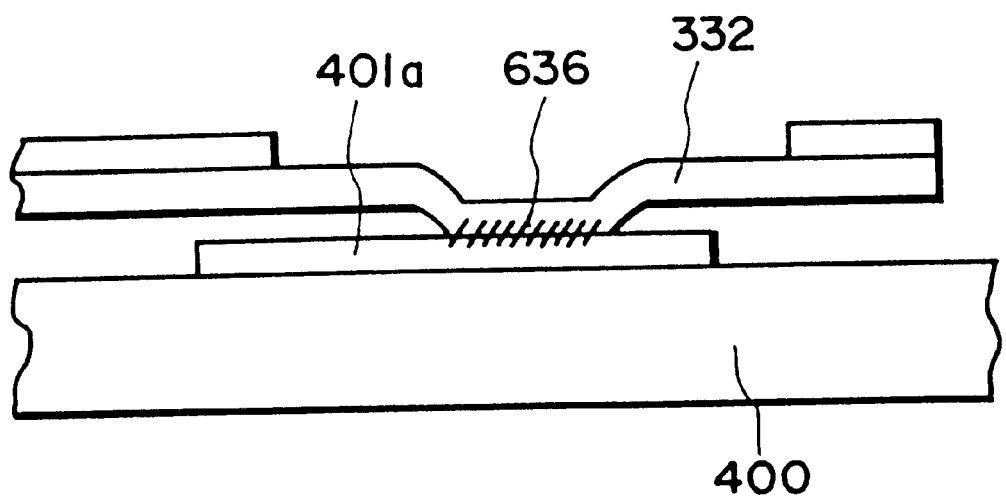
FIG. 139 is a sectional view showing an attachment structure between a liquid crystal device TAB and a driver board.

However, in the case of a large size liquid crystal panel of 24 inches or so, some error can occur in a total length of a driver board 400 or connection electrodes 401a, so that some deviation can occur between the pitch of the input terminals of the liquid crystal drive TABs 630 and that of the connection electrodes 401a as shown in FIG. 138. In such case, the errors are accumulated to fail in ensuring a contact area necessary for connection. Incidentally, the contact area in the case of soldering using a soldering tool is given by the following formula:

(contact area)=[(contact electrode width)−(positional error)]×(soldering tool width), wherein (connection electrode outer diameter)=(input terminal outer diameter)

In the above described embodiment (e.g., FIG. 34), the input terminals 332 of a liquid crystal drive TAB 330 are disposed not parallel but perpendicular to the output terminals 333, so that the spacing between the input terminals can be made optimum without enlarging the end of the input terminals as shown in FIG. 136, thus avoiding the difficulties such as short circuit or adhesion failure for connection with the driver board 400.

Further, in this embodiment, because of the above-described input terminals 332, the area of the tape carrier can be minimized to reduce the tape carrier cost and finally the cost of the entire display apparatus body 200.

Further, even if some positional deviation occurs between the input terminals 332 of the TABs 330 and the connection electrodes 401a of the driver board 400 accompanying the size enlargement of a liquid crystal panel, both the connection electrodes 401a and the input terminals 332 are formed along the direction of the positional deviation (FIG. 138), and the soldering tool width is sufficiently smaller than the length of the input terminals and the connection electrodes in the longitudinal direction, so that no change occurs in contact width between the input terminals and the connection electrodes 401a. As a result, the size error in the driver board 400 does not affect the connection between the input terminals and the connection electrodes to ensure a necessary contact area and therefore a reliable connection between the liquid crystal drive TABs 330 and the driver board 400.

According to this embodiment, as shown in FIG. 59, almost the entirety of the exposed portion of the input terminals of the liquid crystal drive TAB are supplied with heat and pressure by the heat-pressure bonding head 421 and the stage 422, so that the solder resist 410 is pressed by the head 421 via the input terminals 332. As a result, even if the solder is melted, the melted solder is prevented from flowing up or intruding to the solder resist 410, so that the input terminals are solder-fixed only at the region F and are not fixed but remain exposed at the region E in FIG. 54.

Figure 58:
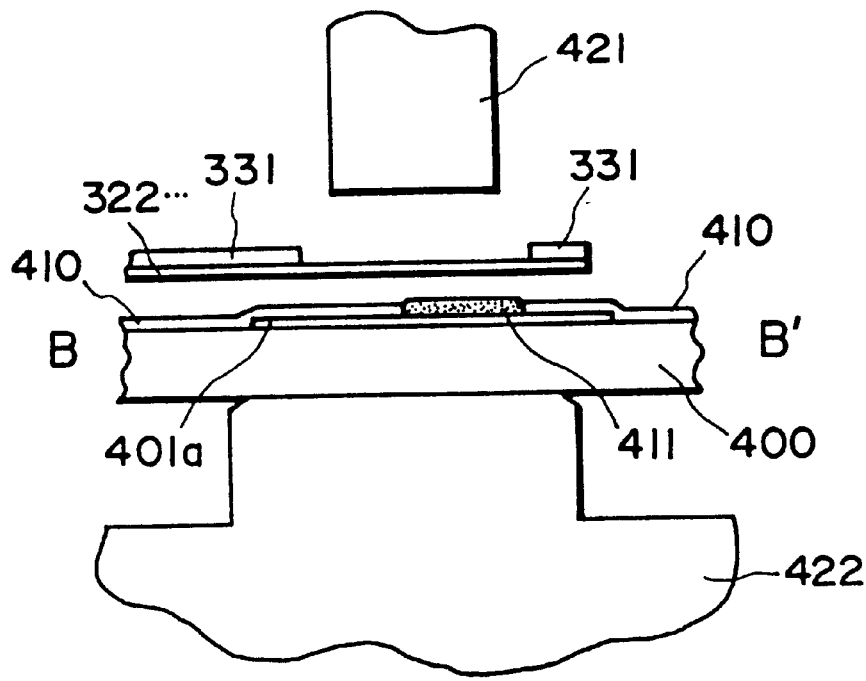
FIGS. 58 and 59 are schematic sectional illustrations for illustrating states before and during heat bonding on a driver board side.

Further, as shown in FIG. 58, the solder 411 has a height larger than that of the surrounding solder resist 410, so that a sufficient contact is ensured between the input terminals 332 and the solder 411 at the time of the heat-pressure bonding by the head 421 to effect a good connection.

Further, in this embodiment, the base film 331 of the liquid crystal drive TAB 330 is partly removed to expose the input terminals 332 (or the output terminal 333), so that the stress occurring in the base film 331 due to thermal expansion and shrinkage is lowered to alleviate the breakage of the input terminals 332 (or output terminals 333).

Further, in the case of using a ferroelectric liquid crystal in a liquid crystal display device, the circuit board connection structure according to this embodiment may be subjected to an elevated temperature of ca. 100° C. for placing the liquid crystal in an isotropic state for alignment of the liquid crystal. In this case, a shearing force occurs in the liquid crystal drive TAB 333 allowing the sides of the substrates 262 and 280 due to difference in thermal expansion between the substrates 262, 280 and the driver board 400. However, in this embodiment, the input terminals 332 and the output terminals 333 of the liquid crystal drive TAB 330 are not connected to the driver board 400 or the liquid crystal panel P at the region E in FIG. 54 or at the region E' in FIG. 52, the breakage of the base film 331 can be obviated, because of a deformation or elongation allowance at the unconnected exposed portions E and E' of the terminals 332 and 333.

As described above, according to this embodiment, at one or both of the connection between the substrates 262, 280 and the liquid crystal drive TABs 330 and the connection between the liquid crystal drive TABs 330 and the driver board 400, a portion of the base film is removed to expose the metal leads and only a position of the metal leads are connected. Accordingly, even if a shearing force occurs in a direction along the sides of the substrates 262, 280, the non-connected metal leads retain a deformation allowance in the direction of their arrangement, so that the breakage of the base film 331 can be obviated even when the environmental temperature changes from a low temperature (e.g., 20° C.) to a high temperature (e.g., 60° C.).

Further, in some cases, a shearing force occurs in the liquid crystal drive TAB 330 along a side of the substrate 262 along which the liquid crystal drive TAB 330 and the driver board 400 are disposed due to a difference in thermal dispansion between the substrate 262 and the driver board 400. In this embodiment, however, the input terminals 332 are arranged in a direction perpendicular to the side of the substrate 262 and the solder 411 is also disposed so as to extend in rows in a direction perpendicular to the side of the substrate 262, so that the input terminals 332 are provided with deformation and elongation allowances, whereby the breakage of wires in the liquid crystal drive TAB 330 can be prevented.

In this embodiment, the driver board 400 is composed of a multi-layered glass-epoxy board of FR4 grade according to NEMA standard) showing a thermal expansion coefficient of 0.08–0.125 (x$10^{-2}$ cm/cm/°C.) close to that of the glass substrates 262 and 280 so as to minimize the shearing force occurring in the liquid crystal drive TAB 330 along the side of the glass substrate due to a difference in thermal expansion between the glass substrate and the driver board even in an environmental temperature change from a low temperature (e.g., −20° C.) to a high temperature (e.g., 60° C.). However, as a general property, such a multi-layered glass epoxy substrate of FR4 grade is liable to cause a heat-shrinkage of 0.02–0.025% at an elevated temperature. Accordingly, when subjected to a high temperature, the shearing force occurring in the liquid crystal drive TAB 330 along the side of the glass substrate along which the TAB 330 and the driver board 400 are arranged can be increased.

In consideration of such a heat shrinkage, in this embodiment, it is desirable to subject the driver board 400 to an aging treatment at a temperature of 60° C. or higher before the connection thereof with the input terminals 332, thereby to cause such a heat shrinkage in advance, and reduce the shrinkage in the assembled state, thus reducing the shearing force occurring in the liquid crystal drive TAB 330 along the side of the glass substrate.

In this embodiment, the heat-pressure bonding head 391 presses the liquid crystal drive TAB 330 via the pressing sheet 392 without direct contact with the TAB 330. Accordingly, it is possible to prevent the soiling of the head 391 with the anisotropic conductive adhesive film 320. Further, by the pressing sheet 392, a slight inclination of the head 391 and minute unevennesses of the connection electrodes are absorbed and relaxed, whereby the reliability of the connection can be enhanced.

Further, as the heat-pressure bonding head 391 is designed to press the TAB 330 only at the connecting portion (region F' in FIG. 52), it is possible to minimize the amount of the anisotropic conductive adhesive film melt-flowing to an outside region (region E' in FIG. 52), thereby preventing the fixation of the output terminals 333 to the substrate 280 at the region E'.

In this embodiment, as explained with reference to FIG. 88, when a linear light source approaches its life end, the linear light source is turned off by the life-detection circuit 593 and the turn-off circuit 595. Accordingly, it is possible to obviate difficulties, such as the filament breakage and abnormal heating at tube ends, occurring at the life end of a linear light source, and also damages of the neighboring members by the abnormal heating.

Further, in this embodiment, when one linear light source 532 approaches its life end, a pair of light sources including the light source and a light source disposed opposite thereto are turned off, and the illumination of the liquid crystal panel P is continued by the remaining (two) light sources. Accordingly, all the light sources are not turned off simultaneously, and it is possible to obviate a situation that the liquid crystal panel P suddenly turns into dark so that an operator cannot continue its operation on the display apparatus. Further, by continuing the illumination of the liquid crystal panel P by an oppositely disposed pair of linear light sources instead of three light sources, the operation can be continued with a symmetrical and relatively good luminance distribution.

In the above embodiment described with reference to, e.g., FIGS. 8 and 85, an insulating plate 225 of vinyl chloride resin is fixed by screwing. However, the insulating plate 225 can be composed of another material capable of interrupting the heat from the switching power supply unit 223, and can be fixed by another method. For example, if the insulating plate 225 is composed of a metal, such as iron or aluminum, it is possible to obtain improved temperature distribution and display quality and, by fixing the metal insulating plate 225 to both the switching power supply unit 223 and the backlight unit 530, the connection strength between the members can be enhanced. Further, it is possible to ground the switching power supply unit 223 through the metal insulating plate to reduce the electromagnetic noise.

The shape and attachment position of the insulating plate 225 can also be varied in various manners as far as possible to interrupt the heat from the switching power supply unit 223. For example, it is possible to incline the insulating plate 225 (e.g., FIG. 11A) with its right end up as viewed from the front of the display apparatus, whereby heat evolved from the secondary side of the power supply unit 223 can be smoothly guided to the right side to provide better temperature distribution and display quality. The insulating plate 225 is disposed on the left-side as viewed from the front in the above embodiment (FIG. 11A) but can extend to span over the entire width while being provided with perforation(s) at prescribed parts (on the right side as viewed from the front) of the insulating plate 225. As a result, it is possible to control the heat flow and ensure a more uniform temperature distribution and uniform display.

The thermistor 310 is fixed to the panel-fixing plate 233 in the above embodiment (FIGS. 28–30), but can be fixed to the backlight unit 530.

The thermistor 310 is fixed by a fixing member 315 in the above embodiment but can be fixed by forming a fixing nail 233A projecting from the panel-fixing plate 233 and holding a silicone resin member 312 or an elastic member 313 to fix the thermistor 310.

The thermistor 310 is disposed in contact with an end face of the liquid crystal panel P in the above embodiment but can be disposed in contact with a part outside the display area on the back surface of the liquid crystal panel P as shown in FIG. 141. In this case, it is possible to seal a thermistor connected with lead wires 311 with an elastic member 313, such as silicone foam sponge, with a silicone resin as a sealant, and inserting the sealed thermistor between the liquid crystal panel P and the panel-fixing plate (or backlight unit) to be fixed thereat. Also in this case, it is important to determine a fixing position capable of detecting an average temperature over the liquid crystal panel.

The above-described attachment structure of the thermistor 310 is applicable to not only a transmission-type liquid crystal panel but also a so-called reflection-type liquid crystal panel.

The diffusion plate 239 is applied to the panel-fixing plate 233 to have the diffusion plate 239 define the closed space S1 in the above embodiment (FIG. 12), but a transparent plate 699 instead of the diffusion plate 239 can be applied to the panel-fixing plate 233 to define the space while fixing the diffusion plate 239 to the surface of the backlight unit 530.

In the above embodiment, the linear light sources 532 in the backlight unit 530 may be fluorescent lamps but can be other types of light sources. The backlight unit 530 may be of a so-called edge-type one as in the above embodiment (FIGS. 70 and 71) but can also be of a direct backing-type one.

In the above embodiment, the exposed width of the output terminals 333 (width of the region D' in FIG. 52) of the liquid crystal drive TAB 330 is 2.5 mm including a portion not connected with the liquid crystal panel P (width of region E' in FIG. 52) of ca. 0.5–1 mm. The exposed width of the input terminals 332 (width of region D in FIG. 54) of the TAB 330 is 2 mm including a portion not connected with the driver board 400 (width of region E in FIG. 54) of ca. 0.5–1 mm. The press bonding head 391 for the output terminals 333 has a tip width of 1.5 mm, and the press bonding head 421 for the input terminals 332 has a tip width of 1.2 mm. But other sizes providing good bonding states may also be used.

The driver board 400 and the liquid crystal drive TAB 330 are bonded by solder but can also be bonded by an anisotropic conductive adhesive film.

Both the input terminals 332 and the output terminals 333 of the TAB 330 are subjected to partial removal of the base film 331 to expose lead electrodes thereat, but the base film 331 of only either one of the input terminals 332 and the output terminals 333 can be removed.

The electroconductive particles in the anisotropic conductive adhesive film may preferably comprise particles which can be deformed by pressing and may preferably comprise a low-melting point metal such as solder, so that the electroconductive particles are deformed during heat-pressure bonding to provide increased contact areas of the individual particles (e.g., 10 μm-dia. particles are pressed into a diameter of 50 μm), thereby providing a further relative electrical contact.

Further, the anisotropic conductive adhesive film 320 before the electrode connection may desirably have a thickness of ca. 10–30 μm but may appropriately be determined depending on the size of the electroconductive particles and the electrode thickness. For example, in case where the electrode thickness is 18 μm, the anisotropic conductive adhesive film may desirably have a thickness of ca. 15 μm. The anisotropic conductive adhesive film 320, at least before the connection, may desirably have a thickness which can be packed at a gap between the electrodes and/or a gap between the electrode and the support.

Too thick an anisotropic conductive adhesive film 320 can fail to reduce the connection gap between the electrodes, thus failing to effect a sufficient connection.

<Another embodiment of alignment marks>

Another embodiment of positional alignment using other alignment marks will be described with reference to FIGS. 143 to 146.

Figure 143:
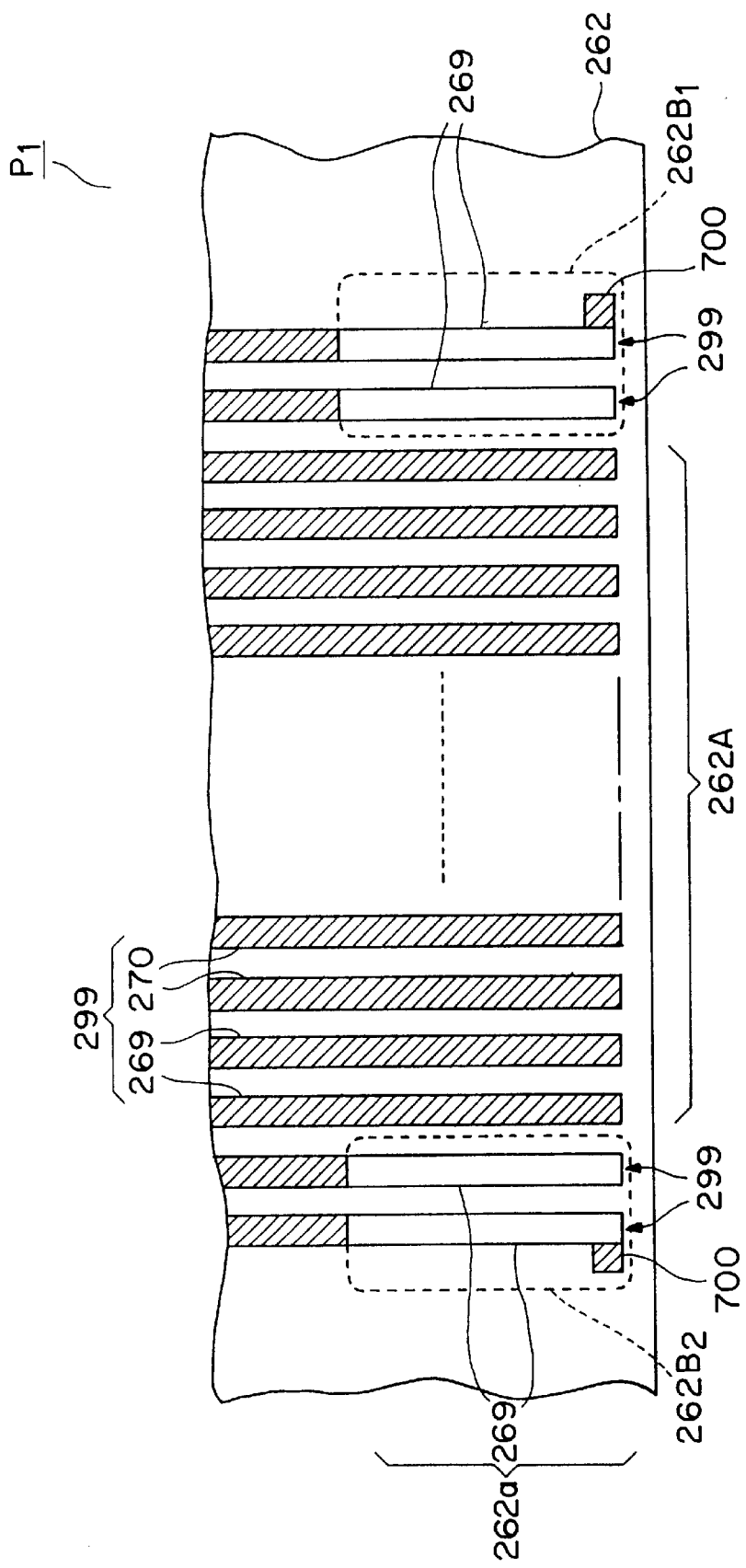
FIGS. 143 and 144 are partial plan views showing another alignment mark disposition on a liquid crystal panel side and on a liquid crystal drive TAB side, respectively.

In this embodiment, at an exposed portion on the upper substrate 262, the scanning electrodes 269 and the metal electrodes 270 are arranged as shown in FIG. 143. The hatched region represents a region where a scanning electrode 269 and a metal electrode 270 are laminated.

More specifically, in a central region 262A of the upper substrate 262 (i.e., a central portion in a lateral direction extending perpendicularly to the longitudinal direction of the scanning electrodes 269), the scanning electrodes 269 and the metal electrodes 270 extend to the edge region (exposed portion) while retaining their laminate structure. On both outside regions of the region 262, the laminate structure of the scanning electrodes 269 and the metal electrodes 270 are terminated at an intermediate point and, at regions 262B1 and 262B2, only the scanning electrodes (transparent electrodes) 269 are formed. In this embodiment, the liquid crystal panel $P_1$ is designed to be driven by using only the electrodes 299 in the region 262A and the electrodes 299 formed in the regions 262B1 and 262B2 are so-called dummy electrodes or ground electrodes.

In the regions 262B1 and 262B2, substrate-side marks 700 are also formed. These substrate-side marks 700 are formed outside and adjacent to the outermost electrodes 269 in the form of nearly a square. FIG. 143 shows electrode shapes only on the upper substrate, but similar electrodes and substrate-side marks are also formed on the other lower substrate 280.

The shape, etc., of the output terminals on the liquid crystal drive TAB 330 will now be described with reference to FIG. 144.

The liquid crystal drive TAB 330, similarly as the one in the above-described embodiment (FIG. 44), comprises a base film 331, input terminals (332, not shown) and output terminals 333, and a liquid crystal drive IC (not shown).

Figure 144:
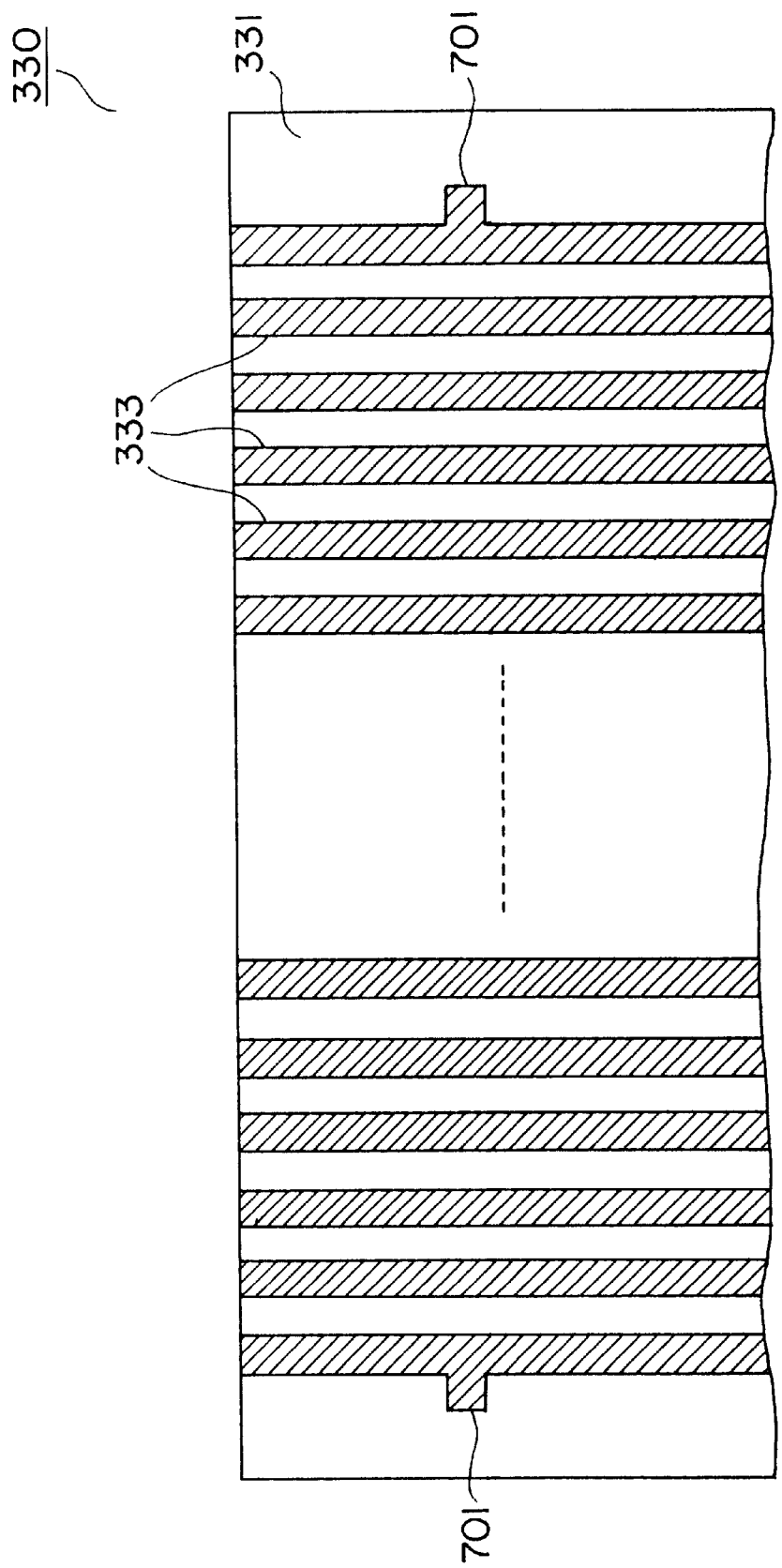

The output terminals 333 are formed in a stripe shape (as shown in FIG. 144) and comprise a copper foil or film plated with Au or Sn. The spacing and the number of the output terminals correspond to those of the scanning electrodes 269 on the liquid crystal panel $P_1$ side.

TAB-side marks 701 are formed continuously with the outermost output terminals 333. The TAB side marks 701 are made of identical materials as the output terminals and more specifically formed by leaving them in the patterning of the output terminals by etching. In this embodiment, the substrate-side marks 700 and the TAB-side marks 701 are formed in positions which do not overlap each other in a state of proper alignment for connection between the liquid crystal panel P$_1$ and the liquid crystal drive TAB 330. More specifically, the spacing between the substrate marks 700 and the spacing between the TAB-side marks are equal to each other but, in a proper alignment position, they are deviated in the longitudinal direction of th e electrodes 299 as shown in FIG. 145.

Figure 145:
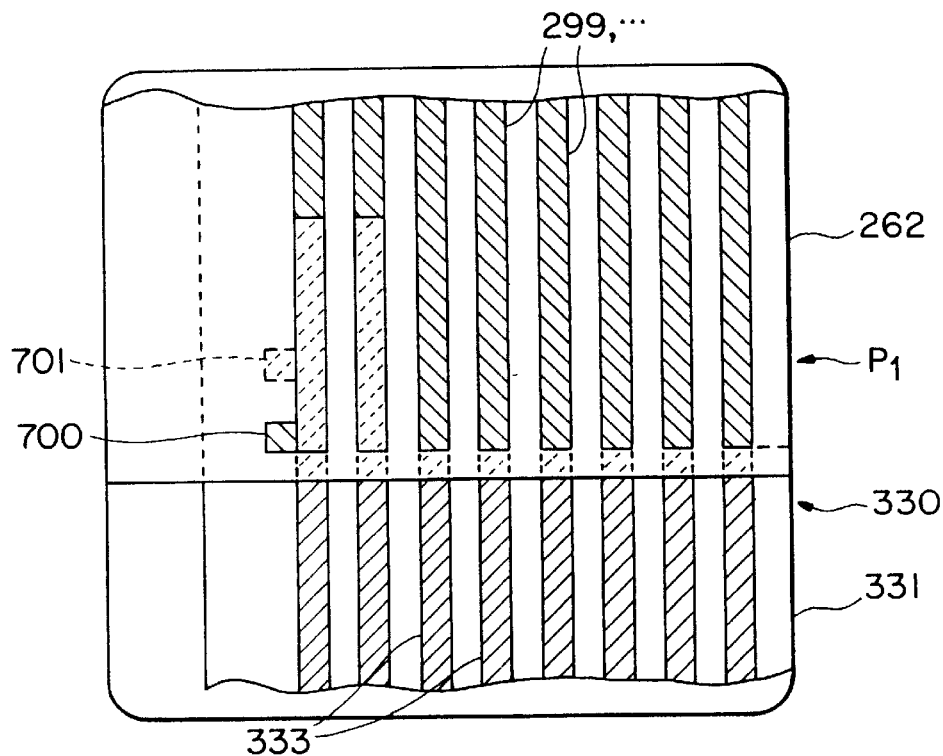
FIGS. 145 and 146 are views showing states after and during positional alignment, respectively.
Figure 146:
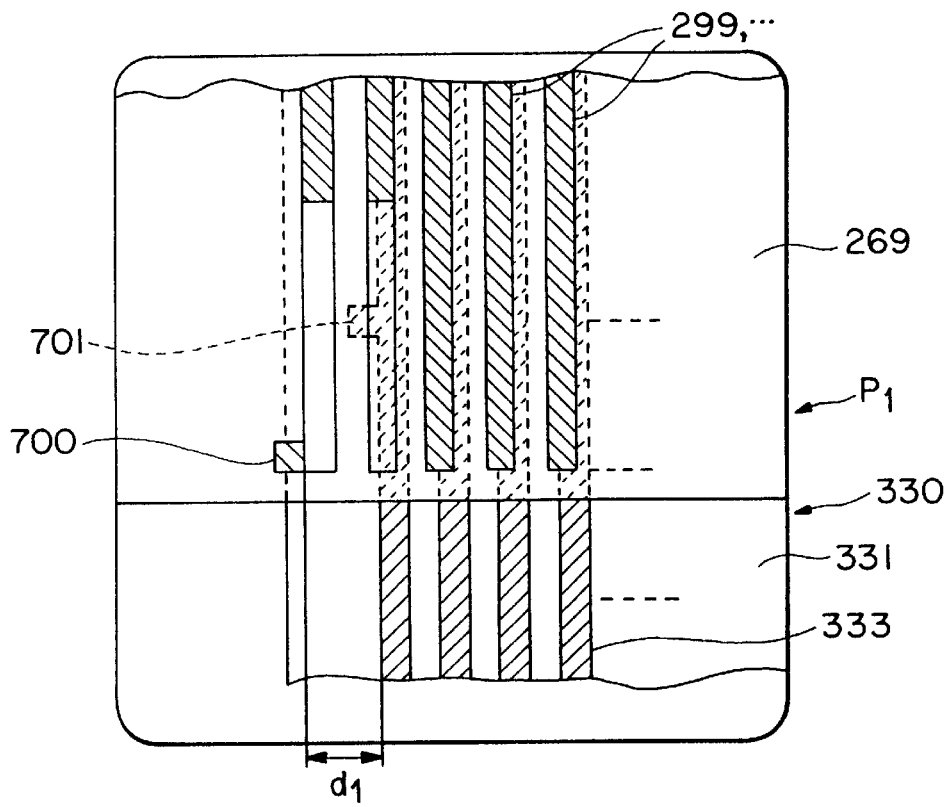

Next, a step of positional alignment between the liquid crystal panel P1 and the liquid crystal drive TAB 330 will be described with reference to FIGS. 145 and 146, including FIG. 145 showing an intermediate state during the positional alignment and FIG. 146 showing a state after the positional alignment (a normally aligned state).

More specifically, FIGS. 145 and 146 show a state wherein the glass substrate 26 of the panel P1 is superposed while directing its front surface downwards with an upwardly directed front surface of the TAB 330 shown in FIG. 144 as a view observed through a camera finder from the backside of the glass substrate 262 of the panel P1 so as to show a region including a righter region of the glass substrate 262 and the left side region of the TAB 330.

Now, in case of connecting the TAB with the liquid crystal panel P1 (more specifically, the glass substrate 262 or 280 thereof), the liquid crystal panel P1 is mounted on the liquid crystal panel alignment unit and the TAB 330 is mounted on the TAB alignment unit. The mounting operation may be performed automatically by using an apparatus therefor or may be performed manually by an operator. In this instance, it is necessary to roughly adjust the positions of both alignment units so that the TAB-side alignment marks 701 are positioned outside the region 262A, more specifically further outside of the region 262B1 or 262B2, to be free from superposition with the metal electrodes 270. In the rough alignment stage, the TAB-side output terminals 333 and the substrate-side electrodes 299 are still deviated (by d$_1$) as shown in FIG. 146.

Then, when an automatic fine adjustment is started by using a camera, etc., the TAB-side marks 701 disposed in a roughly appropriate position by the above-mentioned rough alignment are recognized by the camera through the transparent substrate 262, the anisotropic conductive adhesive (not shown) and the base film 331, and the panel-side marks 700 are recognized through the substrate 262. The image recognition data by the camera are sent to a data process unit (not shown), where a deviation (amount) between the marks 700 and 701 is calculated. The deviation is sent to an alignment drive unit, by which the fine positional adjustment of both alignment units is performed. The fine positional alignment may be performed by moving either one or both of the liquid crystal panel alignment unit and the TAB alignment unit. After the fine adjustment, the marks 700 and 701 are placed at their normal positions which are distant from each other with a prescribed spacing in the longitudinal direction of the electrode 299 and free from deviation in the width direction of the electrode 20 as shown in FIG. 145. Thus, after the fine adjustment, the deviation d$_1$ between the TAB-side output terminals 333 and the substrate-side electrodes 299 is removed. Incidentally, before setting the substrate 262 and the TAB 330 on a positional alignment apparatus, the anisotropic conductive adhesive (film) may be applied or transferred onto at least one of the substrate 262 or the TAB 330, so that the substrate 262 and the TAB 330 at their normal positions are thermally bonded to each other by a thermal press head (not shown) immediately after the positional alignment.

In the above, only the positional alignment of alignment marks 700 and 701 on one side (in the regions 262B1 or 262B2) has been described with reference to FIGS. 145 and 146, but similar image recognition and positional alignment may be performed by using alignment marks 700 and 701 on the other side. By performing the image recognition and positional alignment by using alignment marks on both sides, a more accurate positional alignment may be realized.

According to this embodiment, the panel-side marks 700 are made of a metal and also the electrodes 269 in the region 262B1 are made transparent (i.e., not of metal electrodes), the panel-side marks 700 can be recognized at a larger contrast. Accordingly, even when the vertical falling illumination is performed in image recognition with a camera, the image recognition accuracy is not affected by the transparent electrode thickness as in the conventional case, so that the accuracy of positional alignment between the liquid crystal panel P1 and the TAB 330 is improved.

As a matter in general, in case where a TAB-side mark 701 is recognized through a liquid crystal panel P1 as in this embodiment, the image recognition becomes impossible when the TAB-side mark 701 is superposed with an opaque member, such as metal electrodes. In this embodiment, however, the glass substrate 262 is provided with a transparent region 262B1, so that the TAB side mark 701 can be recognized as far as they are within the region 262B1, so that the above problem can be obviated.

On the other hand, the panel-side mark 700 can be simply formed in the step of forming metal electrodes 270 so that an additional step for the formation thereof is not required, thereby obviating the increase in production cost of the liquid crystal panel P1 and complication of the production steps.

In this embodiment, the panel-side mark 700 and the TAB-side mark 701 are formed so as to have a prescribed spacing therebetween even in their normal connection positions. As a result, in a case where only either one of the liquid crystal panel P1 and the TAB 330 is set on their alignment units or where both are placed on the alignment units but either one of the alignment marks 700 and 701 is recognized due to the presence of the other mark outside the recognition range of the camera. In such a case, if the marks 700 and 701 are not designed to have a spacing in their normal positions, the above state can be erroneously recognized to indicate the completion of positional alignment. Such a problem can be obviated in this embodiment.

Further, in this embodiment, the connection between the liquid crystal panel P1 and the TAB 330 may be performed automatically to reduce the production cost.

The metal electrodes 270 may be formed in an identical width as and over the full width of the scanning electrodes 269 or in a smaller width than and along a part of the scanning electrodes.

The number of transparent electrodes not covered by the metal electrodes is not limited to the one in the above embodiment. The electrodes in the regions 262B1 and 262B2 are ground electrodes in the above embodiment but can be used for driving the liquid crystal panel. In this case, however, it is necessary to reduce the resistance of the electrodes, e.g., by coupling a plural electrodes in combination.

The base film 331 can be partly removed from the region to expose the terminals 333 where TAB-side means 701 are formed or retained as in the above embodiment.

<Other embodiments of driver board holding structure>

Figure 147:
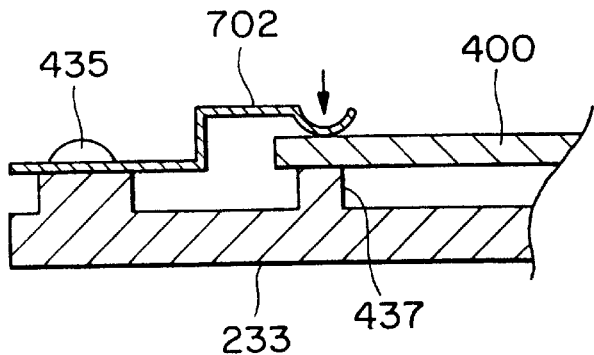
FIG. 147 is a sectional view showing another holding plate example.

Another embodiment of holding plate will be described with reference to FIG. 147.

In the above-described embodiment (FIGS. 61–62), a small gap is retained between the holding plates 430 and the driver boards 400. In this embodiment shown in FIG. 147, a holding plate 702 is composed of a plate spring of a metal or a synthetic resin, and a tip of the holding plate 702 is forced to press the upper surface of the driver board 400. The pressing force of the holding plate 702 may be on the order of not hindering the movement of the driver board 400 in a direction parallel to the panel-fixing plate 233. FIG. 147 shows only one holding plate structure but the other holding plates are also composed of a plate spring and the tips thereof are forced to press the upper surface of the driver board 400.

In this embodiment, as the holding plates 702 are composed of a plate spring, so that holding plates of an identical size and shape can be used for driver boards of different thicknesses. As a result, the number of different components can be reduced to contribute to a reduction is cost for production of the display apparatus body 200. Further, according to this embodiment, the driver board 400 can be supported free from a play in a direction perpendicular to the panel-fixing plate 233. Accordingly, the jumping movement of the driver board 400 accompanying the vibration or impact applied to the display apparatus can be effectively suppressed to ensure the prevention of breakage of connection lines between the driver board 400 and the liquid crystal drive TABs 330 or connection lines between the liquid crystal panel P and the TABs 330 and also of lines in the TABs 330 per se, thus reliably retains a good display state of the liquid crystal panel P.

In this embodiment, in case of thermal expansion or shrinkage due to environmental temperature change, etc., the driver board 400 can slidably move accompanying the deformation of the liquid crystal panel P, so that a connection failure between the driver board 400 and the TABs 330 or between the TABs 330 and the liquid crystal panel P can be prevented, and also the breakage in the liquid crystal drive TABs 330 can be prevented. By using the holding plates 702, the driver board can be supported with a very small space thereabove. In other words, it is possible to minimize the space required for supporting the driver boards 400, whereby the driver boards and consequently the display apparatus body 200 can be reduced in size. Further, a single holding plate 702 can be used for supporting plural driver boards so that the number of components can be reduced and the assemblage thereof is simplified to reduce the production and component costs.

In the above embodiment, the material of the holding plates 702 need not be particularly limited as far as it can exhibit a spring effect. However, the holding plates 702 can be made of an electroconductive member so as to function as a grounding terminal held at a prescribed potential or be electrically connected with a grounding terminal of the driver board 400, thereby ensuring the grounding of the driver board 400.

<Another supporting structure for face plate 242>

Another embodiment regarding a support structure for a face plate disposed in front of the liquid crystal panel P will be described with reference to FIG. 148.

In this embodiment, as shown in FIG. 148, a panel cover 703 is disposed on a backside (liquid crystal panel P-side) of a front cover 201. The panel cover 703 is formed of polycarbonate resin containing glass fiber dispersed therein, and the outer surfaces (inclusive of the front surface, rear surface and side surfaces) thereof are plated with nickel, etc. The panel cover 703 is formed in a frame shape having an opening 703a, and the frame portion has a sectional shape of almost "L" as shown in FIG. 148.

In this embodiment, the panel-fixing plate 233 is attached to the panel cover 703 via a panel-holding elastic member 232 and a panel frame 231. The front surface of the panel cover 703 is provided with a recess where the face plate 242 is bonded via an adhesive member 244 (FIG. 15), and the opening 703a of the panel cover 703 is closed with the face plate 242. The panel cover 703 is attached to the front cover 201 so as to retain a prescribed gap therefrom, and the face plate 242 is held by sandwiching between the panel cover 703 and the front cover 201. The disposed face plate 242 also closes the opening 201a of the front cover 201.

The face plate 242, panel cover 703, panel-fixing plate 233 and liquid crystal panel P forms an almost closed space S2. On the lower surface of the panel cover 703 (opposite to the liquid crystal panel P), an elastic member 243 is applied along the entire periphery of the opening 703a, and the elastic member 243 is abutted to the panel P to further define a smaller space within the above-mentioned space S2, thereby preventing intrusion of dirt onto the surface of the liquid crystal panel P.

In this panel- and face plate-support structure, the front cover 201 and the rear cover 202 can be easily detached, so that the backlight unit 530 or lamps therein can be easily exchanged even when high-luminance lamps having a shorter life are used. The backlight unit 530 can be exchanged without impairing the closed state of the spaces S1 and S2 formed below and above the display unit 230, so that the attachment of dirt onto the liquid crystal panel P leading to display defects is obviated. Accordingly, no wiping for dirt removal is required, and the exchange can be performed simply without using a clean room. At the time of backlight exchange, the diffusion plate 239 is exposed so that dirt can be attached to the lower surface of the diffusion plate 239. However, the diffusion plate 239 is not adversely affected by a mechanical stress unlike the liquid crystal panel P, so that the wiping thereof is possible. Further, even if dirt remains attached thereon, the attached dirt is less recognizable because of the light diffusion effect of the diffusion plate 239 per se, so that a display defect is not liable to be caused thereby.

On the other hand, as an almost closed space S2 is formed above the display unit 230, an impact or vibration possibly applied to the display apparatus can be quickly attenuated by the air damper effect of the space S2 to prevent display quality deterioration.

In this embodiment, the face plate 242 is composed of glass plate showing a longitudinal elastic coefficient which is ca. 30 times as large as that of a transparent resin plate (e.g., acrylic resin plate), so that less warp is caused in resistance to an external stress. Accordingly, even if the space S2 causes repetitive expansion and shrinkage accompanying the vibration of the display unit 230, the face plate is not substantially warped thereby to effectively retain the air damper effect of the space S2 and attenuate the vibration of the display unit 230 in a short period.

Further, as the backlight unit 530 is not required to participate in formation of such an almost closed space, the rear cover 202 may be provided with perforations for ventilation to effectively discharge most of the heat evolved from the backlight unit 530 through the perforations similarly as in the above-described embodiment. The portion of heat not discharged through the perforations is interrupted by the diffusion plate 239 disposed between the display unit 530 and the liquid crystal panel P. Accordingly, the heat transferred by connection within the space S1 to the liquid crystal panel P is substantially reduced to provide a uniform temperature distribution.

<Another embodiment regarding backlight unit>

Another embodiment regarding backlight unit is described with reference to FIGS. 149–151.

Figure 149:
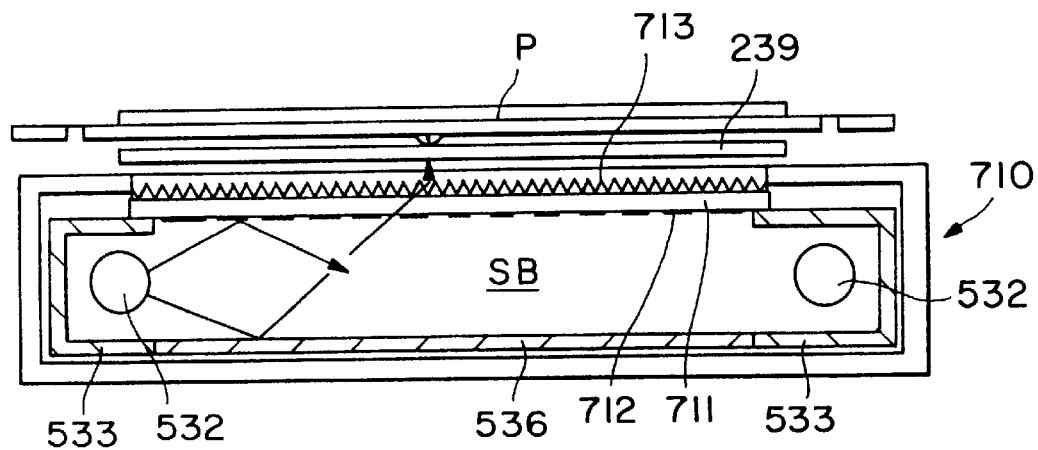
FIG. 149 is a sectional view of another example of backlight unit.
Figure 150:
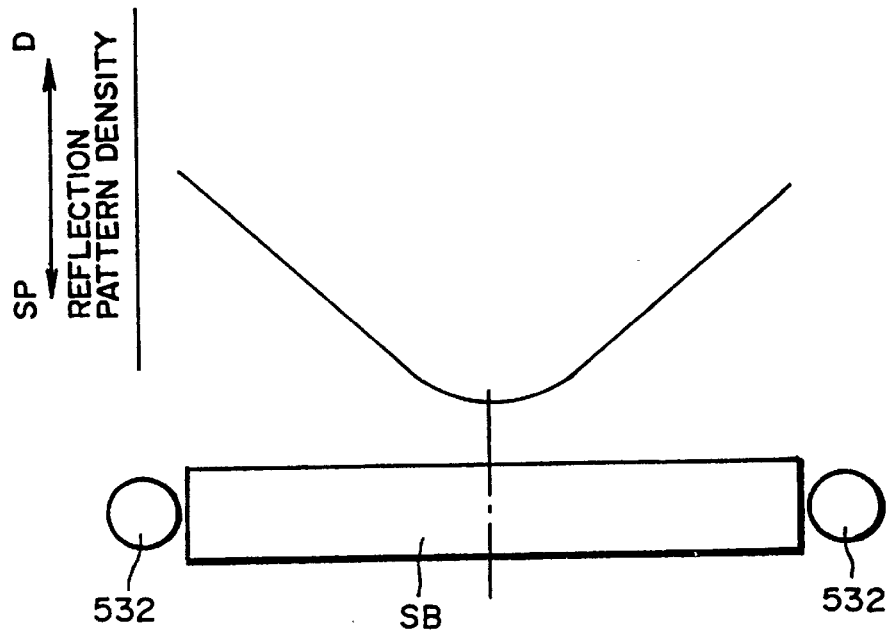
FIGS. 150 and 151 are a schematic sectional illustration and a schematic planar illustration, respectively, of a reflection pattern density.

Referring to FIG. 149, a backlight unit 710 according to this embodiment is provided with a front or fore-side transmission plate 711 disposed in parallel with a rear reflection plate 536 and a space SB formed as a light guide means between the rear reflection plate 536 and the front transmission plate 711.

The front transmission plate 711 is formed of a thin transparent plate, on a lower surface of which is disposed a reflection pattern (luminance distribution adjusting means) 712. In other words, the reflection pattern 712 is disposed on a fore-side of the light guide means (space S) so as to be opposite to the rear reflection plate 536. The reflection pattern 712 may for example be formed by vapor deposition of aluminum in the form of a mesh or dots in a distribution density such that a smaller amount of light is emitted in a fore direction toward the liquid crystal panel P at a position of a higher distribution density and a larger amount of the light is emitted at a position of a lower distribution density. The distribution density of the reflection pattern 712 is designed to be as shown in FIGS. 150 and 151. More specifically, the distribution density of the reflection pattern 712 along a section including linear light sources and a center of the transmission plate 711 is set to be the highest in the vicinities of the linear light sources 532 and to be lower as the position leaves away from the the light sources 532. Further, the distribution density is designed to continuously vary gently along a smooth curve (i.e., not to provide a discontinuity in change rate of the distribution density) at a central part of the illumination device. Further, the areal distribution density of the reflection pattern 712 is designed to be the lowest in the vicinity of the center of the light guide space SB and higher at positions closer to the linear light sources 532. Each iso-distribution density curve forms an angle-free closed loop, preferably an angle-free closed loop which is almost similar in shape to the outer contour of an effective emission surface of the transmission plate 711 (a rectangle in this embodiment). More specifically, the iso-distribution density curve is designed to draw a closed loop having a long axis/short axis ratio substantially equal to a long side/short side ratio of the effective emission surface.

On the other hand, on a fore-side (upper side) of the front transmission plate 711, a prism sheet 713 is disposed so as to uniformize the directionality of illumination light. On the prism sheet 713, respective prisms are disposed so that the extension direction of each prism ridge is parallel with the longitudinally extending directions of the linear light sources 532. (In case of using 4 fluorescent lamps, another prism sheet may preferably be disposed in superposition so that its prism ridge extension direction is in parallel with the longitudinal extension direction of the other pair of fluorescent lamps.) Further, the respective prisms are so disposed that their apex angles are directed toward the front transmission plate 711.

According to this embodiment, the occurrence of bright lines on an illumination surface of an illumination device (backlight device) is suppressed to provide a uniform planar luminance distribution, thereby providing the liquid crystal panel with good display qualities.

Figure 151:
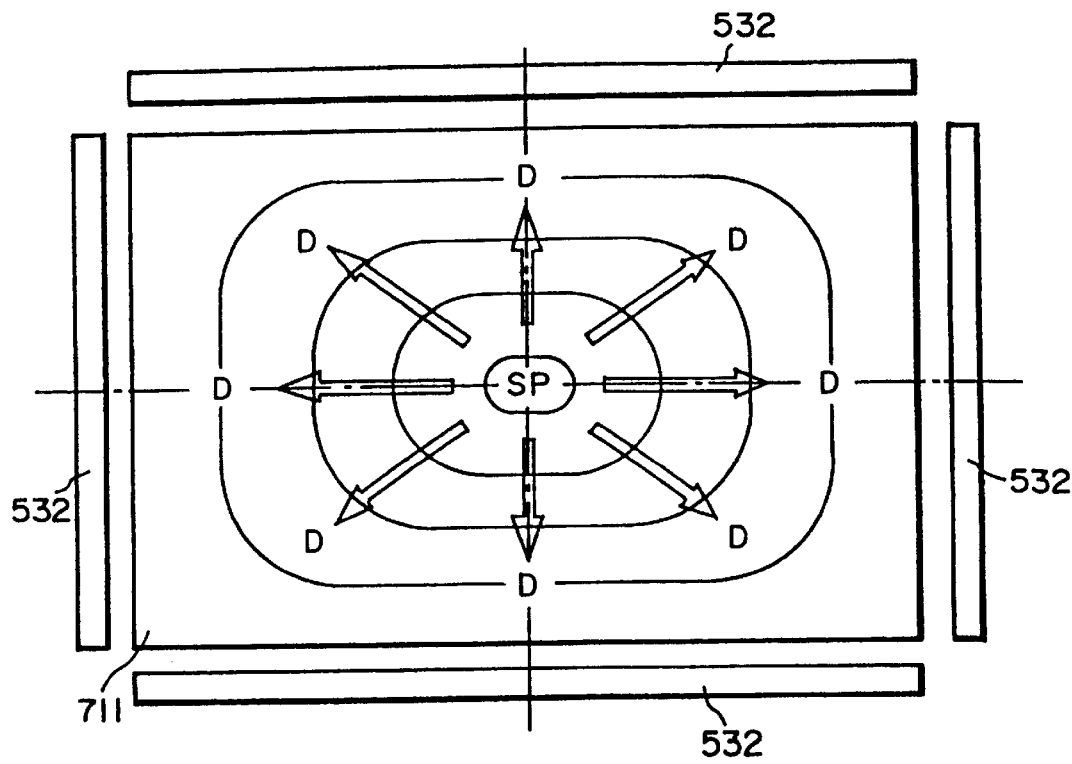

As described above, the reflection pattern 712 is disposed in a distribution density as shown in FIG. 151. However, this is not limitative. For example, in case where the backlight unit 710 provides four corner portions where the luminance is lowered, it is possible to provide a lower distribution density of the reflection pattern 712 than the surrounding regions, thereby increasing the luminance of light emitted from such corner regions to moderate and substantially uniformize the luminance distribution over the entire illumination surface (as shown in FIG. 84). On the other hand, in case where there is a locally excessive luminance portion, it is possible to increase the distribution density of the reflection pattern 712 than in the surrounding region, thereby uniformizing the luminance distribution over the entire surface. Such an adjustment of the distribution density may be performed depending on the type (characteristic) and disposition of the light source used. The light-guide space SB as a light guide means may be replaced with a transparent member such as an acrylic resin plate.

<Another embodiment regarding data signals>

A case of applying different waveforms of signals outputted from data-side ICs 350B1 and 350B2 (FIG. 64) is described with reference to FIG. 152. In this case, as is understood from FIGS. 152(*d*) and (*e*), a voltage V4 is outputted from the ICs 350B2 when a voltage V3 is outputted from the ICs 350B1. On the other hand, a voltage V3 is outputted from the ICs 350B2 when a voltage V4 is outputted from the ICs 350B1.

Figure 152:
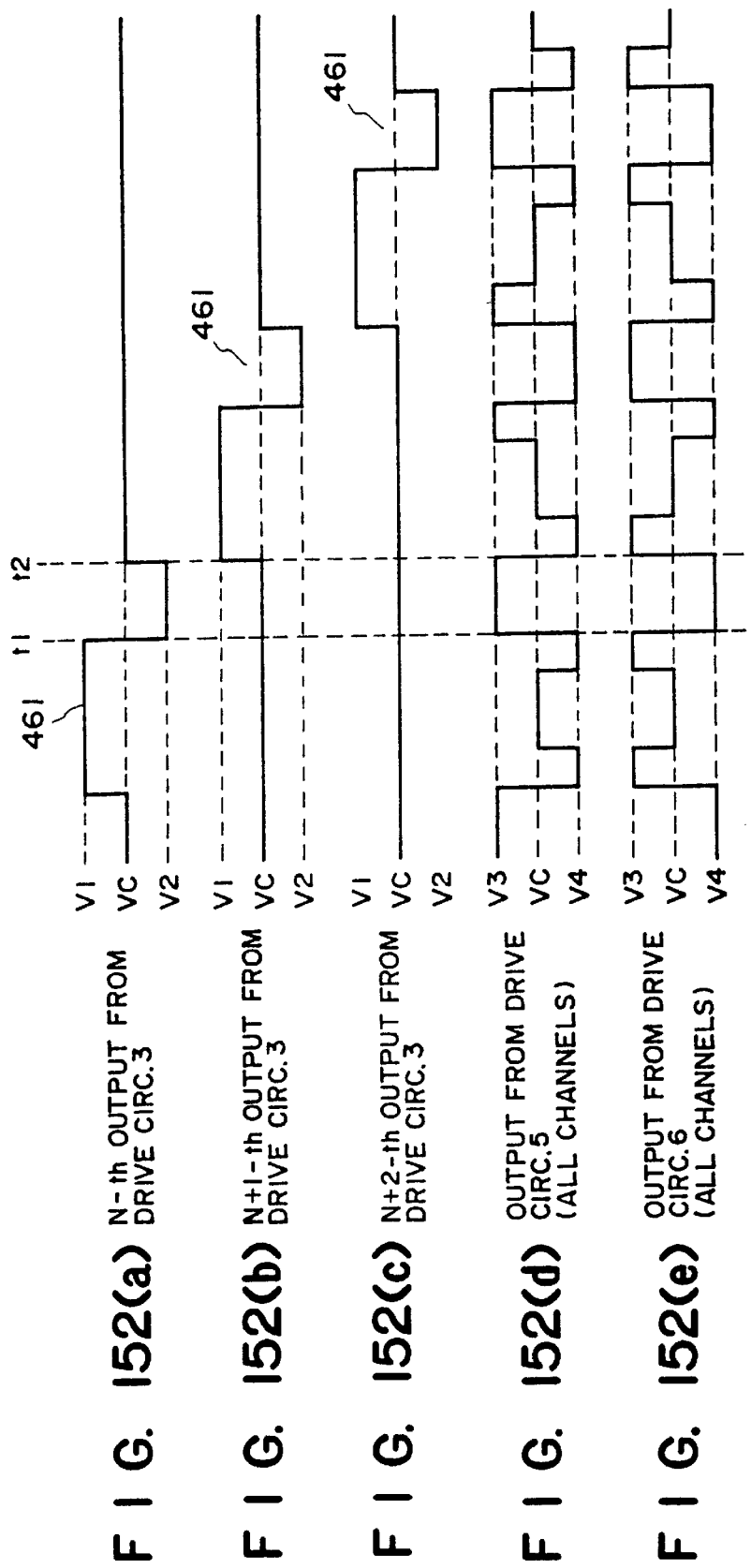
FIG. 152, 155 and 156 are respectively a waveform diagram showing another example set of scanning signals and data signals.

In the case of FIG. 152, e.g., at time t1, most scanning electrodes 269 not receiving the scanning signal assume a constant voltage VC, the data electrodes 281 connected to the data-side ICs 350B1 assume a potential V3, and the data electrodes connected to the other data-side ICs 350B2 assume a potential V4. As a result, at almost the whole region of the liquid crystal panel P, a current flows from the lines at potential V3 of the driver board 400U to the lines at potential V4 of the driver board 400D. On the other hand, at time t2, at almost the whole region of the liquid crystal panel P, a current flows from the lines at V3 of the driver board 400D to the lines at V4 of the driver board 400U.

A similar effect as described above is obtained even in the case of such signal application. More specifically, the cables 456 and 457 supplying drive voltages V3, V4 and VC are short cables so that they can have a low impedance and supply drive waveforms with little delay to the liquid crystal panel P, thus providing good display characteristics.

Further, an abrupt current supply is performed by by-pass capacitors C3 and C4 without flowing a current to the cables, so that a malfunction of the drive circuits can be obviated.

Further, in this embodiment, only the voltages V3, V4 and VC for applying signals to the electrodes 269 and 281 are supplied via the driver board 400L to the data-side ICs 350B1 and 350B2, and voltages for driving the ICs 350B1 and 350B2 are supplied separately to the cables 453 and 455, so that a space economization can be achieved.

Figure 153:
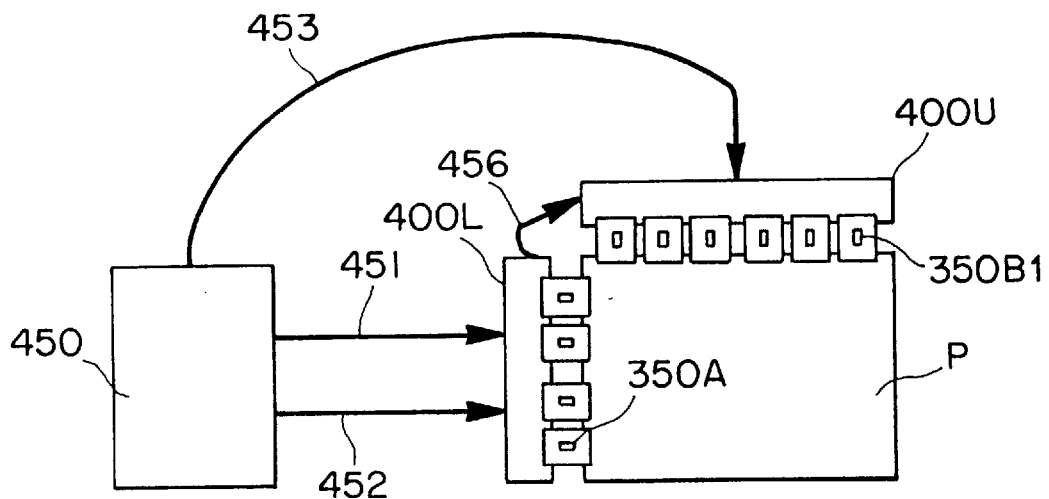
FIGS. 153, 154 and 158–161 are respectively a schematic planar illustration showing another example of circuit connection.
Figure 154:
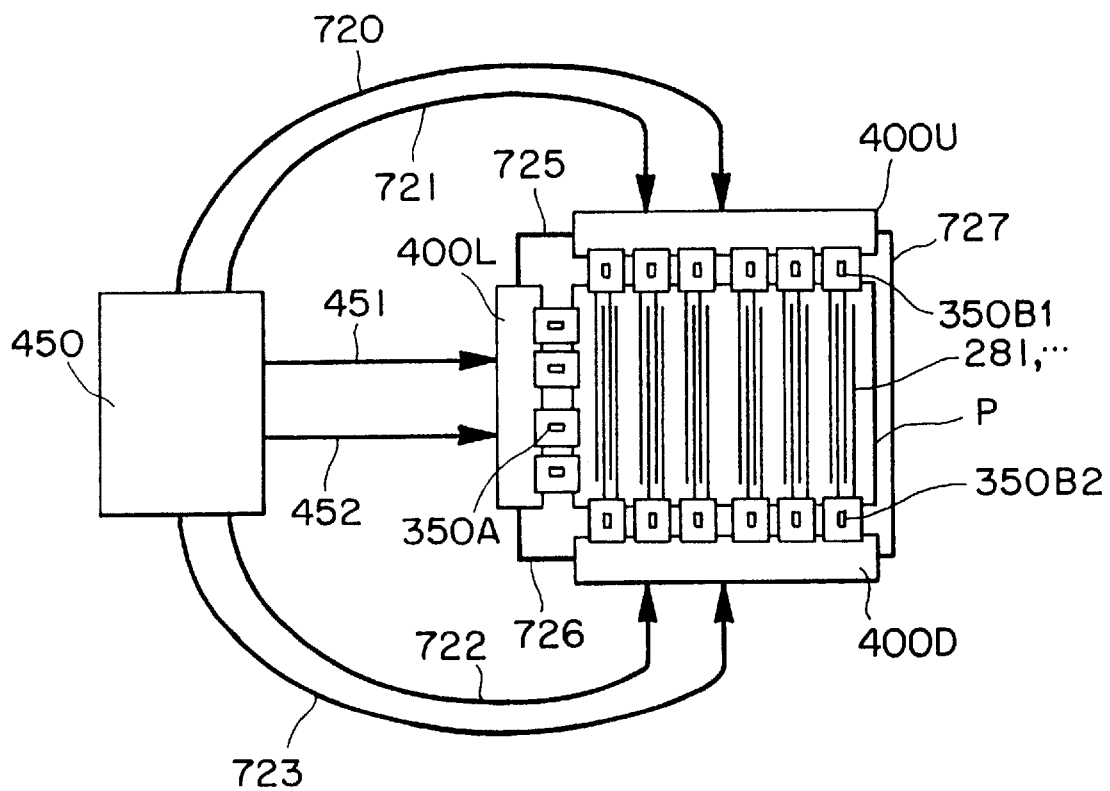

In the above embodiment (FIG. 64), the data side ICs 350B1 and 350B2 are disposed on the upper side and lower side, respectively. However, it is also possible to dispose an upper-side driver board 400U and data side ICs 350B1 only on the upper side of the liquid crystal panel P as shown in FIG. 153. Further, the by-pass capacitors C3 and C4 are formed on the common driver board 400L in the above embodiment but can also be formed on another driver board.

<Another wiring embodiment>

Another wiring embodiment will be described with reference to FIGS. 154–157.

In this embodiment, a common driver board 400L and a driver controller are connected via two flat cables 451 and 452. One cable 451 supplies drive voltages V1, VC and V2 to the scanning-side ICs 350, and voltages and control signals for driving the scanning-side ICs 350A are supplied through the other cable 452.

The other driver boards 400U and 400D are connected to the driver controller 450 via two flat cables 720, 721 or 722, 723. Through one cable 720 or 722, drive voltages V3, VC and V4 are supplied to data-side ICs 350B1 or 350B2 and, through the other cable 721 or 723, voltages and control signals for driving the data-side ICs 350B1 or 350B2 are supplied.

The common driver board 400L and the upper driver board 400U are connected via a flat cable 725, and the common driver board 400L and the lower driver board 400D are connected via a flat cable 726. Further, the grounds of the upper and lower driver boards are connected via a cable 727.

The scanning-side ICs 350A receiving the drive voltages V1, VC and V2 are designed to supply a scanning signal 730 as shown at FIGS. 155(a)–(c) to the respective scanning electrodes. The scanning signal, as shown at FIG. 155(a), includes a reset pulse 731 and a selection pulse 732 subsequent to the reset pulse and is sequentially applied to the scanning electrodes 269 (according to a line-sequential scanning scheme) as shown at FIGS. 155(a)–155(c), which show a manner of line-sequential scanning by indicating the scanning signals sequentially applied to n-th, n+1-th and n+2-th scanning electrodes, while the other scanning electrodes are also subjected to similar line-sequential scanning. Further, as is understood from FIGS. 155(a)–(c), during a period when one scanning electrode (e.g., an n-th scanning electrode) is supplied with a scanning signal 730, the other scanning electrodes (other than the n-th scanning electrode) are supplied with a constant voltage VC. In other words, in case of a 1/480 duty, when one arbitrary line receives a voltage of V1 or V2, the other 479 lines are supplied with a voltage of VC.

On the other hand, the data-side ICs 350B1 and 350B2 having received the voltages V3, VC and V4 are designed to apply data signals having waveforms shown at FIGS. 155(d) and (e) to the data electrodes 281. As is understood from FIGS. 155(d) and (e), these waveforms are identical to each other and are synchronized with the scanning signal 730.

The data electrodes 281 can also be supplied with signal waveforms as shown at FIGS. 156(d) and (e). Herein, the data signal supplied through a data-side IC 350B1 on the upper driver board 400U (FIG. 156(d)) and the data signal supplied through the data-side IC 350B2 on the lower driver board 400L are such that one comprises potentials of V3 and V4 when the other comprises V4 and V3, and one comprises a potential VC when the other also comprises VC.

Figure 157:
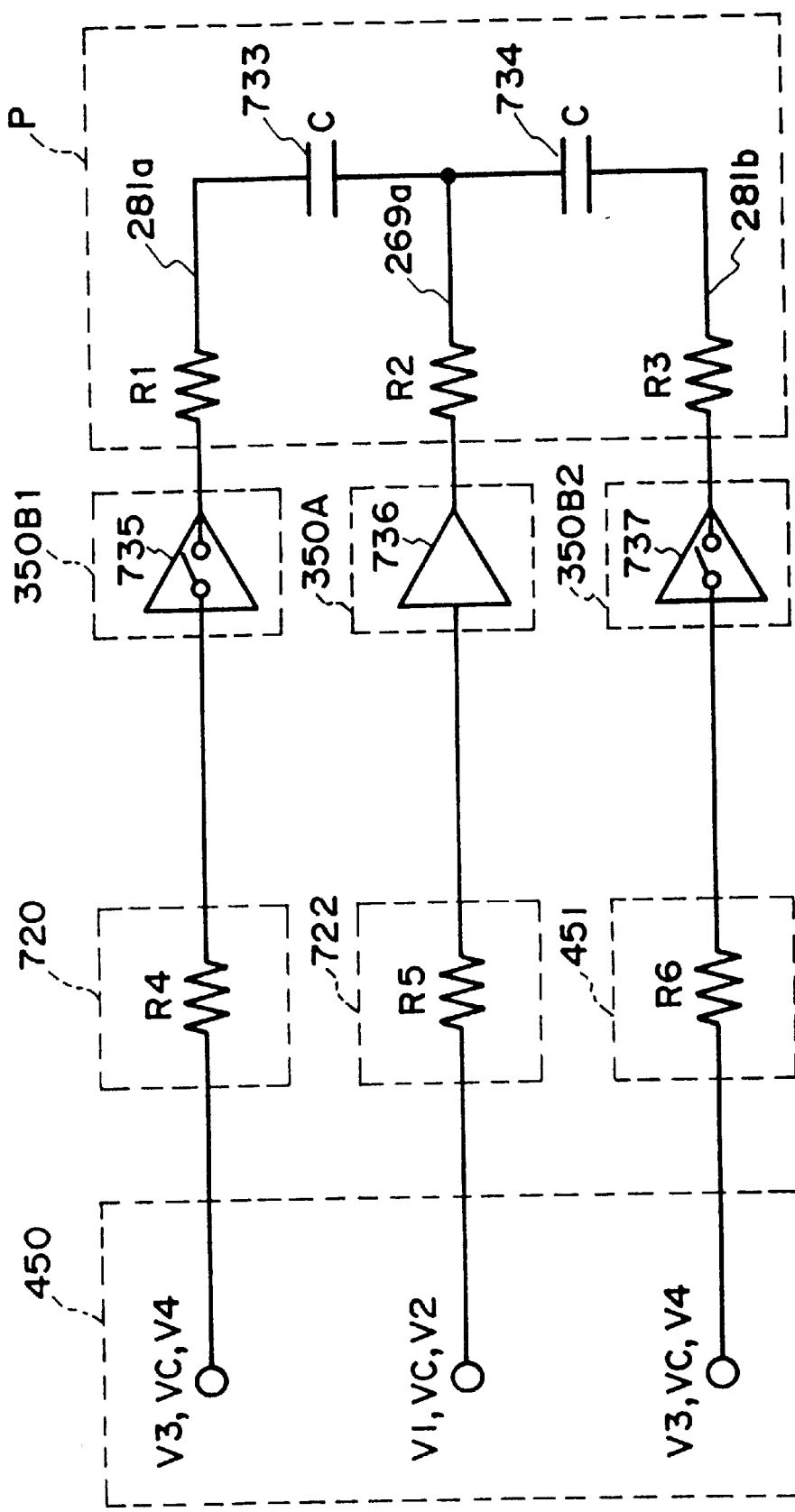
FIG. 157 is a block diagram showing another wiring state.

FIG. 157 shows a circuit applicable to this embodiment. Referring to FIG. 157, numeral 733 represents a pixel formed at an intersection of a data electrode 281a and a scanning electrode 269a; numeral 734 represents a pixel formed at an intersection of a data electrode 281b and the scanning electrode 269a; symbol C represents an electrostatic capacitance of each pixel; R1, R2 and R3 represent the internal resistances of the electrodes 281a, 269a and 281b, respectively; numerals 735, 736 and 737 represents switching elements disposed within the ICs 350B1, 350A and 350B2, respectively; and symbols R4, R5 and R6 represents the internal resistances of the flat cables 720, 722 and 451. The drive voltages V3, VC and V4 are supplied via the flat cable 720 to the data-side ICs 350B1 and converted by the switching elements 735 into signals of prescribed shape, which are applied to the data electrodes. Similarly, the drive voltages V1, VC and V2 are supplied via the flat cable 722 to the scanning-side ICs 350A and converted by the switching elements 736 into a signal of prescribed shape which is supplied to the scanning electrodes 269a.

Figure 155:
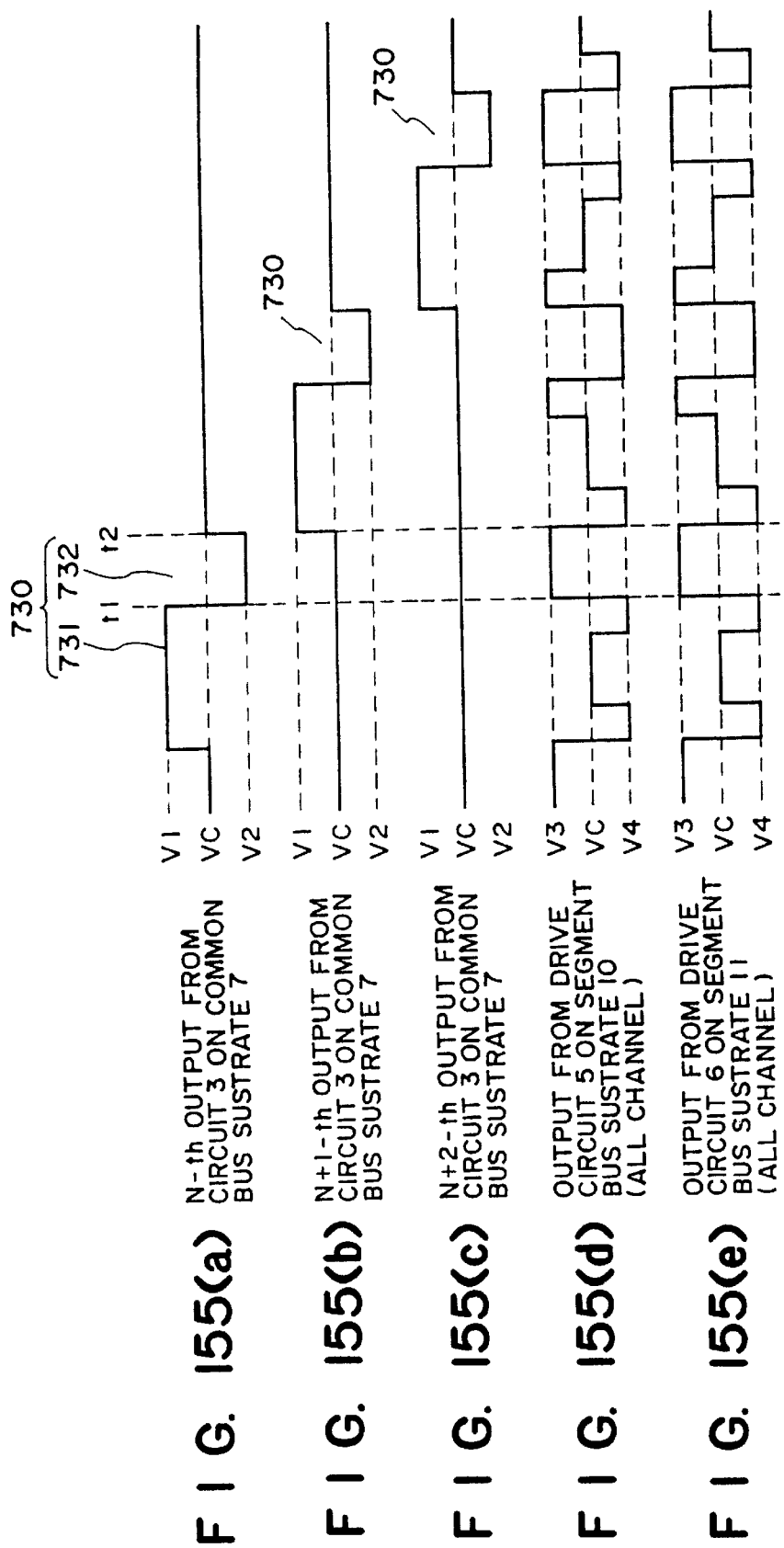

The operation of this embodiment when supplied with the signals shown in FIG. 155 will be described.

When the apparatus is driven, drive voltages and control signals for driving the scanning-side ICs 350A are supplied from the driver controller 450 to the scanning-side ICs 350A via the flat cable 452 and the driver board 400L, and drive voltages and control signals for driving the data side ICs 350B1 and 350B2 are supplied from the driver controller 450 to the data side ICs 350B1 and 350B2 via the flat cable 721 or 723.

On the other hand, drive voltages V1, VC and V2 are supplied from the driver controller 450 to the scanning-side ICs 350A via the flat cable 451 and the driver board 400L to be converted into the scanning signal 730 having the above-described waveform. The scanning signal 730 is sequentially applied to the respective scanning electrodes according to the above-mentioned line-sequential scanning scheme. Further, the drive voltages V3, VC and V4 are supplied via the flat cable 720 or 722 to the data-side ICs 350, where the data signals as shown at FIGS. 155(d) and (e) are formed and applied to the data electrodes. In this case, the data signal waveforms are identical, so that all the data electrodes on the liquid crystal panel are placed at identical potentials.

Under the voltage application state, at time t1 for liquid crystal switching, most scanning electrodes 269 not receiving the scanning signal 730 are supplied with a constant voltage VC and all the data electrodes 281 are equally supplied with a voltage V3 so that, at almost the whole region of the liquid crystal panel P, a current flows from the data lines at V3 to the scanning lines at VC (i.e., from the driver boards 400U and 400D to the scanning driver board 400L). Further, at time t2 for another liquid crystal switching, all the data electrodes 281 are supplied with a voltage V4 and most scanning electrodes 269 are supplied with a constant voltage VC so that, at almost the whole region of the liquid crystal panel P, a current flows from the scanning lines at VC to the data lines at V4 (i.e., from the scanning driver board 400L to the data driver boards 400U and 400D).

In this way, at time t1 and t2, abrupt currents flow through the liquid crystal drive voltage lines (V3, VC and V4) and the driver voltage lines (V3, VC and V4) on the flat cables. These liquid crystal drive voltage lines are adjacent to the ground line so that an electromotive force occur in the ground line due to electromagnetic induction and an induction current flows through the ground line. At times t1 and t2, the directions of current flow are opposite, so that the directions of the electromotive force are also opposite.

In a conventional apparatus, the driver board 400L has not been connected with the upper or lower driver board 400U or 400D, so that a current for dissolving the electromotive force returns through one flat cable to the driver controller 450 and then flows through the other flat cable. Accordingly, the current flow path is very long and involves a very large impedance, so that a sufficient response is not attained against an abrupt induction current.

However, in this embodiment, the driver board 400L is connected with the driver boards 400U and 400D through the flat cables 725 and 726, respectively, so that current can be flowed through these cables, which are relatively short and do not involve a large impedance. As a result, the change in ground level between the scanning-side diver board 400L and the data-side driver boards 400U and 400D oppositely changing can be suppressed.

Figure 156:
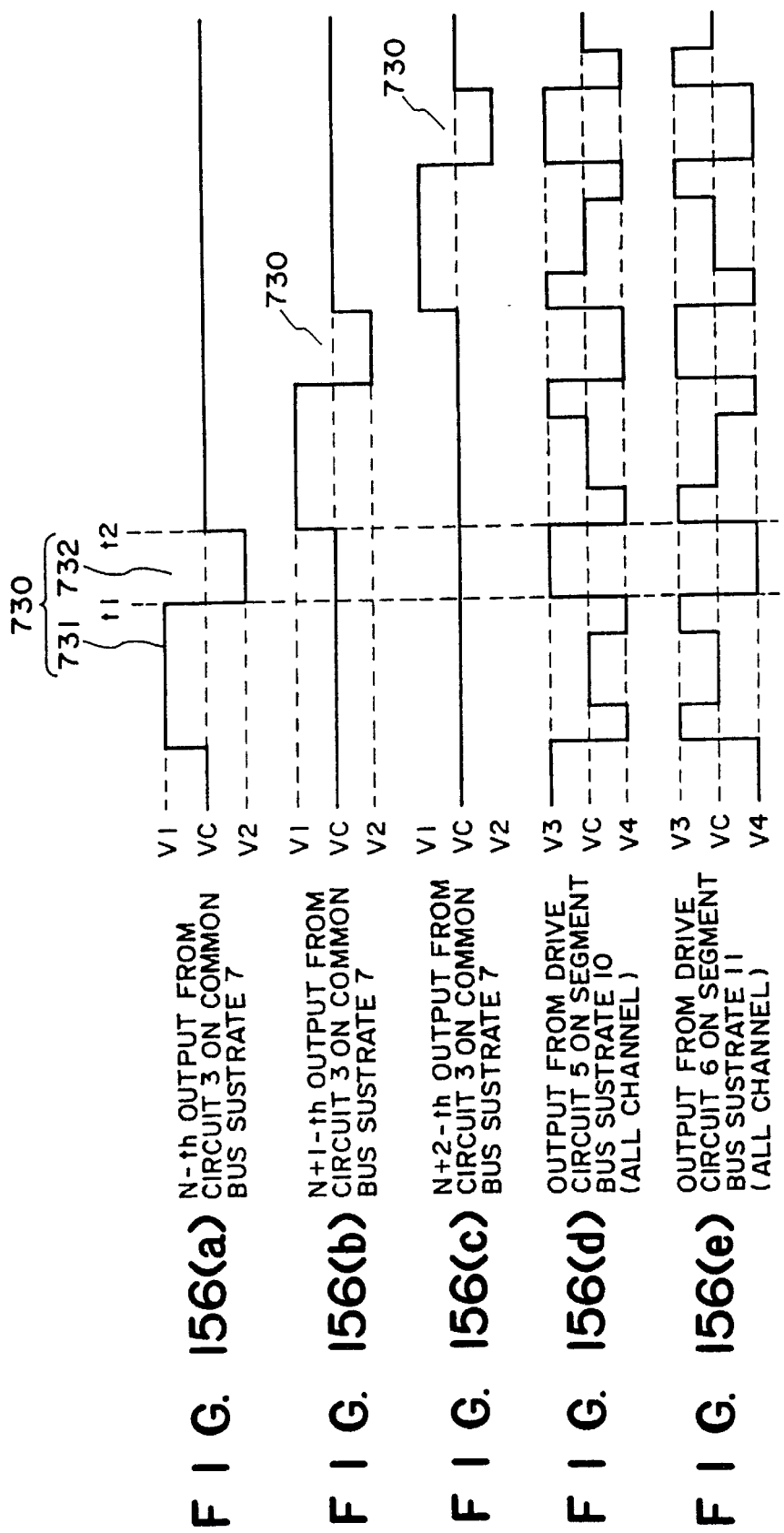

In case of receiving the signals shown in FIG. 156, this embodiment functions in the following manner.

In this case, at time t1, the data electrodes 281 connected to the data-side ICs 350B1 are supplied with a voltage V3, and the other data electrodes 281 connected to the data-side ICs 350B2 are supplied with a voltage V4. Accordingly, a potential difference occurs between adjacent data electrodes.

As a result, a current flows from the V3 lines on the upper driver board 400U to the V4 lines on the low driver board 400D. On the other hand, at time t2, the applied voltages are reversed, so that a voltage V4 is supplied from the data-side ICs 350B1 and a voltage V3 is supplied from the data side ICs 350B1. As a result, a current flows from the V3 lines on the lower driver board 400D to the V4 lines on the upper driver board 400U. In this way, in the case of applying the signals shown in FIG. 156, currents flow between the upper and lower driver boards 400U and 400D while the flow direction varies time to time. Because of the current, an electromotive force occurs due to electromagnetic induction in the adjacent ground line to cause a current flowing therethrough.

In a conventional apparatus, the driver board 400L has not been connected with the upper or lower driver board 400U or 400D, so that a current for dissolving the electromotive force returns through one flat cable to the driver controller 450 and then flows through the other flat cable. Accordingly, the current flow path is very long and involves a very large impedance, so that a sufficient response is not attained against an abrupt induction current.

However, in this embodiment, the driver board 400L is connected with the driver boards 400U and 400D through the flat cables 725 and 726, respectively, so that current can be flowed through these cables, which are relatively short and do not involve a large impedance. As a result, the change in ground level between the scanning-side diver board 400L and the data-side driver boards 400U and 400D oppositely changing can be suppressed.

According to this embodiment, the ground level change occurring at the time of liquid crystal can be suppressed by connecting the driver boards 400L, 400U and 400D with the flat cables 725, 726 and 727. This effect is particularly noticeable against a large ground level change occurring when an extreme pattern is displayed as described with reference to FIG. 156, etc., and a stable display performance is ensured in any display pattern.

Figure 158:
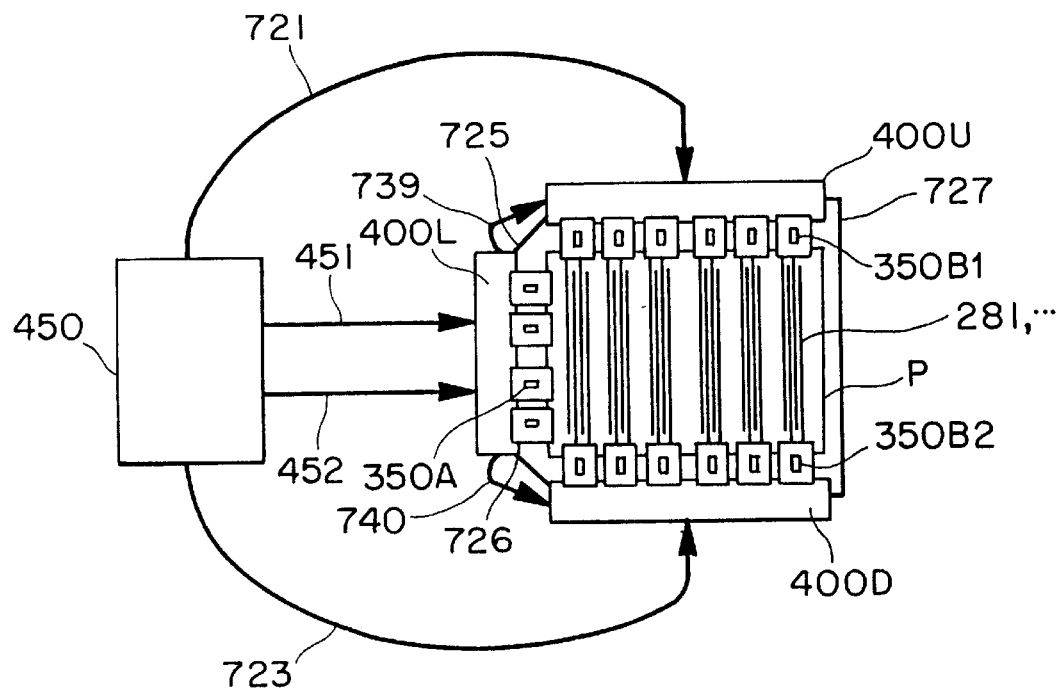

Another wiring embodiment will be described with reference to FIG. 158.

In this embodiment, the driver boards 400U and 400D are connected to the driver controller 450 respectively with a single cable 721 or 723. The upper driver board 400U and the common driver board 400L are connected with two flat cables 725 and 739, and the lower driver board 400D and the common driver board 400L are connected with two flat cables 726 and 740. The drive voltages are supplied from the driver controller 450 to the driver boards 400U and 400D not through the flat cables 720 and 722 as in the above embodiment (FIG. 154) but through a flat cable 451, a common driver board 400L and flat cables 739 and 740. Voltages and control signals for driving the data-side ICs 350B1 and 350B2 supplied through the flat cables 721 and 732 similarly as in the above embodiment.

In this embodiment, an abrupt current can flow through the liquid crystal drive system similarly as in the above embodiment, and accordingly an induction current flows through the respective ground lines. However, in this embodiment, as the driver boards 400U, 400L and 400D are connected with cables 739, 740 and 726 which provide only short paths and not a large impedance, so that the ground level change can be suppressed.

According to this embodiment, the ground level change occurring at the time of liquid crystal switching can be suppressed by connecting the driver boards 400L, 400U and 400D with the flat cables 739, 740 and 727. This effect is particularly remarkable in response to a large ground level change occurring in an extreme pattern switching, so that stable display performance is ensured in any display pattern.

Figure 159:
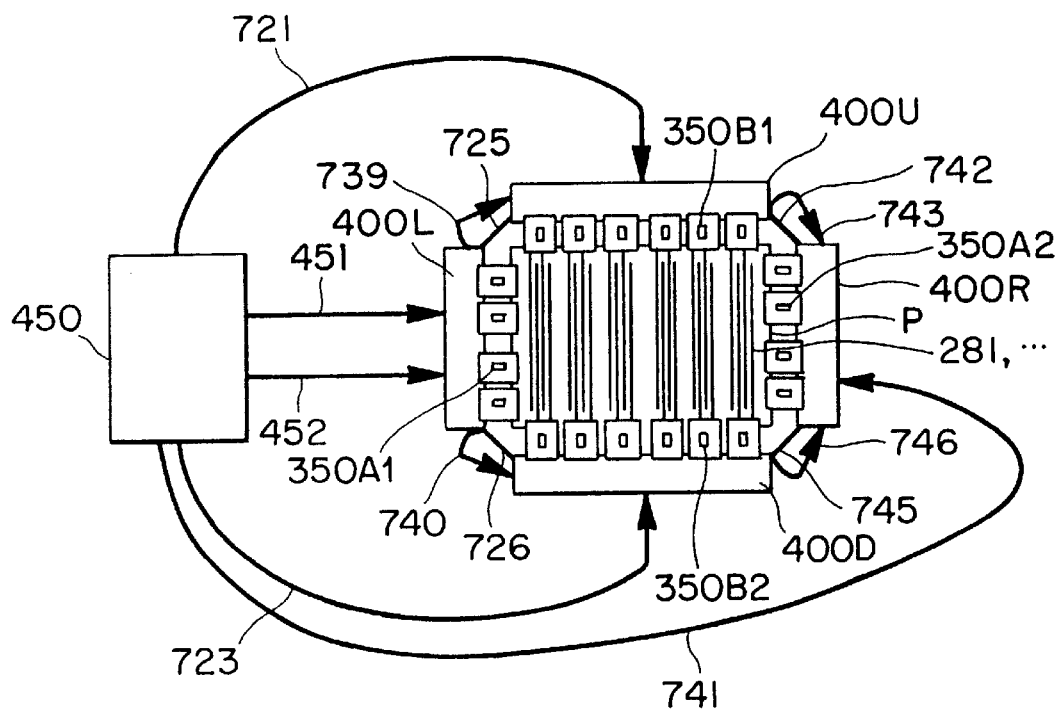

Still another wiring embodiment will be described with reference to FIG. 159.

In this embodiment, scanning-side ICs 350A1 and 350A2 are disposed on a left side and a right side, respectively, of the liquid crystal panel P, and the scanning electrodes 269 are alternately connected to the scanning-side ICs 350A1 and 350A2 and the right-side ICs 350A2 are connected to a driver board 400R, which is connected to a driver controller 400R with a flat cable 741. The driver board 400R and the upper driver board 400U are connected with two flat cables 742 and 743, and the driver board 400R and the lower driver board 400D are connected with two flat cables 745 and 746. Liquid crystal drive voltages are supplied to the driver board 400R through the flat cable 451, driver board 400L, flat cables 739 and 740, driver boards 400U and 400D and flat cables 743 and 746. Voltages and control signals for driving the scanning-side ICs 350A2 are supplied directly to the driver board 400R through the flat cable 741 from the driver controller 450.

In this embodiment, an abrupt current can flow through the liquid crystal drive system similarly as in the above embodiment, and accordingly an induction current flows through the respective ground lines. However, in this embodiment, as the driver boards 400U, 400L and 400D are connected with flat cables 727, 739, 740, 742 and 745 which provide only short paths and not a large impedance, so that the ground level change can be suppressed.

According to this embodiment, the ground level change occurring at the time of liquid crystal switching can be suppressed by connecting the driver boards 400L, 400U, 400D and 400R with the flat cables 727, 739, 740, 742 and 725. This effect is particularly remarkable in response to a large ground level change occurring in an extreme pattern switching, so that stable display performance is ensured in any display pattern. Similar effects can be attained also in case of supplying liquid crystal drive voltages to the respective driver boards.

Figure 160:
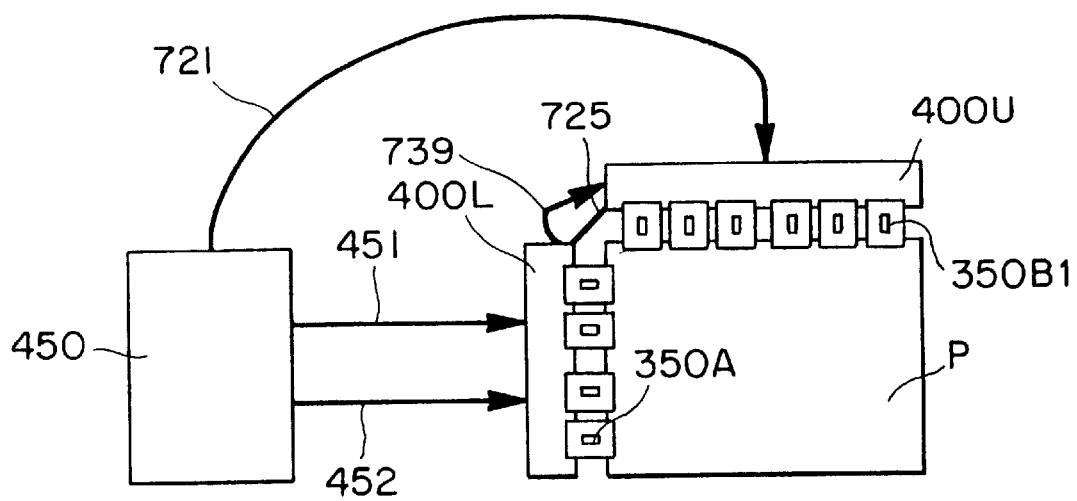

Still another wiring embodiment will be described with reference to FIG. 160.

In this embodiment, the liquid crystal panel P is provided with one upper driver board 400U and one scanning driver board 400L. The upper driver board 400U is supplied with liquid crystal drive voltages through a flat cable 451, a driver board 400L and a flat cable 739. Voltages and control signals for driving the data side ICs 350B1 are supplied directly from the driver controller 450 through the flat cable 721. The driver board 400L and the upper driver board 400U are connected with a flat cable 725 to suppress the ground level change at the time of liquid crystal switching.

In this embodiment, the driver boards 400L and 400U are connected through a flat cable 725, so that the ground level change at the time of liquid crystal switching can be prevented, thereby showing a stable performance. Similar effects can be attained also in case of supplying liquid crystal drive voltages for each driver board.

Figure 161:
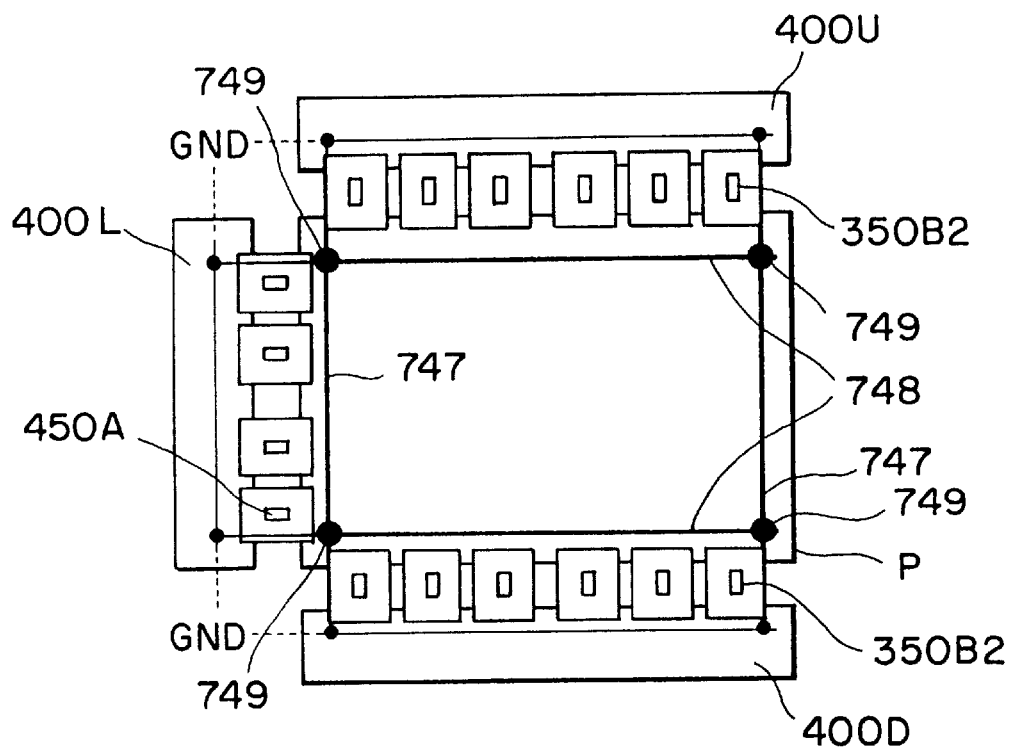

Another wiring embodiment will be described with reference to FIG. 161.

In this embodiment, the ground lines of the respective driver boards 400L, 400U and 400D are not connected with flat cables as in the above embodiments but are connected inside the liquid crystal panel P. More specifically, the liquid crystal panel P is provided, in addition to the electrodes for data display, with electrodes 747 which are connected to the ground lines of the driver boards 400U and 400D through electrodes disposed on both sides of liquid crystal drive TABs carrying liquid crystal drive ICs 350B1 and 350B2. Further, the liquid crystal panel P is provided with electrodes 738 which are connected to the ground line of the driver board 400L. These electrodes 747 and 748 connected with each other at their intersections (interconnecting points) 749 so as to connect the ground lines of the data-side driver boards 400U and 400D with the ground line of the common driver board 400L.

According to this embodiment, the ground lines of the respective driver boards are connected, so that the ground level change at the time of liquid crystal switching can be prevented to provide a stable display performance. Further, in this embodiment, the flat cables for connecting the respective driver boards and connectors therefor can be dispensed with. <Another driver board-supporting structure>

In the above embodiment (FIG. 60, etc.), the driver boards 400 are supported by the holding plates 430, etc. In this embodiment, the driver boards 400 are supported without using such holding plates but by using a projection 750 and an elastic member 751, which will be described with reference to FIGS. 162 to 166.

Figure 162:
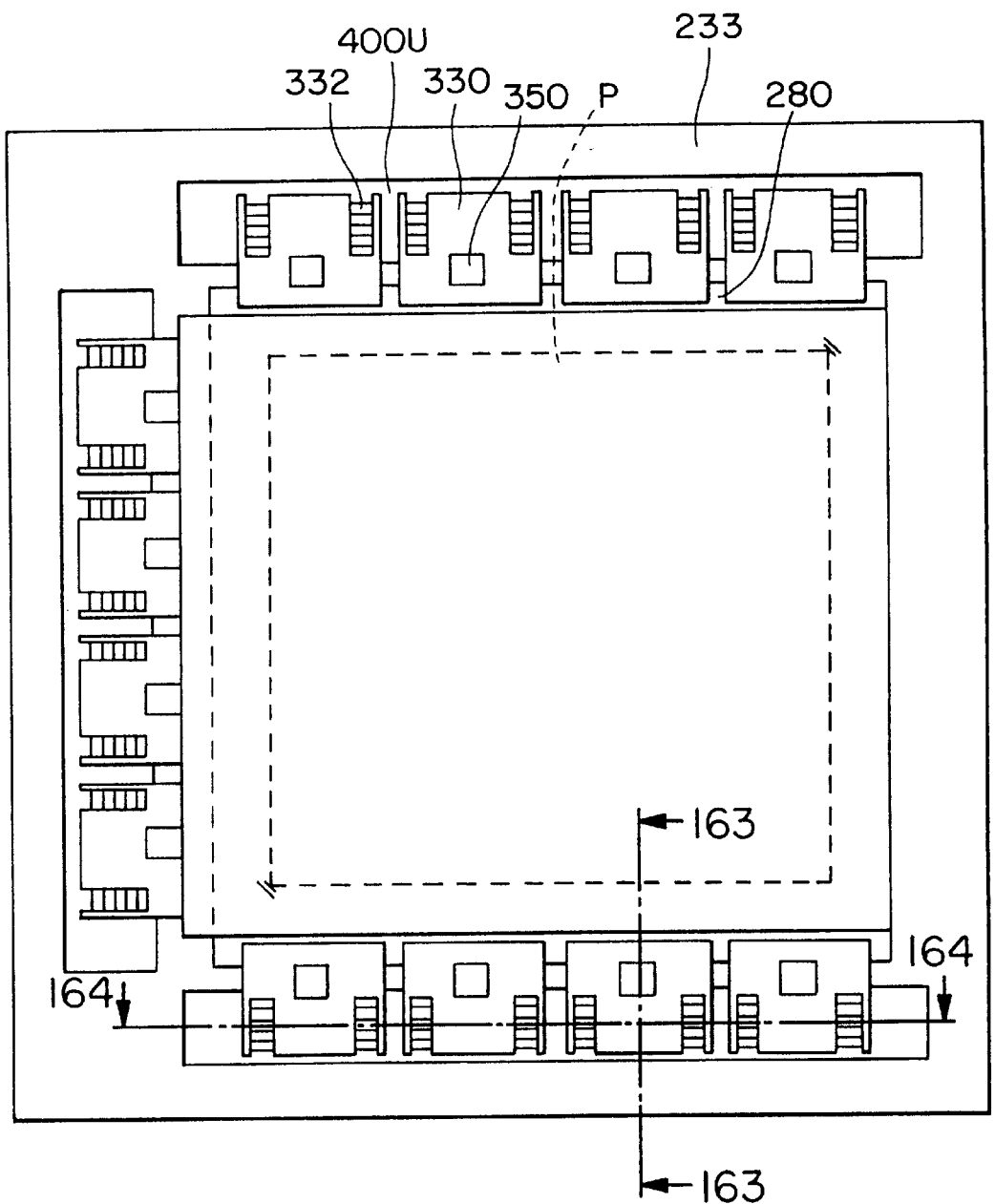
FIG. 162 is a plan view showing a disposition of driver boards.
Figure 163:
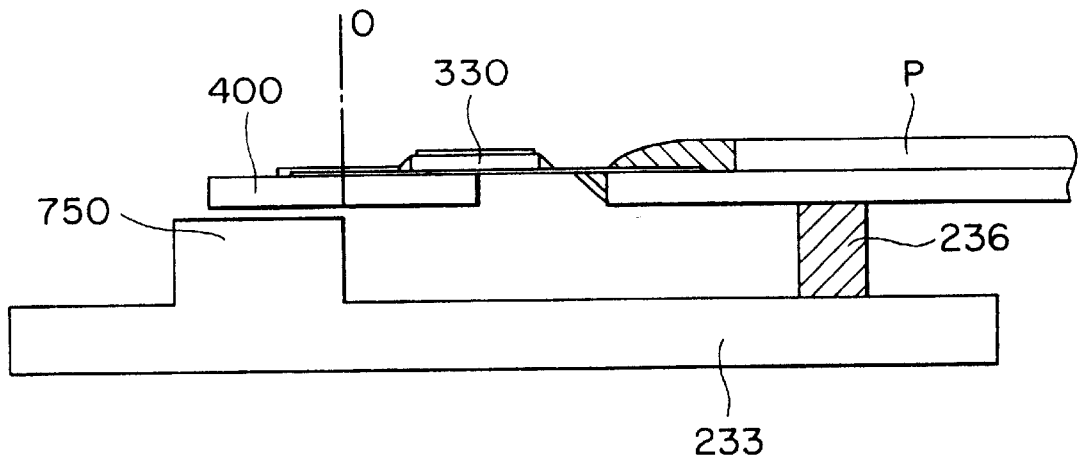
FIGS. 163 and 164 are respectively a sectional view for illustrating a driver board-supporting structure.
Figure 164:
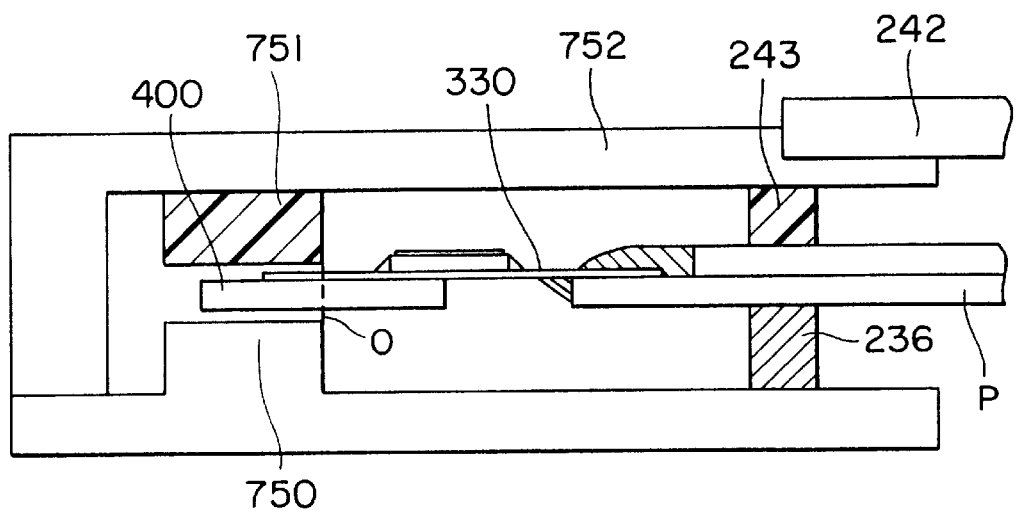

Referring to FIG. 162 (a plan view showing a driver board-supporting structure) and FIG. 163 (a sectional view taken along an 113—113 line in FIG. 162), in this embodiment, a panel-fixing plate 233 is provided with a projection in a region where a driver board 400 is disposed. The projection 750 is formed so as to surround a liquid crystal panel P with respect to its three directions or along its three sides. As more detailedly shown in FIG. 163, relative to the driver board, the projection 750 is disposed at a position farther from the liquid crystal panel P than a central line O (extending in the direction of arrangement of the electrodes or driving the liquid crystal panel P to divide the driver board into equal halves) of the driver board 400. In other words, the projection 750 is formed to support a farther side portion of the driver board 400 from the liquid crystal panel P.

Above the projection 750, an elastic member is disposed in attachment to a face plate-supporting member 752. The elastic member 752 is also disposed outside the central line O (i.e., farther from the liquid crystal panel P). The elastic member 751 is disposed to have a lower surface opposite to and with a small gap from the driver board 400, so that the driver board 400 is held between the elastic member 751 and the projection 750 with a small allowance therebetween.

The function and effect of this embodiment will be described with reference to FIGS. 165 and 166.

Figure 165:
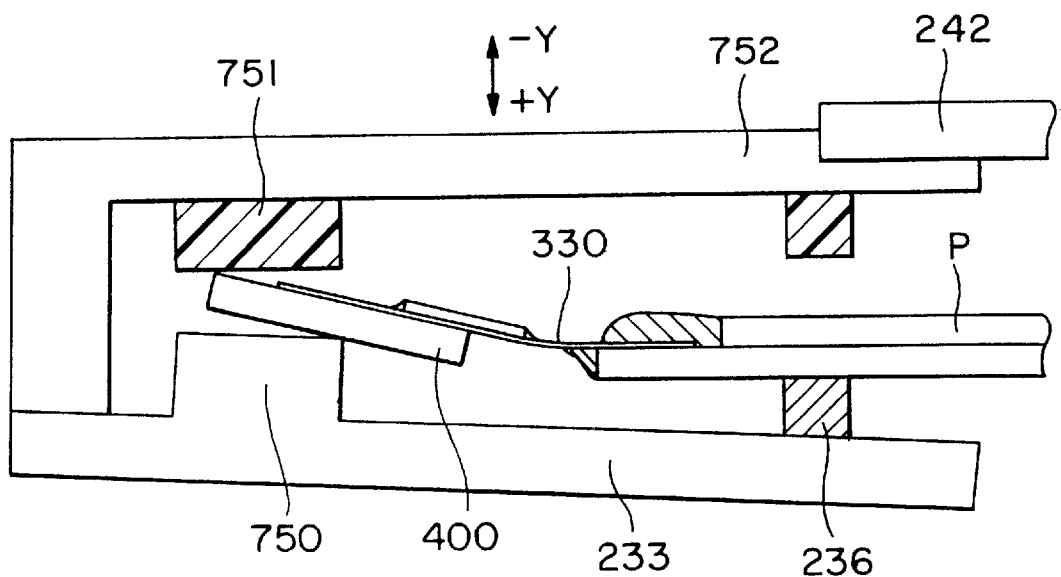
FIGS. 165 and 166 are respectively a schematic sectional view showing a movement of a driver board.

When a dropping impact is applied to the display apparatus body 200 in a +Y direction, the liquid crystal panel P is moved in the same direction and the panel-fixing plate 233 is deformed in an arcuate form so that the elastic member 236 is compressed between the face plate-supporting member 752 and the liquid crystal panel P as shown in FIG. 165. On the other hand, when a dropping impact is applied to the display apparatus body 200 in a −Y direction, the liquid crystal panel P is moved in the same direction, and the panel-fixing plate 233 is deformed in an arcuate form in the −Y direction so that the elastic member 236 is elongated and the elastic member 243 is compressed between the liquid crystal panel P and the face plate-supporting member 752.

At this time, because of the deformation of the panel-fixing plate 233 and the compression and elongation of the elastic members 236 and 243, the positional relationship between the liquid crystal panel P and the driver board 400 is changed to move the driver board 400. Thus, as the driver board 400 is supported by the projection 750 and the elastic member 751 with respect to its farther side portion from the liquid crystal panel P, the driver board is allowed to rotatively move as shown in FIGS. 165 and 166.

As a result, even if a strong impact or vibration is applied to the display apparatus body 200, the stress applied to the liquid crystal drive TAB 220 is reduced to prevent the breakage or separation of the TAB 330.

Further, as the driver board 400 is held between the elastic member 751 and the projection 750 with a small gap, an excessive jumping of the driver board 400 can be prevented even when a strong impact or vibration is applied. Further, some degree of deformation of the driver board per se may be allowed. Accordingly, the stress applied to the liquid crystal drive TAB 330 is reduced to prevent the breakage or connection separation of the TAB 330.

Figure 167:
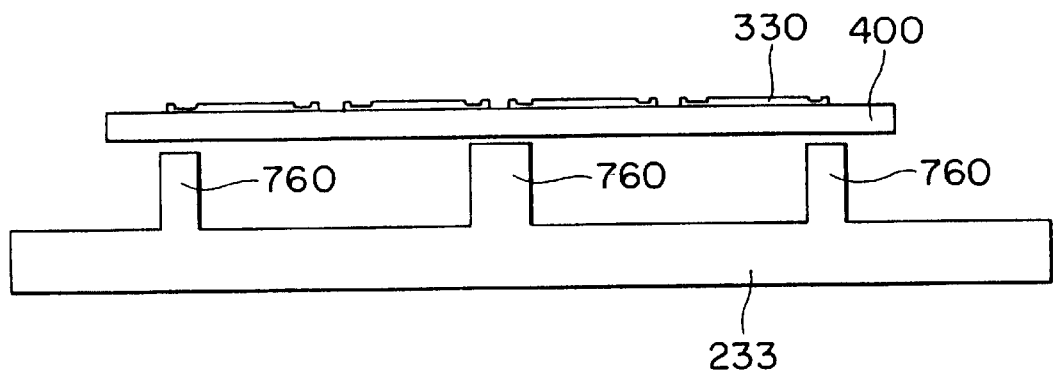
FIGS. 167 and 168 are respectively a sectional view showing another driver board-supporting structure.
Figure 168:
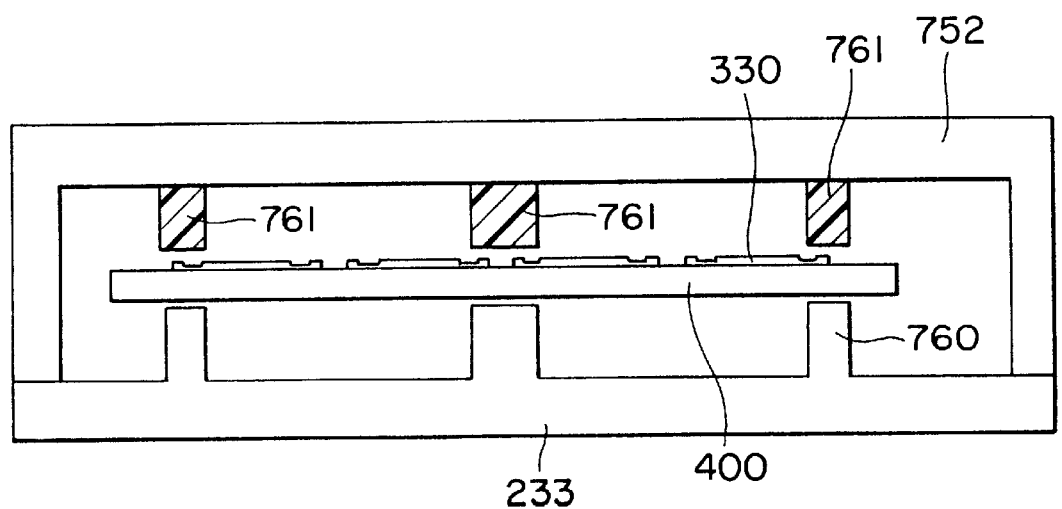

Then, another driver board-supporting structure is described with reference to FIGS. 167–168.

In the above embodiment, the projection 750 is continuously formed on the panel-fixing plate in the whole region where the driver boards 400 are arranged. In this embodiment, three projections 760 are formed along each side of the panel fixing plate 233 where a driver board is disposed at positions corresponding to both ends and a central portion along the length of the driver board 400 as shown in FIG. 167. Above the projections 760, elastic members 761 are disposed, respectively, in attachment with a front frame 752 (FIG. 168). These elastic members 761 are disposed to have a lower end surface opposite to the driver board 400 with a small gap. These elastic members 761 are disposed at spacings between adjacent TABs 330 among a plurality of TABs disposed along the driver board 400.

The other structure of this embodiment is similar as in the previous embodiment, and the projections 760 are disposed to support a farther side portion of the driver board 400 from the liquid crystal panel P than a central line extending in a direction of arrangement of the electrodes of the liquid crystal panel P and dividing the driver board into equal halves.

According to this embodiment, the elastic members 761 are disposed at positions corresponding to spacings between adjacent liquid crystal drive TABs 330, so that it is possible to avoid an interference between the TABs 330 and the elastic members 761, thereby preventing damages of the TABs 330.

Similar effects as in the previous embodiment can also be attained.

Figure 166:
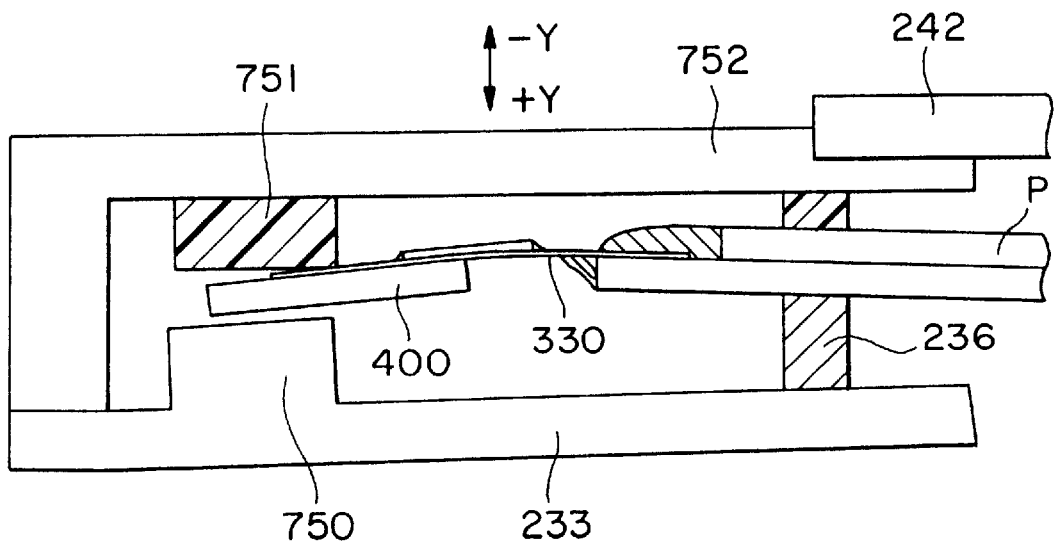

Thus, even when a strong impact or vibration is applied to the display apparatus body 200, the driver board 400 can be moved as shown in FIGS. 165 and 166. As a result, the stress applied to the liquid crystal drive TAB 220 is reduced to prevent the breakage or separation of the TAB 330.

Further, as the driver board 400 is held between the elastic members 761 and the projections 750 with a small gap, an excessive jumping of the driver board 400 can be prevented even when a strong impact or vibration is applied. Further, some degree of deformation of the driver board 400 per se may be allowed. Accordingly, the stress applied to the liquid crystal drive TAB 330 is reduced to prevent the breakage or connection separation of the TAB 330.

In the above embodiment, the driver board 400 is disposed on the projections 750 or 760 formed on the panel-fixing plate 233, but it is also possible to form such projection(s) on a surface closer to the liquid crystal panel P of the backlight unit and dispose the driver board on the protection(s).

The projection(s) 750 or 760 may be composed of a wide variety of materials having a hardness ranging widely.

The elastic members and projections may be disposed directly above or below the input terminals of liquid crystal drive TABs whereby it is possible to obviate narrowing of area for mounting electric elements on the driver board 400.

<Another embodiment regarding a flat cable and a connector>

In the above embodiment (FIG. 67), the flat cable 451 includes two conductor layers (a conductor layer 492 and a layer of conductor lines 493) and an insulating support layer (base film) 491. Some embodiments of modification will be described with reference to FIGS. 169A to 169E each including a transverse sectional view and a longitudinal sectional view.

A flat cable 770 shown in FIG. 169A has connection parts at both ends, each connection part has a laminated structure including one shield conductor layer 771 and one layer of signal conductor lines respectively exposed out of insulating layers 795.

A flat cable 780 shown in FIG. 169B includes a layer of signal conductor lines 772 surrounded by a shield conductor layer 781. Similarly as the one in FIG. 169A, each connection part at respective ends has an exposed upper layer of signal conductors 772 and an exposed shield conductor layer 781.

A flat cable 790 shown in FIG. 169C includes a layer of signal conductor lines 772, at least one of which is short-circuited with a shield conductor layer 781 so as to prevent crosstalk between signal conductor lines. FIG. 169C also shows a connector 791 connected to the flat cable 790.

A flat cable 800 show in FIG. 169D is a modification of the one shown in FIG. 169C, from which the shield conductor layer 802 is removed from both lateral sides of the signal conductor line layer 801, and the lamination order of the layers 801 and 802 is reversed at the connection parts at both ends.

A flat cable 810 shown in FIG. 169E has a sectional shape opposite to that shown in FIG. 169A, and the signal conductor layer 811 and the shield conductor layer 812 respectively have exposed upper surfaces at both ends of the flat cable. FIG. 169E also shows a connector 813 having two contacts 815 and 816 which have both downward convexes having different heights and contact the shield conductor layer 812 and signal conductor layer 811, respectively.

Another embodiment of flat cable is described with reference to FIGS. 170A and 170B.

FIGS. 170A and 170B are perspective views of another embodiment of the flat cable having a structure similar to the one shown in FIG. 169A as viewed from its grounding side and signal side, respectively. The flat cable includes signal lines 821 on one side and a shielding and grounding layer 822 on the other side of a support sheet 491 so that the signal lines 821 and the shield layer 822 are exposed for connection with a connector. This structure may be obtained by forming the layer of signal lines 821 and the shield layer 822 on both sides of an insulating support sheet 491 or by bonding a print-circuit sheet having signal lines 821 on one side of a support sheet 491 and another support sheet coated with a grounding layer. It is also possible to bond two flexible print-circuit sheets each having signal lines and a grounding layer on one side.

FIGS. 171 and 172 are sectional views each showing another embodiment of the flat cable. More specifically, FIG. 171 is a sectional view taken along a 171–171 line in FIG. 170B and shows a structure including a conductor layer 830 for grounding only on the opposite surface of the support layer 491 with respect to the signal lines 831. FIG. 172 shows a structure including a shielding conductor layer 830 so as to surround the entirety of signal lines 831 and also a protective layer 495 coating the whole peripheral side of the conductor layer 830.

Another connector embodiment will be described with reference to FIGS. 173 and 174.

FIG. 173 is an exploded perspective view of another embodiment of the connector, wherein, of upper and lower contacts 856 and 852 in a mold (housing) 851, the lower contact 2 is provided with a uniform contacting surface over the entire width within the mold 851 for connection with a shield conductor layer for grounding. The contact 852 is integrally provided with terminals 853 for fixation, and the connector 850 is mounted on a board 855 by bonding the terminals 853 to solder lands LD for grounding.

The mold 851 of the connector 850 and optional insulators therein may preferably comprise, e.g., polyamide, mesomorphic polymer or polyphenylene sulfide. The height of the mold 851 may preferably be suppressed to at most 2.0 mm.

Figure 175:
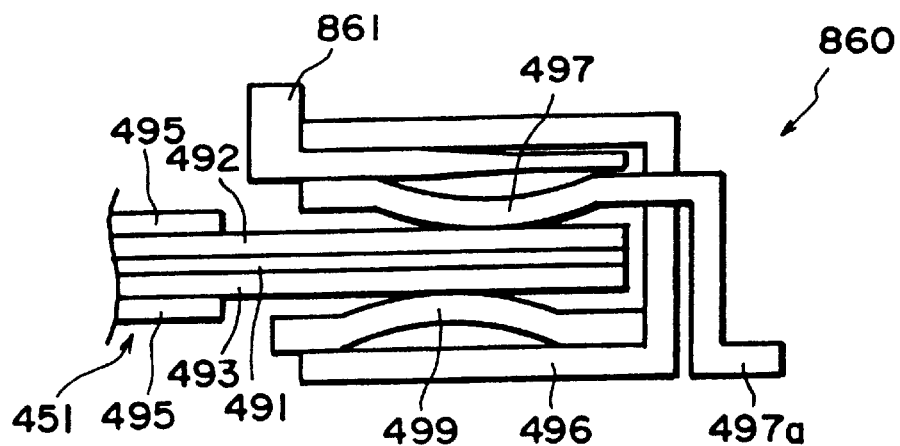

FIG. 175 is a sectional view showing a state of connection between a flat cable and another connector according to the present invention. In a connector 860 of this embodiment, a fixing plate 861 called a retainer is inserted into the 496 so as to provide a more reliable contact between the connector contacts 497, 499 and contact points of the conductive layers 492, 493 in the flat cable. This is also effective for ensuring a clearance for inserting the flat cable to facilitate the insertion.

Figure 176:
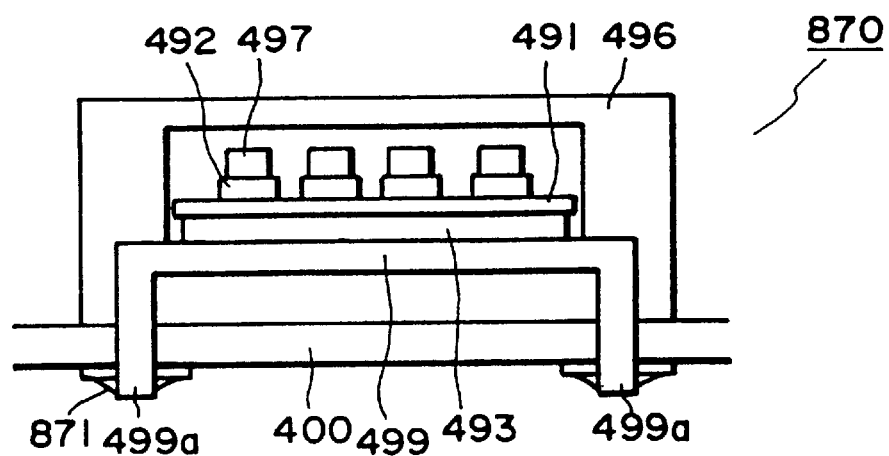

FIG. 176 is a transversal sectional view showing another embodiment of the connector. Members 499a integrally extended from a lower contact 499 are further extended to piece through a driver board 400 to be mechanically and electrically connected with a solder 871 on the opposite surface of the driver board 400.

Figure 177:
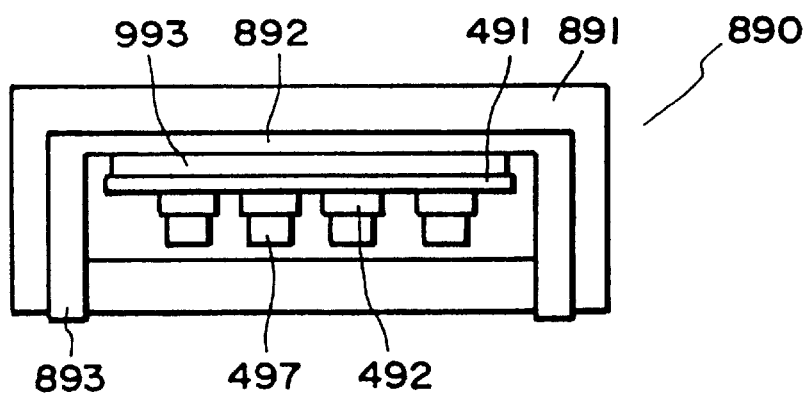

FIG. 177 is a sectional view of another embodiment of a connector 890 for connection with a flat cable having signal lines 492 on the lower side and a shield layer 493 to be grounded on the upper side. The connector 890 includes a lower contact 497 for contact with the signal lines 492 and an upper contact 892 for contact with the shield conductor layer 493. Both ends 893 of the upper contact 892 extend to cover the lower contact 497 and also function as a shielding plate.

Another connector-flat cable connection embodiment will be described with reference to FIGS. 178, 179A and 179B.

Figure 178:
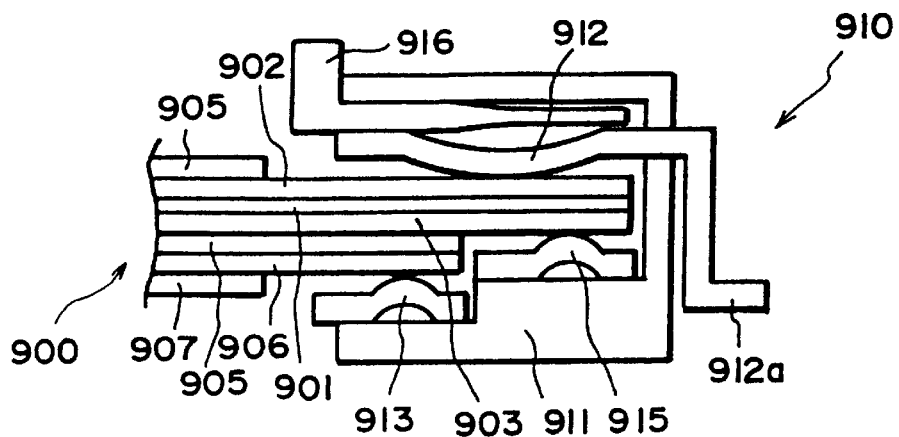

As shown in FIG. 178 (which is a sectional view showing a state of connector-flat cable connection), a flat cable 900 includes an insulating support layer 901, on both surfaces of which are respectively formed a signal conductor layer 902 and a maximum supply voltage VCC (e.g., a reference voltage of 5 V) layer 903. These layers 902 and 903 are respectively coated with an insulating protective layer 905. Further, on the protective layer 905 coating the VCC layer, a shield conductor layer (GND layer 906) is formed and coated with a protective layer 907.

Figures 179A, 179B:
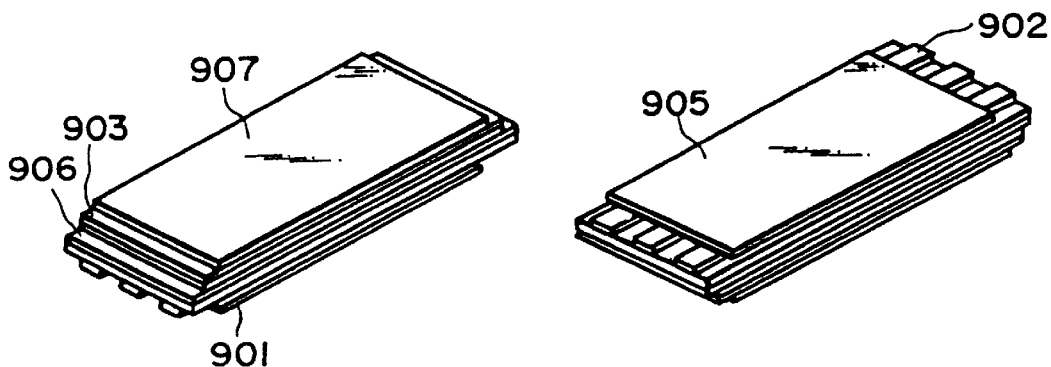

As shown in FIGS. 179A and 179B (which are perspective views of the flat able as viewed from the grounding side and the signal side, respectively), the signal conductor layer 902 is composed a multiplicity of conductor lines, and the maximum supply voltage VCC layer 903 and the shield conductor layer (GND layer) 906 are respectively composed of an unpatterned single metal layer. The projecting length of the VCC layer 903 at a flat cable end is shorter than that of the shield conductor layer 906, and both layers 903 and 906 are exposed on an identical side (lower side in FIG. 178).

On the other hand, the connector 910 includes a mold 911, an upper contact 912 disposed with its connection directed downward in an upper part of the mold 911, and two lower contacts 913 and 915 disposed with their convexities having different heights both directed upwards. In the state connected with the flat cable 900, the upper contact 915 contacts the signal conduct layer 902, and the lower contacts 913 and 915 contact the shield conductor layer 906 and the maximum supply voltage layer 903, respectively.

Another connector-flat cable connection embodiment will be described with reference to FIGS. 180 and 181.

Figure 180:
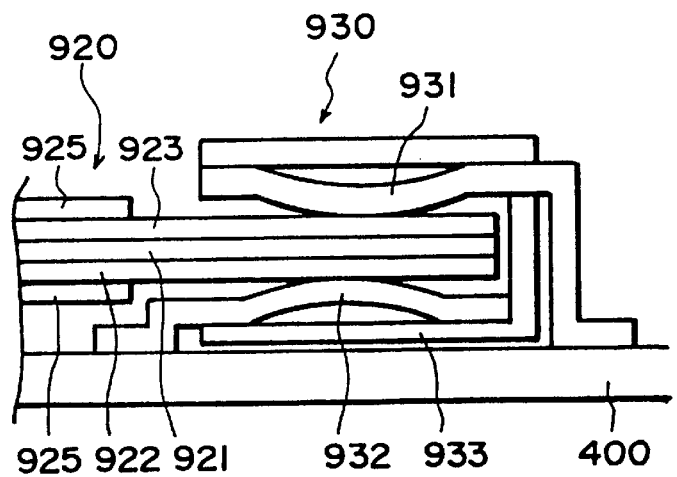
Figure 181:
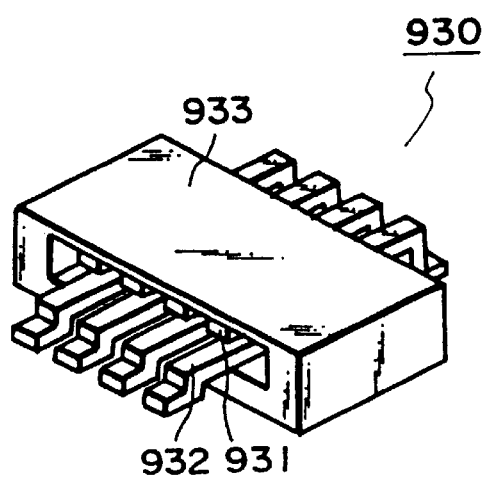

As shown in FIG. 180 (which is a sectional view showing a state of connector-flat cable connection), a flat cable 920 includes an insulating support layer 921, on both surfaces of which are respectively formed a shield conductor layer 922 and a signal conductor layer 923 preferably comprising a group of conductors. These layers 922 and 923 are respectively coated with an insulating protective layer 925.

On the other hand, the connector 930 includes a mold 933, an upper contact 931 disposed with its connection directed downward in an upper part of the mold 933, and a lower contact 932 and disposed with its convexity directed downwards. In the state connected with the flat cable 920, the upper contact 931 and the lower contact 932 contact the signal conductor layer 923 and the shield conductor layer 922, respectively, so as to sandwich the flat cable 920. The upper contact 931 extends in a direction opposite to a direction from which the flat cable 920 is inserted, and is soldered to a driver board 400. The lower contact 932 extends in a direction of the flat cable insertion to be soldered to the driver board 400.

Figure 182:
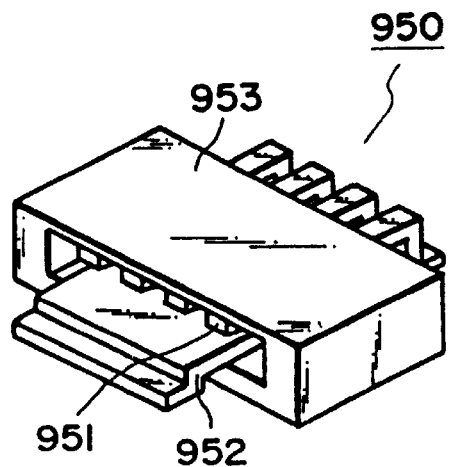

FIG. 182 shows another connector embodiment. A connector 950 shown in FIG. 182 includes a lower contact 952 formed over the entire width of the connector to have a uniform contact surface. The connector 950 is designed to be pierced by the flat cable 820 shown in FIGS. 170A and 170B for connection.

According to this embodiment, a reference potential (GND) is applied to the conductor layer and the contact formed over the whole width to provide a more reliable reference potential. Further, as the physical distance between the signal line side and the reference side is reduced, the potential fluctuation on the signal lines is also suppressed, thereby preventing a mal-function of the circuit per se and suppressing the occurrence of radiation noise.

Figures 183, 184:
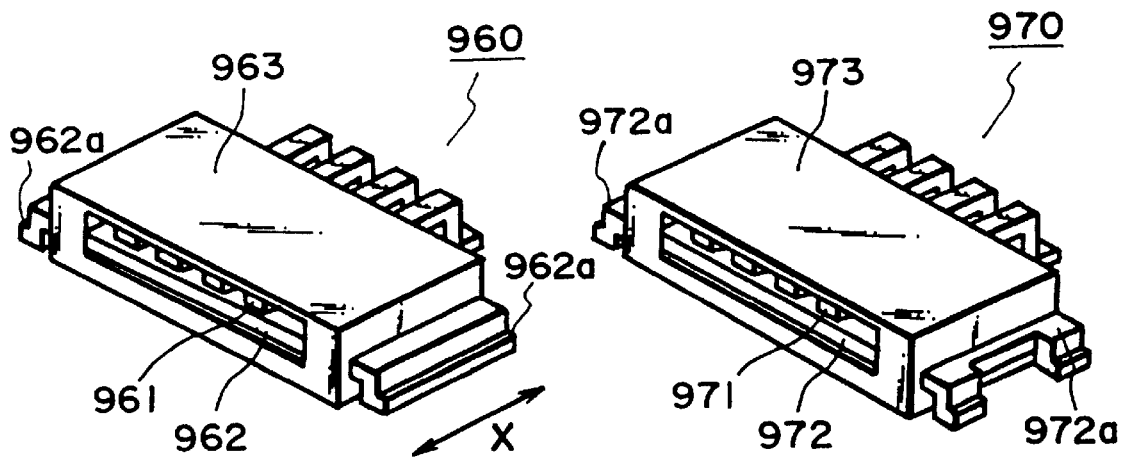

FIG. 183 is a perspective view of another connector embodiment. A connector 960 includes a lower contact 962 which is formed on the inner lower surface of a mold 963 to have a uniform contact surface over the entire width of the connector and is further extended through the mold 963 in a direction of 90 degrees with respect to a direction X of the insertion of a flat cable or print-circuit sheet to be soldered and fixed onto a driver board (not shown). As a result, the connector can be formed in a smaller width in the direction X.

FIG. 184 is a perspective view of a further modification of the connector shown in FIG. 183. The connector of FIG. 184 includes a contact 972 formed on the inner lower surface of a mold 973 to have a uniform contact surface over the entire width of a flat cable to be inserted thereinto. The member constituting the contact 972 is extended in a direction of 90 degrees with respect to a direction of insertion of the flat cable and divided to have plural tips 972a for connection, e.g., by soldering with a driver board (not shown). The connector structure facilitates an operation, such as soldering, to simplify the loading process. Further, by a change in shape of connection between the supporting board and the connector, it becomes possible to provide an improved heat distribution over the connector and the flat cable at the time of re-flow loading and more specifically can minimize an adverse thermal effect, such as heat distortion.

Figure 185:
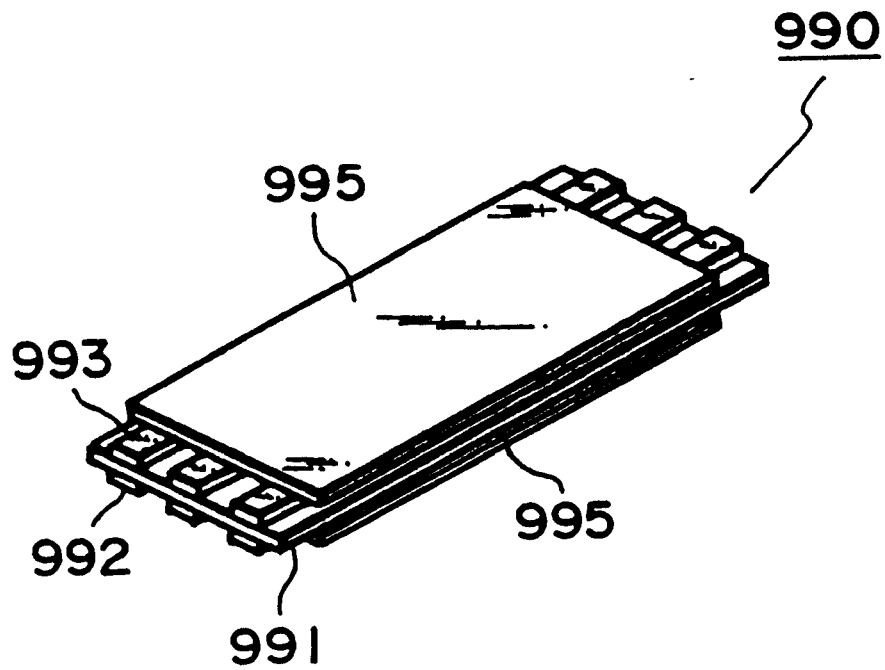

FIG. 185 is a perspective view of another flat cable embodiment, including a layer of stripe-form signal conductor lines 992 on one side of an insulating support sheet 991 and a layer of stripe conductors 993 for shielding and grounding on the opposite side. The signal conductor lines 992 and the stripe conductors 993 for shielding are both exposed at both ends for connection with a connector.

Figure 186:
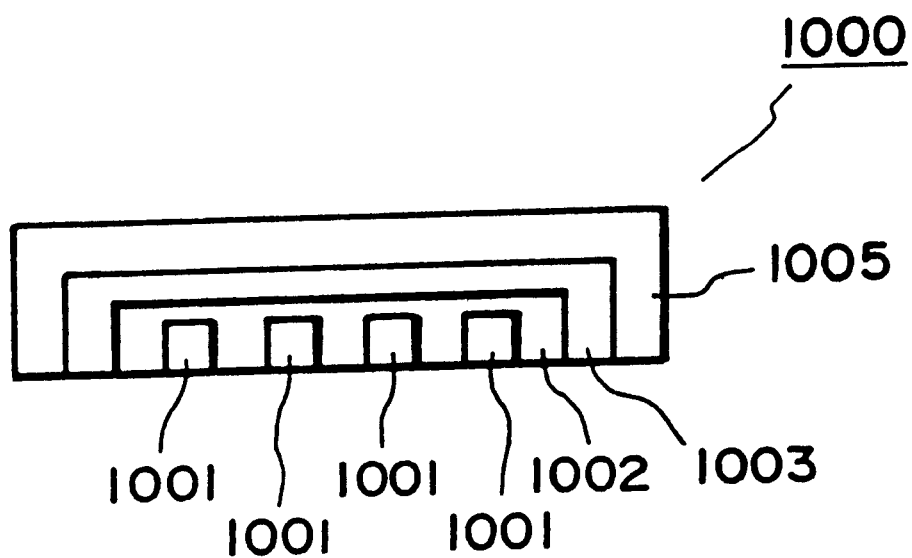

FIG. 186 is a transversal sectional view at a connection part of another embodiment of flat cable 1000, wherein signal conductor lines 1001 are coated with an insulating support sheet or layer 1002, with respect to their lateral sides and upper surfaces, and the support layer 1002 is further coated with a shield conductor layer 1003 and an insulating protective layer 1005. The lower surface of the conductor lines 1001 and the upper surface of the shield conductor layer 1003 are exposed for connection with a connector. The insulating support layer 1002 may preferably comprise an insulating material having a higher dielectric constant than the protective layer 1005.

As described above, according to the above flat cable and connector embodiments, it becomes possible to effect reliable electrical connection, particularly for grounding, between plural print-circuit boards (e.g., driver boards) with the flat cable and reduce the common-mode noise and normal-mode noise affecting the print-circuit boards and the flat cables. Further, a plurality of connectors can be mounted on a print-circuit board while the grounding is ensured, and the flat cables are reliably shielded to reduce radiation noises, thereby reducing noise-preventing means, such as three-terminal filters, ferrite beads or ferrite cores to aid a reduction in production cost. On the other hand, a specifically provided GND line of a single core or plural cores conventionally used becomes unnecessary, so that the flat cable (particularly a flexible print-circuit sheet) can be produced in a smaller width. This also favors a reduced production cost, a simpler assemblage, and a reduction in radiation noise. These effects are particularly pronounced in apparatus requiring relatively long flat cables, such as a large size flat display having a diagonal size of 15 inches or larger. Further, a conventional flat cable has ordinarily required the grounding of a shield layer via a through-hole, etc., but this measure also becomes unnecessary according to the above embodiments.

FIGS. 187 and 188 are a plan view, and a partial sectional view (taken along a line D—D in FIG. 187) of a display apparatus including a connection using a connector and a flat cable which are representatively denoted by numerals 490 and 451, respectively, but can be any of the above described connectors and flat cables.

In this embodiment, a panel-fixing plate 1010 is bent downwards and a chassis 1011 is attached to a lower end portion thereof. The panel-fixing plate 1010 and a liquid crystal panel P are bonded with an elastic adhesive member 1012. In the apparatus, large numbers of flat cables 451 and connectors 490 as described above are used.

Figure 189:
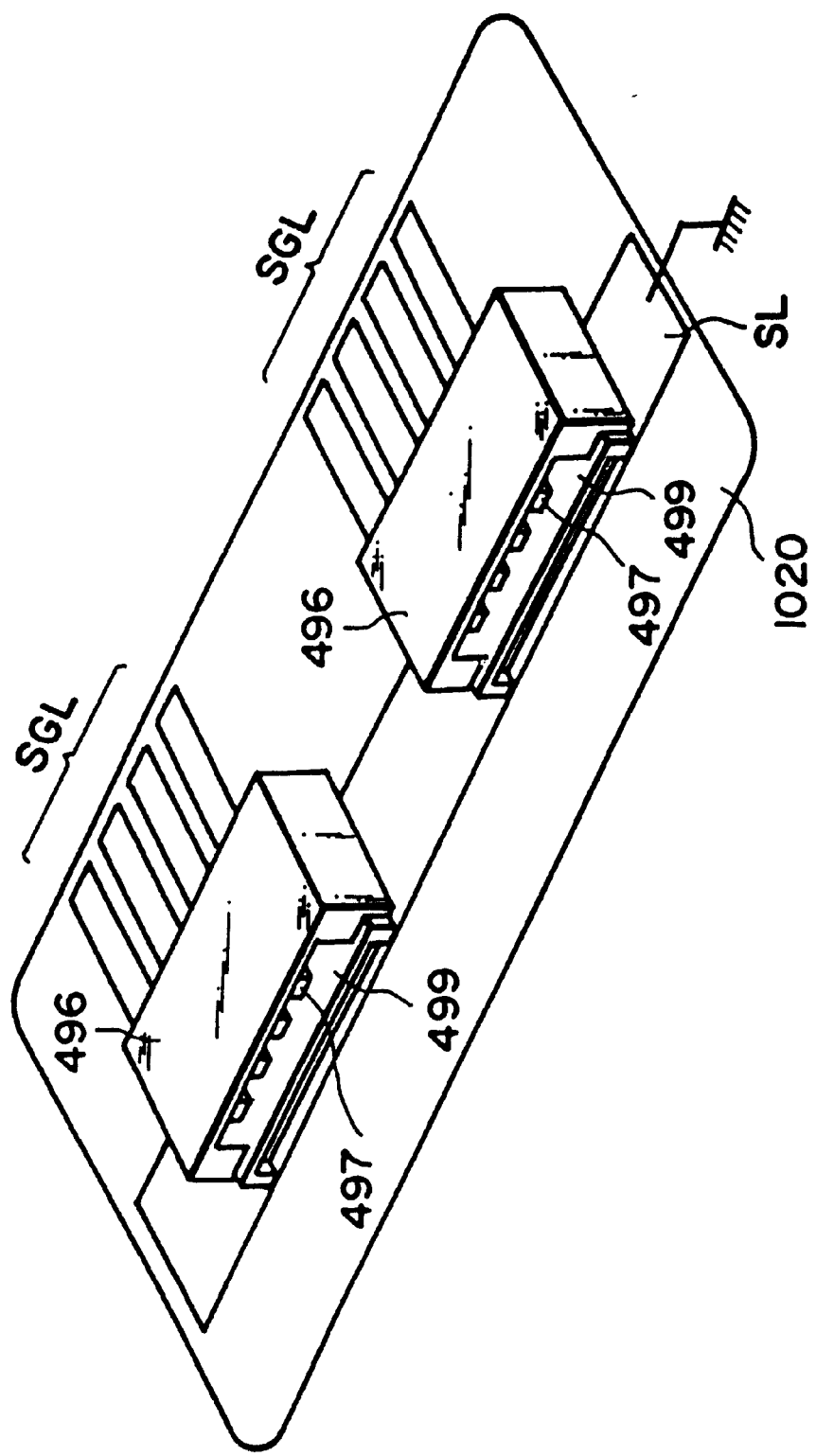

FIG. 189 is a perspective view showing connectors 496 arranged in a rigid substrate 1020.

In the embodiment of FIG. 189, contacts 497 connected with signal lines SGL and contacts 2 connected to a single shielding line SL are housed within two molds 496. Accordingly, it is unnecessary to provide intersections outside the connectors, so that an unnecessary increase in loading area can be suppressed.

Next, some explanation is added to a case wherein a ferroelectric liquid crystal is used in a liquid crystal panel P.

The electrostatic capacity C of a pixel is calculated by $$C = \epsilon_r \epsilon_0 S/d,$$

wherein $\epsilon_r$: a dielectric constant of a liquid crystal, $\epsilon_0$: dielectric constant of vacuum, S: electrode area, and d: cell gap. Accordingly, if pixel sizes are equivalent, the capacity of one (matrix) drive line of a ferroelectric liquid crystal panel is 2–3 times that of an STN-type and ca. 5 times that of a TFT-type liquid crystal panel principally because of a smaller cell gap d. In order to retain an identical speed of rising of drive waveform (i.e., to provide an identical CR value), the conductor resistance (including ON-resistance of a driver IC) for one line of a ferroelectric liquid crystal panel is required to be suppressed to ca. ½ to ⅓ of that of an STN-type liquid crystal panel and ca. 1/5 of that of a TFT-type liquid crystal panel.

Further, as a rush current per line is almost inversely proportional to a conductor resistance and proportional to a voltage, the rush current per line of a chiral smectic liquid crystal panel provides a peak value of 4–9 times that of an STN-type liquid crystal panel. In view of a larger panel size, the current through a driver which is proportional to a panel size is caused to provide a peak value exceeding 10 times that for an SNT-type liquid crystal panel.

Further, a ferroelectric liquid crystal panel having a larger panel size requires a larger print-circuit board size and a larger flat cable size, thereby being liable to result in larger induction noise and common-mode noise.

In such a liquid crystal apparatus using a ferroelectric liquid crystal, the display image qualities can be remarkably improved if the flat cable and connection device according to the above embodiments are adopted in a drive control system. <Other embodiments of backlight unit>

FIGS. 190A and 190B show another embodiment of backlight unit, wherein a reflection plate 1030 of aluminum, etc., is formed around a linear light source 532 and is abutted to upper and lower metal plates 550 and 551 of backlight. As a result, heat evolved from the linear light source 532 is dissipated through the reflection plate 1030 and the backlight upper and lower plats 550 and 551. Further, by contact between the reflection plate 1030 and the plates 550, 551, the heat dissipation effect is enhanced.

In this embodiment, when the linear light source is turned on, light therefrom is transmitted through a light-guide plate 531 and reflected at a lower reflection plate (not shown) to illuminate the liquid crystal panel P, whereby images, such as characters displayed on the panel, can be observed with the aid of the illumination.

In this embodiment, a grommet (not shown) and the reflection plates 1030 are composed of high thermal conductivity, so that heat evolved from the linear light source 532 is easily dissipated and the conduction thereof to the liquid crystal panel P is effectively suppressed.

In this embodiment, the reflection plate 1030 is surface-coated with a vapor-deposited silver film for effective reflection of light from the light source 532. An edge-type backlight unit is used so as to reduce the thickness of the display apparatus body 200. Heat from the light source is easily dissipated through the grommets and reflection plates 1030 having a high thermal conductivity, so that the liquid crystal panel P is less affected by the heat and the lowering in display quality due to heat can be suppressed. Even if a temperature distribution occurs along the backlight unit, the effect thereof on the liquid crystal panel P can be reduced, thus avoiding ununiformity of drive conditions. As the heat quantity conducted to the liquid crystal panel P is reduced, a high-luminance lamp having a high-heat evolution can be used.

The reflection plate 1030 can be made of other metals having a good thermal conductivity instead of aluminum. The reflection plate 1030 can be surface-coated with another reflectivity-enhancing material, such as white paint instead of silver deposited film.

The grommets may be composed of a resin having a high thermal conductivity and may preferably be disposed to contact other metal parts such as the backlight upper and lower plates 550 and 551.

Further, as shown in FIG. 190A, it is possible to attach a fin $F_1$ to enhance the heat dissipation effect. It is also possible to form a fin $F_2$ by molding integrally with the reflection plate 1030 as shown in FIG. 190B.

Further, it is also possible to apply a black paint on the back surface of the reflection plate 1030. A similar effect may be obtained by dyeing or applying a black film on the back side of the reflection plate.

FIGS. 191 and 192 show another backlight unit embodiment. In this embodiment, a portion of backlight lower plate 551 is cut and set up into a tab 551, to which an inverter unit 570 or a controller unit (not shown) is affixed by a screw 1050 (FIG. 192) to provide an electrical continuity between the ground line of the unit and the backlight lower plate 551.

At four corners of the light-guide plate 531, perforations 531*a* are formed and, into each perforation 531*a*, a hollow shaft 1051 having a tap at both ends is buried, where backlight upper and lower plates 550 and 551 are affixed with a screw 1052.

Further, a rear cover 202 is provided with a plate spring 1053 to apply a force to the grounding portion of the backlight lower plate 551, thereby electrically connecting the lower plate 551 and the rear cover 202.

The hollow shaft 1051 and the reflection plate 533 may be formed of brass or aluminum having a good electroconductivity and are electrically securely connected with the backlight upper and lower plates 550 and 551.

The front cover 201 and the rear cover 202 may be provided with shield plating (electroless plating of copper and nickel overcoating the copper), and the plated portions of the covers 201 and 202 are electrically connected to each other.

The backlight upper plate 550 is fixed to the front cover 201 and electrically connected to the plated portion of the front cover 201.

In this embodiment, the ground line of the inverter unit 570 or controller unit (not shown) is connected via the backlight upper plate, etc., to the plated portion of the front cover 201, and further via the plate spring 1053 to the plated portion of the rear cover. As a result, noises are reduced to provide improved drive performances without using members only for electrical connection, thus improving the space efficiency and assembling efficiency.

The plate spring 1053 may be replaced by a coil spring for example. The front and rear covers can also be plated by electrostatic coating. Further, the front and rear covers 201 and 202 can be composed of electroconductive metal materials, such as magnesium or aluminum die cast materials.

FIGS. 193–196 show another backlight unit embodiment. In this embodiment, as show in FIGS. 193 and 194, perforations 531*a* are formed at four corners (optically little affected positions) of the light guide plate 531. As shown in FIG. 193, each perforation 531*a* has a large diameter and a smaller diameter at the upper and lower sides, respectively. Into the perforation 531 a, a shaft 1060 is buried. The shaft 1060 has a larger diameter portion 1060*a* and smaller diameter portions 1060*b* having an elongated circular section formed on both sides of the portion 1060*a*.

The backlight upper plate 550 is provided with an elongated through hole 550a which is a little larger than the smaller diameter portion 1060b. The smaller diameter portion 1060b is designed to protrude out of the elongated hole 550a in the assembled state of the backlight unit.

The other smaller diameter portion 1060b is disposed only within the light guide plate 531 so as not to protrude out of the backlight lower plate 551. Further, the backlight lower plate 551 provided with elongated through holes or perforations 551a (FIG. 196) similarly as the upper plate 550.

Between the elongated hole 550a and the smaller diameter portion 1060b, spacings S are formed at both ends in a diagonal direction, and the spacings S may be determined depending on an expected temperature change and linear expansion coefficients of the related members. For example, in the case where a light-guide plate 531 with size of 345 mm×385 mm (diagonal length of 447 mm) comprising an acrylic resin (methacrylic resin) having a linear expansion coefficient of $56.5 \times 10^{-5}/°$ C. is expected to receive a temperature change in the housing from 25° C. to 55° C., the diagonal size is increased by ca. 1.48 mm, i.e., by ca. 0.74 mm on a half size from the panel center. Accordingly, a spacing S of 0.8 mm or more is sufficient between the shaft 1060 and the elongated hole 550a. On the other hand, in case of a temperature decrease by 30° C., this causes a shrinkage of also ca. 74 mm, so that a spacing S of 0.8 mm or more may be formed on the opposite side. The spacing size may be varied appropriately depending no the size and the material of the light-guide plate 531.

Screws 552 are inserted into the elongated holes 551a of the backlight lower plates 551, so that a similar spacing of 0.8 mm or more may be formed between the elongated hole 551a and the screw 552 in the diagonal direction.

In this embodiment, even when a large temperature change occurs to cause a positional deviation between the light guide plate 531 and the backlight upper plate or lower plate 550 or 551, the positional deviation is absorbed by the spacings provided to the elongated holes 550 or 551 for attachment. Accordingly, it is possible to obviate the cracking or ununiform deformation of the light-guide plate 531, thus providing uniform light emission and a display apparatus showing a high display quality.

The projecting smaller diameter portions (1060b) can have a rather arbitrary shape, such as a square or rectangular shape, instead of an elongated circular shape as in the above embodiment.

An embodiment regarding an entire display apparatus body structure including a backlight unit will be described with reference to FIGS. 197 to 200.

In this embodiment, as shown in FIG. 197, a front cover 201 is provided with an inner cover 1070 fixed to the backside thereof. The inner cover 1070 is provided with an opening 1070a at a position corresponding to the opening 201a of the front cover 201, so that the face plate 242 is fixedly sandwiched by the edge portions of both openings. The panel-fixing plate 33, panel frame 231 and inner cover 1070 are formed of glass-incorporated polycarbonate resin. The panel frame 231 is fixed to the inner cover 1070. The panel-fixing plate 233 is provided with a recess at its opening peripheral edge, and a diffusion plate 239 is affixed to the recess.

The linear light sources 532 of the backlight unit 530 are designed to be driven at a driving frequency of 30–50 kHz. The front cover 201 and the rear cover 202 are made of ABS resin, and the inner surfaces thereof are plated so as to reduce the emission of electric wave.

In this embodiment, the inverter unit 570 is provided with inverter terminals 1071, which are connected to the linear light sources 532 via lead wires 1072 as shown in FIG. 198.

A plurality of lead wire fixtures 1073 are attached to the backlight lower plate 551, and the lead wires 1072 are distributed and attached by using the fixtures 1073. More specifically, the lead wires 1072 are drawn along the linear light sources 532 disposed at upper and lower parts (in FIG. 198) between the inverter unit 570 or the controller unit 572 and the linear light sources 530 and drawn between the units 570 and 572 to be connected to the inverter terminals 1071.

In this embodiment, the lead wires 1072 are arranged between the inverter unit 570 and the controller unit 572 so as not to constitute an antenna, thereby reducing the noise level.

We measured a low-frequency electromagnetic wave at a point distant in a lateral direction from a display apparatus (point A 0.5 m distant from the center of a display apparatus 1080 as shown in FIGS. 199 and 200). As a result, a decreased noise level was confirmed.

In the above, an edge-type backlight unit (wherein linear light-sources are disposed along edges of the unit so as to surround a light-guide means) is explained. In the case of a direct-backing type backlight unit wherein linear light-sources 532 are disposed directly on the back of a liquid crystal panel), the lead wires 1072 may be drawn and arranged as shown in FIG. 201.

More specifically, the lead wires 1072 are drawn along an upper edge of the backlight unit and on a side upper than the inverter unit 570 or the controller unit 572 and drawn between both units 570 and 572 to be connected to the inverter terminals 1071.

Then, another embodiment regarding the operation of a backlight unit will be described with reference to FIGS. 202 to 211.

In this embodiment, a lighting apparatus 1090 includes a lighting circuit 1091, which supplies a lighting current to the linear light sources 532 to effect an illumination.

The lighting apparatus 1090 further includes a filament drive circuit 1092 for supplying a preheating current to the light sources 532 in a preheating period to heat the filament, thereby improving the discharge performance.

Figure 204:
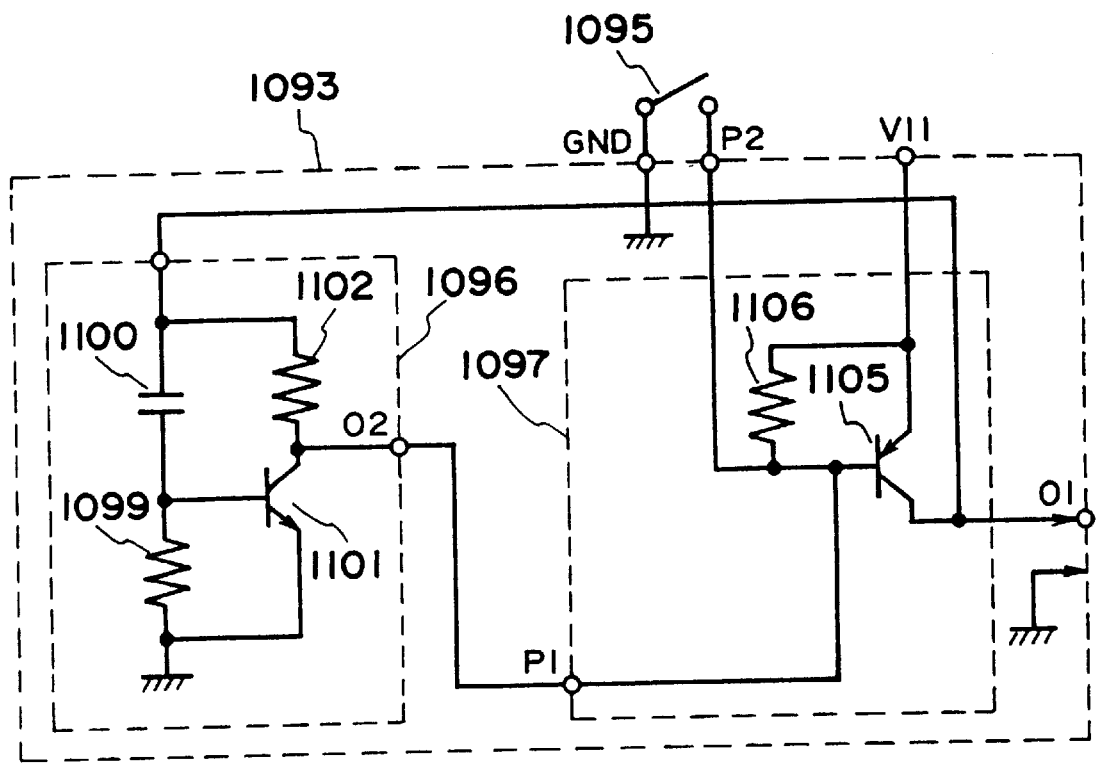

The lighting apparatus 1090 further includes an initial lighting control unit 1093 equipped with a lighting switch 1095. As shown in FIG. 203, the initial lighting control unit 1093 includes a preheating period generator 1096 and a lighting apparatus power supply controller 1097. As shown in FIG. 204, the preheating period generator 1096 includes a resistance element 1099 and a capacitive element 1100 which in combination form a time constant circuit for counting a preheating period of the lighting apparatus 1090. The lighting apparatus power supply controller 1097 includes a transistor 105, etc., and is designed to supply a preheating current to the light sources 532 when the lighting switch 1095 is turned on and terminate the preheating current supply on receiving a signal indicating completion of time count from the preheating period generator 1096. The initial lighting control unit 1093 further includes a similar time-constant circuit in addition to the above-mentioned time constant circuit to count a certain period (e.g., a period $T_2$ shown at FIG. 206(a)) after a preheating.

As shown in FIG. 202, the lighting apparatus 1090 further includes a dimmer unit 1120 to which a dimmer rheostat 1121 is connected. The dimmer unit 1120 is designed to energize the light sources 532 at a maximum luminance for a prescribed period ($T_2$ at FIG. 206(a)) after the preheating to ensure a reliable illumination and thereafter change the lighting current depending on the dimmer rheostat 1121 so as to energize the light sources at a selected luminance. However, it is also possible to use other types of dimmer, such as one changing the duty ratio of the applied voltage instead of current change.

The lighting apparatus operates as follows. <Lighting operation>

When the lighting switch 1095 is turned on, the emitter of the transistor 1105 in the lighting power supply controller 1097 is set to a voltage $V_{11}$ and apply a voltage lower by 0.6–0.7 volts than $V_{11}$ to the base, whereby emitter and collector of the transistor 1105 are made conducive with each other (turned on) to output a voltage $V_{11}$, from the output terminal 01 of the lighting apparatus 1090. The output voltage $V_{11}$ is applied via the filament drive circuit 1092 to the filaments of the linear light sources 532, so as to heat the filament before turning-on and improve the dischargeability.

Further, by the continuity between the emitter and collector of the transistor 1105, the input voltage $V_{10}$ to the preheating period generator 1096 is made equal to $V_{11}$, and the base potential of the transistor 1101 is raised by $V_{10}$ (=$V_{11}$) almost simultaneously with the start of the preheating period (at A in FIG. 205). At this time, the transistor 1101 is turned on (emitter-collector conductive), the output terminal 02 of the preheating period generator is brought to GND potential (at B in FIG. 205).

As the output terminal 02 of the preheating generator 1096 is connected to the base of the transistor 1105 in the lighting apparatus controller 1097, the base potential of the transistor 1105 is held at GND potential to retain the emitter-collector continuity of the transistor 1105.

Thereafter, the base potential of the transistor 1101 is gradually decreased with lapse of time reversely proportional to the product of the value of the resistance 1099 and the value of the capacitor 1100. When the potential is lowered to 0.6–0.7 volts, the transistor 1101 is turned off (emitter-collector non-conductive), whereby the potential at the output terminal 02 of the preheating period generator 1096 is brought to $V_{10}$ (B at FIG. 205). As a result, the base potential of the transistor 1105 is also brought to $V_{10}$, whereby the transistor 1105 is turned off (emitter-collector non-conductive). As a result, the preheating of the filament by the filament drive circuit 1092 is terminated. (Turning-off of lighting switch 1095 in preheating period)

Even if the lighting switch 1095 is turned off during the preheating period, the base potential of the transistor 1101 in the preheating period generator 1096 is retained at a level higher than a prescribed level of 0.6–0.7 volt (while it is gradually lowered with time), so that the emitter-collector continuity of the transistor is retained and the output of the preheating period generator is retained at GND potential during the preheating period. Accordingly, in the period, the base potential of the transistor 1105 is also held at GND potential (without being raised to $V_{11}$), so that the lighting power supply controller 1097 continually supplies a voltage 11 to the light sources. In this way, when the lighting switch 1095 is once turned on, the preheating current is continually applied to the filament even if the switch 1095 is thereafter turned off.

Then, when the base potential of the base potential is lowered to a prescribed level (0.6–0.7 volt), the transistor 1101 is turned off, so that the potential at the output 02 of the preheating period generator 1096 is made equal to $V_{10}$ (B at FIG. 205) and the base potential of the transistor 1105 is made equal to $V_{10}$, thus turning of the transistor 1105. As a result, the power supply control unit 1097 terminates power supply to the lighting apparatus 1090, to terminate the preheating of the filaments by the filament drive circuit 1092. (Lighting operation)

When the preheating period is terminated in the above-described manner and the switch 1095 is kept on, the initial lighting controller 1093 starts a time constant circuit different from the above-mentioned one for preheating period setting to act on the dimmer unit 1120 so that the light sources are energized at a maximum luminance during a period counted by the time constant circuit. Thus, the dimmer unit 1120 control to energize the light sources at a maximum luminance. As a result, the temperature of the light sources is raised to provide an improved discharge performance regardless of the surrounding temperature, thus ensuring a reliable lighting.

After the termination of set period counting by the time constant circuit, the initial lighting control circuit supplies a prescribed signal to the dimmer unit 1120, so that the dimmer unit 1120 supplies a signal depending on a value set by the dimmer rheostat 1121 to the lighting circuit 1091, whereby the circuit 1091 supplies a corresponding lighting current to the light sources 532. As a result, the light sources 532 illuminate the liquid crystal panel at a prescribed luminance set by the dimmer rheostat 1121. In this instance, the feed control of the lighting circuit 1091 by a resistance division in the dimmer rheostat is effected by the dimmer unit 1120.

In order to clarify the function of the above embodiment, some problems of a conventional system are descried with reference to FIGS. 206–208.

At FIG. 206(a) is shown a change with time of lighting current supplied to a linear light source in an ordinary case of keeping a lighting switch on without turning-off, and at FIG. 206(b) is shown a change with time of lighting voltage (effective value) correspondingly applied between both ends of the linear light source.

In the case of FIG. 206, in a preheating period $T_1$, no lighting current flows but only a preheating current flows through each filament. Thereafter, in a period $T_2$, a dimmer unit controls a lighting circuit to energize the linear light source at a maximum luminance. Then, in a period $T_3$, the dimmer unit controls the lighting circuit to energize the light source at a prescribed luminance.

If the lighting switch is turned off during a preheating period, the preheating current is immediately turned off to terminate the filament preheating operation in a conventional apparatus. Further, even if the lighting switch is turned off, the counting of the preheating period is continued.

Accordingly, if a series of ON→OFF→ON operations are performed for a lighting switch in one preheating period, while the counting of the preheating period is not reset, the preheating current is cut off at the OFF time and the substantial preheating period (i.e., a period of actual preheating current flow as denoted by $T_4$ at FIG. 207(a)) is shortened, thereby failing to effect a sufficient heating. In such a case, in a period ($T_5$) after completion of the preheating period ($T_4$), a prescribed lighting current $I_3$ (=$I_1$) is flowed through the light source similarly as in the above case but, as the filament is not sufficiently heated due to insufficient preheating, an excessive voltage increase ($V_4$) is induced to exert an excessive damage to the filament, thus resulting in blackening at both ends of and a shortened life of the linear light source, so that the reliability of the lighting apparatus and the linear light sources can be lost. Further, as an excessive voltage increase is induced as described above, the power consumption can be increased up to ca. 1.5 times that in the normal case. FIG. 207(a) shows a change with time of lighting current in a period after second switching-on in such a case and FIG. 207(b) shows a corresponding change with time of lighting voltage.

Incidentally, the period of V4 voltage application as described above is gradually increased as the above-mentioned sequential ON→OFF→ON operation in a single preheating period is repeated to finally resulting in a continual application of voltage V4 throughout the period $T_5$ (FIG. 208). Thus, as the above operation is repeated, the period of V4 voltage application is increased to increase the power consumption and promote the blackening and life-shortening of the light source.

In contrast thereto, the following effects are attained according to this embodiment.

As described above, once the lighting switch 1095 is turned on, the preheating current is continually supplied even if the switch 1095 is turned off during the preheating period.

As a result, even if the sequential ON→OFF→ON operation is applied to the lighting switch 1095 during a single preheating period, the filament is continually supplied with a preheating current from the first turning-on, so that insufficient preheating is not caused. As a result, the blackening and life-shortening of the light source can be prevented, and the increase in power consumption is suppressed.

Further, as the dimmer unit controls the linear light source to be energized at a maximum luminance after the preheating period, the temperature of the light source 532 is sufficiently raised, so that the stable discharge performance is improved without being affected by a surrounding temperature, thus ensuring a reliable lighting.

The preheating period generator 1096 is constituted as a differential circuit as shown in FIG. 204 in the above embodiment but can also be constituted as illustrated in FIGS. 209 and 210.

FIG. 209 shows a preheating period generator 1130, constituted by an integrating circuit. In this embodiment, when the lighting switch 1095 is turned on similarly as in the above case, the input voltage $V_{10}$ to the preheating period generator 1130 is identical to $V_{11}$ to turn on the transistor 1131 to provide the output terminal of the transistor with GND potential. On the other hand, the base potential of the transistor 1131 is raised to $V_{10}$ within a time reversely proportional to the product of the resistance 1133 and the capacitance 1134 and, when the base potential reaches a value of $V_{10}$—(0.6 to 0.7 volt), the transistor o1131 is turned off to provide the output terminal 03 of the preheating period generator with potential $V_{10}$.

FIG. 20 shows a preheating period generator 1140 constituted as a digital time constant circuit comprising an oscillator 1141 and a counter circuit 1142. More specifically, pulses outputted from the oscillator 1141 are counted by the counter circuit 1142 to obtain an output change within a prescribed period.

The initial lighting controller 1093 is constituted as shown in FIG. 204 in the above embodiment but can also be constituted as shown in FIG. 211. More specifically, an initial lighting controller 1150 includes a relay 1151 showing a mechanical operation. The relay includes terminals P2 and P3 receiving an input indicating an ON period of a lighting switch and an input indicating a preheating period, respectively. A logical sum of both inputs is taken by a logic sum circuit 1153 of a digital integrated circuit, thereby ensuring a time required for desired power supply interruption in order to obviate deterioration of the linear light sources 532.

<Another panel-fixing plate embodiment>

Another embodiment is described with reference to FIG. 212 wherein like parts as in FIG. 148 are denoted by like reference numerals and descriptions thereof are omitted.

In this embodiment, a panel-fixing plate 1200 is not provided with an opening but is composed of a colorless transparent blue sheet glass having a linear expansion coefficient ($0.85 \times 10^{-5}/°$ C.) almost equal to that of the substrates 262 and 280 constituting the liquid crystal panel P.

Onto the lower surface of the panel-fixing plate 1200, the liquid crystal panel P is secured with a silicone adhesive 1201. Further, the liquid crystal drive TABs 330 and the driver boards 400 are also secured to the lower surface of the panel-fixing plate 1200.

Below the liquid crystal panel P, a backlight unit 1202 is disposed, including a plurality of fluorescent lamps 1203, a reflection plate 1205 for guiding light from the lamps to the liquid crystal panel P and a diffusion plate 1206 for providing a uniform luminance over the entire display area. Above the backlight unit 1202, a lower polarizer plate formed by applying a polarizer film onto a transparent plate such as glass sheet or acrylic resin plate.

As a result, even if a temperature is raised for re-aligning treatment, the fixing plate expands to an extent equal to the liquid crystal panel P, so that the liquid crystal panel P is not deformed in an arcuate form. Further, as the TABs are also attached to the fixing plate 1200, the stress concentration at connections with the panel P can be avoided, thereby preventing breakage of lines therein.

<An embodiment of display apparatus body equipped with a vibration damper plate>

Another embodiment regarding a vibration regulation structure of the display apparatus will be described with reference to FIGS. 213 to 218.

In a display apparatus using an air damper structure as shown in FIG. 12, it is possible that the oppositely disposed substrates 262 and 280 mutually vibrate at the time of power supply for driving the liquid crystal panel P and the vibration is communicated to other members, such as the cover 201 to be amplified, thereby providing a noise recognizable by the user.

As measures for suppressing the noise, it has been known to lower the applied signal voltages and increase the frequency beyond the audio frequency, but such measures can impair the operation performances of the liquid crystal panel, thus resulting in inferior display quality.

FIGS. 213 and 214 show an embodiment of display apparatus with vibration damping structure for solving the above problem.

In this embodiment, a liquid crystal panel p has a diagonal length of ca. 420 mm, and a vibration damper 1220 is applied onto an upper surface of the panel P. The vibration damper has a frame-shape and is applied with an adhesive outside the image display area of the panel P. Further, the liquid crystal panel P is attached to an upper surface of a panel-fixing plate 233 via a cushioning member 236, and the panel-fixing plate 233 is provided where the panel P is attached. Further, on the upper surface of the pane-fixing plate, driver boards 400 are attached and connected to the electrodes of the panel P via liquid crystal drive TABs 330. Surrounding the panel-fixing plate 233, a panel frame 231 is disposed, and the whole periphery of the fixing plate 233 and the panel frame 231 are bonded via a panel-holding elastic member 232. At a lower part of the panel frame 231, a backlight unit 530 is attached so as to illuminate the liquid crystal panel P through the opening 235.

When the above apparatus is driven, signals are supplied to the liquid crystal panel P via the driver boards 400, etc. As a result, the liquid crystal is supplied with an electric field, and the liquid crystal molecules change their orientation directions depending on the direction of the electric field applied thereto, whereby light from the backlight unit is interrupted or transmitted depending on the orientations of liquid crystal molecules at respective pixels to display various information or data. The signals are continuously applied and the electric field direction is changed at a frequency of 3–20 Hz, so that such quick vibration of liquid crystal molecules can be transmitted to both substrates.

Such vibration transmitted to the substrates can be amplified to generate a noise in some cases. In this embodiment, the vibration is attenuated by a vibration damper 1220 to suppress the noise.

In this embodiment, as the vibration is attenuated by the vibration damper 1220 to lower the noise, the mental fatigue of an operator can be alleviated even when the display apparatus is continually used for a long period. Further, it is unnecessary to lower the applied signal voltages or increase the frequency beyond the audio frequency, thus avoiding impairment of operation characteristic of the liquid crystal panel per se. Incidentally, according to our measurement of sonic pressure level at a position 25 cm distant from a liquid crystal panel P under drive, the application of a damper plate provided a substantially lower noise level as represented by a dashed line in FIG. 214 compared with an identical panel not provided with the vibration damper as represented by a solid line in FIG. 214.

Figure 215:
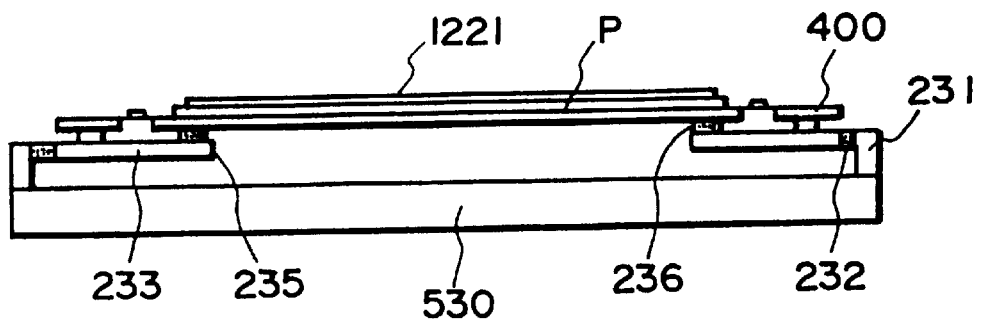

Another embodiment regarding the vibration damper will be described with reference to FIG. 215, etc.

In this embodiment, a transparent vibration damper 1221 is used. The vibration damper 1221 is applied on the entire surface of a liquid crystal panel P including the display area thereof.

Figure 216:
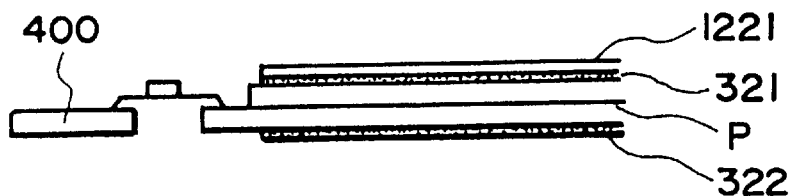

In case when the liquid crystal panel P is coated on its both surfaces with polarizer films 321 and 322 as shown in FIG. 216, the vibration damper 1221 may be applied on the upper polarizer film 321. Alternately, the vibration damper can be applied first on the liquid crystal panel P so that polarizer films 321 and 322 on both sides of the panel thereafter. In this case, the damper 1221 may preferably comprise non-orientative.

In this embodiment, similar effects as in the above embodiment can be attained. Thus, the mental fatigue of an operator can be alleviated even in a long period of continual use of the display apparatus without impairing the operation performances of the liquid crystal panel P per se.

Figure 217:
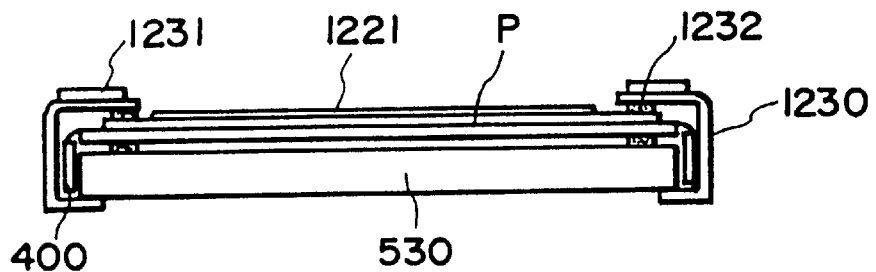

FIG. 217 shows another embodiment regarding the vibration damper.

In this embodiment, the display apparatus body includes a fixing frame 1230 formed of a metal, such as aluminum, by which a liquid crystal panel P and a backlight unit 530 are covered. On the upper surface of the fixing frame 1230, a frame-shaped vibration damper 1231 is bonded. Further, on the liquid crystal panel P, another vibration damper 1221 is applied.

According to this embodiment, a vibration occurring in the liquid crystal panel P is attenuated by two vibration dampers 1221 an 1231, the vibration noise can be further reduced.

Another embodiment regarding vibration damper is described with reference to FIG. 218.

Figure 218:
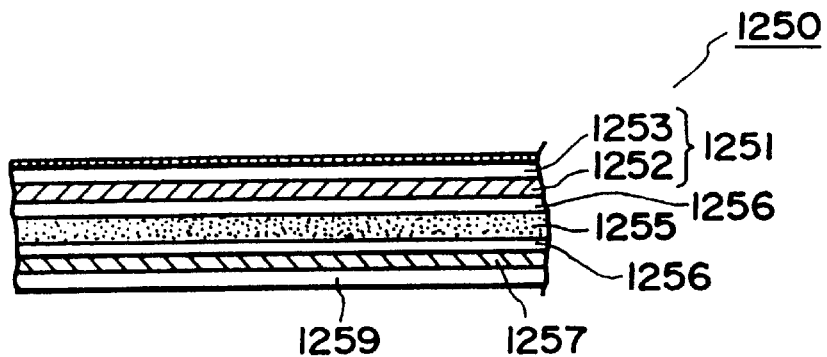

FIG. 218 is a sectional view of a laminated film 1250 used in this embodiment. The laminated film 1250 includes a vibration damper 1251 comprising a resinous elastic adhesive layer 1252 and a rigid resin layer 1253, in lamination, which layers are both transparent. The elastic adhesive layer 1252 may comprise a silicone-base, acrylic or urethane-based resin, and the rigid resin layer 1253 may comprise polycarbonate, acrylic resin or polyethylene terephthalate. The surface of the rigid resin layer 1253 is subjected to a low-reflection treatment. The elastic adhesive layer 1252 may have a thickness of 50–200 μm, and the rigid resin layer 1253 may have a thickness of 0.1–2 mm.

The laminated film 1250 further includes a polarizing film 1250, both surfaces of which are laminated with a triacetate resin film 1256 for protecting the polarizing film 1255. The polarizing film 1255 may comprises a stretched and dyed polyvinyl alcohol film. The lower triacetate resin film 1256 is successively coated with an acrylic resin-based adhesive layer 1247 and a cover film 1259 of polyethylene terephthalate resin, etc. The laminated film 1250 may be used in a manner of peeling the cover film 1259 off and applying the remainder with the exposed adhesive layer to a glass substrate, etc.

The vibration damper 1221, etc. in the above embodiment is applied on one surface of the liquid crystal panel P but can be applied on both surfaces of the panel P. In the case where the vibration damper is applied onto the entire surface of the liquid crystal panel P, the vibration damper may preferably be subjected to a diffusion treatment by providing the surface with unevennesses or a low-reflection treatment by applying plural film layers having different refractive indexes. The rigid layer 1253 in the above embodiment comprises a resin but can also comprise a layer of metal, such as aluminum or stainless steel.

<Another embodiment regarding grounding of liquid crystal drive TAB>

As described above, the liquid crystal drive TABs and the liquid crystal panel may be connected by removing a portion of the base film of each liquid crystal drive TAB to expose output terminals and bonding exposed terminals with an anisotropic conductive adhesive film to the liquid crystal panel. According to the method, the stress due to thermal expansion and thermal shrinkage of the base film can be reduced.

However, in the case of using an anisotropic conductive adhesive film, there can arise a problem that electroconductive particles are present between the adjacent output terminals (FIG. 219) to fail in electrical insulation, thus lowering the reliability. Further, heat-pressure bonding is performed for connection between the drive TABs and the liquid crystal panel and, during the heat-pressure bonding, commingled dirt can collapse the electroconductive particles to impair the insulation between adjacent output terminals.

As a method for solving the above problem, there is a method of using an insulating photocurable resin to connect the TABs 330 (output terminal 333) and the liquid crystal panel P (electrodes 269) with the resin 1260 (FIG. 220). In this method of using such a resin 1260, the connection between the output terminals 333 subjected to soft-etching and the electrodes 269 relies solely on a shrinkage stress to overcome the residual force of the film carrier, etc., resisting the connection, but this leaves a problem in respect of reliability.

Accordingly, in this embodiment, an insulating adhesive 1265 is used for connecting the TAB 330 (output terminals 333) and the liquid crystal panel P (electrodes 269) as shown in FIGS. 221 and 222.

More specifically, in this embodiment, a portion of the base film 331 of a liquid crystal drive TAB 330 is removed to partly expose the output terminals, thus forming a so-called overhang structure. Also, in this embodiment, the lower surface (to be connected with the base film 331) of the output terminals 333 retains unevennesses 1266 of ca. 2–3 μm without being subjected to soft-etching for smoothening. Further, an insulating adhesive 1265 is disposed between the output terminals 333 and the electrodes 269 which are heat-pressure bonded to each other with the insulating adhesive 1265 therebetween, to effect electrical and mechanical connection. The insulating adhesive is in the form of a sheet as shown in FIG. 221. After the heat-pressure bonding, the insulating adhesive 1265 is not left between the output terminals and the electrodes 269 of the panel P.

In this embodiment, as the output terminals 333 are provided with surface unevennesses, the bonding thereof with the base film 331 is enhanced.

The unevennesses also function as minute contacts with the panel-side electrodes 269 to provide a high connection reliability. Such a high connection reliability obtained by using output terminals having surface unevennesses 1266 compared with output terminals having no such unevennesses has been confirmed by us as a result of a thermal impact test. It has been also confirmed by our thermal impact test that output terminals having an overhang structure show a higher reliability than output terminals having no overhang structure (but retaining the base film material at the connection).

The use of a sheet-form insulating adhesive 1265 provides an improved processability.

After the heat-pressure bonding, the insulating adhesive 1265 is disposed between adjacent output terminals without electroconductive particles, so that the electrical insulation between the output terminals is ensured.

Further, the heat-pressure bonding is performed in the state that the insulating adhesive 1265 is present between the liquid crystal drive TAB 330 (output terminals 333) and the liquid crystal panel P (electrodes 269), whereby a high connection reliability is attained.

The unevenness 1266 of the output terminals 333 are formed inherently during the production of the output terminals, so that they do not incur an increase in production cost.

In the above embodiment, the heat-pressure bonding is performed in the state that the insulating adhesive 1265 is disposed between the liquid crystal drive TAB 330 (output terminals 330) and the liquid crystal panel P (electrodes 269). However, the heat-pressure bonding can also be performed in a state that the insulating adhesive 1265 is disposed on the upper surface (not opposite to the liquid crystal panel P) of the output terminals 333.

<Another embodiment regarding the bonding of liquid crystal drive TAB 330>

The connection between the liquid crystal drive TAB 330 and the liquid crystal panel (electrodes 269) shown in FIG. 221 is accompanied with a problem that it provides a small connection strength thus easily resulting in a connection breakage on application of an external force in case where the output terminals 333 are arranged at a density of 10 terminals/mm or higher. This embodiment aims at solving the problem.

This embodiment is described with reference to FIGS. 223 and 224.

Figure 223:
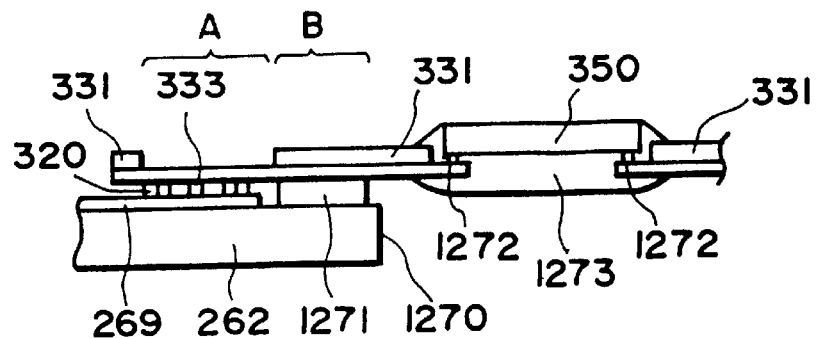

In this embodiment, a portion of the base film 331 of the drive TAB is removed to expose the output terminals 333 (thereby providing a so-called overhang structure) as shown at A in FIG. 223, and the output terminals 333 and the panel-side electrodes 269 are electrically and mechanically connected with an anisotropic conductive adhesive film 320 at a region of prescribed distance from a substrate edge 1270. The anisotropic conductive adhesive film 320 is formed by dispersing electroconductive particles in an insulating adhesive.

At a region B proximate to the substrate edge 1270, the substrate 269 and the liquid crystal drive TAB 330 are secured to each other by bonding with an insulating adhesive 1271. At the bonding region, the output terminals of the TAB 330 are not exposed but retain the base film. FIG. 223 also shows a projecting electrode 1272 and a sealing resin 1273.

According to this embodiment, an increased connection strength is attained because of bonding and fixation between the substrate 269 and the TAB 330 with the insulating adhesive 1271 at the region B. As a result, even when an external force is applied, the force applied to the region A is reduced to prevent the breakage of the output terminals 333 and ensure an electrical connection between the liquid crystal panel P and the drive TAB 330.

In the above embodiment, the electrical and mechanical connection between the output terminals 333 and the panel-side electrodes 269 is obtained by heat-pressure bonding with the anisotropic conductive adhesive film 320. It is also possible to effect heat-pressure bonding in the presence of a thermosetting insulating adhesive.

Figure 224:
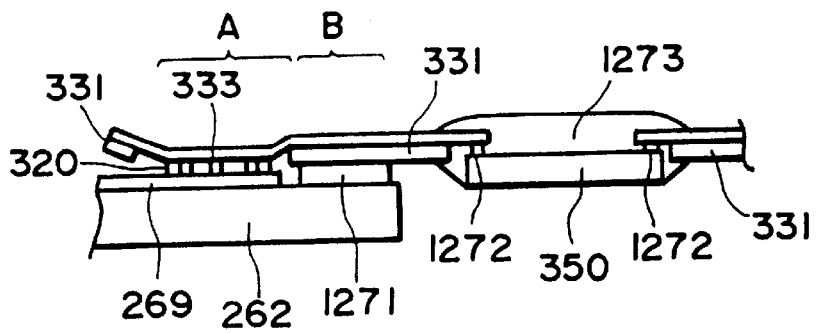

Further, the base film 331 is disposed on an upper side of the TAB 330 (FIG. 223) in the above embodiment but can also be disposed on a lower side of the TAB 330 as shown in FIG. 224.

Figure 225:
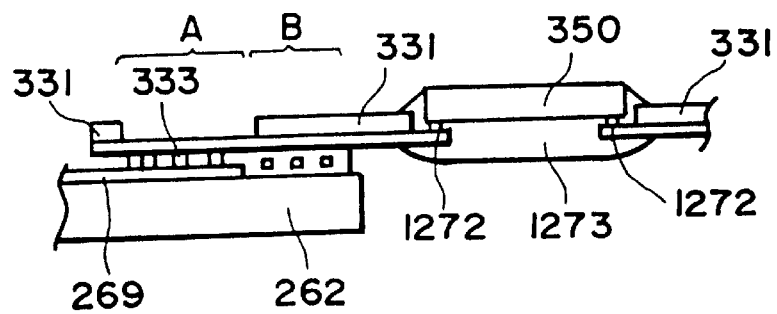
Figure 226:
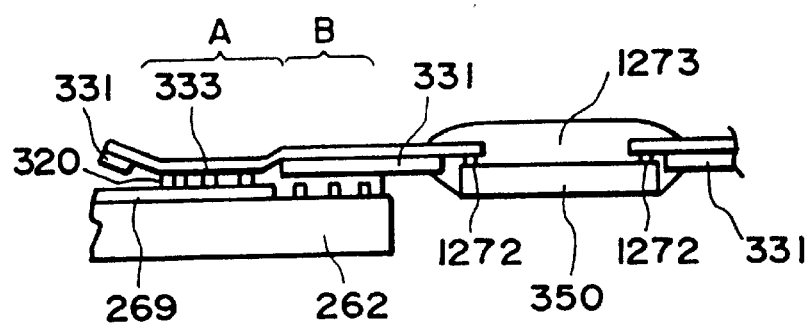

The adhesives bonding the liquid crystal panel P and the drive TAB 330 at parts A and B may be different or the same in species. In the latter case, it is possible to dispose the adhesive in a continuous layer as shown in FIGS. 225 and 226 (of which FIG. 225 shows an embodiment wherein the base film 331 is on the upper side and FIG. 226 shows an embodiment wherein the base film is on the lower side, respectively, of the drive TAB 330).

The panel-side electrodes 269 are not formed at region B in the above embodiment (FIG. 223) but can extend to the region B. In this case, it is possible to take an additional electrical connection between the panel-side electrodes 269 and the output terminals 333 also at the region B.

<Another embodiment regarding heat-pressure bonding apparatus>

A heat-pressure bonding apparatus 1290 as shown in FIG. 227 has been ordinarily used for heat-pressure bonding of a liquid crystal drive TAB to a liquid crystal panel P.

The heat-pressure bonding apparatus 1290 includes a heat-pressure bonding tool 1291 supported vertically movably. The bonding tool 1291 has a heat-pressure bonding surface (lower surface) 1292. The bonding tool 1291 includes a heater body 1293 containing therein a number of heaters 1295–1297 (3 being shown) identical to that of drive TABs subjected to heat-pressure bonding. Below the heater body 1293 and at a position corresponding to the center of the heat-pressure bonding surface 1292, a single thermo-couple 1299 is disposed. The three heaters 1295–1297 and the thermo-couple 1299 are connected to a common temperature controller 1300, so as to heat and hold the heat-pressure bonding tool 1291 at a set temperature.

In such a heat-pressure bonding apparatus, the heaters 1295–1297 are provided in a number of three so as to avoid a lowering in heat capacity of the heat-pressure bonding surface 1292, so that the central heater 1296 has a lower heat capacity than the side heaters 1295 and 1297. Further, the apparatus 1290 has only one thermocouple 1299 in proximity to the central heater 1296, and all the heaters 1295–1297 are controlled by the thermocouple 1299. As a result, at the time of a power supply start, while the central heater 1296 arrives at the set temperature without overshooting but the other heaters 1295 and 1297 cause a temperature overshooting, so that it takes a considerable time until the entire bonding tool 1290 reaches the set temperature. Further, only the edges of the heater body 1293 cause an excessive thermal expansion in an amount corresponding to the overshooting, it is difficult to ensure the planarity of the heat-pressure bonding surface 1292. On the other hand, the heater body 1293 has a special structure including three division heaters and is therefore expensive.

This embodiment aims at providing an improved heat-pressure bonding apparatus for TAB bonding, which will be described with reference to FIGS. 228 to 230.

Referring to FIG. 228, a heat-pressure bonding apparatus 1310 according to this embodiment includes a number of heaters 1311, temperature controllers 1312 and thermocouples 1313, respectively, equal to the number (3 in FIG. 228) of drive TABs to be heat-pressure bonded, and each temperature controller 1312 is connected to one heater 1311 and one thermocouple 1313 so as to allow an individual control.

Thus, according to this embodiment, each heater 1311 is individually controlled by a thermocouple 1313 disposed in proximity thereof and a temperature controller 1312 exclusively therefor. Accordingly, the time required until the entire heat-pressure bonding apparatus reaches a set temperature can be shortened, and the planarity of the heat-pressure bonding surface 1316 is ensured. Further, at the time of heater breakage, only the broken heater can be exchanged without exchanging the entire heater body, thus economizing the cost for heater exchange.

The number of the heaters is the same as the number of drive TABs to be heat-pressure bonded in the above embodiment but can be larger than the latter. For example, it is possible to provide a supplemental heater 1320 at each side of the bonding tool 1315 so as to avoid a temperature decrease at the portions.

The heat-pressure bonding surface 1316 is flat in the above embodiment but can be recessed at a portion 1330 thereof not used for heat-pressure bonding as shown in FIG. 230. In such a case, the heaters are disposed except for the recessed portion, whereby a proper heat-pressure bonding can be effected onto a panel substrate 262 carrying a member 1332 which cannot be pressurized or heated.

<Another embodiment regarding inverter unit>

Figure 88:
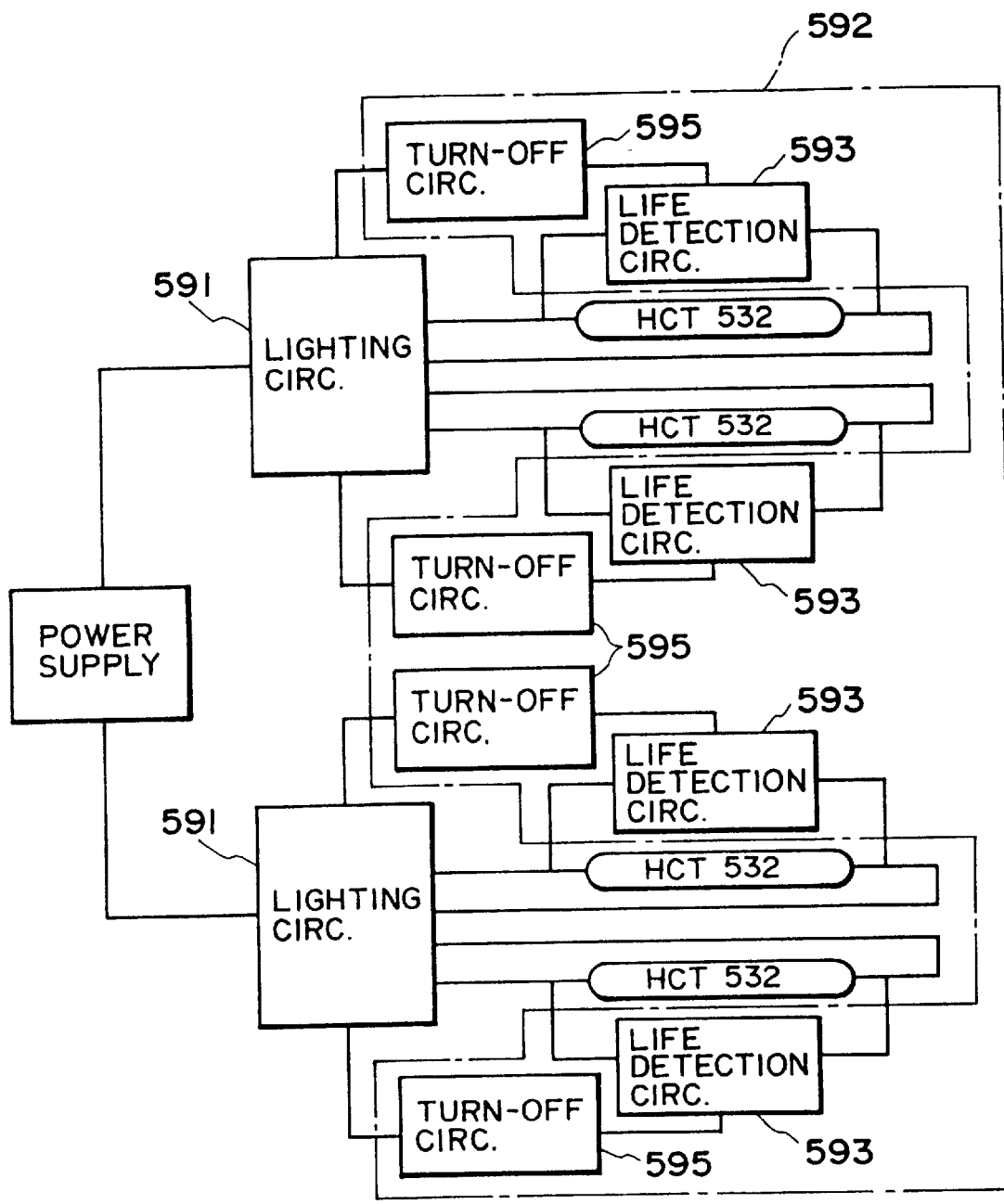

Another embodiment regarding the inverter unit will be described with reference to FIGS. 231 and 232, wherein like parts as in FIG. 88 are denoted by like reference numerals and description thereof is omitted.

In this embodiment, a backlight unit includes four linear light sources 532 as shown in FIG. 231, and the inverter unit includes one life-detection circuit 593, one turn-off circuit and one lighting circuit 592 for each linear light source (HCT) 532 as shown in FIG. 232. Further, the respective lighting circuits are connected to a power supply 1350.

Each life detection circuit 593 always monitors a lighting voltage between both ends of a linear light source 532 after lowering the voltage by resistance division and rectification. Further, the life detection circuit 593 includes a comparator, such as a comparator IC, so as to send out a life detection signal to a turn-off circuit when the lighting voltage of a linear light source exceeds a prescribed value. Further, the turn-off circuit 592 is designed to control an associated lighting circuit 591 to terminate the lighting of an associated linear light source 532 based on the life detection signal from the life detection circuit 593.

The operation of this embodiment will now be described.

When a linear light source 532 approaches its life end, the lighting voltage of the light source is gradually increased to exceed a prescribed value, whereby the life detection circuit 593 sends a life detection signal to the associated turn-off circuit 595. Based on the life detection signal, the turn-off circuit 595 controls the associated lighting circuit 592 to turn off the linear light source 532.

According to this embodiment, it is possible to obviate difficulties, such as a filament breakage and abnormal heat evolution at tube ends, at the life end of a linear light source. Accordingly, it is also possible to prevent the deformation of neighboring members due to the heat evolution.

Further, the respective linear light sources are individually controlled by independent lighting circuits 591, so that only a light source approaching its life end can be turned off while continually energizing other normal light sources. Thus, all the light sources are not turned off simultaneously so that it is possible to obviate a difficulty that the liquid crystal panel display suddenly turns into dark to make the continuation of operation on the panel difficult.

The four linear light sources in the above embodiment are arranged as shown in FIG. 231 but can also be arranged as shown in FIG. 233 wherein two linear light sources are disposed on each of two opposite sides of a light-guide plate or in a direct backing-type arrangement as shown in FIG. 24 wherein all the four linear light sources are arranged in parallel on the back of a panel.

The number of linear light sources are four in the above embodiments but can also be larger, e.g., 6 or 8.

The life detection circuit 593 functions to monitor a lighting voltage of a tube in the above embodiments but can be of a type detecting a temperature of a tube by a temperature-detecting element such as a thermistor, so that the temperature increase at tube ends on approaching a tube life end is monitored to turn off the tube when the temperature exceeds a prescribed value.

<Anisotropic conductive adhesive film>

An anisotropic conductive adhesive (film) for connecting output terminals of a liquid crystal drive TAB and electrodes of a liquid crystal panel may comprise a thermosetting resin containing electroconductive particles dispersed therein. The thermosetting resin may for example comprise a thermosetting epoxy adhesive, a thermosetting silicone resin or a thermosetting polyimide resin.

Instead of using an as-formed film adhesive, it is possible to use a pasty adhesive by applying it, e.g., by printing.

The use of a thermosetting anisotropic conductive adhesive is advantageous for the following points.

The above-mentioned liquid crystal panel may use a ferroelectric liquid crystal. In such a case, it is necessary to develop a monodomain alignment step in a chiral smectic phase by gradual cooling (e.g., at a rate of ca. 5° C./min.) from a higher temperature phase, such as isotropic phase, as disclosed U.S. Pat. No. 4,639,089 to Okada, et al. At present, it is impossible to form a monodomain alignment state if the cooling to the chiral smectic phase or the heating to the isotropic phase is rapidly performed.

Accordingly, if such a liquid crystal panel P containing a ferroelectric liquid crystal and liquid crystal drive TABs are electrically connected by a heat-pressure bonding step as described above, the liquid crystal panel P can be heated rapidly partly or entirely and can be cooled rapidly after the heat-pressure bonding, so that the liquid crystal in the panel can fail to assume a monodomain alignment state in some cases when it is returned to the chiral smectic phase. The liquid crystal having caused such an alignment disorder can be restored to an original monodomain alignment state by a re-aligning treatment. However, a connection obtained by using an anisotropic conductive adhesive principally comprising a thermoplastic resin can cause a problem, such as an increase in connection resistance, after the heating for the realizing treatment.

According to this embodiment, the above difficulty is obviated. FIG. 235 includes graphs showing effects of the embodiment. At (a) is shown a temperature change with time during a re-aligning treatment for a ferroelectric liquid crystal panel P; at (b) is shown a connection resistance change with time during the realigning treatment measured with respect to a connection as described in the above-embodiments formed by using an anisotropic conductive adhesive comprising a thermoplastic resin (i.e., one obtained by dispersing 10 wt. parts of electroconductive particles (formed by coating high-accuracy spherical cured resin particles ("Eposter GP-90", available from Nippon Shokubai Kagaku Kogyo K.K.) with Au) in a resin mixture of 50 wt. parts of styrene-butadiene copolymer and 50 wt. parts of terpene phenolic resin), and at (c) is shown a connection resistance change with time during the realigning treatment measured with respect to a connection as described in the above-embodiments formed by using an anisotropic conductive adhesive (one obtained by dispersing 10 wt. parts of the above-mentioned electroconductive particles in 100 wt. parts of thermosetting epoxy resin).

As shown in FIG. 235, when subjected to a re-aligning treatment with a temperature profile including a heating from room temperature $T_1$ to a realigning treatment temperature $T_2$ (80° C.) and a gradual cooling for ca. 2 hours (from $t_1$ to $t_2$) as shown at FIG. 235(a), the connection using a thermoplastic resin-based conductive adhesive caused a connection resistance change from an initial resistance $R_1$ (ca. 2 Ω) to $R_2$ (ca. 10 Ω) in an environment of 80° C. and then to $R_3$ (ca. 3 Ω) at room temperature $T_1$ after gradual cooling for ca. 2 hours ($t_1$ to $t_2$), thus showing an increase in connection resistance as shown at FIG. 235(b). This increase in connection resistance may be attributable to a floating or increase in distance between the connection electrodes of the panel P and the output terminals of the drive TAB due to a difference in linear expansion coefficient among the thermoplastic resin adhesive, the glass substrate of the panel P and the base film 331 of the TAB, and a weakened adhesion strength caused by softening of the thermoplastic resin adhesive at a re-aligning treatment temperature. As a result, the contact area and number of contacting particles of the electroconductive particles participating in the electrical connection may be reduced.

On the other hand, the connection using a thermosetting resin-based conductive adhesive caused a connection resistance change including an increase from an initial resistance $R_1$ (ca. 2 Ω) to $R_2$ ( ca. 3 Ω) in an atmosphere of 80° C. but, after gradual cooling for ca. 2 hours ($t_2$ to $t_2$), the connection resistance was lowered to $R_3$ (ca. 2 Ω) which was substantially identical to the initial resistance $R_1$ as shown at FIG. 235(c). The above-connection resistance change inclusive of some increase in the environment of 80° C. and restoration to the initial value after gradual cooling to room temperature, may be attributable to elongation and shrinkage of the thermosetting resin.

As described above, by the use of a thermosetting resin-based anisotropic conductive adhesive, it has become possible to obviate an increase in connection resistance of a connection formed by an anisotropic conductive adhesive after subjecting a ferroelectric liquid crystal panel P to a re-aligning treatment (i.e., a treatment for removing an alignment disorder of ferroelectric liquid crystal caused by rapid cooling or heating by re-heating the ferroelectric liquid crystal to isotropic phase, followed by gradual cooling, to restore the monodomain alignment state).

Incidentally, the output terminals 333 formed on the base film 331 are connected to the liquid crystal drive IC 350 by a bonding member and the periphery thereof is protected by an adhesive.

Preferable liquid crystals having bistability which can be used in the present invention are smectic, particularly chiral smectic liquid crystals having ferroelectricity. Among them, chiral smectic C (SmC*)- or H (SmH*)-phase liquid crystals are suitable therefor. These ferroelectric liquid crystals are descried in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. U.S. Pat. Nos. 4,561,726, 4,589,996 and 4,592,858. Ferroelectric liquid crystal disclosed in these publications may be used in the present invention.

More particularly, examples of ferroelectric liquid crystal compound used in the method according to the present invention are disiloxybensilidene-p'-amino-2-methylbutyl-cinnamate (DOBAMBC), hexyloxybenzilidene-p'-amino-2-chloropylcinnamate (HOBACPC), 4-O-(2-methyl)-butylresorcilidene-4'-octylaniline (MBRA8), etc.

When a panel is constituted by using these materials, the panel may be supported with a block of copper, etc. in which a heater is embedded in order to realize a temperature condition where the liquid crystal compounds assume an SmC*- or SmH*-phase.

In the present invention, it is also possible to use a ferroelectric liquid crystal in a chiral smectic F phase, I phase, J phase, G phase or K phase in addition to the above-mentioned SmC* and SmH*.

Referring to FIG. 236, there is schematically shown an example of a ferroelectric liquid crystal cell (panel). Reference numerals 262 and 280 denote substrates (glass plates) on which a transparent electrode of, e.g., $In_2O_3$, $SnO_2$, ITO (indium-tin-oxide), etc., is disposed, respectively. A liquid crystal of an SmC*-phase in which liquid crystal molecular layers 1360 are oriented perpendicular to surfaces of the glass plates is hermetically disposed therebetween. A full line 1361 shows liquid crystal molecules. Each liquid crystal molecule 1361 has a dipole moment 1382 in a direction perpendicular to the axis thereof. When a voltage higher than a certain threshold level is applied between electrodes formed on the base plates 262 and 280, a helical or spiral structure of the liquid crystal molecule 1361 is unwound or released to change the alignment direction of respective liquid crystal molecules 1361 so that the dipole moments 1362 are all directed in the direction of the electric field. The liquid crystal molecules 1361 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell (panel) thus arranged functions as a liquid crystal optical modulation device of which optical characteristics vary depending upon the polarity of an applied voltage. Further, when the thickness of the liquid crystal cell is sufficiently thin (e.g., 1 μm), the helical structure of the liquid crystal molecules is released without application of an electric field whereby the dipole moment assumes either of the two states, i.e., Pa in an upper direction 1370a or Pb in a lower direction 1390b thus providing a bistability condition, as shown in FIG. 237. When an electric field Ea or Eb higher than a certain threshold level and different from each other in polarity as shown in FIG. 237 is applied to a cell having the above-mentioned characteristics, the dipole moment is directed either in the upper direction 1370a or in the lower direction 1370b depending on the vector of the electric field Ea or Eb.

In correspondence with this, the liquid crystal molecules are oriented to either a first orientation state 1371a or a second orientation state 1371b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 1371b. When the electric field Ea is applied to the liquid crystal molecules, they are oriented in the first stable state 1371a. This state is stably retained even if the electric field is removed. On the other hand, when the electric field Eb of which direction is opposite to that of the electric field Ea is applied thereto, the liquid crystal molecules are oriented to the second orientation state 1371b whereby the directions of molecules are changed. Likewise, the latter state is stably retained even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$m, further preferably 1 to 5 $\mu$m.

As described above, according to the present invention, as the display unit and the power supply unit are integrally disposed within a common housing, and an insulating plate is disposed depending on a heat-evolution condition of the power supply unit and in a prescribed positional relationship with the inverter unit and the converter unit, a heat evolved from the power supply unit is transmitted in a controlled manner to the power supply unit to uniformize the temperature distribution on the display unit. Particularly, in the case of a display unit using a ferroelectric liquid crystal, the heat transferred from the power supply unit is used to raise the display unit temperature, thereby accelerating the response speed of the ferroelectric liquid crystal.

Accordingly, in the present invention, it has become unnecessary to use a heater, etc., for warming the display unit to economize the power consumption. This also contributes to a reduction in number of parts or components, improved assembling and maintenance characteristics, and improved convenience for transportation and movement and cost reduction due to the use of less parts or components.

Further, as the display unit, the backlight unit, the inverter unit, the controller unit and the power supply unit are disposed integrally within a common housing, the display apparatus body can be moved easily.

Further, by removing a portion of a base film of the print circuit sheet (TAB film) to expose a portion of the output terminals or input terminals, it is possible to prevent the breakage of the terminal electrodes even when the base film expands or shrinks accompanying a temperature change.

Further, in the case of forming alignment marks on TAB films and transparent substrates, the connection between the TAB films and the transparent substrates can be effected accurately.

In the case of forming the panel-fixing plate and the panel frame from a glass-fiber dispersed resin, it is possible to provide these members with a thermal expansion coefficient close to that of the glass substrates of the liquid crystal panel, thereby further reducing a stress occurring in TAB films.

Further, in the case of disposing an elastic member of silicone resin, etc., between the liquid crystal panel and the panel-fixing plate, between the panel cover and the liquid crystal panel or between the panel frame and the panel-fixing plate, the liquid crystal panel is elastically supported to alleviate a vibration transmitted to the panel, so that it is possible to prevent a display quality degradation due to vibration or impact. Further, by utilizing the elastic members also for forming a closed space, an air damper effect is given by the closed space, thereby promoting the attenuation of vibration, etc., and further ensuring the prevention of display quality degradation due to vibration, etc.

When the panel cover is plated with Ni, etc., it is possible to reduce a radiation noise. Further, the panel cover may be provided with a protective transparent member (face plate), which may be subjected to diffusion treatment to reduce the reflection of light entering from the outside, thereby allowing an easy recognition of displayed images.

By using a backlight unit including linear light sources on the periphery of light-guide means, the display apparatus thickness can be reduced. In this case, by covering the light sources with reflection plates, light from the light sources can be efficiently guided to the light-guide means. Further, by providing the light sources with engaging projections and providing the reflection means with engaging perforations, the light sources and the reflection means can be easily attached to and detached from each other. Further, by disposing a luminance distribution adjusting means for adjusting a luminance distribution of light emitted from the backlight unit, it is possible to uniformize the luminance distribution and provide an improved display quality.

What is claimed is:

1. A display apparatus, comprising:

a display unit for displaying images, a backlight unit for illuminating the display unit, an inverter unit for electrically controlling the backlight unit, a controller unit for controlling the inverter unit and the display unit, a power supply unit having an exothermic heat distribution for supplying electricity to the inverter unit and the controller unit; with the display unit being disposed on a front side of the backlight unit, the inverter unit and the controller unit being disposed on a back side of the backlight unit, the power supply unit being disposed on a side of the display unit, the backlight unit, the inverter unit and the controller unit, and the display unit, the backlight unit, the inverter unit, the controller unit and the power supply unit being disposed in a common housing, wherein the inverter unit and the controller unit are arranged behind the backlight unit, and an insulating member is disposed between the power supply unit and one side of the display unit at a position corresponding to a region of relatively large exothermic heat of the power supply unit, with the insulating member being disposed at a diagonal position with respect to the inverter unit.

2. A display apparatus according to claim 1, wherein the display unit, the backlight unit, the inverter unit and the controller unit are disposed above the power supply unit, the inverter unit is disposed diagonally above the large exothermic heat region of the power supply unit, and the controller unit is disposed above the large exothermic heat region of the power supply unit.

3. A display apparatus according to claim 1, wherein the housing comprises a front housing member and a rear housing member detachably affixed to the front housing member, at least a front side of the display unit is covered by the front housing member, and at least rear sides of the inverter unit, the controller unit and the power supply unit are covered by the rear housing member.

4. A display apparatus according to claim 1, wherein the display unit comprises a liquid crystal panel, a plurality of printed circuit sheets disposed at a periphery of the liquid crystal panel, a driver board electrically connecting the plurality of printed circuit sheets and the controller unit, a panel-fixing plate supporting the liquid crystal panel and the driver board, and a panel frame supporting the panel-fixing plate, so that the controller unit supplies signals to the liquid crystal panel via the driver board and the printed circuit sheets, thereby to drive the liquid crystal panel.

5. A display apparatus according to claim 4, wherein the liquid crystal panel comprising a pair of oppositely disposed transparent substrates having scanning electrodes and data electrodes, respectively, on their opposing surfaces, and a liquid crystal disposed between the substrates.

6. A display apparatus according to claim 4, wherein the liquid crystal panel is a ferroelectric liquid crystal.

7. A display apparatus according to claim 5, wherein the printed circuit sheets include a scanning-side printed circuit sheet for supplying scanning signals to the scanning electrodes based on a signal from the controller unit, and a data-side printed circuit sheet for supplying data signals to the data electrodes based on a signal from the controller unit.

8. A display apparatus according to claim 7, wherein the scanning-side printed circuit sheet comprises a base film comprising polyimide, output electrodes and input electrodes each comprising copper and formed on the base film, and a scanning-side drive IC connected to the output electrodes and the input electrodes.

9. A display apparatus according to claim 8, wherein the data-side printed circuit sheet comprises a base film comprising polyamide, output electrodes and input electrodes each comprising copper and formed on the base film, and a data-side drive IC connected to the output electrodes and the input electrodes.

10. A display apparatus according to claim 8, wherein the output electrodes of the scanning-side printed circuit sheet are connected to the scanning electrodes of the liquid crystal panel via an anisotropic conductive adhesive film, and the anisotropic conductive adhesive film comprises a thermosetting resin and a multiplicity of metal particles or metal-plated resin particles dispersed therein.

11. A display apparatus according to claim 9, wherein the output electrodes of the data-side printed circuit sheet are connected to the data electrodes of the liquid crystal panel via an anisotropic conductive adhesive film, and the anisotropic conductive adhesive film comprises a thermosetting resin and a multiplicity of metal particles or metal-plated resin particles dispersed therein.

12. A display apparatus according to 8, wherein the output electrodes of the scanning-side printed circuit sheet are partly exposed by removing a portion of the base film at an intermediate region thereof so that the output electrodes retain a tip portion retaining the base film.

13. A display apparatus according to 9, wherein the output electrodes of the data-side printed circuit sheet are partly exposed by removing a portion of the base film at an intermediate region thereof so that the output electrodes retain a tip portion retaining the base film.

14. A display apparatus according to claim 8, wherein the scanning-side printed circuit film has a first alignment mark in proximity to the output electrodes, one of the transparent substrates having thereon the scanning electrodes has thereon a second alignment mark in proximity to the scanning electrodes, and the output electrodes and the scanning electrodes are positionally aligned by means of the first and second alignment marks and connected to each other.

15. A display apparatus according to claim 9, wherein the data-side printed circuit sheet has a third alignment mark in proximity, to the output electrodes, one of the transparent substrates having thereon the data electrodes has thereon a fourth alignment mark in proximity to the data electrodes, and the output electrodes and the data electrodes are positionally aligned by means of the third and fourth alignment marks and connected to each other.

16. A display apparatus according to 9, wherein the driver board includes a scanning-side driver board for supply scanning signals to the scanning-side printed circuit sheet disposed between the controller unit and the scanning-side printed circuit sheet, and a data-side driver board for supplying data signals to the data electrodes disposed between the controller unit and the data-side printed circuit sheet.

17. A display apparatus according to claim 16, wherein the scanning side driver board has a laminated structure including a substrate layer comprising epoxy resin containing glass fiber therein, and a layer of copper wires, laminated alternately.

18. A display apparatus according to claim 16, wherein the data-side driver board has a laminated structure including a substrate layer comprising epoxy resin containing glass fiber therein, and a layer of copper wires, laminated alternately.

19. A display apparatus according to 16, wherein the scanning-side driver board has connection electrodes which are connected to the input electrodes of said scanning-side printed circuit sheet with solder.

20. A display apparatus according to 16, wherein the data-side driver board has connection electrodes which are connected to the input electrodes of the data-side printed circuit sheet with solder.

21. A display apparatus according to 8, wherein the input electrodes of the scanning-side printed circuit sheet are partly exposed by removing a portion of the base film at an intermediate region thereof so that the input electrodes retain a tip portion retaining the base film.

22. A display apparatus according to 9, wherein the input electrodes of the data-side printed circuit sheet are partly exposed by removing a portion of the base film at an intermediate region thereof so that the input electrodes retain a tip portion retaining the base film.

23. A display apparatus according to claim 16, wherein reference potentials for driving the scanning-side drive IC and the data-side drive IC are commonized via the scanning-side driver board and the data-side driver board.

24. A display apparatus according to claim 23, wherein the reference potentials are commonized by connecting the scanning-side driver board and the data-side driver board with a flat cable.

25. A display apparatus according to claim 4, wherein the panel-fixing plate comprises a resin containing glass fiber dispersed therein.

26. A display apparatus according to 25, wherein the resin comprises polycarbonate.

27. A display apparatus according to claim 4, wherein the panel frame comprises a resin containing glass fiber dispersed therein.

28. A display apparatus according to claim 27, wherein the resin comprises polycarbonate.

29. A display apparatus according to claim 4, wherein the liquid crystal panel is elastically supported by the panel-fixing plate via silicone resin disposed at the peripheral region of the liquid crystal panel.

30. A display apparatus according to claim 4, wherein the panel frame is formed in a frame shape so as to surround the periphery of the panel-fixing plate, and the panel-fixing plate is elastically supported by the panel frame via silicone resin.

31. A display apparatus according to claim 4, wherein the driver board is supported by the panel-fixing plate by means of holding plates provided to the panel-fixing plate.

32. A display apparatus according to claim 4, wherein a panel cover is disposed inside the housing so that the panel-fixing plate is supported by the housing via the panel cover, and the panel cover comprises a resin containing glass fiber dispersed therein.

33. A display apparatus according to claim 32, wherein the resin comprises polycarbonate.

34. A display apparatus according to claim 32, wherein the plate cover is plated with nickel.

35. A display apparatus according to claim 4, wherein a diffusion plate is attached to the panel-fixing plate so as to be disposed between the backlight unit and the liquid crystal panel and so that light from the backlight unit is diffused by the diffusion plate.

36. A display apparatus according to claim 32, wherein the panel cover is disposed between the housing and the liquid crystal panel and provided with an opening corresponding to the position of the liquid crystal panel, and the panel cover is further provided with a diffusion-treated transparent member attached thereto so as to close the opening with the transparent member.

37. A display apparatus according to claim 32, wherein an elastic member is disposed between the panel cover and the liquid crystal panel so as to define an almost closed space together with the panel cover and the liquid crystal panel.

38. A display apparatus according to claim 32, wherein the liquid crystal panel and the driver board are elastically supported within a space surrounded by the panel-fixing plate, the panel frame and the panel cover.

39. A display apparatus according to claim 4, wherein the liquid crystal panel includes polarizers disposed on both surfaces thereof.

40. A display apparatus according to claim 36, wherein the liquid crystal panel includes polarizers disposed on both surfaces thereof, and one of the polarizers disposed opposite to the transparent member is diffusion-treated.

41. A display apparatus according to claim 1, wherein the backlight unit includes a light source, a light-guide means for transmitting light from the light source therethrough, a diffusive reflection means disposed opposite to the driver unit via the light guide means so as to diffusively reflect the light from the light source, and a prism sheet disposed opposite to the diffusive reflection means via the light guide means so as to direct the light transmitted through the light-guide means toward the display unit.

42. A display apparatus according to claim 41, wherein the light source is disposed at a periphery of the light-guide means.

43. A display apparatus according to claim 42, wherein the light source includes four linear light sources disposed to surround the light guide means.

44. A display apparatus according to claim 41, wherein the backlight unit includes a reflection means disposed so as to cover the light source and direct light from the light source toward the light-guide means.

45. A display apparatus according to claim 44, wherein the light source has an engaging projection, and said reflection means has an engaging perforation with which the engaging projection is detachably engaged, so that the light source and the reflection means are integrated with each other.

46. A display apparatus according to claim 41, wherein the backlight unit includes a luminance distribution adjusting means disposed between said diffusive reflection means and the light guide means so as to adjust a luminance distribution of light emitted from the backlight unit.

47. A display apparatus according to claim 46, wherein the light-guide means comprises a transparent plate, and the luminance distribution adjusting means is formed on a surface of the light guide means.

48. A display apparatus according to claim 41, wherein the backlight unit includes a backlight upper plate and a backlight lower plate, and the light source, the light-guide means, the diffusive reflection means and the prism sheet, are sandwiched between the backlight upper and lower plates.

49. A display apparatus according to claim 48, wherein an elastic member is disposed between the backlight upper plate and the display unit and along the periphery of the display unit so that an almost closed space is defined by the elastic member together with the display unit and the backlight upper plate.

50. A display apparatus according to claim 48, wherein the inverter unit and the controller unit are supported by the backlight lower plate.

51. A display apparatus according to claim 4, further including a first connector attached to the display unit, a second connector attached to the controller unit, and a flat cable comprising a flexible printed circuit sheet, so that the display unit and the controller unit are electrically connected to each other via the connectors and the flat cable.

52. A display apparatus according to claim 51, wherein the flat cable comprises a base film, a signal line disposed on one surface of the base film and a reference potential line disposed on the other surface of the base film.

53. A display apparatus according to claim 51, wherein said first and second connectors each comprises a plurality of contacts each contacting any one of the signal line and the reference potential line of the flat cable.

54. A display apparatus according to claim 52, wherein the signal line of the flat cable is covered with the reference potential line via an insulating layer except at positions for connection with the connectors.

55. A display apparatus according to claim 51, wherein the first connector is attached to the driver board of the display unit.

56. A display apparatus according to claim 51, further including an interface cable connection connected to the controller unit, so that the controller unit is connected to a host computer via the interface cable connection.

57. A display apparatus according to claim 1, wherein the common housing is provided with a perforation for heat dissipation at a prescribed part thereof.

58. A display apparatus according to claim 4, wherein the liquid crystal panel is equipped with a thermistor for detecting the temperature of the liquid crystal.

59. A display apparatus according to claim 58, wherein the liquid crystal panel is in the form of a rectangle having four sides, and a plurality of printed circuit sheets are disposed along only three of the four sides including a side along which the power supply unit is disposed and an opposite side thereto, and the thermistor is disposed on the remaining one side free from disposition of the print circuit sheets of the panel at a position which is shifted from a mid point of the side toward the power supply unit side.

60. A display apparatus according to claim 59, wherein the remaining one side of the liquid crystal panel free from disposition of the printed circuit sheets is disposed closer to the said insulating member than an opposite side thereto.

61. A display apparatus comprising:

a display apparatus body including;

a display unit for displaying images, a backlight unit for illuminating the display unit, an inverter unit for electrically controlling the backlight unit, a controller unit for controlling the inverter unit and the display unit, a power supply unit having an exothermic heat distribution for supplying electricity to the inverter unit and the controller unit, with the display unit being disposed on a front side of the backlight unit, the inverter unit and the controller unit being disposed on a back side of the backlight unit, the power supply unit being disposed on a side of the display unit, backlight unit, inverter unit and controller unit, the display unit, the backlight unit, the inverter unit, the controller unit and the power supply unit being disposed in a common housing, and wherein the inverter unit and the controller unit are arranged behind the backlight unit, and an insulating member is disposed between the power supply unit and one side of the display unit at a position corresponding to a region of relatively large exothermic heat of the power supply unit, with the insulating member being disposed at a diagonal position with respect to the inverter unit; and a support structure for supporting the display apparatus body.

62. A display apparatus according to claim 61, wherein the support structure includes an angle adjusting mechanism capable of adjusting vertical and lateral angles of the display apparatus body so that the display apparatus body is supported by the support structure at desired angles.

63. A display apparatus according to claim 1, wherein the insulating member comprises a metal.

64. A display apparatus according to claim 61, wherein the insulating member comprises a metal.

65. A display apparatus, comprising:

a common housing;

a display unit for displaying images;

a power supply unit for supplying power for driving the display unit, with the power supply unit and the display unit disposed within the common housing; and an insulating member disposed between the display unit and the power supply unit at a position corresponding to a region of relatively large exothermic heat of the power supply unit so that exothermic heat from the region of relatively large erothermic heat is guided to a relatively low temperature region of the display unit.

66. A display apparatus according to claim 65, wherein the insulating member comprises a metal.

67. A display apparatus according to claim 65, further including a controller unit housed within the common housing at a position above the region of relatively large exothermic heat of the power supply unit.

* * * * *

UNITED STATES PATENT AND TRADEMARK OFFICE
CERTIFICATE OF CORRECTION

PATENT NO. : 6,020,867

DATED : February 1, 2000

INVENTOR(S): TETSUYA SHIMADA, ET AL.  Page 1 of 2

It is certified that error appears in the above-identified patent and that said Letters Patent is hereby corrected as shown below:

[30] FOREIGN APPLICATION PRIORITY DATA:

```
Insert the following:
-- [30]   Foreign Application Priority Data
          March 22, 1995   [JP] .......... 7-90406
          March 22, 1995   [JP] .......... 7-90407
          March 22, 1995   [JP] .......... 7-90408--.
```

COLUMN 6:

Line 22, "in" should read --in FIGS. 114, 115, 117 and 118, respectively).--.
Line 23, "¶ FIGS. 114, 115, 117 and 118, respectively)." should be deleted.

COLUMN 69:

Line 25, "an 113-113" should read --a 163-163--.

COLUMN 79:

Line 58, "of the base potential" should be deleted.

UNITED STATES PATENT AND TRADEMARK OFFICE
CERTIFICATE OF CORRECTION

PATENT NO. : 6,020,867
DATED : February 1, 2000
INVENTOR(S): TETSUYA SHIMADA, ET AL.

Page 2 of 2

It is certified that error appears in the above-identified patent and that said Letters Patent is hereby corrected as shown below:

COLUMN 94:

Line 34, "said" should read --the--.

COLUMN 96:

Line 2, "said" should read --the--.
    Line 42, "said" should read --the--.

Signed and Sealed this

Tenth Day of April, 2001

Attest:

NICHOLAS P. GODICI

*Attesting Officer*    *Acting Director of the United States Patent and Trademark Office*